US011273881B2

(12) United States Patent
Deckard et al.

(10) Patent No.: US 11,273,881 B2
(45) Date of Patent: Mar. 15, 2022

(54) SIDE-BY-SIDE VEHICLE

(71) Applicant: Polaris Industries Inc., Medina, MN (US)

(72) Inventors: Aaron D. Deckard, Zionsville, IN (US); Adam J. Schlangen, Rush City, MN (US)

(73) Assignee: Polaris Industries Inc., Medina, MN (US)

(*) Notice: Subject to any disclaimer, the term of this patent is extended or adjusted under 35 U.S.C. 154(b) by 196 days.

(21) Appl. No.: 16/292,440

(22) Filed: Mar. 5, 2019

(65) Prior Publication Data

US 2019/0217909 A1 Jul. 18, 2019

Related U.S. Application Data

(62) Division of application No. 14/051,700, filed on Oct. 11, 2013, now Pat. No. 10,246,153.

(Continued)

(51) Int. Cl.

| | |
|---|---|
| ***B62D 63/02*** | (2006.01) |
| ***B60G 3/20*** | (2006.01) |
| ***B60G 21/055*** | (2006.01) |
| ***B60G 7/00*** | (2006.01) |
| ***B60R 22/00*** | (2006.01) |
| ***F16B 19/00*** | (2006.01) |
| ***B60N 2/90*** | (2018.01) |

(Continued)

(52) U.S. Cl.

CPC ............. *B62D 63/02* (2013.01); *B60G 3/202* (2013.01); *B60G 7/008* (2013.01); *B60G 21/055* (2013.01); *B60N 2/005* (2013.01); *B60N 2/90* (2018.02); *B60R 22/00* (2013.01); *B62D 23/005* (2013.01); *B62D 27/065* (2013.01); *F16B 7/18* (2013.01); *F16B 19/002* (2013.01); *B60G 2200/1442* (2013.01); *B60G 2200/182* (2013.01); *F16B 37/067* (2013.01)

(58) Field of Classification Search

CPC ........ B62D 63/02; B60G 3/202; B60G 7/008; B60G 21/055; B60G 2200/1442; B60G 2200/182

See application file for complete search history.

(56) References Cited

U.S. PATENT DOCUMENTS

| | | | |
|---|---|---|---|
| 3,422,918 | A | 1/1969 | Musser |
| 3,600,768 | A | 8/1971 | Romanzi |

(Continued)

FOREIGN PATENT DOCUMENTS

| | | |
|---|---|---|
| CN | 1724283 | 1/2006 |
| CN | 101115635 | 1/2008 |

(Continued)

OTHER PUBLICATIONS

Office Action issued by the Australian Patent Office, dated Apr. 7, 2016, for Australian Patent Application No. 2013329090; 3 pages.

(Continued)

*Primary Examiner* — Jonathan Ng
*Assistant Examiner* — Joselynn Y Sliteris
(74) *Attorney, Agent, or Firm* — Faegre Drinker Biddle & Reath LLP

(57) ABSTRACT

The present invention relates to all terrain vehicles having at least a pair of laterally spaced apart seating surfaces.

16 Claims, 97 Drawing Sheets

Related U.S. Application Data

(60) Provisional application No. 61/712,396, filed on Oct. 11, 2012.

(51) Int. Cl.

| | |
|---|---|
| ***B62D 23/00*** | (2006.01) |
| ***B62D 27/06*** | (2006.01) |
| ***B60N 2/005*** | (2006.01) |
| ***F16B 7/18*** | (2006.01) |
| *F16B 37/06* | (2006.01) |

(56) References Cited

U.S. PATENT DOCUMENTS

| | | | | |
|---|---|---|---|---|
| 4,046,403 | A | 9/1977 | Yoshida | |
| D286,760 | S | 11/1986 | Ooba | |
| 4,650,210 | A | 3/1987 | Hirose | |
| D300,011 | S | 2/1989 | Oba | |
| 4,817,985 | A | 4/1989 | Enokimoto | |
| D312,989 | S | 12/1990 | Murata | |
| 5,086,858 | A | 2/1992 | Mizuta | |
| 5,306,044 | A | 4/1994 | Tucker | |
| 5,327,989 | A | 7/1994 | Furuhashi | |
| 5,738,471 | A | 4/1998 | Zentner | |
| 5,752,791 | A | 5/1998 | Ehrlich | |
| 5,816,650 | A | 10/1998 | Lucas | |
| 5,895,063 | A | 4/1999 | Hasshi | |
| 6,113,328 | A | 9/2000 | Claucherty | |
| D442,119 | S | 5/2001 | Murata | |
| 6,293,588 | B1 | 9/2001 | Clune | |
| 6,293,610 | B1 | 9/2001 | Howard | |
| 6,295,713 | B1 | 10/2001 | Hilliard | |
| 6,309,024 | B1 | 10/2001 | Busch | |
| D453,912 | S | 2/2002 | Hettich | |
| D467,200 | S | 12/2002 | Luo | |
| 6,582,004 | B1 | 6/2003 | Hamm | |
| D497,324 | S | 10/2004 | Chestnut | |
| D500,707 | S | 1/2005 | Lu | |
| D503,657 | S | 4/2005 | Katoh | |
| D504,638 | S | 5/2005 | Tanaka | |
| D511,317 | S | 11/2005 | Tanaka | |
| 7,014,241 | B2 | 3/2006 | Toyota | |
| 7,281,753 | B2 | 10/2007 | Curtis | |
| D555,036 | S | 11/2007 | Eck | |
| D574,297 | S | 8/2008 | Carl | |
| D575,675 | S | 8/2008 | Williams | |
| D578,433 | S | 10/2008 | Kawaguchi | |
| D578,934 | S | 10/2008 | Tanaka | |
| 7,431,024 | B2 | 10/2008 | Buckwitz | |
| D592,998 | S | 5/2009 | Woodard | |
| D595,613 | S | 7/2009 | Lai | |
| D604,201 | S | 11/2009 | Kawaguchi | |
| D605,555 | S | 12/2009 | Tanaka | |
| D606,900 | S | 12/2009 | Flores | |
| 7,625,048 | B2 | 12/2009 | Rouhana | |
| D607,377 | S | 1/2010 | Shimomura | |
| 7,677,646 | B2 | 3/2010 | Nakamura | |
| 7,717,495 | B2 | 5/2010 | Leonard | |
| D621,423 | S | 8/2010 | Nakanishi | |
| D622,631 | S | 8/2010 | Lai | |
| 7,795,602 | B2 | 9/2010 | Leonard | |
| D624,848 | S | 10/2010 | Shimomura | |
| D625,662 | S | 10/2010 | Li | |
| 7,819,220 | B2 | 10/2010 | Sunsdahl | |
| D631,395 | S | 1/2011 | Tandrup | |
| D633,006 | S | 2/2011 | Sanschagrin | |
| 7,913,505 | B2 | 3/2011 | Nakamura | |
| D636,704 | S | 4/2011 | Yoo | |
| D640,598 | S | 6/2011 | Zhang | |
| D641,288 | S | 7/2011 | Sun | |
| D642,493 | S | 8/2011 | Goebert | |
| 8,052,202 | B2 | 11/2011 | Nakamura | |
| 8,215,694 | B2 | 7/2012 | Smith | |
| 8,328,235 | B2 | 12/2012 | Schneider | |
| 8,464,824 | B1 | 6/2013 | Reisenberger | |
| 8,465,050 | B1 | 6/2013 | Spindler | |
| 8,548,710 | B1 | 10/2013 | Reisenberger | |
| 8,596,405 | B2 | 12/2013 | Sunsdahl | |
| 8,613,335 | B2 | 12/2013 | Deckard | |
| 8,640,814 | B2 | 2/2014 | Deckard | |
| D703,102 | S | 4/2014 | Eck | |
| 8,746,719 | B2 * | 6/2014 | Safranski | B60G 3/20 280/124.148 |
| 8,781,705 | B1 | 7/2014 | Reisenberger | |
| 8,827,025 | B2 | 9/2014 | Hapka | |
| 8,827,028 | B2 | 9/2014 | Sunsdahl | |
| 8,994,494 | B2 | 3/2015 | Koenig | |
| 8,997,908 | B2 | 4/2015 | Kinsman | |
| 9,152,607 | B2 * | 10/2015 | Wetterlund | B60G 21/052 |
| 9,393,894 | B2 * | 7/2016 | Steinmetz | B60N 2/012 |
| 9,440,671 | B2 * | 9/2016 | Schlangen | B60K 11/04 |
| 9,566,858 | B2 * | 2/2017 | Hicke | B60K 11/04 |
| 9,623,912 | B2 * | 4/2017 | Schlangen | B62D 33/06 |
| 9,650,078 | B2 | 5/2017 | Kinsman | |
| 9,776,481 | B2 | 10/2017 | Deckard | |
| 9,981,519 | B2 * | 5/2018 | Despres-Nadeau | B60G 3/20 |
| 10,207,554 | B2 * | 2/2019 | Schroeder | B60G 15/067 |
| 10,246,153 | B2 | 4/2019 | Deckard | |
| 10,464,386 | B2 * | 11/2019 | Hisada | B60G 3/202 |
| 10,668,780 | B2 * | 6/2020 | Despres-Nadeau | B60N 2/38 |
| 10,800,224 | B2 * | 10/2020 | Sellars | B60G 21/0551 |
| 10,800,470 | B2 * | 10/2020 | Barkey | B62D 63/025 |
| 10,850,582 | B2 * | 12/2020 | Despres-Nadeau | B60G 3/202 |
| 10,967,694 | B2 * | 4/2021 | Brady | B60G 21/055 |
| 11,014,420 | B2 * | 5/2021 | Sawai | B60K 17/165 |
| 2001/0031185 | A1 | 10/2001 | Swensen | |
| 2002/0011374 | A1 | 1/2002 | Brister | |
| 2002/0135175 | A1 | 9/2002 | Schroth | |
| 2003/0233732 | A1 | 12/2003 | Kohlstrand | |
| 2005/0073187 | A1 | 4/2005 | Frank | |
| 2005/0077098 | A1 | 4/2005 | Takayanagi | |
| 2005/0173177 | A1 | 8/2005 | Smith | |
| 2005/0173180 | A1 | 8/2005 | Hypes | |
| 2005/0279330 | A1 | 12/2005 | Okazaki | |
| 2006/0006696 | A1 | 1/2006 | Umemoto | |
| 2007/0214818 | A1 | 9/2007 | Nakamura | |
| 2008/0023249 | A1 | 1/2008 | Sunsdahl | |
| 2008/0084091 | A1 | 4/2008 | Nakamura | |
| 2008/0093883 | A1 | 4/2008 | Shibata | |
| 2008/0150249 | A1 | 6/2008 | Murata | |
| 2008/0256738 | A1 | 10/2008 | Malone | |
| 2009/0184531 | A1 | 7/2009 | Yamamura | |
| 2009/0301830 | A1 | 12/2009 | Kinsman | |
| 2010/0090797 | A1 | 4/2010 | Koenig | |
| 2010/0194086 | A1 | 8/2010 | Takashi | |
| 2010/0314184 | A1 | 12/2010 | Stenberg | |
| 2010/0314191 | A1 | 12/2010 | Deckard | |
| 2011/0062748 | A1 | 3/2011 | Kaita | |
| 2011/0155087 | A1 | 6/2011 | Wenger | |
| 2011/0156433 | A1 | 6/2011 | Horiuchi | |
| 2011/0297462 | A1 | 12/2011 | Grajkowski | |
| 2011/0298189 | A1 | 12/2011 | Schneider | |
| 2012/0031688 | A1 * | 2/2012 | Safranski | B60G 7/006 180/54.1 |
| 2012/0031693 | A1 | 2/2012 | Deckard | |
| 2012/0161468 | A1 | 6/2012 | Tsumiyama | |
| 2012/0161477 | A1 | 6/2012 | Furman | |
| 2012/0193163 | A1 | 8/2012 | Wimpfheimer | |
| 2012/0223500 | A1 | 9/2012 | Kinsman | |
| 2013/0033070 | A1 | 2/2013 | Kinsman | |
| 2013/0199097 | A1 | 8/2013 | Spindler | |
| 2013/0319785 | A1 | 12/2013 | Spindler | |
| 2014/0353956 | A1 | 12/2014 | Bjerketvedt | |
| 2015/0014974 | A1 | 1/2015 | Cotnoir | |
| 2015/0175114 | A1 | 6/2015 | Schroeder | |
| 2016/0032625 | A1 | 2/2016 | Suzuki | |
| 2021/0061036 | A1 * | 3/2021 | Despres-Nadeau | B60G 3/20 |

FOREIGN PATENT DOCUMENTS

| | | |
|---|---|---|
| CN | 101177110 | 5/2008 |
| CN | 201597405 | 10/2010 |
| CN | 101903205 | 12/2010 |
| CN | 201679362 | 12/2010 |

(56) References Cited

FOREIGN PATENT DOCUMENTS

| | | |
|---|---|---|
| CN | 101952164 | 1/2011 |
| CN | 103249578 | 8/2013 |
| CN | 105377672 | 3/2016 |
| CN | 105730221 | 7/2016 |
| DE | 37435 | 11/1886 |
| DE | 102009038853 | 3/2011 |
| EP | 1493624 | 1/2005 |
| EP | 2057060 | 5/2009 |
| FR | 2914597 | 10/2008 |
| GB | 2036659 | 7/1980 |
| JP | 63-25977 | 5/1988 |
| JP | 7040783 | 2/1995 |
| JP | 2001130304 | 5/2001 |
| JP | 2003-237530 | 8/2003 |
| JP | 2010-95106 | 4/2010 |
| WO | WO 2011/152817 | 12/2011 |
| WO | 2012/018896 | 2/2012 |
| WO | WO 2012/109546 | 8/2012 |
| WO | WO 2013/166310 | 11/2013 |
| WO | WO 2014/059258 | 4/2014 |

OTHER PUBLICATIONS

International Search Report and Written Opinion issued by the European Patent Office, dated Mar. 25, 2014, for International Patent Application No. PCT/US2013/064516; 23 pages.
International Preliminary Report on Patentability issued by The International Bureau of WIPO, dated Apr. 14, 2015, for International Patent Application No. PCT/US2013/064516; 18 pages.
Owner's Manual, Trail Master-300XRX Dune Buggy, http://gokartsusa.com/pdf/TrailMaster-300-XRX-Owners-Manual.pdf, Jul. 29, 2011; 30 pages.
American Sport Works, Zircon, http://www.amsportworks.com/pdf/gokarts-minibikes/zircon-hangtag.pdf, Apr. 9, 2013; 2 pages.
New for 2004, Yamaha Rhino 660 4×4, Ray Sedorchuk, ATV Connection Magazine, © 2006; 3 pages.
2006 Rhino 450 Auto 4×4, Yamaha, Company website, © 2005; 3 pages.
2006 Rhino 660 Auto 4×4 Special Edition, Yamaha, Company website, © 2006; 4 pages.
2006 Rhino 660 Auto 4×4, Yamaha, Company website, © 2006; 4 pages.
Rhino 660 Auto 4×4 Exploring Edition Specifications, Yamaha, Company website, © 2006; 3 pages.
Prowler XT650 H1, Arctic Cat, Company website; 9 pages.
Product pages for XRT 1500 SE, Club Car, Company website; 2 pages.
Honda Hippo 1800 New Competition for Yamaha's Rhino, Dirt Wheels Magazine, Apr. 2006; pp. 91-92.
2006 Kart Guide, Buyer's Guide Supplement, Powersports Business Magazine; 6 pages.
BRP Can-Am Commander photo; undated; 1 page.
Welcome to Ranger Country Brochure 2006, Polaris Ranger, © 2005; 24 pages.
Brochure ATVs and Side×Sides Brochure 2010, Polaris Ranger, © 2009; 26 pages.
RZR Brochure 2011, Polaris Ranger, © 2011; 16 pages.
Brochure 2011, Polaris Ranger, © 2010; 22 pages.
Utility Vehicle Brochure 2009, Kawasaki Mule, © 2008; 10 pages.
The Off-Road Capable 610 4×4 XC Brochure 2011, Kawasaki Mule, © 2010; 6 pages.
Recreation Utility Vehicle Brochure 2009, Kawasaki Teryx, © 2008; 8 pages.
750 FI 4×4 Sport Brochure 2011, Kawasaki Teryx, © 2010; 6 pages.
Off-Road Utility Vehicles Brochure 2004, Polaris Ranger, © 2003; 20 pages.
Work/Play Only Brochure 2008, Polaris Ranger, © 2007; 28 pages.
Brochure 2009, Polaris Ranger, © 2008; 32 pages.
International Search Report and Written Opinion issued by the European Patent Office, dated Jul. 7, 2016, for International Patent Application No. PCT/US2012/024664; 19 pages.
International Preliminary Report on Patentability issued by the European Patent Office, dated Mar. 8, 2013, for International Patent Application No. PCT/US2012/024664; 24 pages.
International Search Report and Written Opinion issued by the European Patent Office, dated Jul. 31, 2013, for International Patent Application No. PCT/US2013/039304; 11 pages.
International Preliminary Report on Patentability issued by the European Patent Office, dated Nov. 4, 2014, for International Patent Application No. PCT/US2013/039304; 7 pages.
Office Action issued by the European Patent Office, dated Jun. 9, 2017, for European Patent Application No. 13784068.2; 5 pages.
Office Action issued by the European Patent Office, dated Dec. 14, 2016, for European Patent Application No. 13784068.2; 4 pages.

* cited by examiner

SIDE-BY-SIDE VEHICLE

The present application is a divisional of U.S. patent application Ser. No. 14/051,700, filed on Oct. 11, 2013, which claims priority to U.S. Provisional Patent Application Ser. No. 61/712,396 filed Oct. 11, 2012. The subject matter of the previously-identified patent applications is expressly incorporated herein by reference.

FIELD OF THE DISCLOSURE

The present invention relates to side-by-side all terrain vehicles.

BACKGROUND

Generally, all terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint.

SUMMARY

A utility vehicle, comprising a plurality of ground-engaging members; a frame supported by the ground-engaging members; a drivetrain supported by the frame; an operator's area defined by side by side seats and operator controls; a cab frame covering the operators area and defined by at least first and second front support portions, at least first and second rear support portions, and longitudinally extending sections coupling the front and rear support portions; and the operator's area having a driver seat having a driver restraint harness and a passenger seat having a passenger restraint harness, the driver seat and the passenger seat being in a side-by-side arrangement, the cab frame being configured to support a driver restraint harness for the driver seat and a passenger restraint harness for the passenger seat, the driver and passenger restraint harnesses comprising a shoulder retractor coupled to the cab frame rearward of the respective driver and passenger seats.

According to an illustrative embodiment of the present disclosure, a utility comprises a plurality of ground-engaging members; a frame supported by the ground-engaging members; a drivetrain supported by the frame; and an operator area having a seating portion supported by the frame. The seating portion includes a driver seat having a driver restraint harness and a passenger seat having a passenger restraint harness. The driver seat and the passenger seat are in a side-by-side arrangement. The frame is configured to support a driver restraint harness for the driver seat and a passenger restraint harness for the passenger seat. The driver restraint harness is coupled to one of the driver seat and the frame in at least one of a first coupling location, a second coupling location, a third coupling location, a fourth coupling location, a fifth coupling location, and a sixth coupling location, and the passenger restraint harness is coupled to one of the passenger seat and the frame in at least one of a first coupling location, a second coupling location, a third coupling location, a fourth coupling location, a fifth coupling location, and a sixth coupling location.

In another embodiment, a utility vehicle comprises a frame; ground engaging members supporting the frame; an operator's compartment; a powertrain for driving the ground engaging members; and a rear suspension comprising a trailing arm, the trailing arm being generally horizontally disposed.

In another embodiment, a seat for a utility vehicle comprises a seat bottom including a first portion, a second portion, and a third portion; first portion intermediate second and third portions and has a generally flat orientation for supporting a driver; second and third portions are angled outwardly and upwardly relative to first portion in order to retain the operator and passenger on seat bottoms during operation of the vehicle; the first, second and third portions having an inner layer surrounded by a waterproof outer cover; and an outer covering surrounding the outer cover.

In another embodiment, a coupling assembly comprises a washer; a deformable shank having a head, a body portion and deformable wings; and fasteners.

The above mentioned and other features of this invention, and the manner of attaining them, will become more apparent and the invention itself will be better understood by reference to the following description of embodiments of the invention taken in conjunction with the accompanying drawings.

Figure 1:
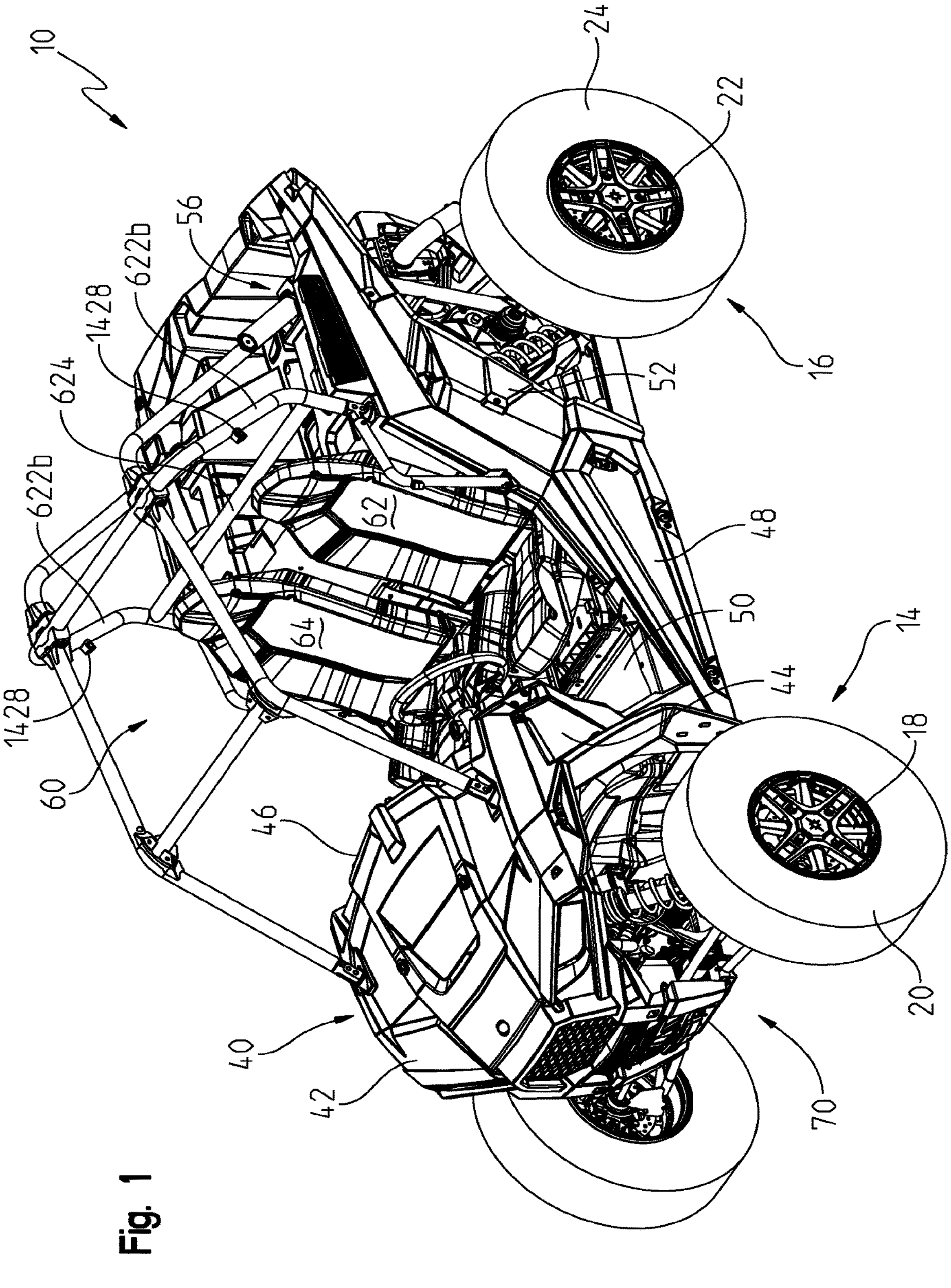
FIG. 1 shows a front left perspective view of the vehicle of the present disclosure.
Figure 2:
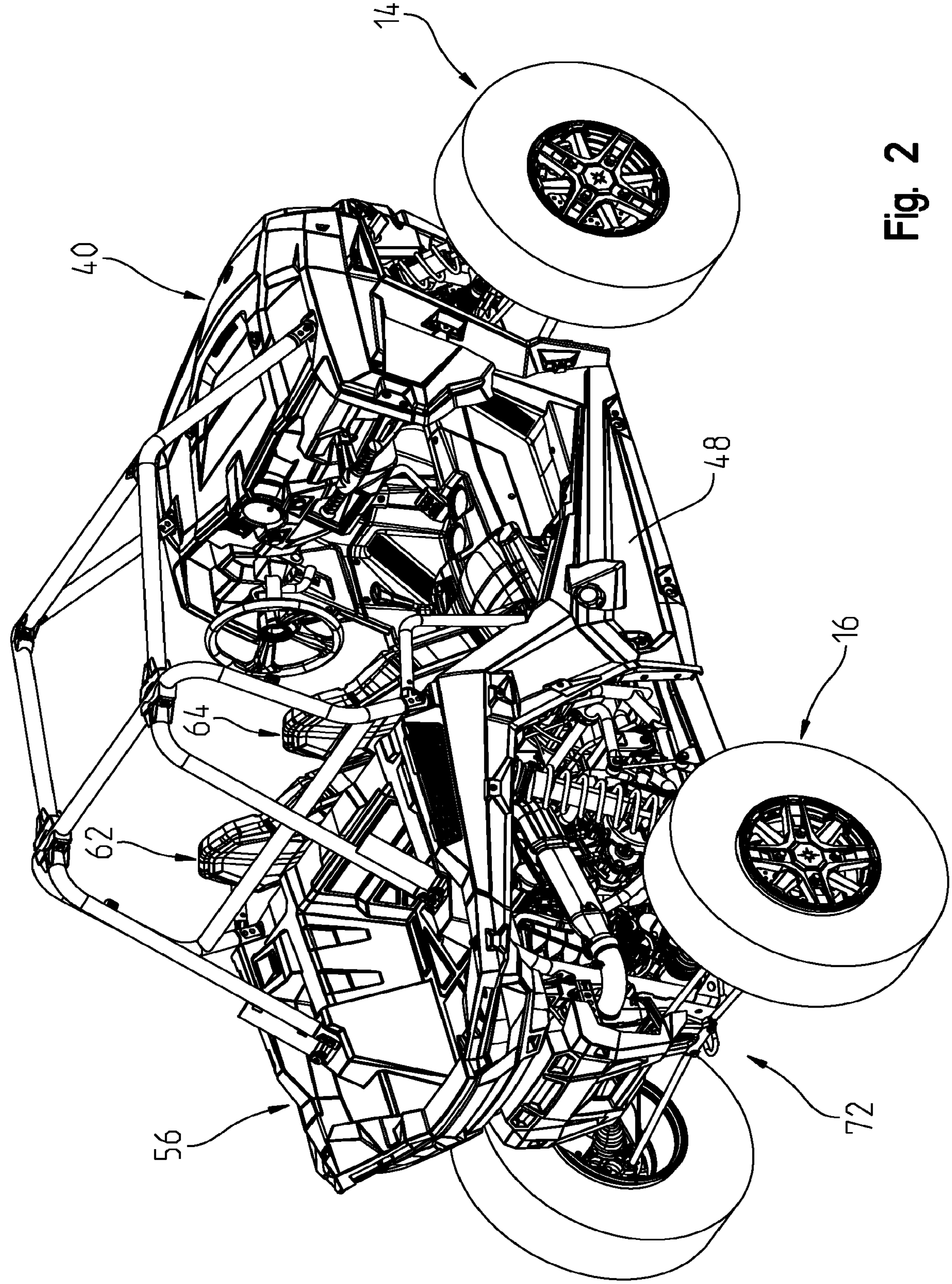
FIG. 2 shows a rear right perspective view of the vehicle of FIG. 1.
Figure 3:
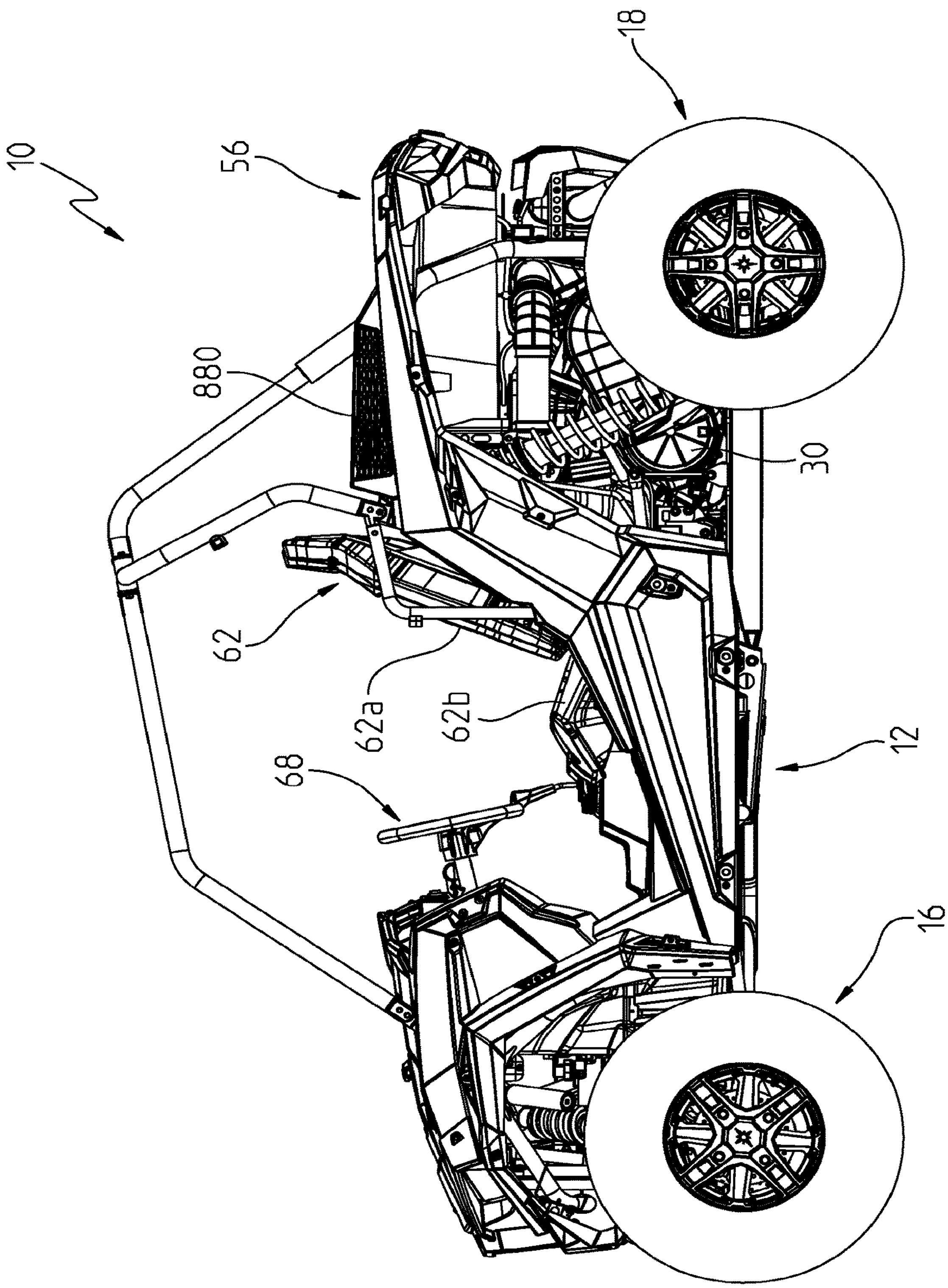
FIG. 3 shows a left side view of the vehicle of FIG. 1.
Figure 4:
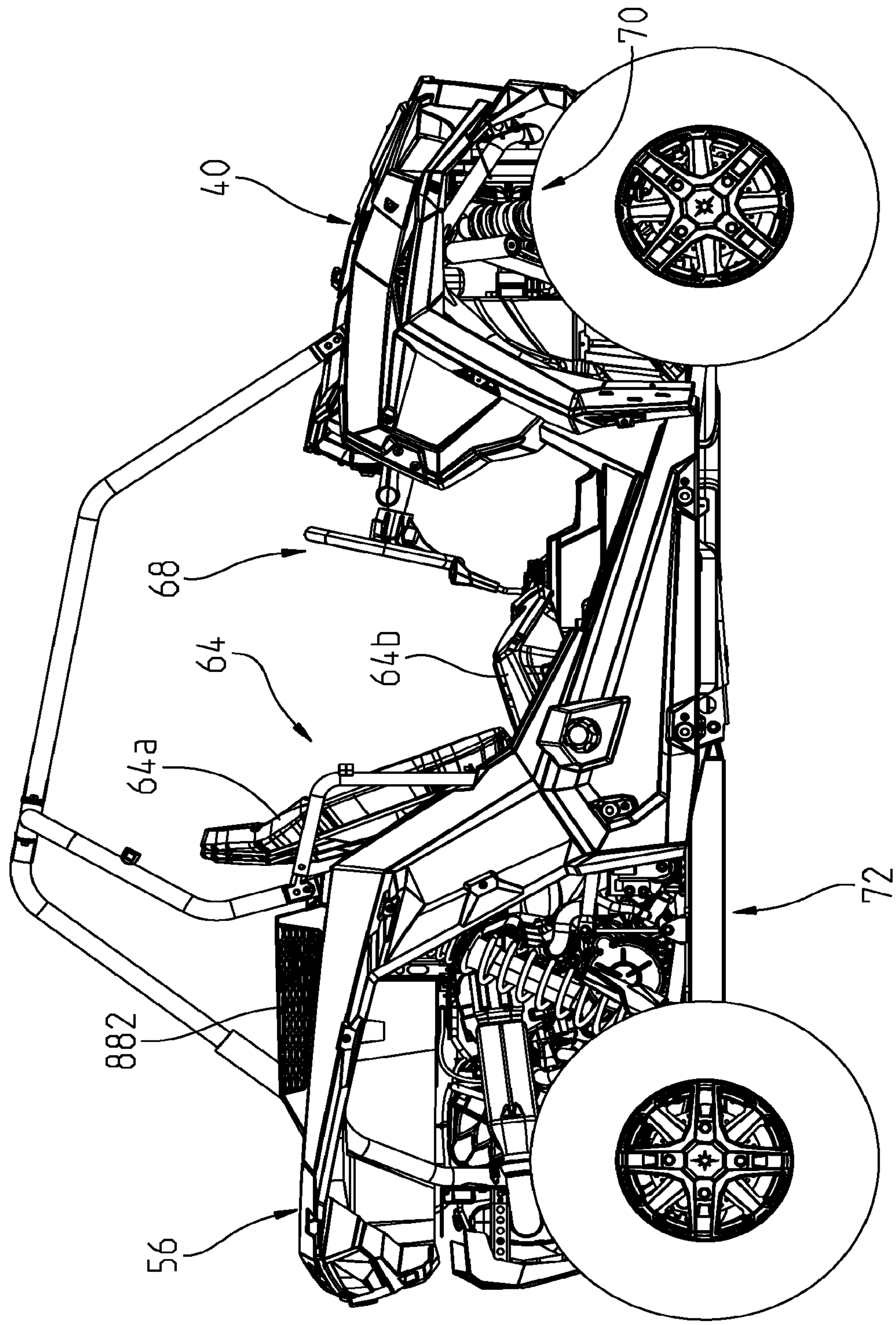
FIG. 4 shows a right side view of the vehicle of FIG. 1
Figure 5:
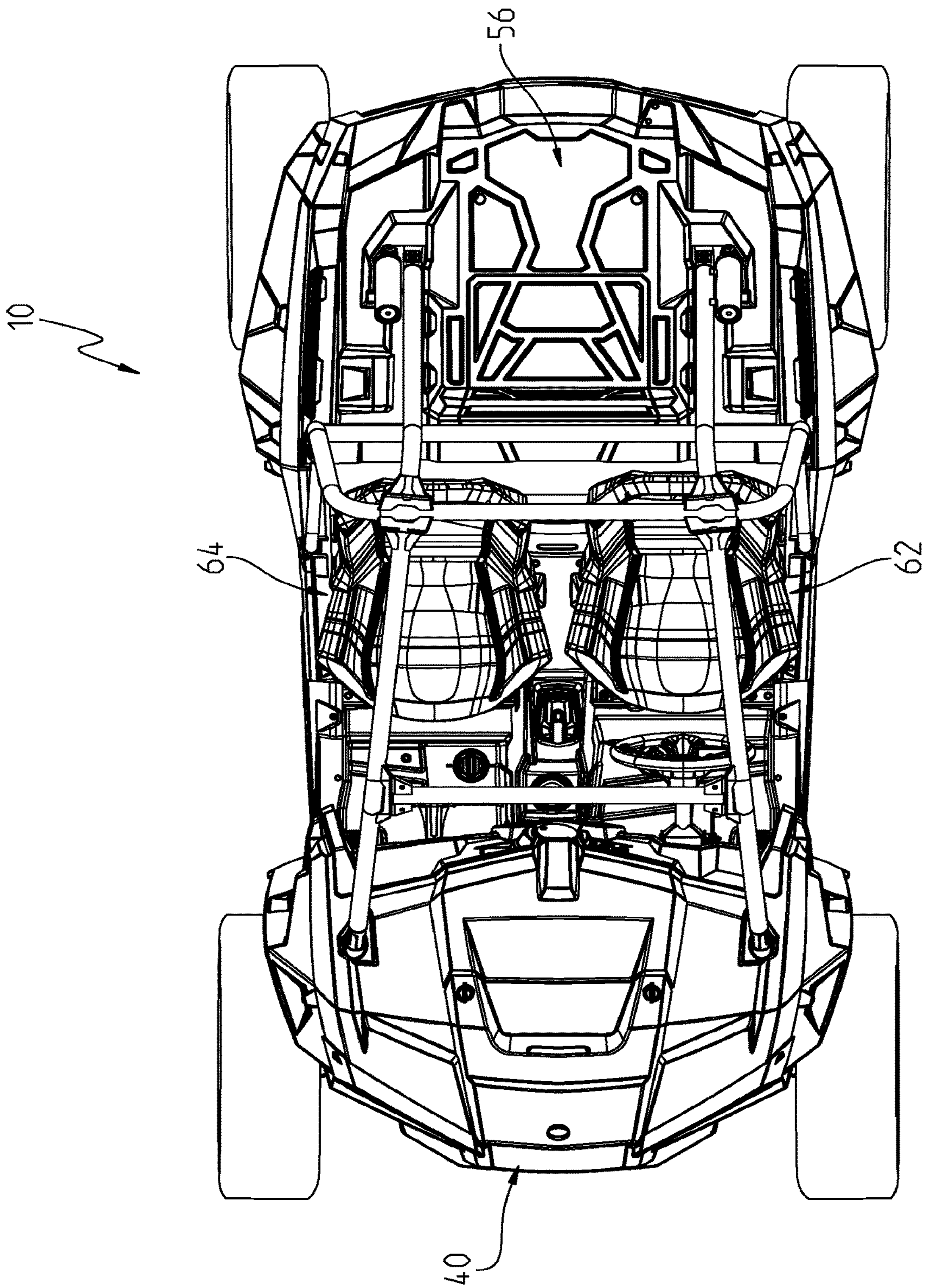
FIG. 5 shows a top view of the vehicle of FIG. 1.
Figure 6:
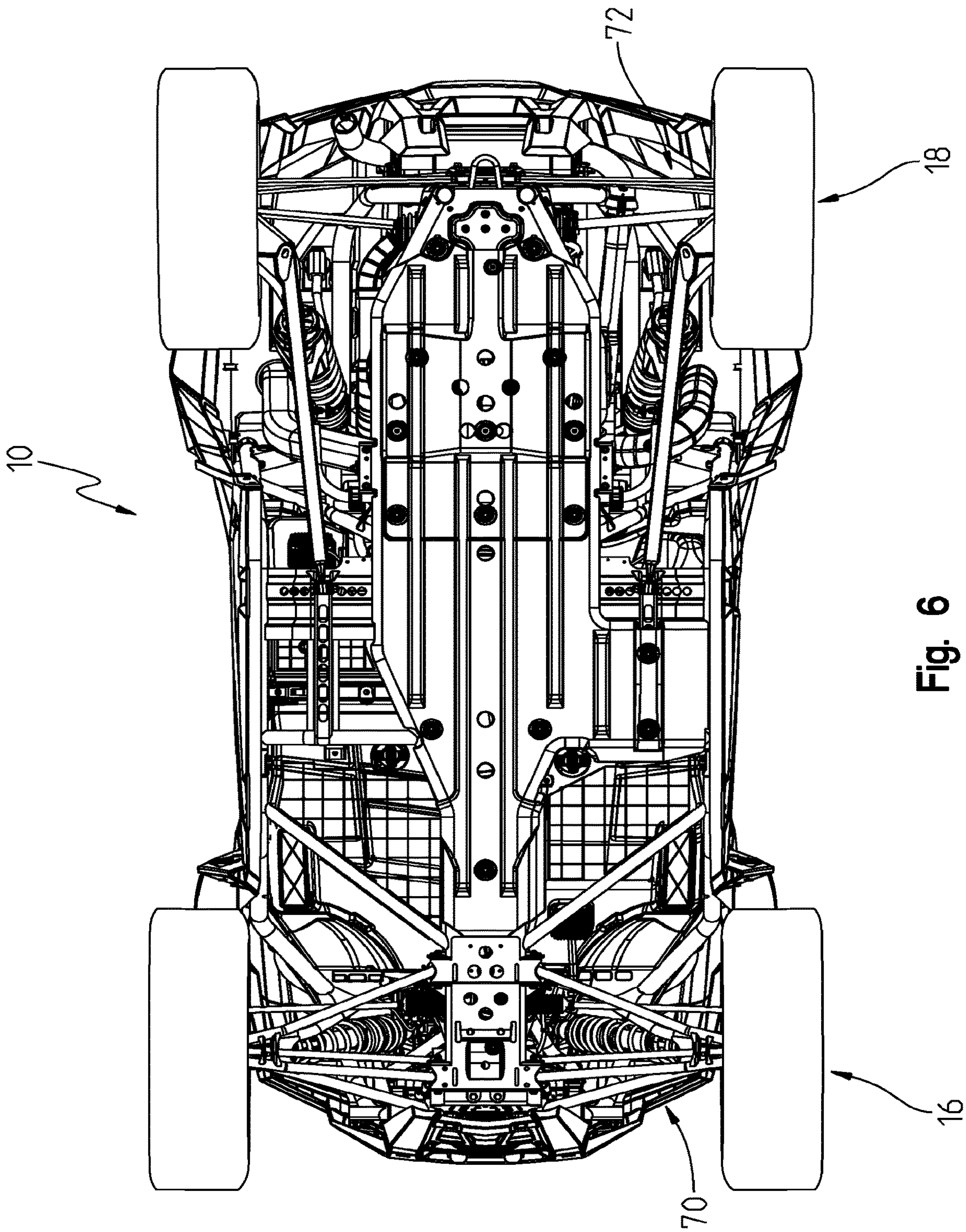
FIG. 6 shows a bottom view of the vehicle of FIG. 1.
Figure 8:
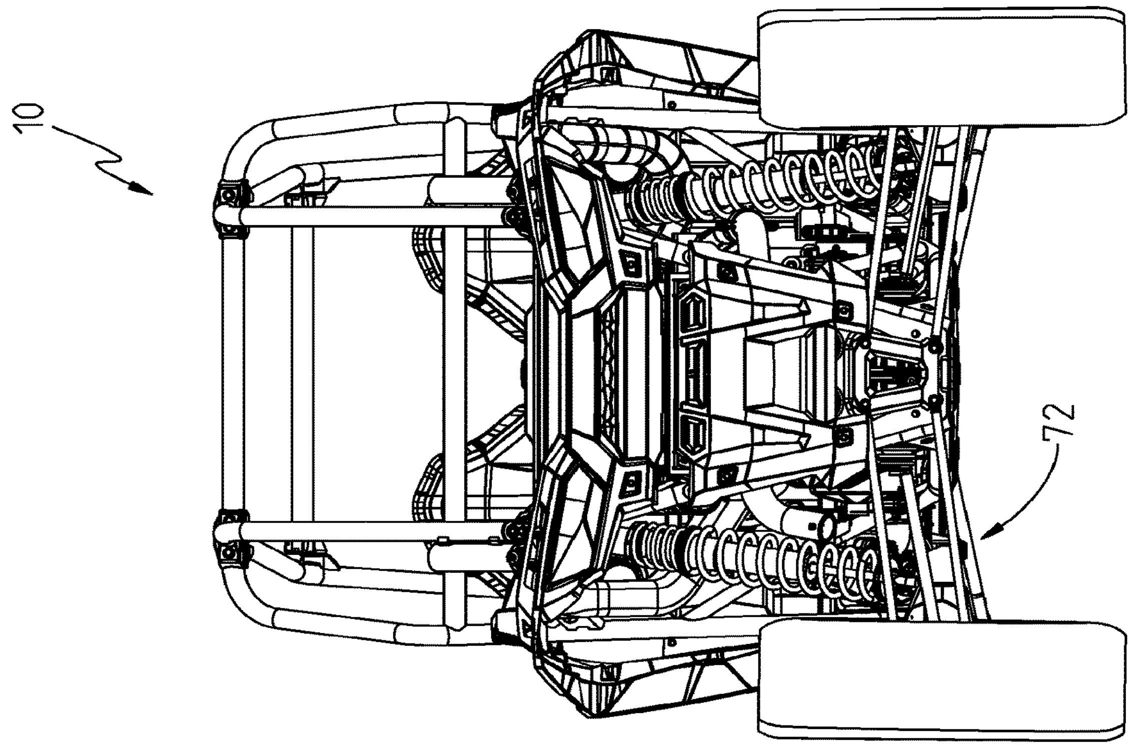
FIG. 8 shows a rear view of the vehicle of FIG. 1.
Figure 7:
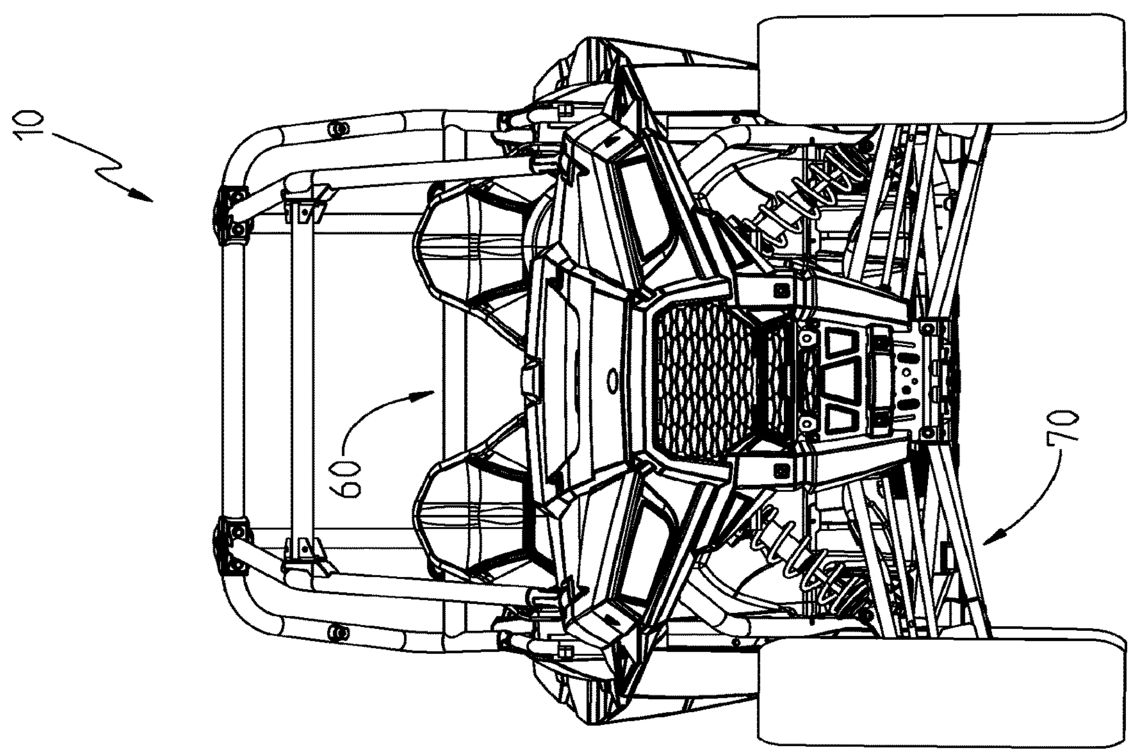
FIG. 7 shows a front view of the vehicle of FIG. 1.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to UVs, certain features described herein may be applied to other applications such as ATVs, snowmobiles, motorcycles, mopeds, etc.

With reference first to FIGS. 1-6, the vehicle of the present disclosure will be described. The vehicle is shown generally at 10 and is commonly referred to as an all terrain vehicle (ATV), a side-by-side vehicle (SxS) or a utility vehicle. As shown, vehicle 10 generally comprises a frame 12 (FIG. 2) supported by ground engaging members 14 and 16. As shown in this disclosure, ground engaging members 14 and 16 are comprised of wheels 18 and tires 20; and wheels 22 and tires 24. Vehicle 10 further comprises a drive train 30 (FIG. 3) operatively connected to frame 12 and drivingly connected to one or more of the ground engaging members 14, 16. In the present disclosure, the drivetrain 30 is comprised of a fuel-burning engine and transmission combination, together with a driveshaft extending between the drivetrain and both of the front and rear ground engaging members 14, 16, as described in greater detail herein. However, any drivetrain could be contemplated such as hybrid, fuel cell or electric. The drivetrain 30, the front and rear suspension assemblies, and steering assemblies are more thoroughly described in our pending applications Ser. No. 11/494,891 filed Jul. 28, 2006 and Ser. No. 11/494,890 filed Jul. 28, 2006, the subject matter of which is incorporated herein by reference.

As shown in FIGS. 1-4, vehicle 10 further includes a body portion or chassis shown generally at 40 to include a hood 42, front fender 44, dash 46, sideboard 48, front floorboard 50, rear sideboard 52 and rear cargo area 56. As also shown, vehicle 10 is comprised of seating area 60, having a driver seat 62 and a passenger seat 64. As shown best in FIG. 3, driver seat includes a seat back 62*a* and a seat bottom 62*b*, while passenger seat 64 (FIG. 4) includes a seat back 64*a* and a seat bottom 64*b*. Furthermore, vehicle 10 includes operator controls shown generally at 68, which includes controls for steering, acceleration and braking, as described further herein. Vehicle 10 also includes a front suspension 70 and a rear suspension 72.

Figure 9:
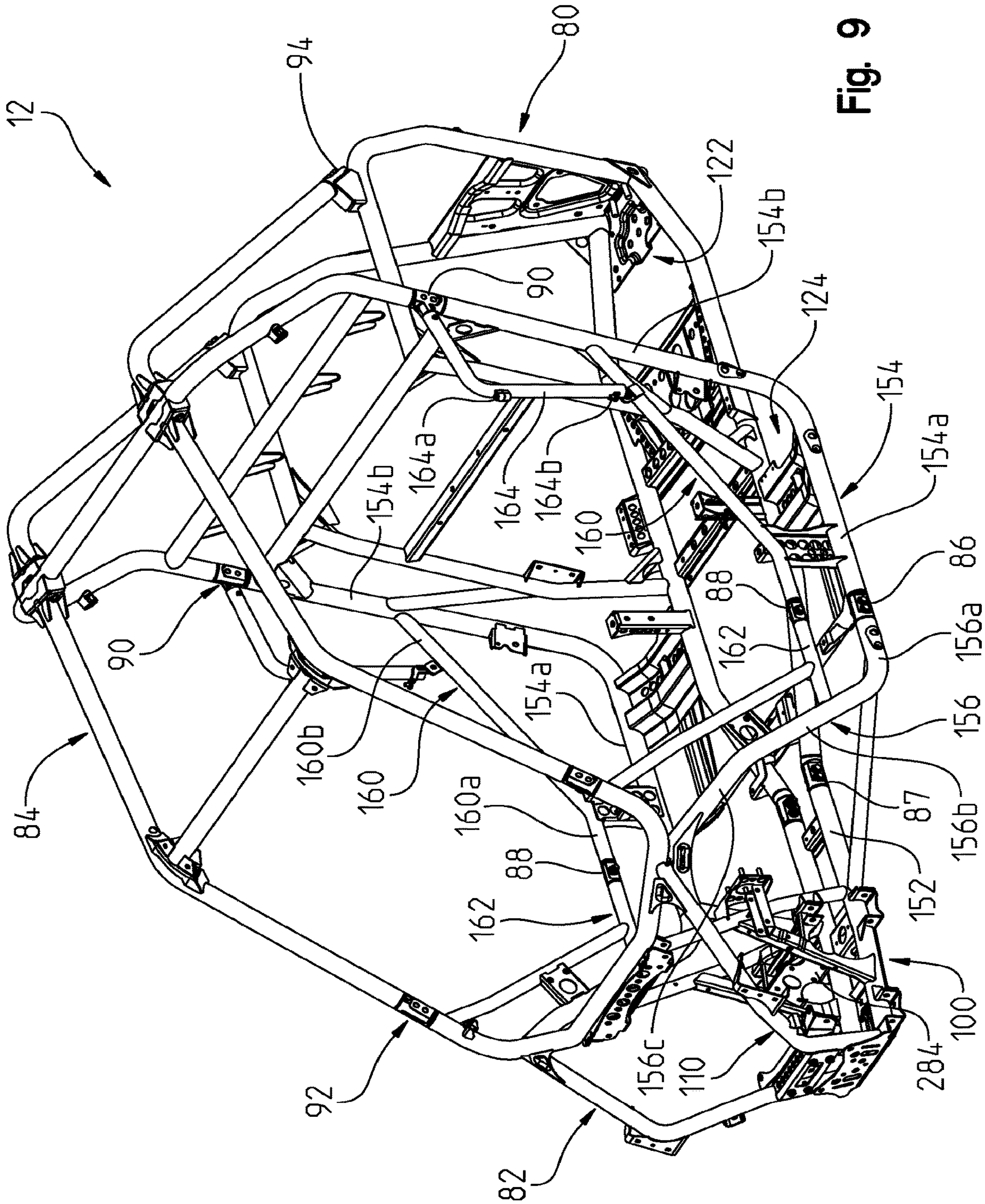
FIG. 9 shows a front left perspective view of the vehicle frame.

With respect now to FIGS. 9-28, frame 12 will be described in greater detail. Frame 12 is generally comprised of a main frame section 80, front frame section 82, and cab frame section 84, where the sections are interconnected by way of couplers 86, 87, 88, 90 and 92. In addition to providing the structural rigidity for the vehicle, frame 12 provides mounting accessories for mounting various vehicle components. With reference now to FIGS. 9-18, front section 82 includes a front suspension mount 100, steering mount 104 (FIG. 13), controls mount 108 (FIG. 10), and front differential mount 110 (FIG. 9). Rear section 80 includes engine mount 120 (FIG. 10), rear differential mount 122, rear suspension mount 124, and seating mount 126. In general it should be noted that frame 12 is comprised of substantially round tubes which increases the strength of the frame and decreases the weight.

Figure 10:
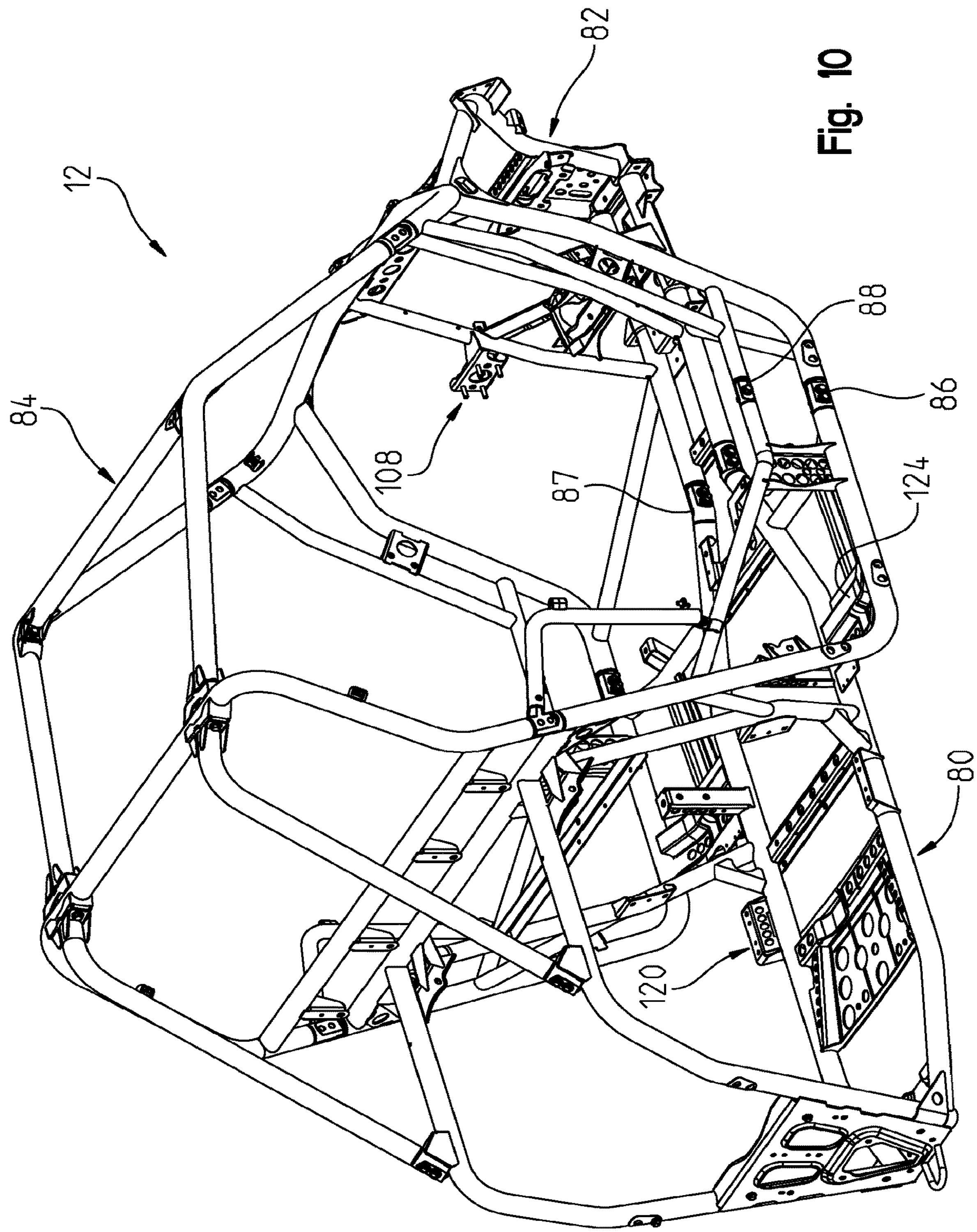
FIG. 10 shows a rear right perspective view of the vehicle frame.
Figure 11:
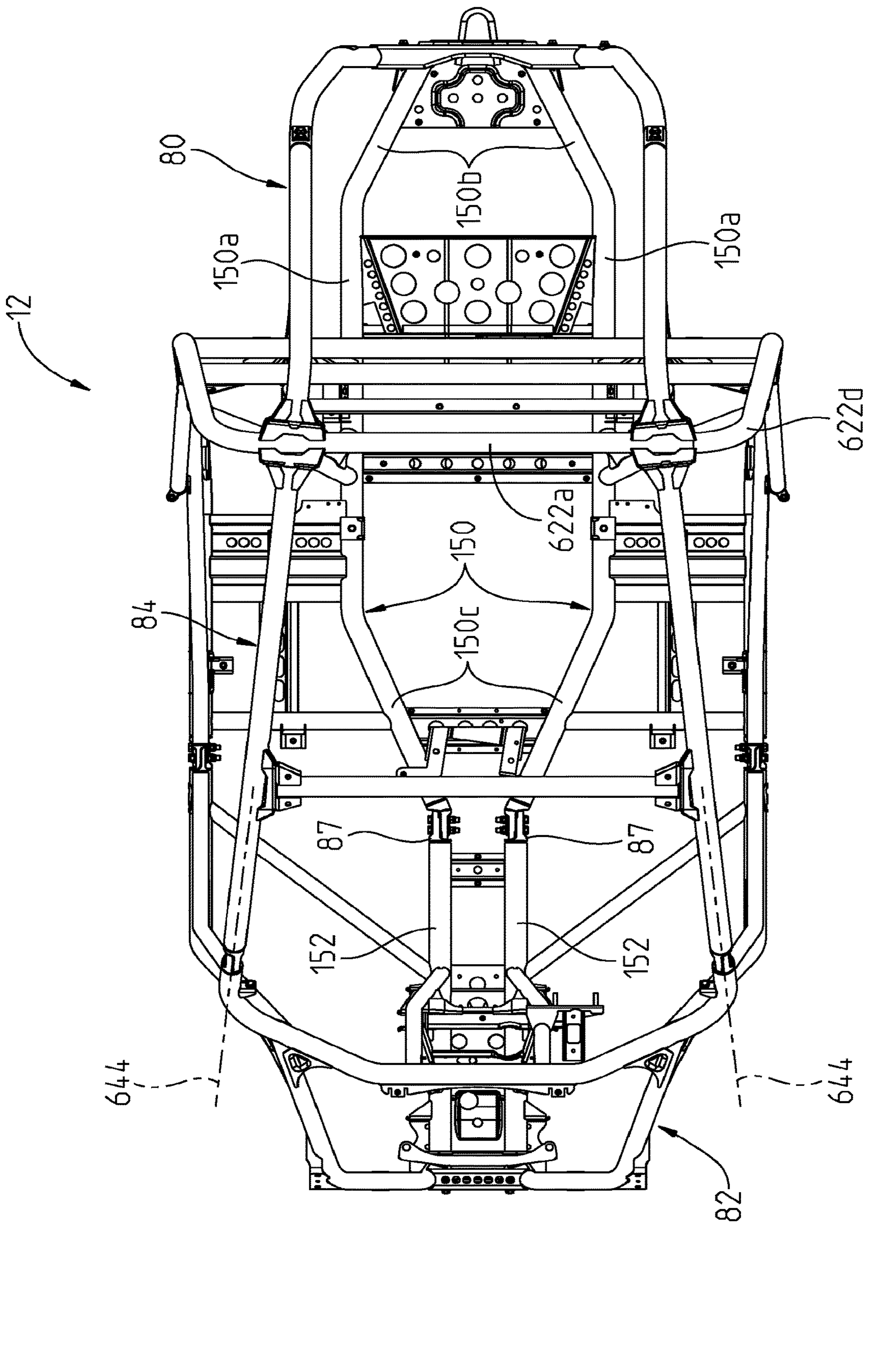
FIG. 11 shows a top view of the vehicle frame.
Figure 12:
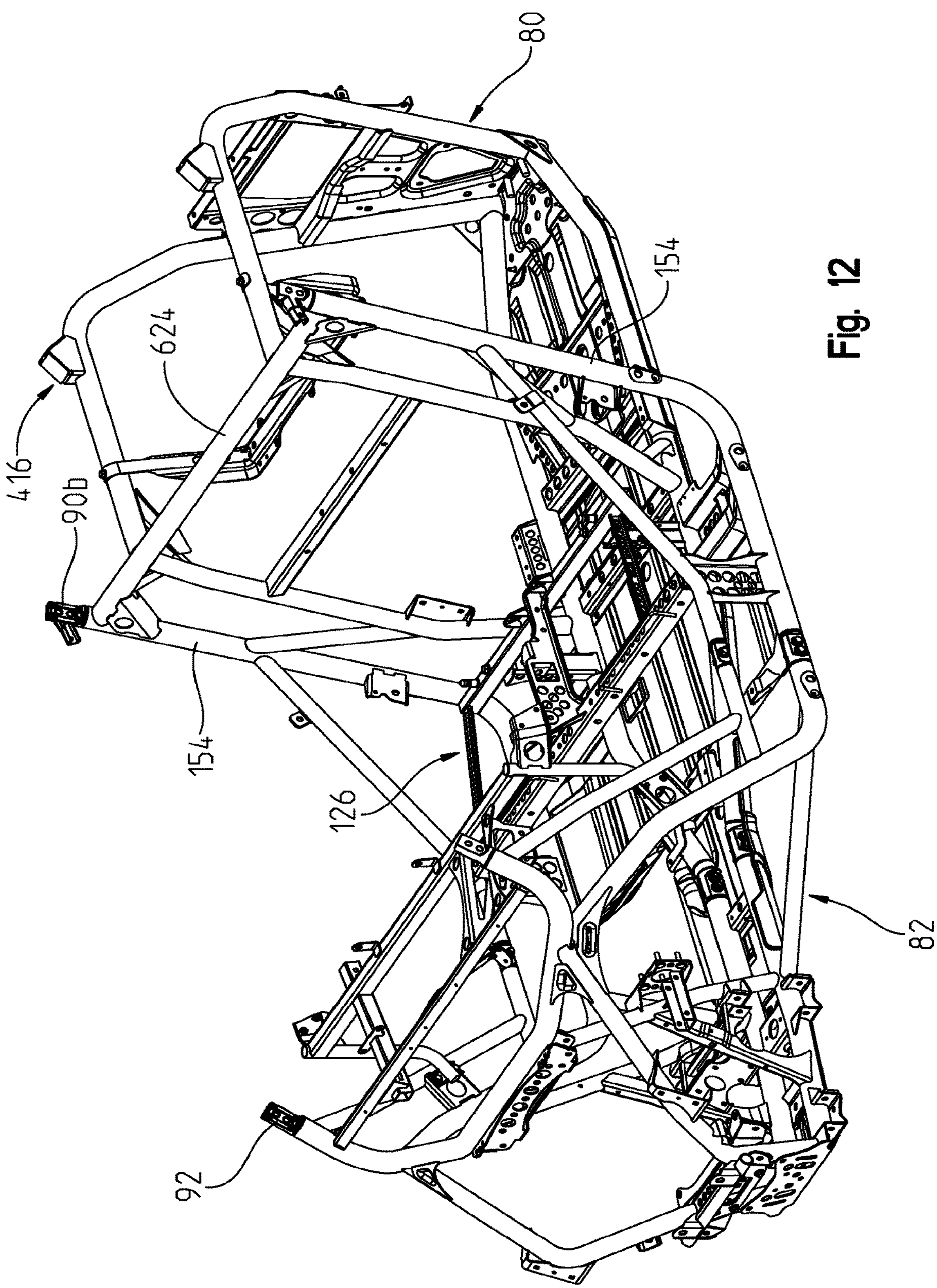
FIG. 12 is a view similar to that of FIG. 9 showing the cab frame removed.
Figure 13:
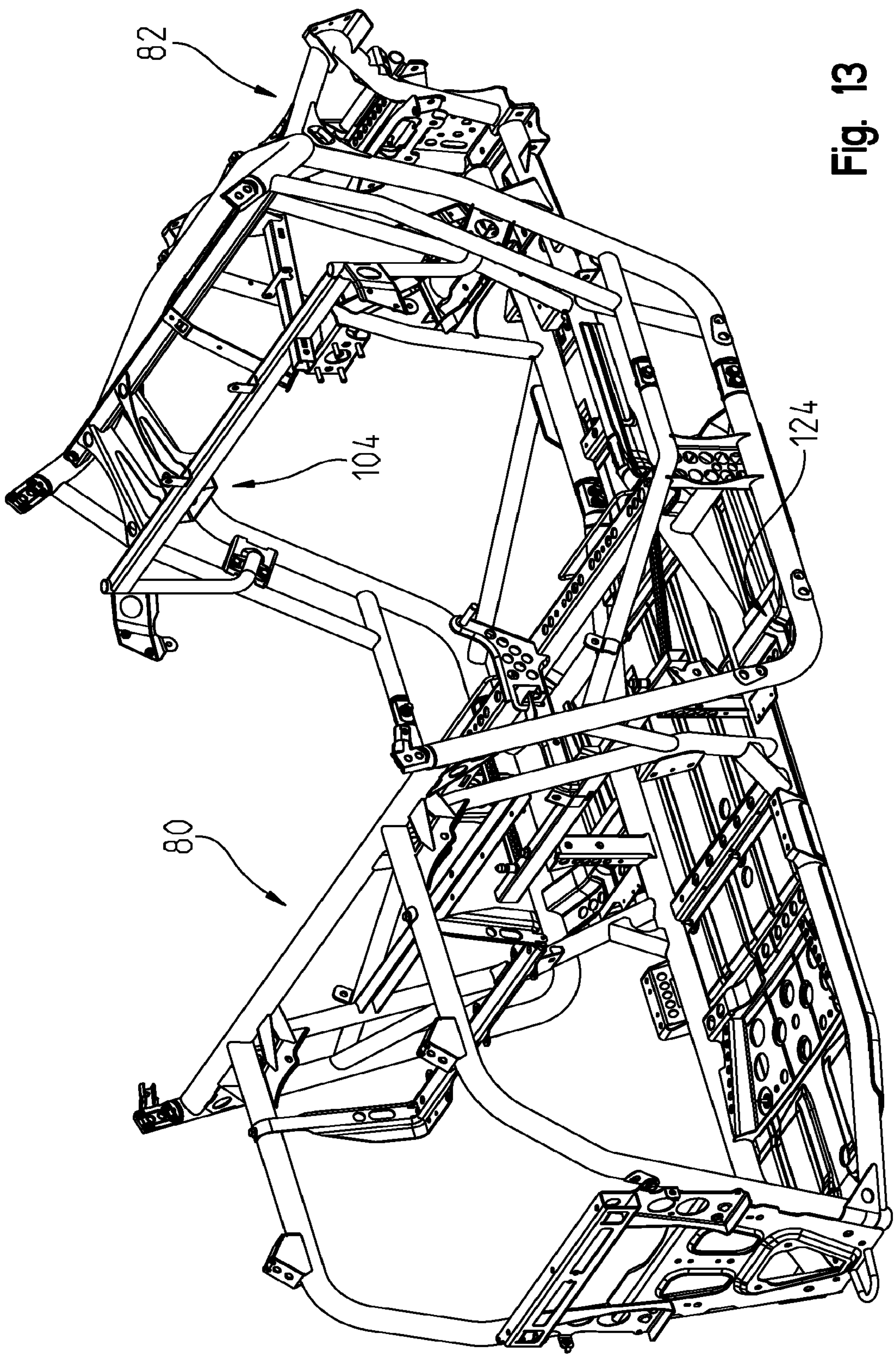
FIG. 13 is a rear right perspective view of the vehicle frame of FIG. 12.

With reference now to FIGS. 9-11, frame 12 will be described in greater detail. As shown best in FIG. 11, frame 12 includes longitudinally extending frame tubes 150 having a lengthwise portion 150*a* and rear angled portions 150*b* and front angled portions 150*c*. Frame tubes 150 couple with frame tubes 152 via couplers 87. Main frame section 80 further includes outer frame rails 154 (FIG. 9) having longitudinal section 154*a* and upright portion 154*b*. The frame further includes frame tube portions 156 (FIG. 9) including portions 156*a*, upright portions 156*b*, and inclined portions 156*c*. Frame tubes 152 and 156 are coupled together by way of frame tubes 158. Frame tubes 154 and 156 are coupled together by way of couplers 86 as described herein. Frame 12 also includes side frame tubes 160 having longitudinal sections 160*a* and upwardly inclined portions 160*b*, which intersect and connect with upright portions 154B of outer frame tubes 154. Frame 12 also includes frame tube 162, which couples with upright portion 156*b* of frame tube 156 and which is coupled to frame tube portion 160A by way of couplers 88 (FIG. 9). Side tube 164 is coupled to coupler 90 at a top end thereof and to frame tube 160 at a lower end. side tube 164 includes hinge components 164*a* and 164*b* as further described herein.

Figure 14:
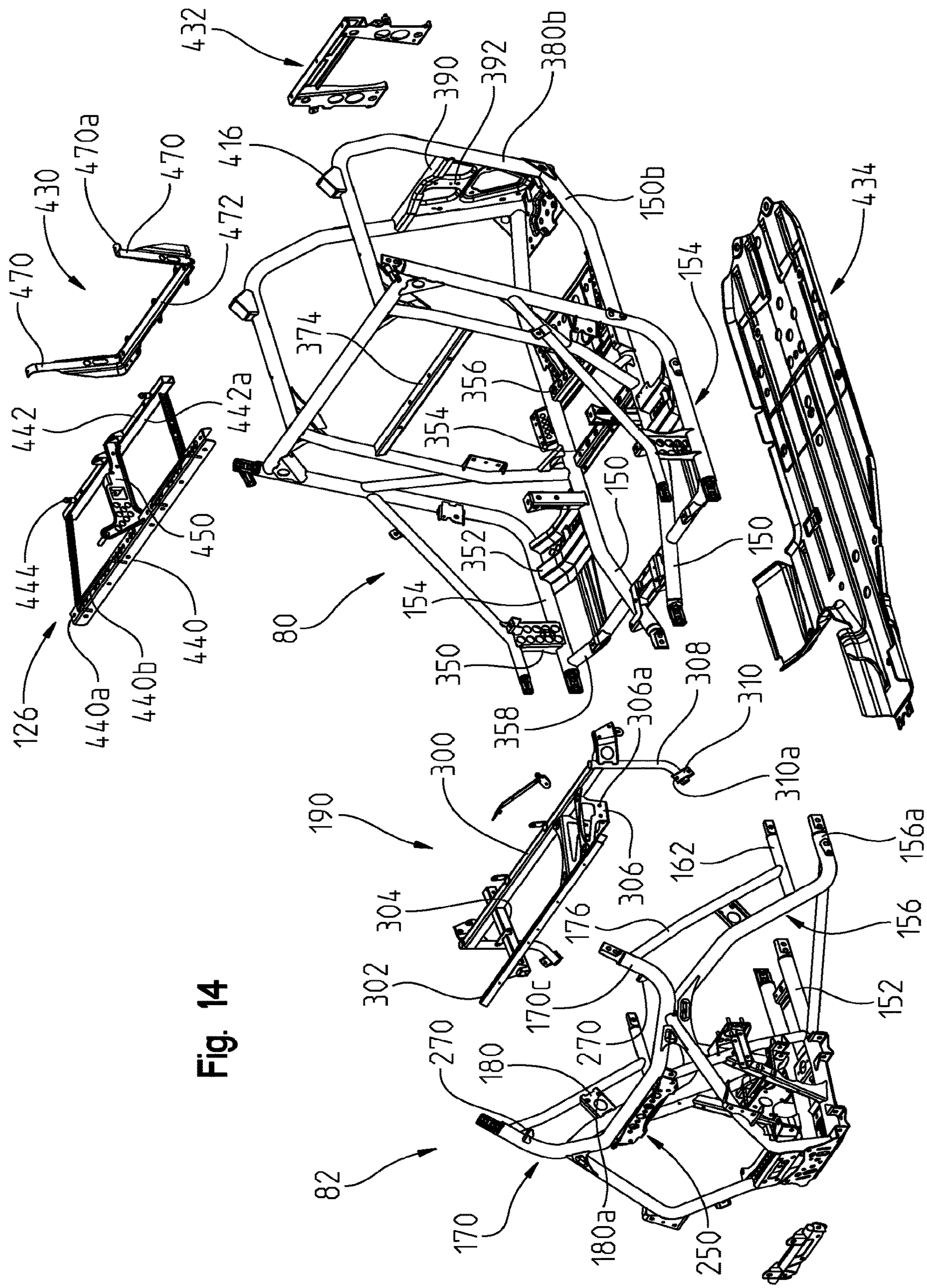
FIG. 14 is a left front perspective view of the vehicle frame of FIG. 12 in an exploded manner.
Figure 15:
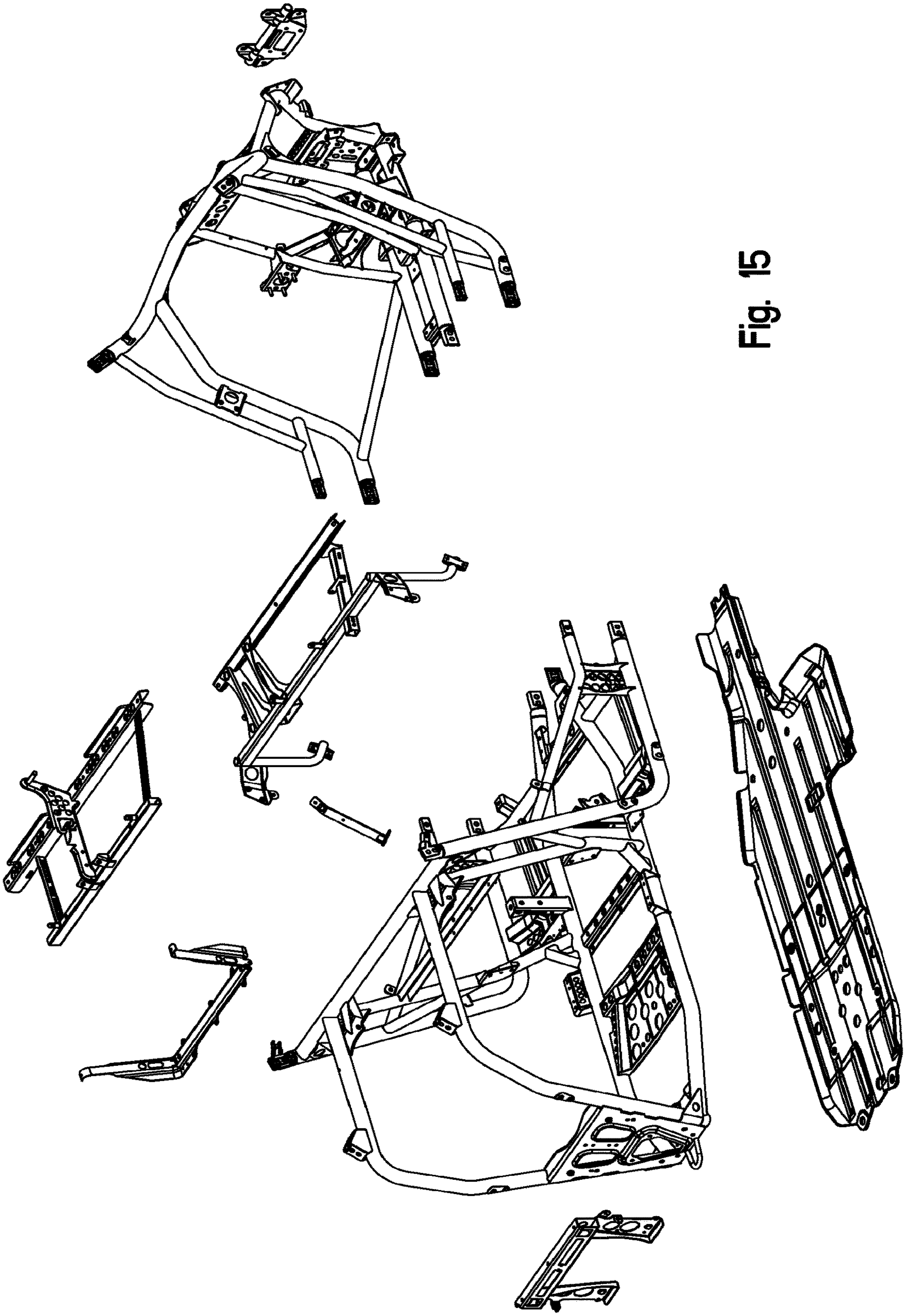
FIG. 15 is a rear right perspective view of the vehicle frame of FIG. 14.
Figure 16:
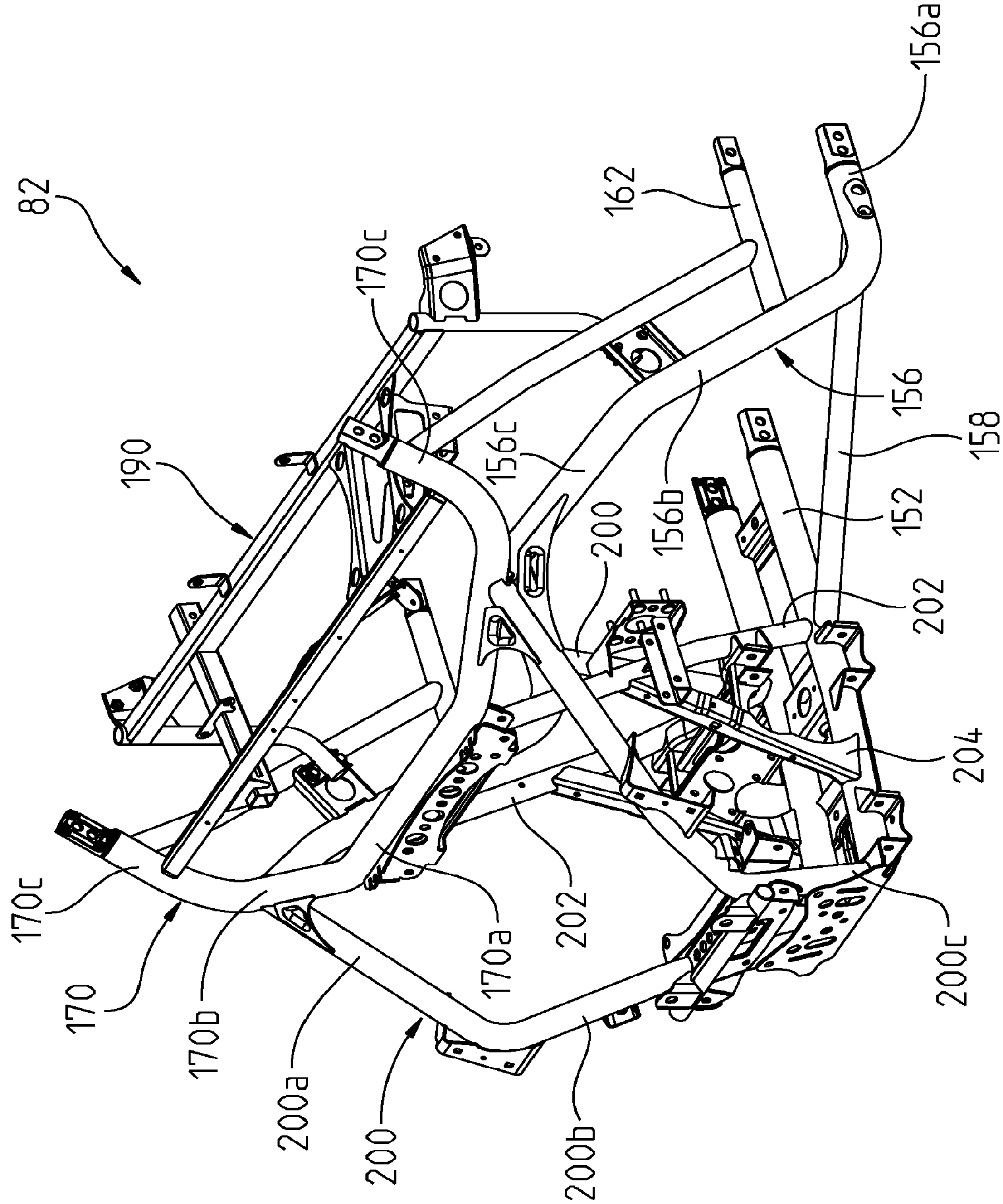
FIG. 16 shows a front left perspective view of a first portion of the vehicle frame of FIG. 12.

With reference now to FIGS. 14-16, front frame portion 82 will be described in greater detail. As shown best in FIG. 16, frame tubes 156 extend upwardly to connect with U-shaped frame tube 170 where U-shaped portion 170 includes a center section 170*a*, inclined sections 170*b*, and upwardly and rearwardly extending section 170*c*. As shown best in FIG. 14, frame tube 176 extends upwardly from frame tube 162 to connect with frame tube portion 170*c*. Mounting brackets 180 having mounting apertures 180*a* are coupled to and connect frame tubes 156, 176, and assist in the mounting of upper front frame section 190, as described herein. With reference to FIG. 16, front frame portion 82 further includes front frame tubes 200 having tube portions 200*a* coupled to frame tube portions 170*b* of frame tube 170; tube portions 200*b*, and downwardly and inwardly angled tube portions 200*c*, which couple with a front end of frame tubes 152. Frame tubes 202 also extend upwardly from frame tubes 152 and couple with frame tubes 170 at tube portions 170*a*. Furthermore, channel portions 204 extend upwardly and rearwardly coupling frame tubes 152 with frame tubes 202.

Figure 16A:
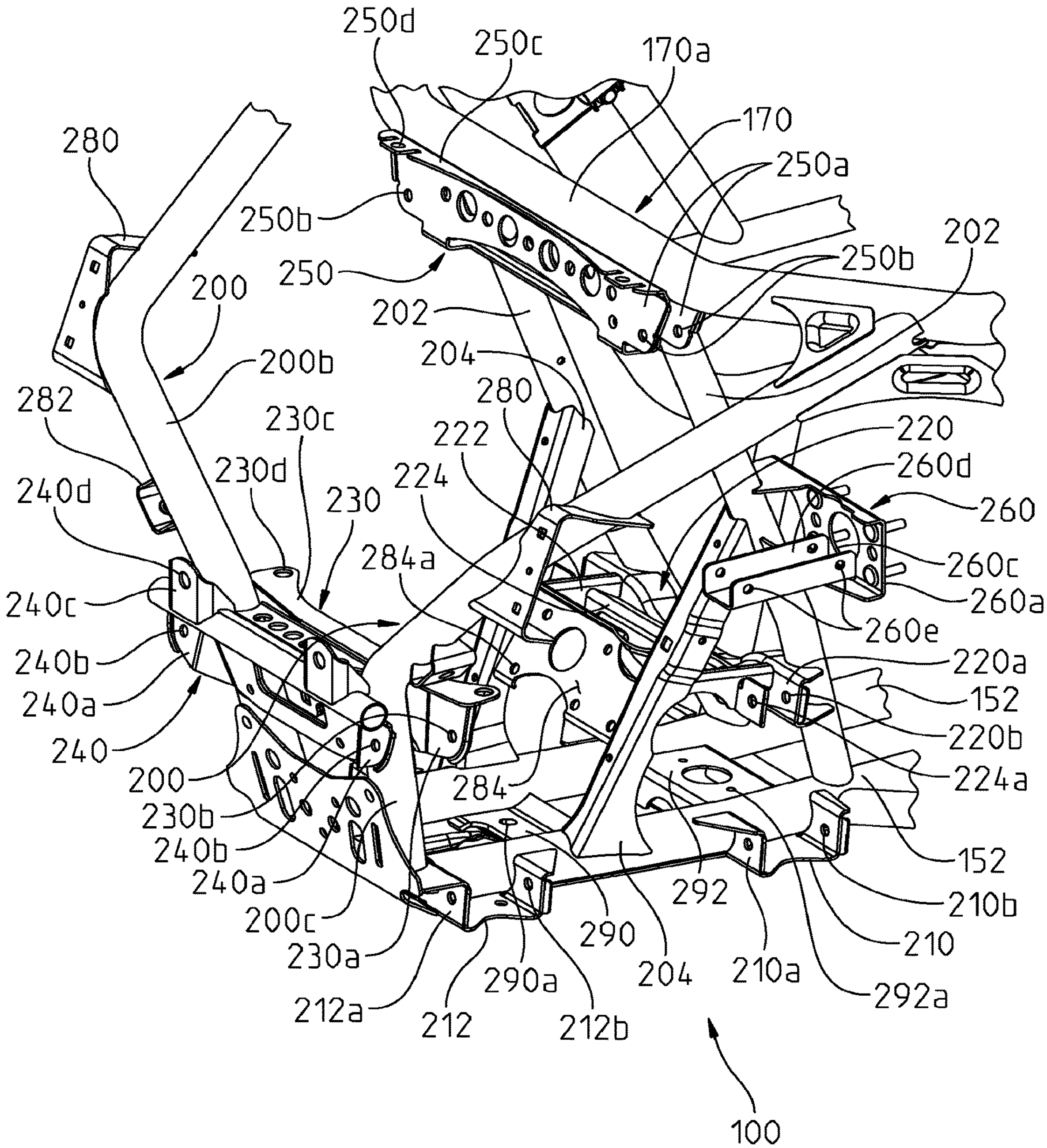
FIG. 16A shows an enlarged fragmented view of a portion of the vehicle frame of FIG. 16.
Figure 17:
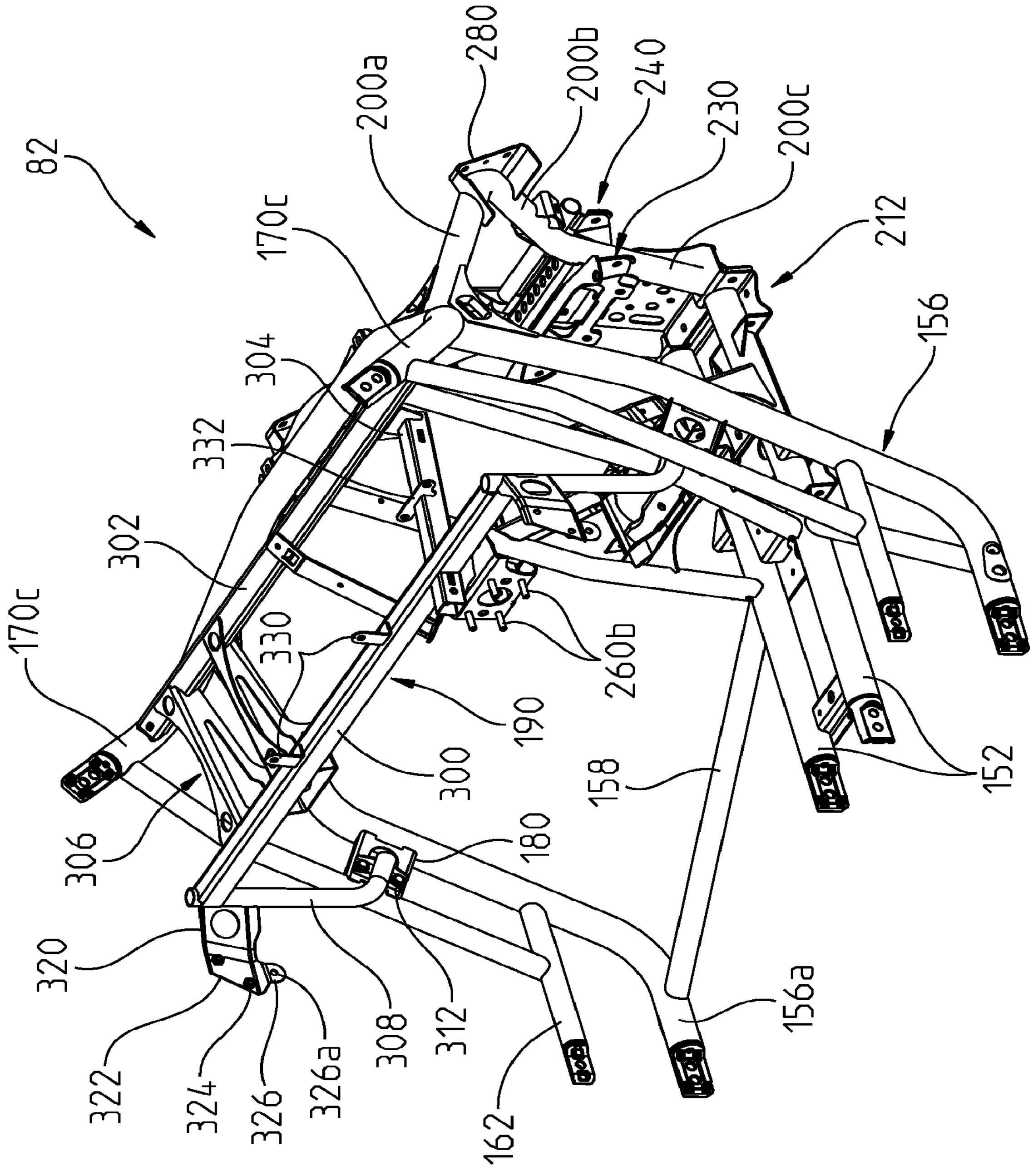
FIG. 17 is a rear right perspective view of the frame portion of FIG. 16.

With reference now to FIG. 16A, front suspension mount 100 will be described in greater detail. As shown in FIG. 16A, channel portions 210 and 212 straddle frame tubes 152 defining sidewalls 210*a* and 212*a*, each having mounting apertures 210*b* and 212*b* for mounting a lower control arm of the front suspension as described herein. As also shown in FIG. 16A, channel portion 220 straddles frame tubes 202 and defines a front face at 220*a* having a mounting aperture at 220*b*. Channels 222 extend between channel 220 and channel 204 and retain a plate portion 224 defining an aperture at 224*a*. Bracket 230 straddles frame tube portions 200*c* and defines a tab portion 230*a* extending beyond frame tube 200*c* having an aperture at 230*b*. Bracket 230 also defines an upper horizontal wall at 230*c* defining apertures at 230*d* as described herein. Bracket 240 straddles frame tube portions 200C on a front side thereof and defines plate portions 240*a* extending beyond frame tube portions 200*c* and defines apertures at 240*b*. It should be appreciated then that apertures 220*b*, 224*a*; and 230*b*, 240*b* define a mounting location for an upper control arm of the front suspension as described herein.

Bracket 240 also includes upper flanges 240*c* having mounting apertures 240*d* as described herein. With reference still to FIG. 16A, upper channel 250 flanks tube portion 170*a* of frame tube 170 defining parallel plate portions 250*a* having mounting apertures 250*b* for mounting a top end of a shock absorber of front suspension 70 as described herein. Channel portion 250 also defines an upper wall 250*c* having mounting apertures 250*d* as described herein. As shown best in FIGS. 16*a* and 17, control mount 260 is shown. Control mount 260 has a front wall 260*a* coupled to frame tube 202 having fasteners 260*b* (FIG. 17) surrounding an opening 260*c*. Bracket 260*d* extends rearwardly from front wall 260*a* including mounting apertures 260*e*.

Front frame portion 82 includes further additional brackets such as 270 (FIG. 14), 280 (FIG. 16A), 282 (FIG. 16A) and 284 having mounting apertures 284*a* (FIG. 16A). Lower plate 290 (FIG. 16A) is coupled to a lower portion of frame tubes 152 and includes a mounting aperture 290*a*. Channel 292 also couples frame tube portions 152 and includes a mounting aperture at 292*a*.

With reference again to FIGS. 14 and 17, upper frame portion 190 includes a transverse tube 300; transverse channel 302 where tube 302 and channel 302 are coupled by way of cross tube 304 and steering mount 306. Steering mount 306 includes a plurality of mounting apertures at 306*a*. Mounting tubes 308 extend downwardly from tube 300 and include mounting brackets at 310 and have mounting apertures at 310*a*. It should be appreciated that channel 302 overlies brackets 270 and that brackets 310 overlie brackets 180 (FIG. 17) with fasteners 312 positioned through apertures 310*a*, 180*a*. Brackets 320 (FIG. 17) extend rearwardly from tubes 308 and include a flange 322 having fasteners 324 and a mounting tab 326 having a mounting aperture at 326A. Front frame portion 82 further includes mounting tabs 330 and 332.

Figure 18:
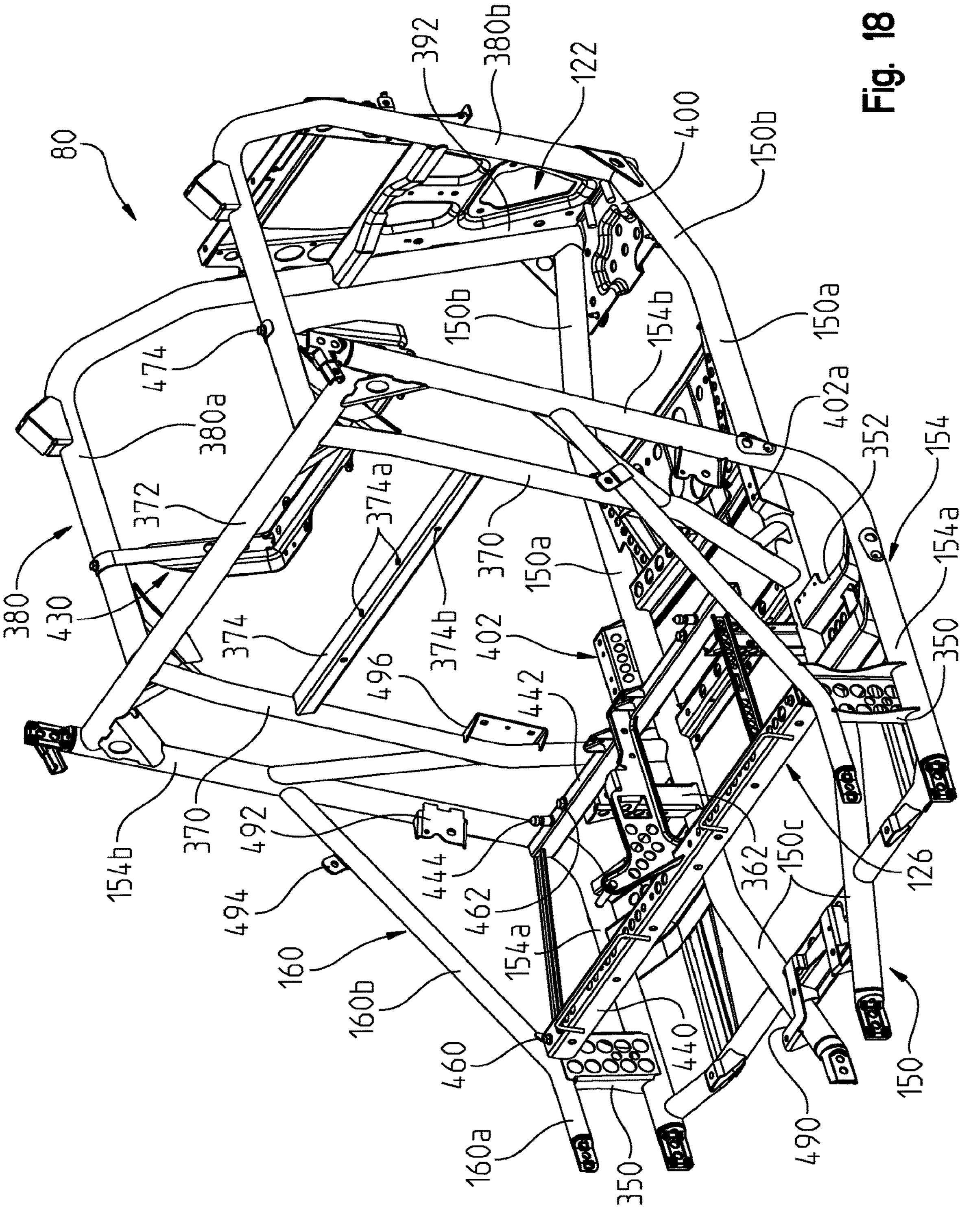
FIG. 18 shows a left front perspective view of the vehicle frame rear portion.

With reference now to FIGS. 14-15 and 18-20, rear frame portion 80 will be further described. As shown in FIG. 18, rear frame portion 80 further includes a truss portion 350 positioned between tube portions 154*a* and 160*a*. Truss portions 352 extend between frame tubes 150 and 154, and trusses 354, 356 (FIG. 14) extend between frame tubes 150. A cross tube 358 extends between frame tube 150 and frame tubes 154. With respect now to FIG. 14*a*, mount portions 360 are coupled to frame tube 160 providing a mounting aperture at 360*a* and mounting bracket 362 is provided coupled to frame tubes 152 providing a mounting aperture at 362*a*.

As shown in FIG. 18, rear frame portion 80 further includes frame tubes 370 coupled to frame tubes 150 at a lower end thereof and to a cross tube 372 at an upper end thereof. Cross tube 372 also couples between upper portions 154*b* of frame tubes 154. Cross tube 374 extends between frame tubes 370 providing mounting apertures 374*a* and 374*b*. Rear frame tubes 380 extend from cross bar 372 rearwardly and relatively horizontally through frame tube portions 380*a* and are then bent downwardly and inwardly at tube portions 380B to couple with rear portions 150*b* of frame tubes 150. Rear channel 390 and rear plate 392 (FIG. 14) extend between frame tube portions 380*b* of frame tubes 380.

Figure 19:
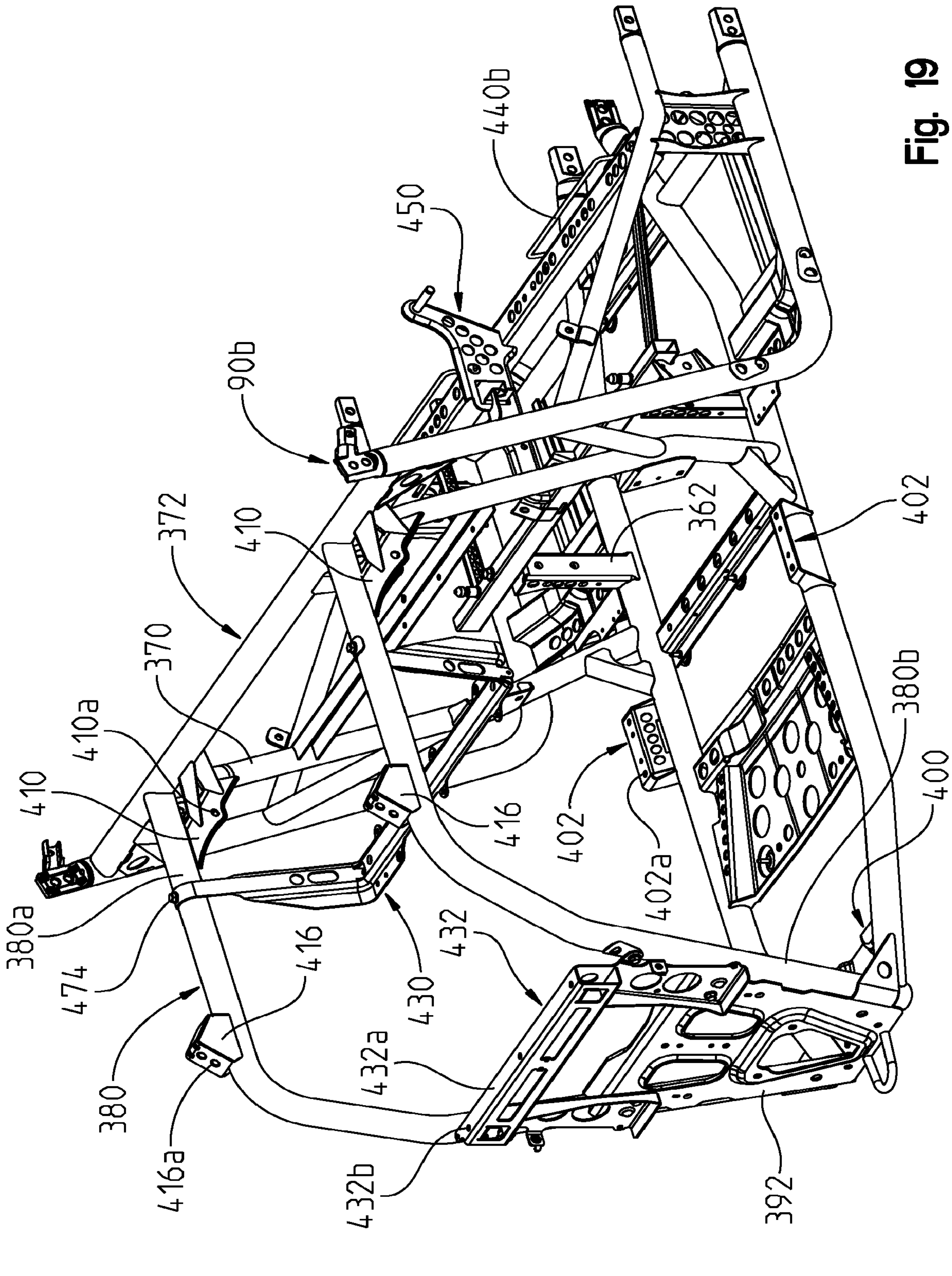
FIG. 19 shows a right rear perspective view of the vehicle frame portion of FIG. 18.
Figure 20:
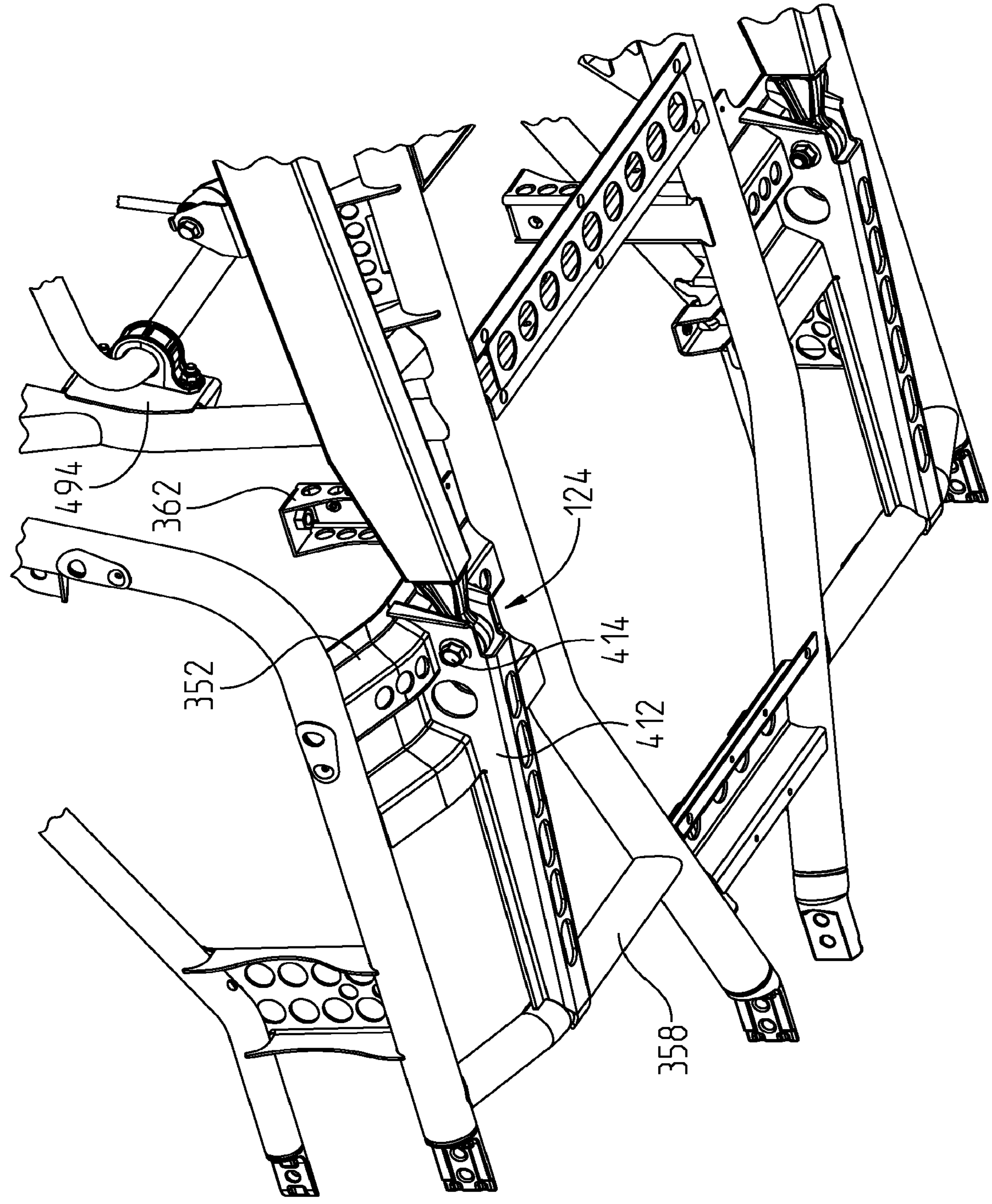
FIG. 20 shows an underside perspective view of the rear frame portion showing the rear suspension mount.

As shown in FIG. 18, rear differential mount 122 is defined by plate 392 for mounting rear differential of the power train as described herein. As shown best in FIGS. 14*a* and 18, engine mounting brackets 402 are provided coupled to frame tubes 150 having mounting apertures at 402*a*. As shown in FIG. 19, an upper shock mount 410 is defined as a gusset at the intersection of frame tubes 380 and 370 defining a mounting aperture 410*a* for a shock absorber as described herein. As shown in FIG. 20, rear suspension mount 124 is defined by channel 412 coupled between cross tube 358, having mounting apertures at 414.

In a like manner, brackets 416 (FIG. 19) are provided at an upper side of frame tube 380A and defining mounting apertures at 416*a* for mounting of cab frame 84 as described herein. With reference again to FIG. 14, rear frame portion 80 includes seating mount 126, mounting strap 430 for utility box 56, muffler bracket 432 and skid plate 434. With reference still to FIG. 14, seating bracket 126 includes a front channel at 440 including mounting apertures at 440*a*. Bracket 126 further includes a rear frame tube at 442 having seat mounting pins at 444. Front channel 440 also includes seat mounting hooks at 440*b*. A control mounting bracket 450 is positioned laterally intermediate mounting portions 440*b* as further described herein.

Figure 14A:
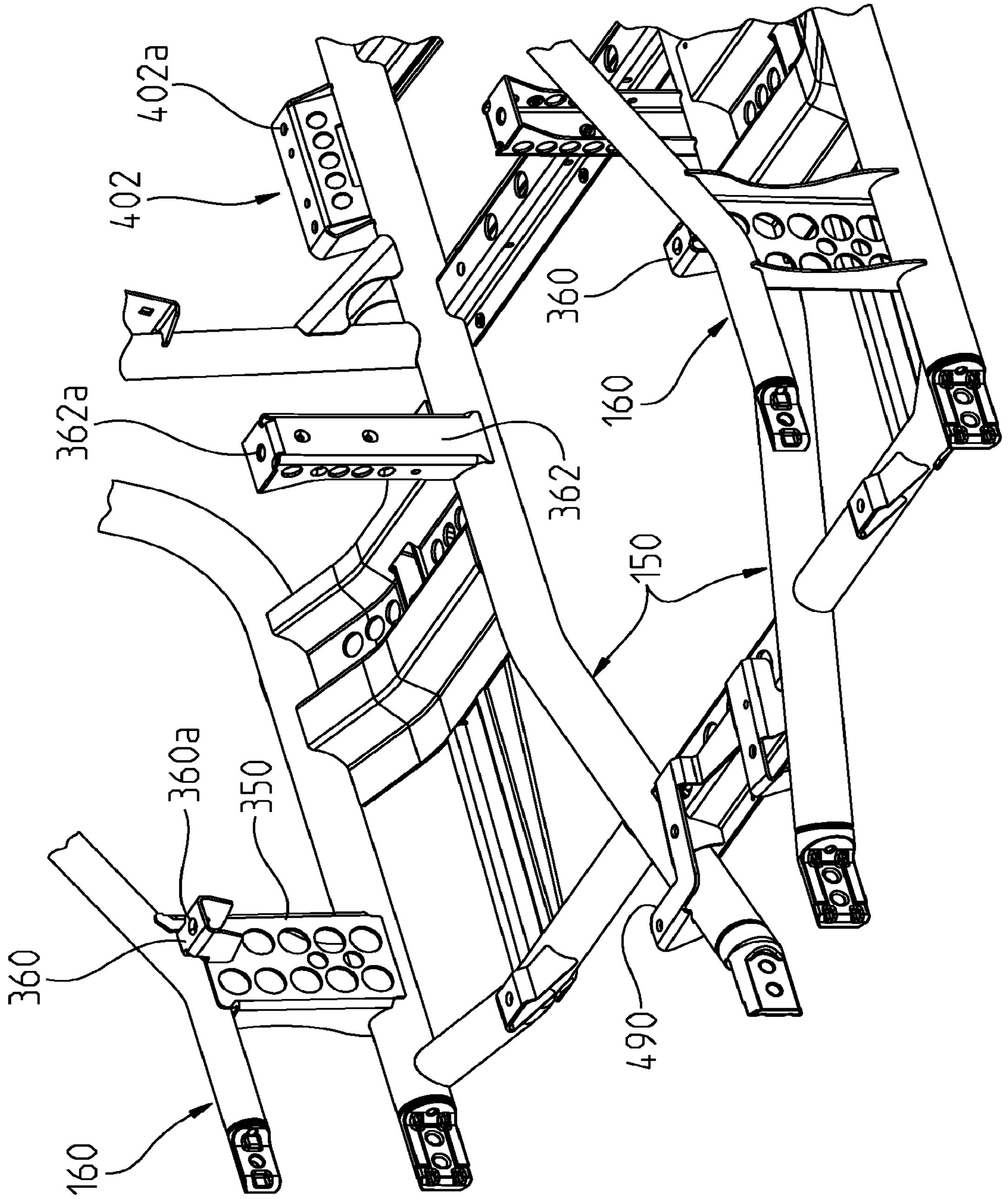
FIG. 14A shows an enlarged fragmented view of a portion of the vehicle frame of FIG. 14.

As shown best in FIGS. 18 and 19, seat mounting bracket 126 is shown coupled to rear frame portion 80 with channel 440 positioned over mounting brackets 360 (FIG. 14*a*) and with a fastener 460 positioned through apertures 440*a* into apertures 360A (FIG. 14*a*). In a like manner, rear tube 442 sits atop brackets 362 with fasteners 462 positioned through apertures 442*a* (FIG. 14) and into apertures 362*a* (FIG. 14*a*).

Strap 430 includes mounting arms 470 (FIG. 14) having mounting apertures at 470*a* and a lower support member at 472. Strap 430 is shown in the mounted position in FIGS. 18 and 19 with fasteners 474, coupling strap 430 to upper arms 380. Muffler mount 432 is also shown in FIG. 19 in a coupled position to rear frame tube portions 380*b* and has a cross tube 432*a* having mounting apertures at 432*b*.

As shown in FIG. 18, rear frame portion 80 further includes various other mounting brackets, namely, front mounting brackets 490 coupled to frame tube portions 150*a*, brackets 492 coupled to frame tube portions 155*b*, brackets 494 coupled to frame tube 160, and mounting brackets 496 are coupled to frame tubes 370.

Figure 21:
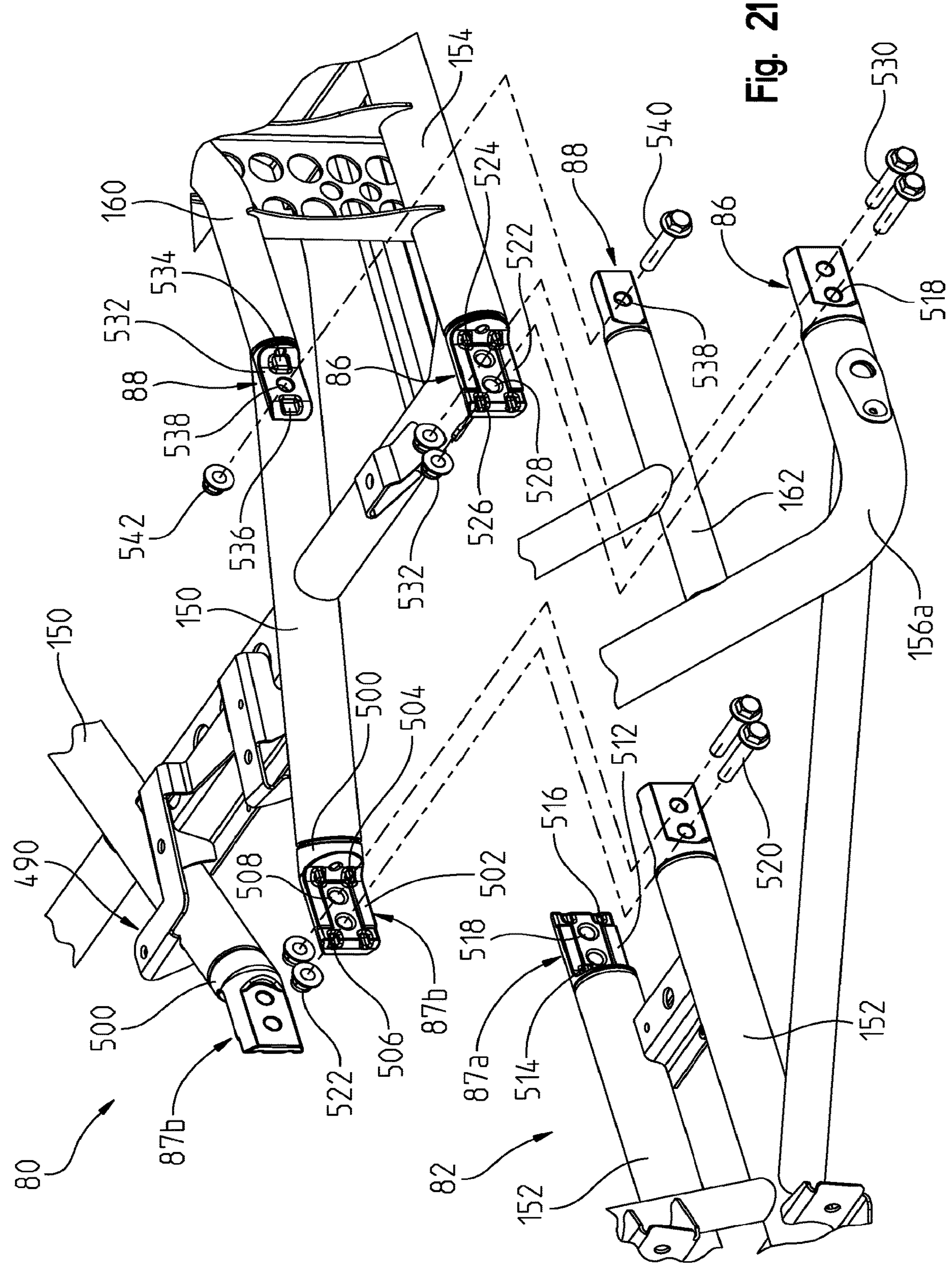
FIG. 21 shows a front left perspective view of the front and rear portions of the vehicle frame being coupled together.
Figure 22:
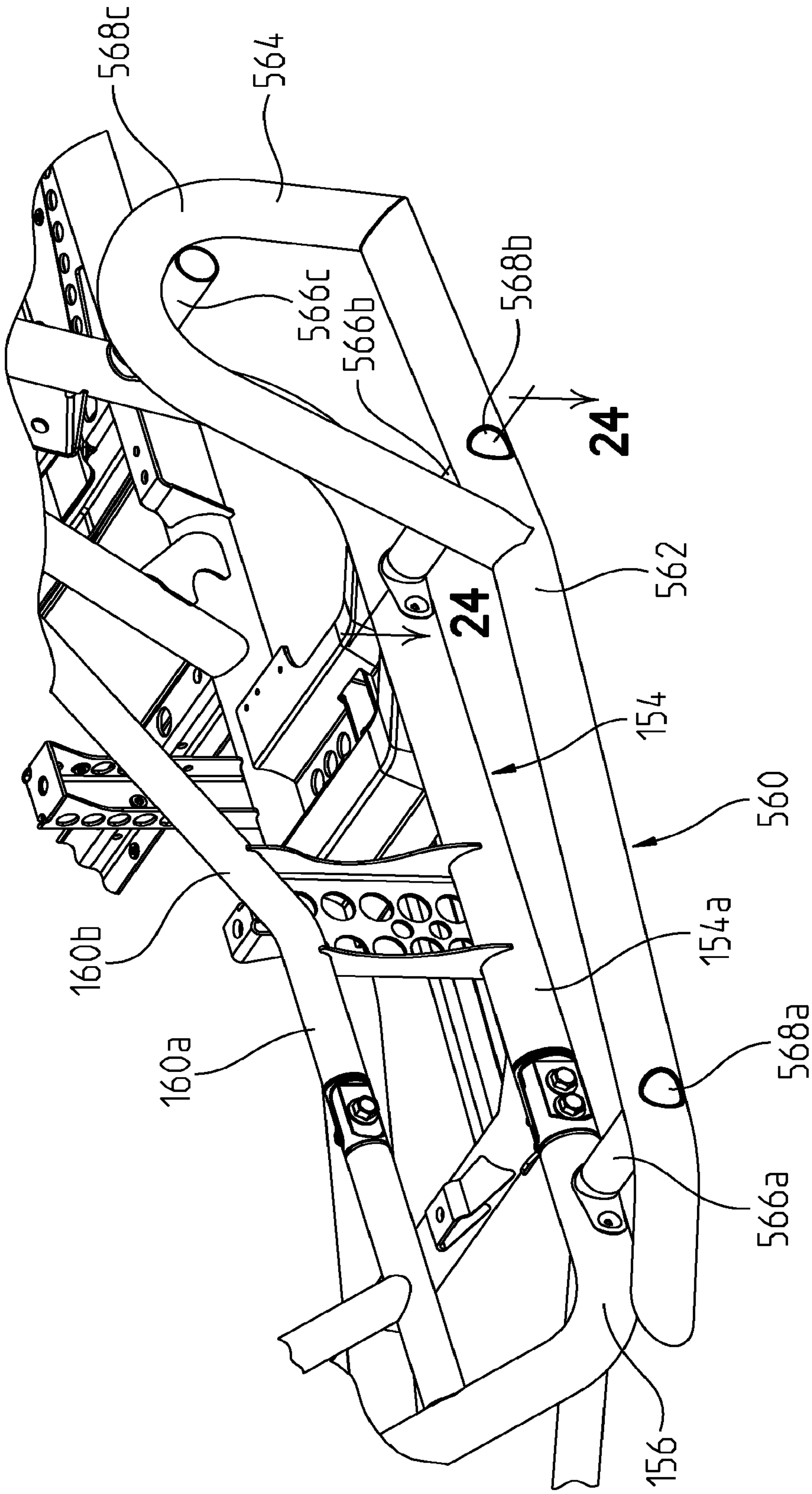
FIG. 22 shows the frame portions of FIG. 20 coupled together, and an auxiliary side frame.
Figure 23:
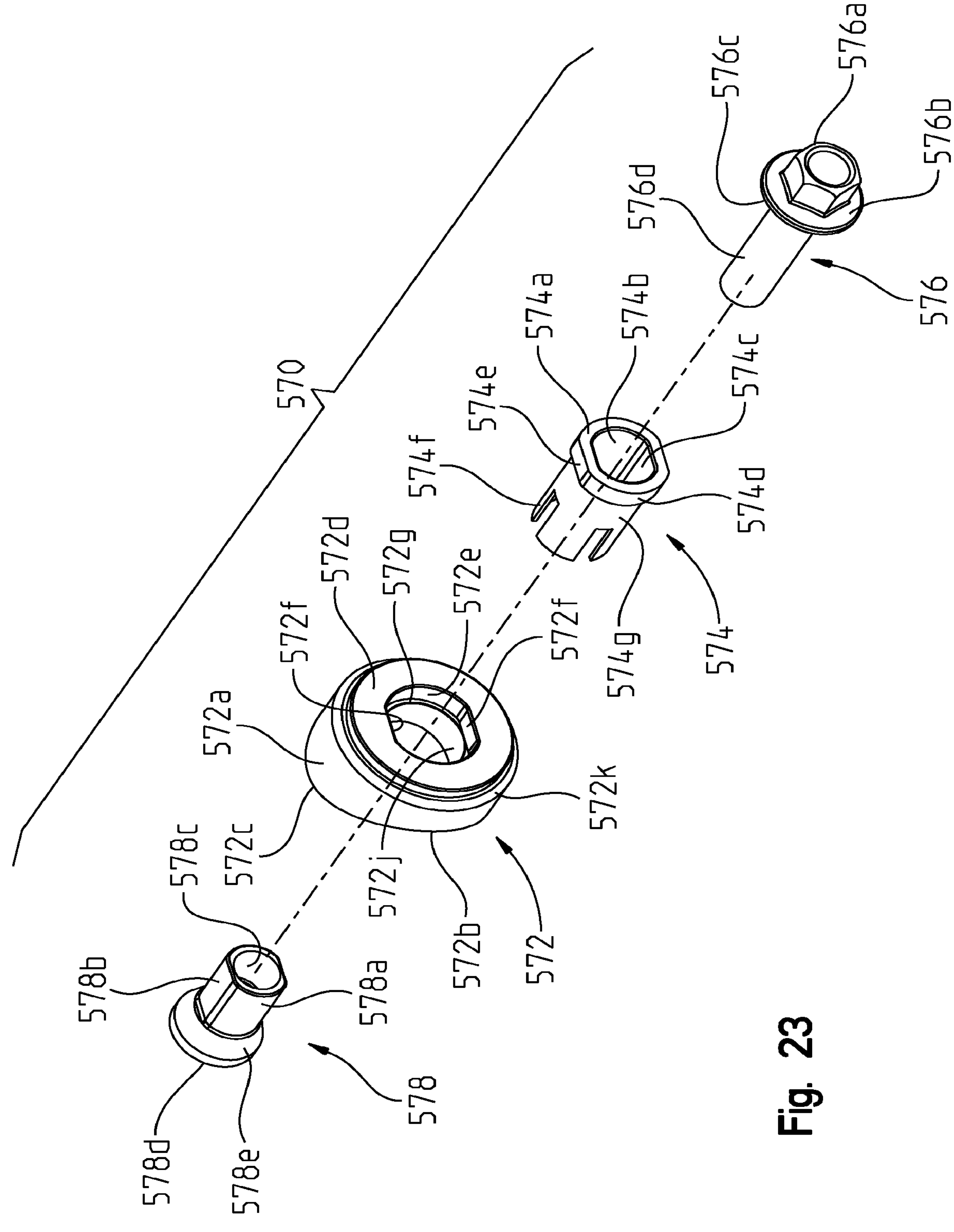
FIG. 23 shows a perspective view of the couplers that retain the side frame of FIG. 22 in position.

As previously mentioned, frame portions 80 and 82 are coupled together by way of couplers 86, 87, and 88, and this is shown in exploded fashion in FIG. 21. Couplers 87 include an inline coupler 87*a* and an angled coupler 87*b*. The couplers 87*b* include an angled shank portion 500 having a front face at 502 having protrusions 504, recesses 506, and apertures at 508. In a like manner, coupler 87*a* includes a face 512, projection 514, recess 516, and aperture 518. It should be appreciated that the couplers 57*a* and 57*b* couple together with the two faces 502, 512 in a planar manner with projections 504 received in recesses 516 and with projections 514 received in recesses 506. This allows fasteners 520 and 522 to couple together frame tubes 150 and 152.

Frame tubes 154 and 156 are coupled together in a like manner by way of couplers 86. Couplers 86 are identical having a front face 522, projection 524, recess 526, and aperture 528. It should be appreciated that the couplers 86 are positioned with their respective faces 522 in a planar manner with respective projections 524 received in respective recesses 526 of the opposite coupler 86. Thus fasteners 530, 532 fasten the couplers 86 together coupling frame tubes 154 and 156.

Finally, frame tubes 160 and 162 are coupled together by way of their respective couplers 88. Couplers 88 are also identical having a front face 532, projection 534, recess 536 and aperture 238. Couplers 88 are positioned with their respective faces 532 in a planar manner with respective projection 534 received in a respective recess 536. Fastener 540 is receivable through apertures 538 to receive fasteners 542 and fasten couplers 88 together thereby coupling frame tubes 160, 162 together.

With reference now to FIGS. 22-25, an optional outer guard 562 is described which may be coupled to a side of frame 12, and namely to frame tubes 154, 156. Guard 560 includes a longitudinal tube portion 562 and a rearward tube 564. Guard 560 includes frame tube couplers 566*a*, 566*b*, and 566*c*. Apertures 568*a*, 568*b*, and 568*c* align with an internal cylindrical volume of each of the coupling tubes 566*a*, 566*b*, and 566*c*, respectively. A coupling assembly 570 (FIG. 23) includes a contoured washer 572, a deformable shank 574, and fasteners 576, 578. Contoured washer 572 has an outer diameter at 572*a* having an arcuately curved face at 572*b* providing extreme most points at 572*c* in order to lie flushly against the outer cylindrical surface of frame tubes 154, 156. Contoured washer 572 further includes a front face at 572*d* opposing curved surface 572*b* and includes an inner diameter at 572*e* having flat portions at 572*f* and a shoulder at 572*g*. An internal diameter is provided at 572*j*.

Deformable shank 574 includes a head at 574*a* having an internal diameter 574*b* interrupted by flat portions 574*c* and an outer diameter portion 574*d* interrupted by flat portions 574*e*. Deformable wings 574*f* extend from a body portion 574*g*.

Fastener 576 includes a bolt head 576*a* having a shoulder portion 576*b* having an inner face at 576*c* and a threaded portion at 576*d*. Fastener 578 has a cylindrical body at 578*a* having flats at 578*b*, and internal threads at 578*c*. A head 578*d* defines a camming surface at 578*e* (FIG. 24).

Figure 24:
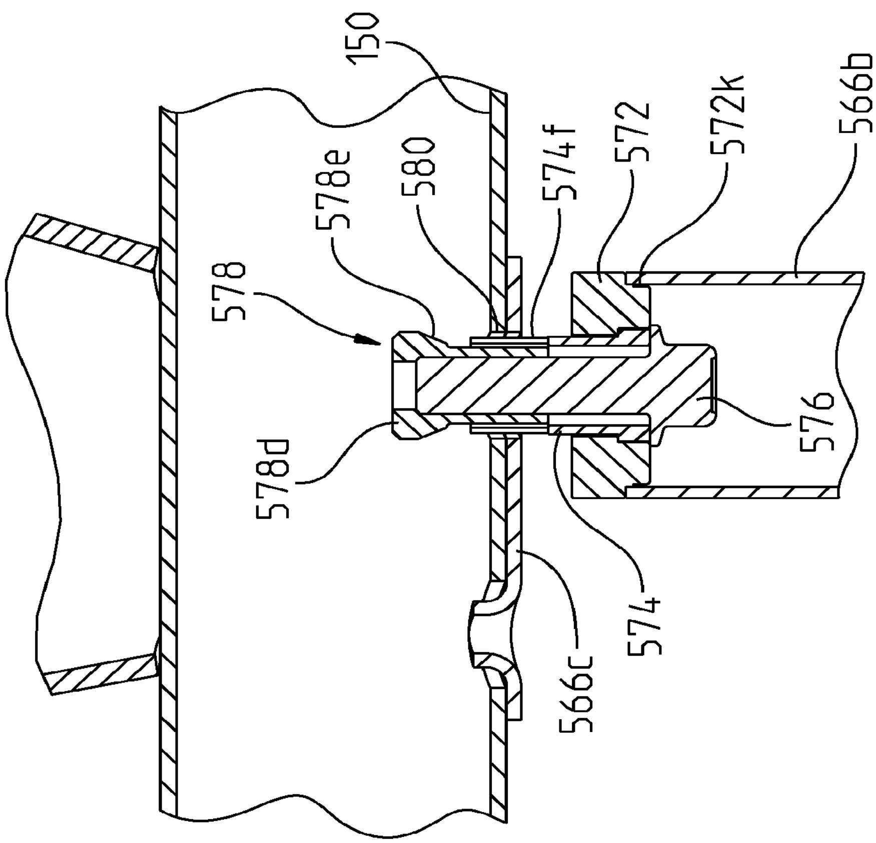
FIG. 24 is a cross-sectional view through lines 24-24 of FIG. 21, with the retainers in a pre-locked position.

As shown best in FIG. 24, tube coupler 566*b* is attached to contoured washer 572 by way of an end of tube 566*b* fitting within undercut portion 572*k* on washer 572. The coupling assembly 570 may be preassembled such that the deformable shank 574 is positioned within contoured washer with the head 574*a* abutting the shoulder 572*g* and with diameters 574*d* and 572*e* and flats 574*e*, 572*f* in complementary relationship. This positions the deformable wings 574 beyond the contoured washer 572 and allows fasteners 576 and 578 to be threadably received on opposite sides of the deformable shank 574 (FIG. 24). Thus the tube 566*b* and the coupler assembly 570 may be positioned through an aperture 580 (FIG. 24) of frame tube 150 with flange 566 in abutting relationship with frame tube 150.

Figure 25:
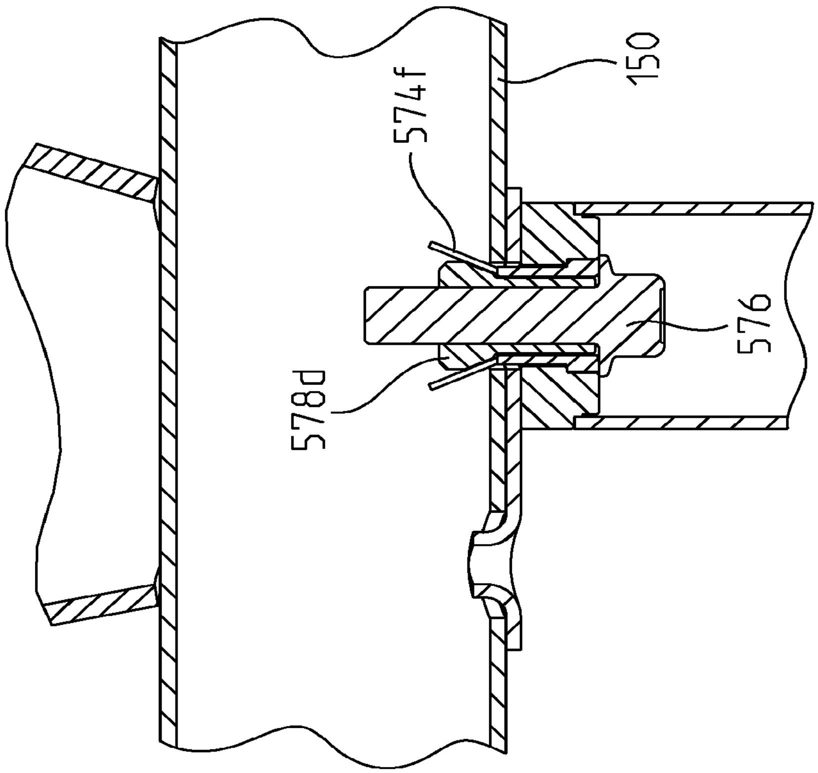
FIG. 25 shows the cross-sectional view of FIG. 24 with the retainers in the locked position.

Fastener 576 is thereafter tightened down which draws the two fasteners 576 and 578 together. A tool such as a wrench is not required on the inside of frame tube 150 due to the corresponding flats 578*b*, 574*c* and 574*e* and 572*f* together with the contour of the arcuate surface 572*b* of contoured washer 572. Thus the camming surface 578 is drawn into the deformable wings 574 as shown in FIG. 25 deforming the wings outwardly and pinching the wings to aperture 580 locking the entire assembly to frame tubes 150.

Figure 26:
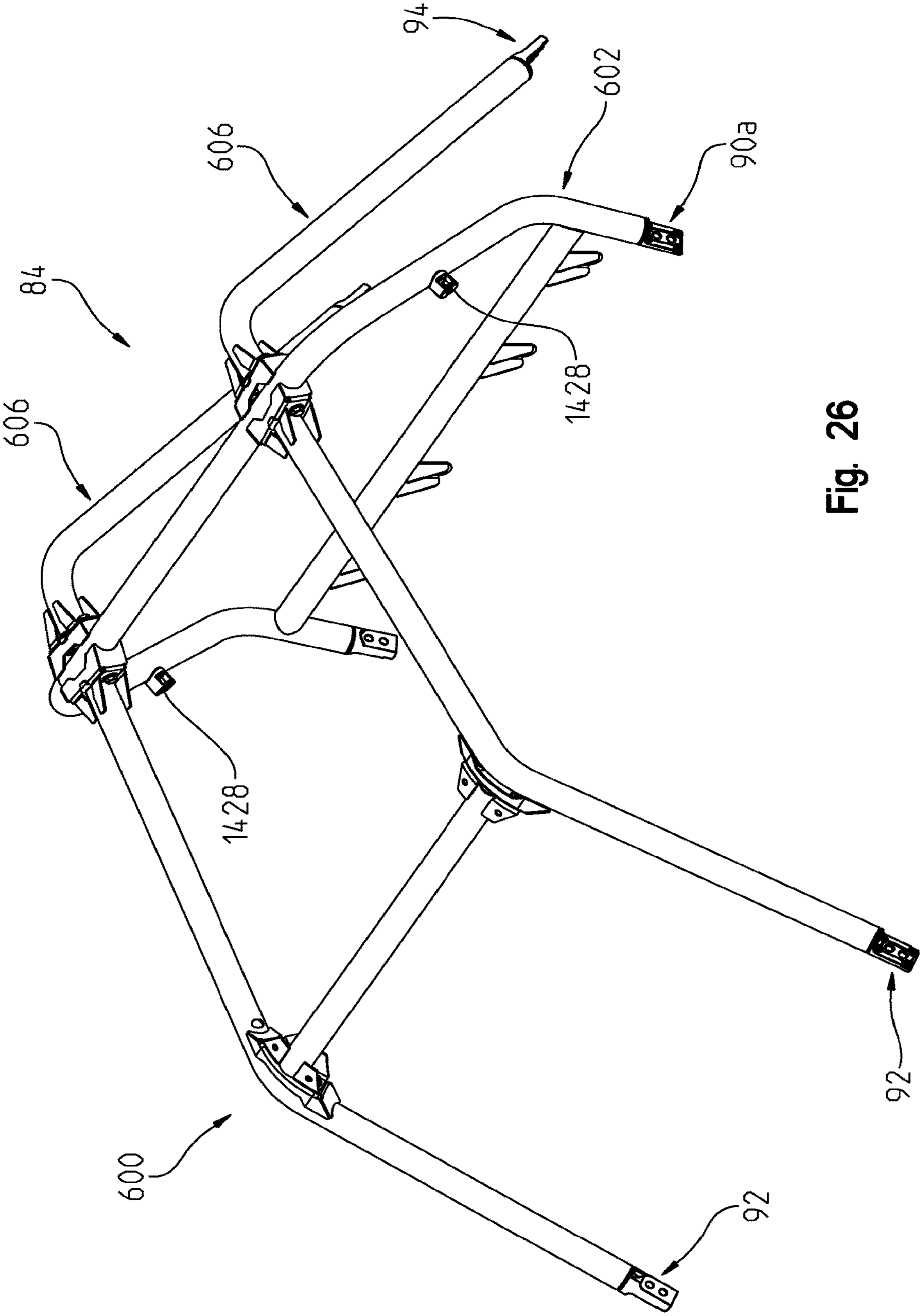
FIG. 26 shows a front left perspective of the cab frame.
Figure 27:
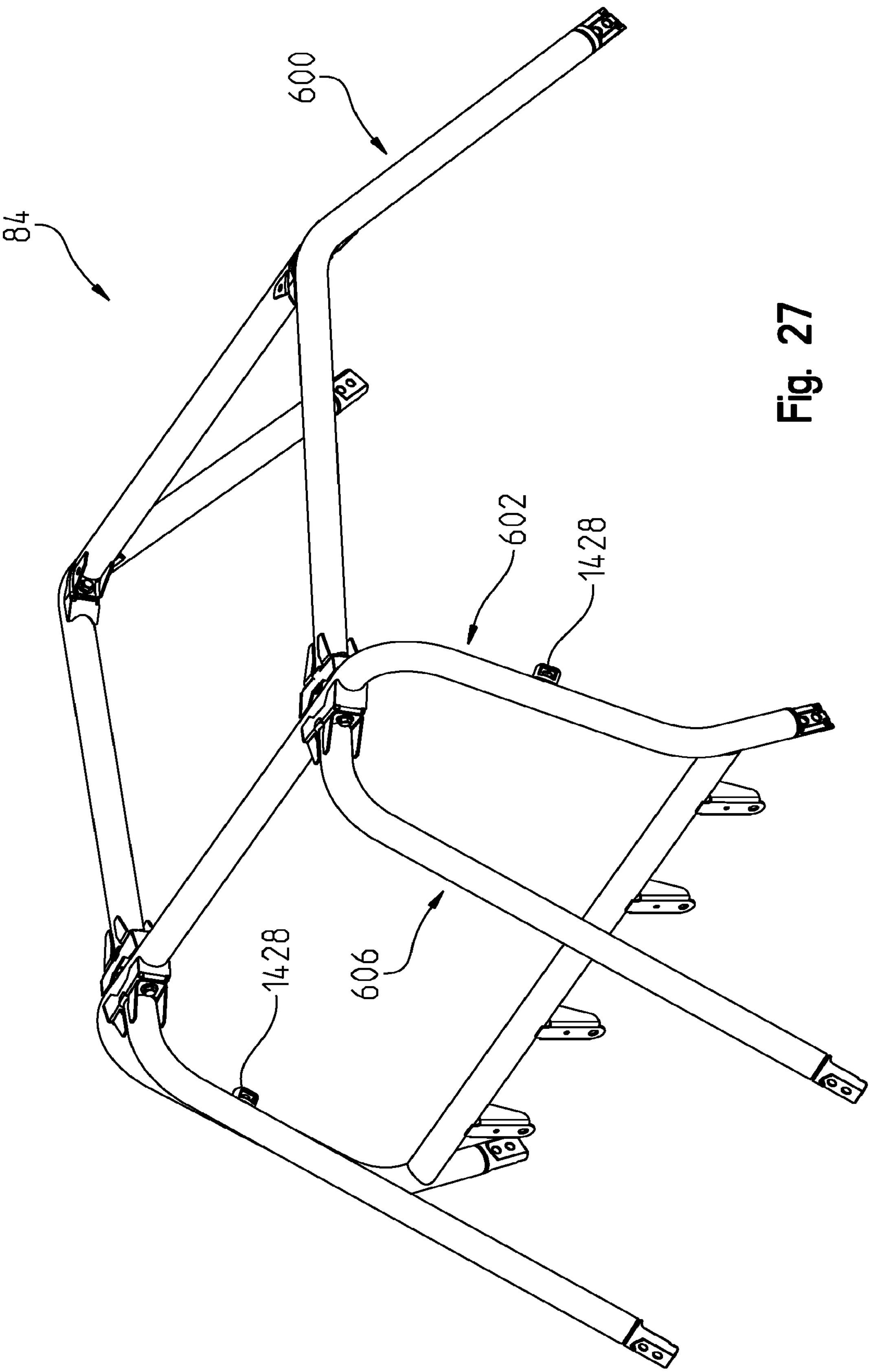
FIG. 27 shows a rear right perspective view of the cab frame.
Figure 28:
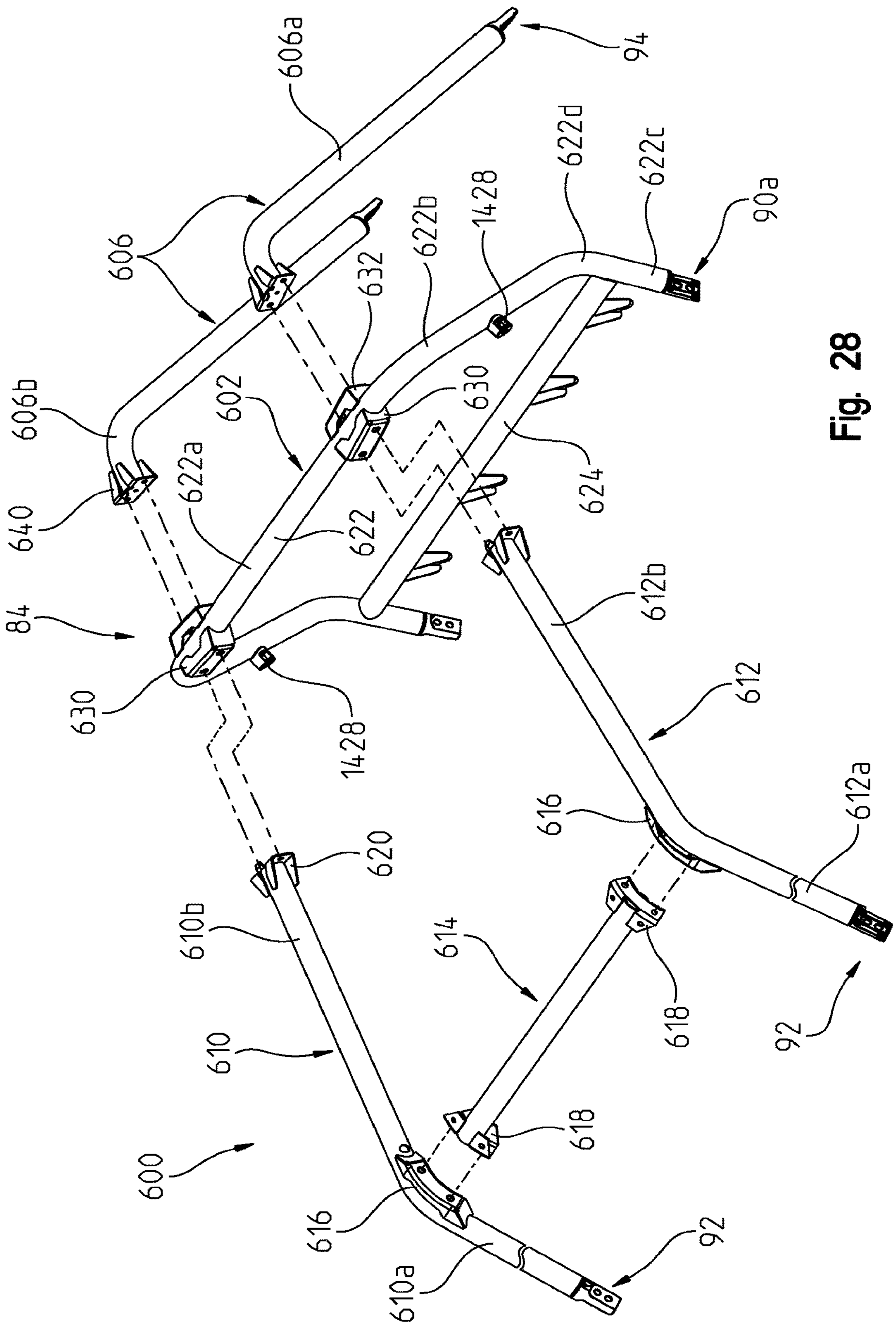
FIG. 28 shows a view similar to that of FIG. 26 showing the cab frame components in an exploded manner.
Figure 29:
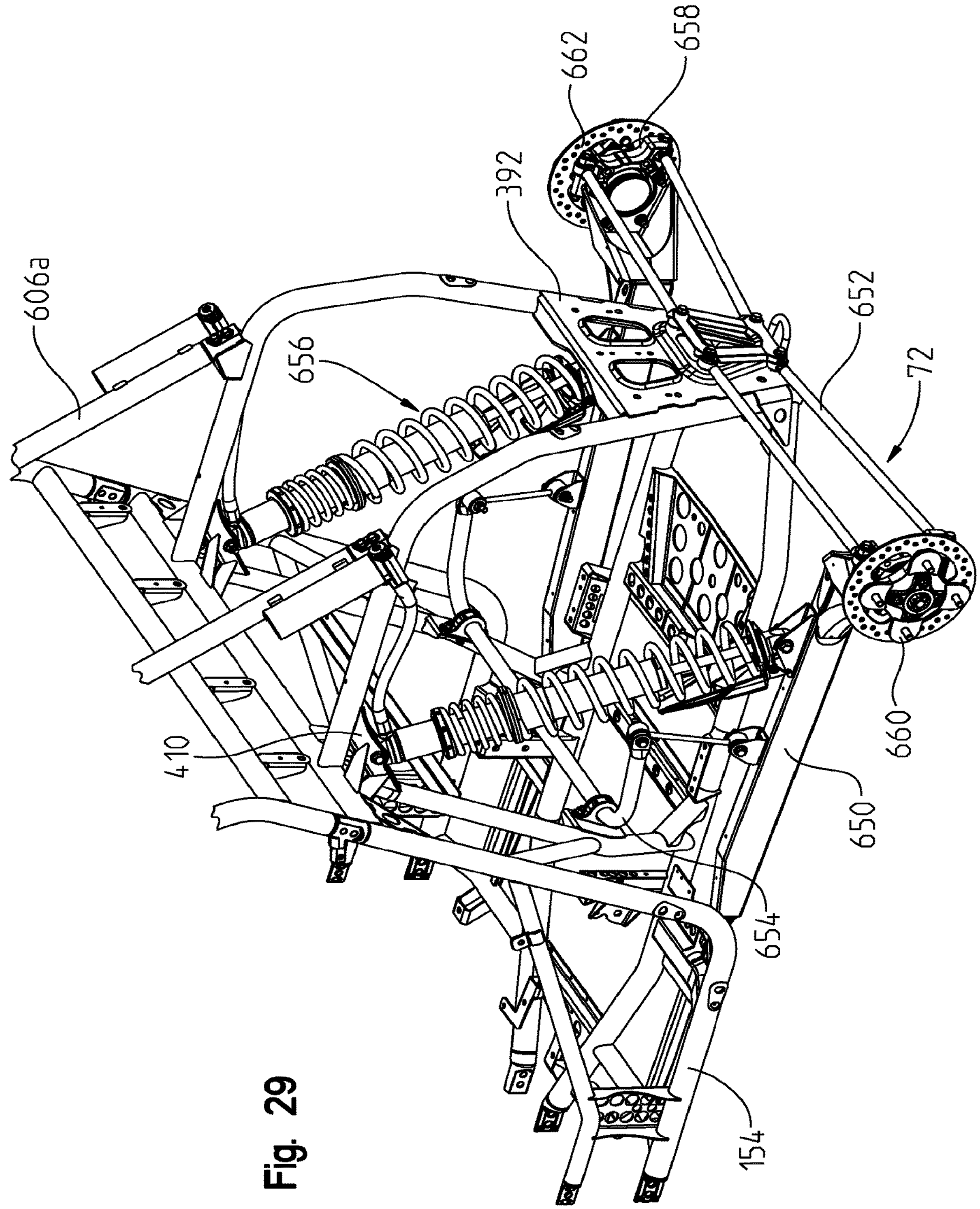
FIG. 29 shows a rear left perspective view of the vehicle rear suspension.

With reference to FIGS. 26-28, cab frame 84 will be described in greater detail. With reference first to FIGS. 26 and 27, cab frame 84 includes a front portion 600, rear portion 602, and rear supports 606. As shown best in FIG. 28, front portion 600 includes first and second frame portions 610, 612 coupled together by way of a cross bar 614. Frame portions 610 and 612 each include tube portions 610*a*, 612*a*, which would extend forward of the operator and be coupled to the frame. Frame portion 610 and 612 further include longitudinally extending sections 610*b* and 612*b*, which extend rearwardly and over the operator's head. Corresponding brackets 616 on frame portion 610, 612 and corresponding brackets 618 on cross tube 614 allows coupling together to define the front frame portion 600. Frame tube portion 610 further includes rear brackets 620 for coupling tube rear frame portion 602.

Rear frame portion 602 includes a U-shaped tube 622 defined by a laterally extending tube portion 622*a* and downwardly extending tube portions 622*b* having ends at 622*c*. Radiused portions 622*d* extend between 622*b* and 622*c*. The cross tube 624 couples tube ends 622*c* and retains couplers 90*a* thereto. Brackets 630 face forwardly to couple with bracket 620. Rear brackets 632 face rearwardly to couple with rear support arms 606.

Rear support arms 606 include rearwardly and downwardly extending sections 606*a* having couplers 94 at the lowest most end and tube portions 606*b* having brackets 640 facing forwardly, and profiled to couple with brackets 632. As assembled, and as best shown in FIG. 11, tube portions 610*b*, 612*b* angle inwardly along lines 644 as they project rearwardly. This provides an offset with the overhead portion of the cab frame 84 allowing better ingress/egress.

Figure 32:
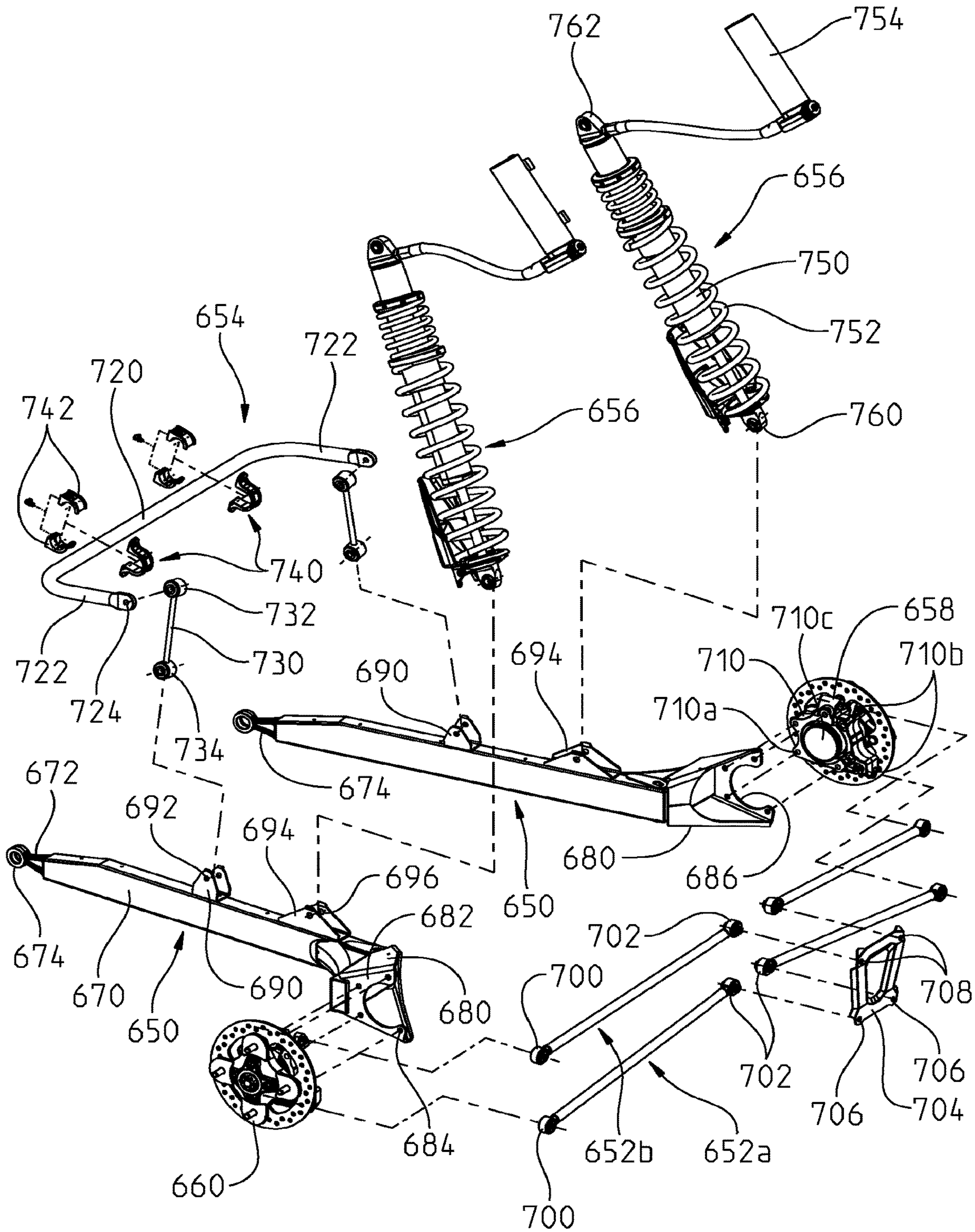
FIG. 32 shows the rear suspension in an exploded manner.

With reference now to FIGS. 29-32, rear suspension 72 will be described in greater detail. Rear suspension 72 is a trailing arm type suspension generally comprised of rear trailing arms 650, radius arms 652*a*, 652*b*, torsion bar or sway bar 654, and shock absorbers 656. Trailing arms 650 couple to spindles 658, which in turn hold wheel hubs 660 and brake discs 662. With reference now to FIG. 32, the details of the trailing arm suspension components will be described in greater detail. As shown, trailing arms 650 includes a generally longitudinally extending channel portion 670 having a link arm 672 at a front end thereof including a front coupling 674. Trailing arm 650 further includes a rear bracket 680 defining a mounting face at 682 having mounting apertures 684. As shown, face 682 defines an opened ended aperture at 686 as described herein. Trailing arm 650 further includes a first bracket 690 having mounting apertures 692, and a second bracket 694 having mounting apertures 696.

Alignment arms 652 include outer couplings 700 and inner couplings 702. Connector plate 704 includes apertures 706 in alignment with inner couplings 702 of lower radius arms 652*a* and upper apertures 708 in alignment with couplers 702 of upper radius arms 652*b*. With reference still to FIG. 32, spindle 658 includes flange 710 having mounting apertures at 710*a* profiled to align with apertures 684 for mounting thereof. Spindle 658 also includes threaded apertures 710*b* extending rearwardly and profiled to couple with outer couplings 700 of alignment arms 652. Spindle 710 also includes a central opening at 710*c*, which is profiled to receive a stub shaft or half shaft (not shown) in order to drive hub 660. Due to the open aperture 686, the stub shafts may be removed without the removal of the trailing arms 650.

With respect to FIG. 32, torsion bar 654 includes a laterally extending shaft portion 720 and longitudinally extending arm portions 722 having mounting apertures at 724. Link arm 730 includes an upper coupler 732 for coupling at aperture 724 and a lower coupler 734 for coupling to bracket 690. Clamps 740 are provided together with bearings 742 to clamp torsion bar to the frame as described herein. Shock absorbers 656 include a shock absorber portion 750 with an over spring 752. As shown, shock absorber portion 750 is a gas assist shock having a gas canister at 754. In the embodiment shown, rear shocks 656 are Walker Evans part number 7043983. Shock absorber 750 has a lower coupling at 760 for mounting to bracket 694 and an upper coupler 762 for mounting to frame 12 as described herein.

Figure 30:
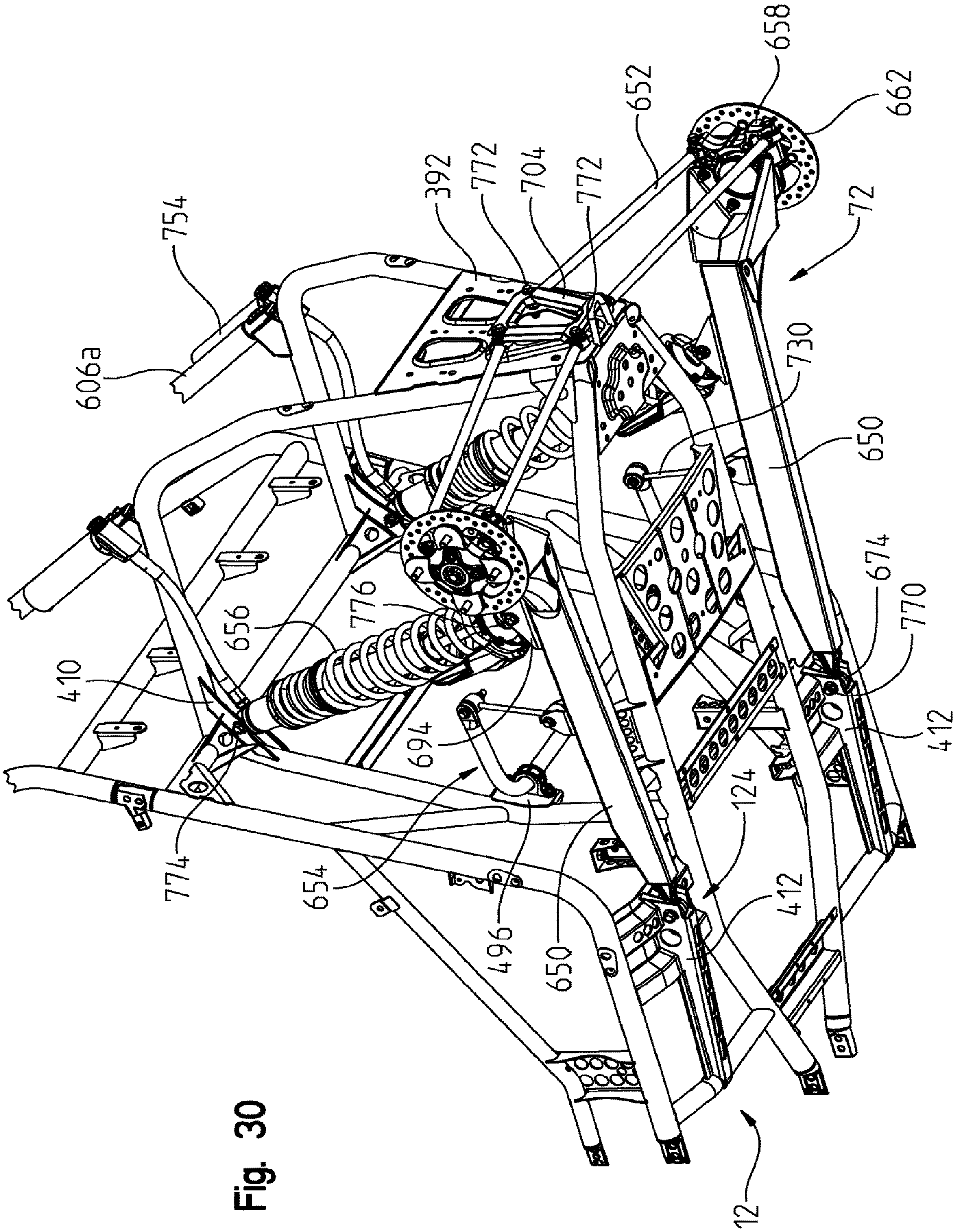
FIG. 30 shows a rear underside perspective view of the rear suspension shown in FIG. 29.
Figure 31:
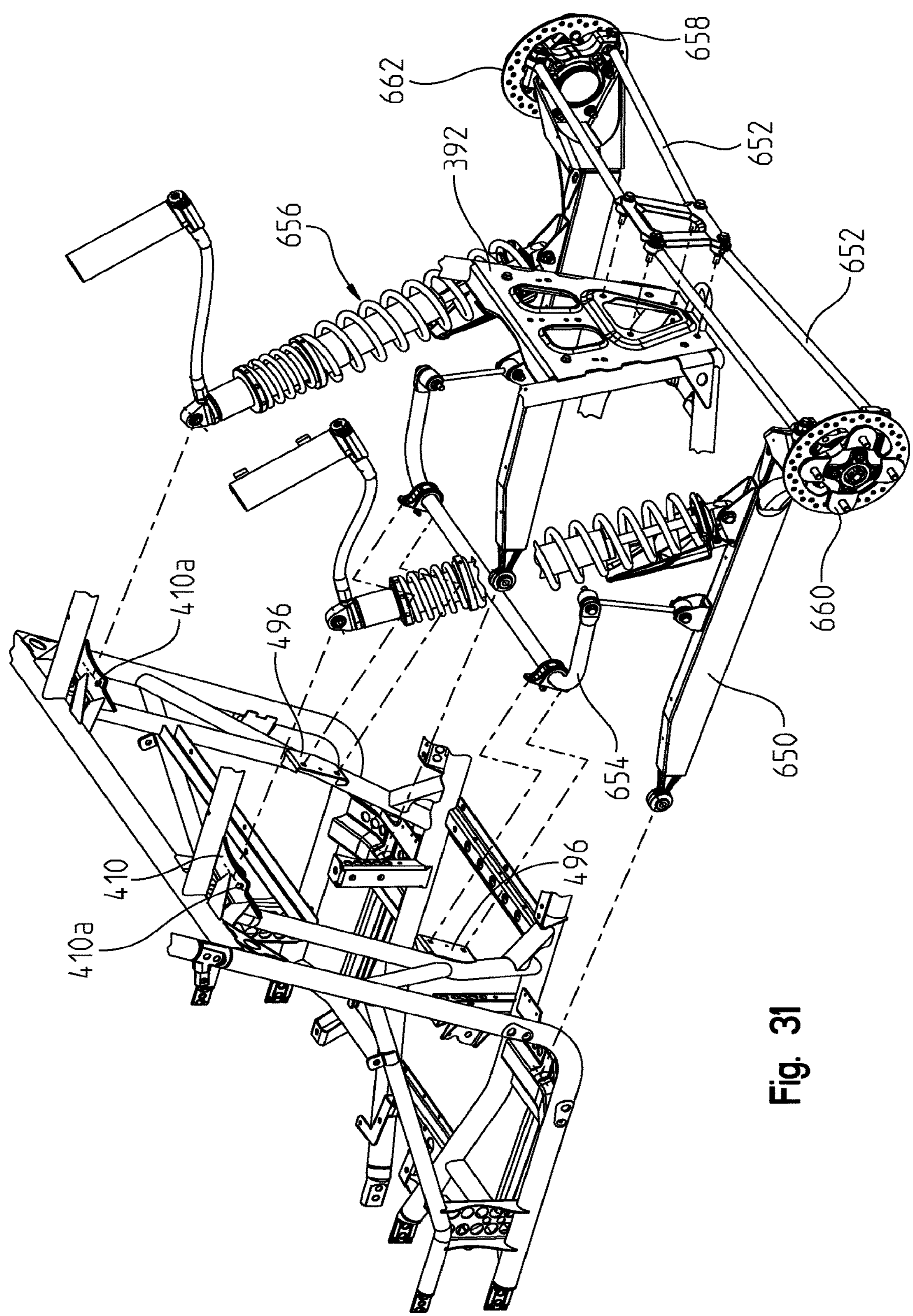
FIG. 31 shows the rear suspension of FIG. 29 exploded from the rear frame portion.

As shown in FIG. 30, trailing arms 650 are coupled to frame 12 by way of fasteners 770 extending through channel member 412 (through apertures 414, FIG. 20) and through coupling 674 (FIG. 32) of trailing arm 650. This allows trailing arms 650 to pivot upwardly and downwardly about a pivot axis which is transverse to a longitudinal direction of the vehicle. Trailing arms 650 are coupled to each other by way of the torsion bar 654 as clamps 740 retain the torsion bar to frame bracket 494 and links 730 are coupled between each torsion bar 650. Radius arms 652 maintain trailing arms 650 in a laterally fixed manner by way of connection to the spindles and to frame plate 392 by way of fasteners 772 through connector plate 704. Shock absorbers 656 are fixed at an upper end to bracket 410 by way of fasteners 774 and are fixed at a lower end to trailing arm 650 by way of fasteners 776 connected to bracket 694. Canisters 754 are coupled to cab frame tubes 606*a*.

Figure 33:
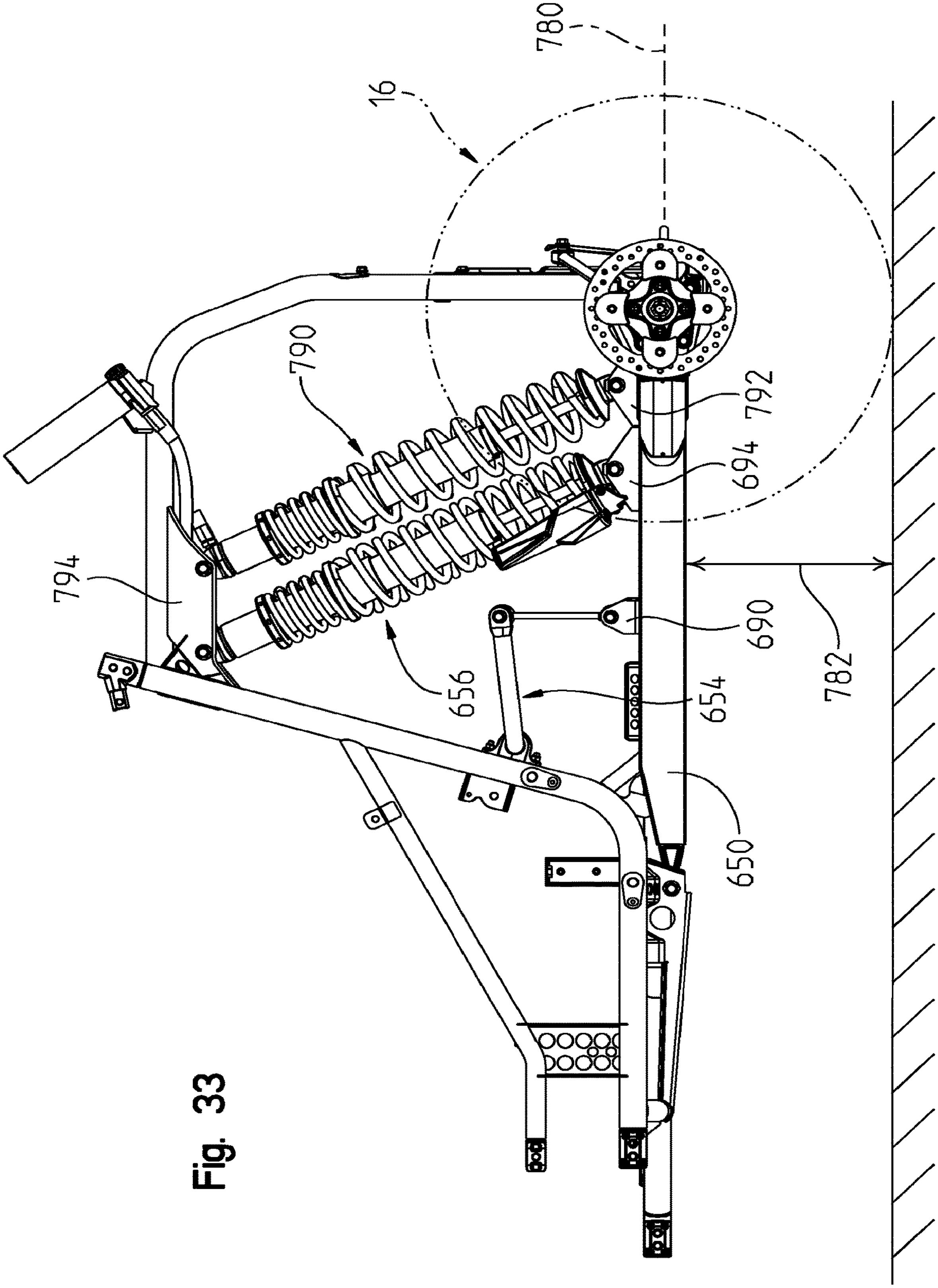
FIG. 33 shows a side view of the rear suspension.

As shown in FIG. 33, trailing arms 650 are shown in an unsprung, steady state position where trailing arm 650 is substantially horizontal to axis 780. This maximizes the ground clearance 782 between the ground and the bottom of trailing arm 650.

With reference now to FIG. 33, a second embodiment of rear suspension is shown incorporating a second shock absorber 790. Thus trailing arm 650 includes an additional bracket 792 and an alternate upper bracket 794 is provided to accommodate the upper ends of both shocks 656 and 790.

Figure 34:
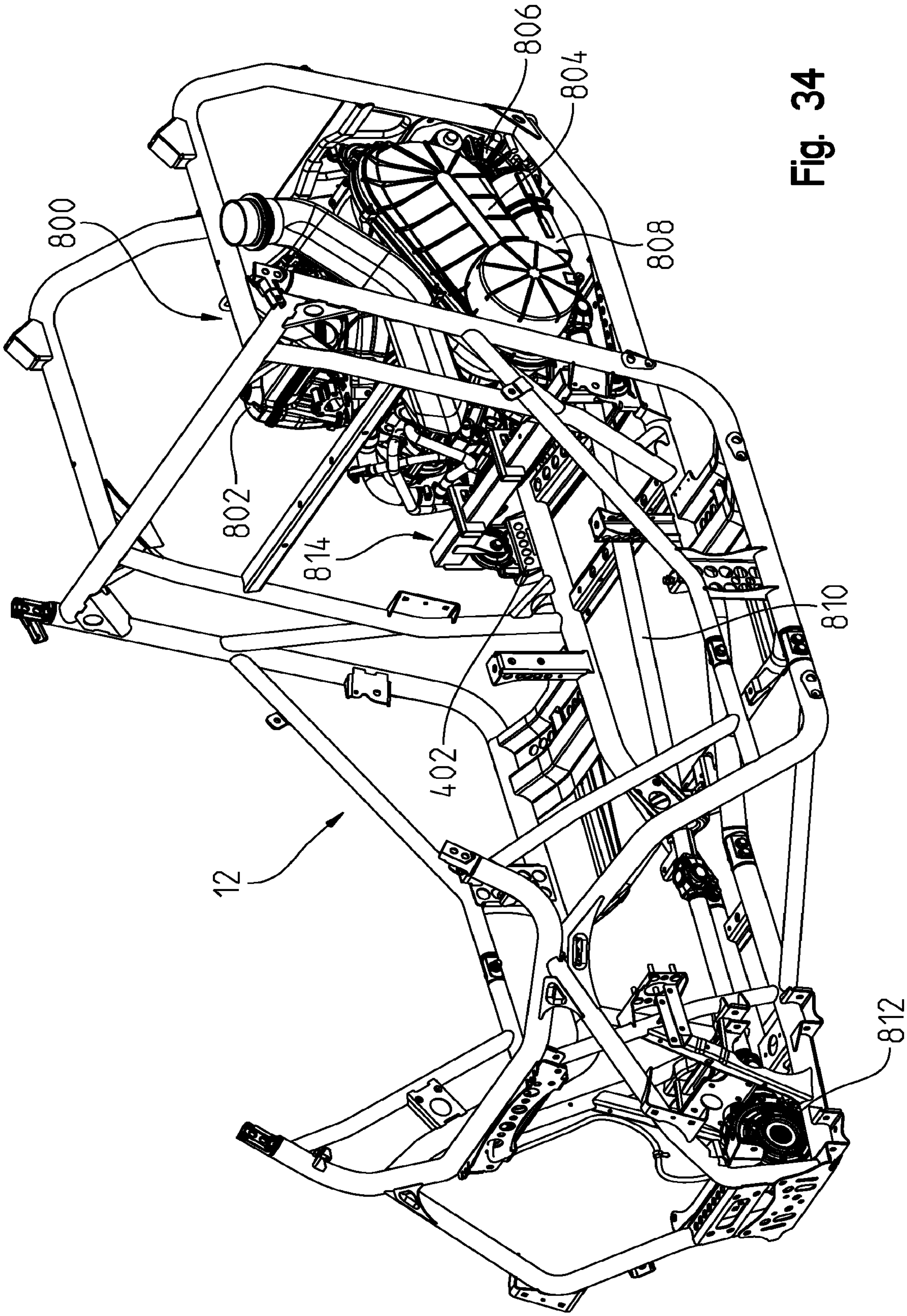
FIG. 34 shows a front left perspective view of the power train as installed in the frame.

With reference now to FIG. 34, frame 12 is shown having a power train installed therein. As shown, power train 800 is comprised of an engine 802, transmission 804, which may include a continuously variable transmission (CVT), and a rear differential 806. A rear drive 808 is provided between transmission and rear differential 806. A front drive shaft 810 is provided between transmission 804 and front differential 812. Engine 802 is mounted to frame 12 by way of an engine mount 814 coupled to engine 802 and to frame 12 at brackets 402. Engine mount 814 is similar in nature to that described in Applicants' patent applications, Ser. No. 13/370,139, the subject matter of which is incorporated herein by reference.

Figure 35:
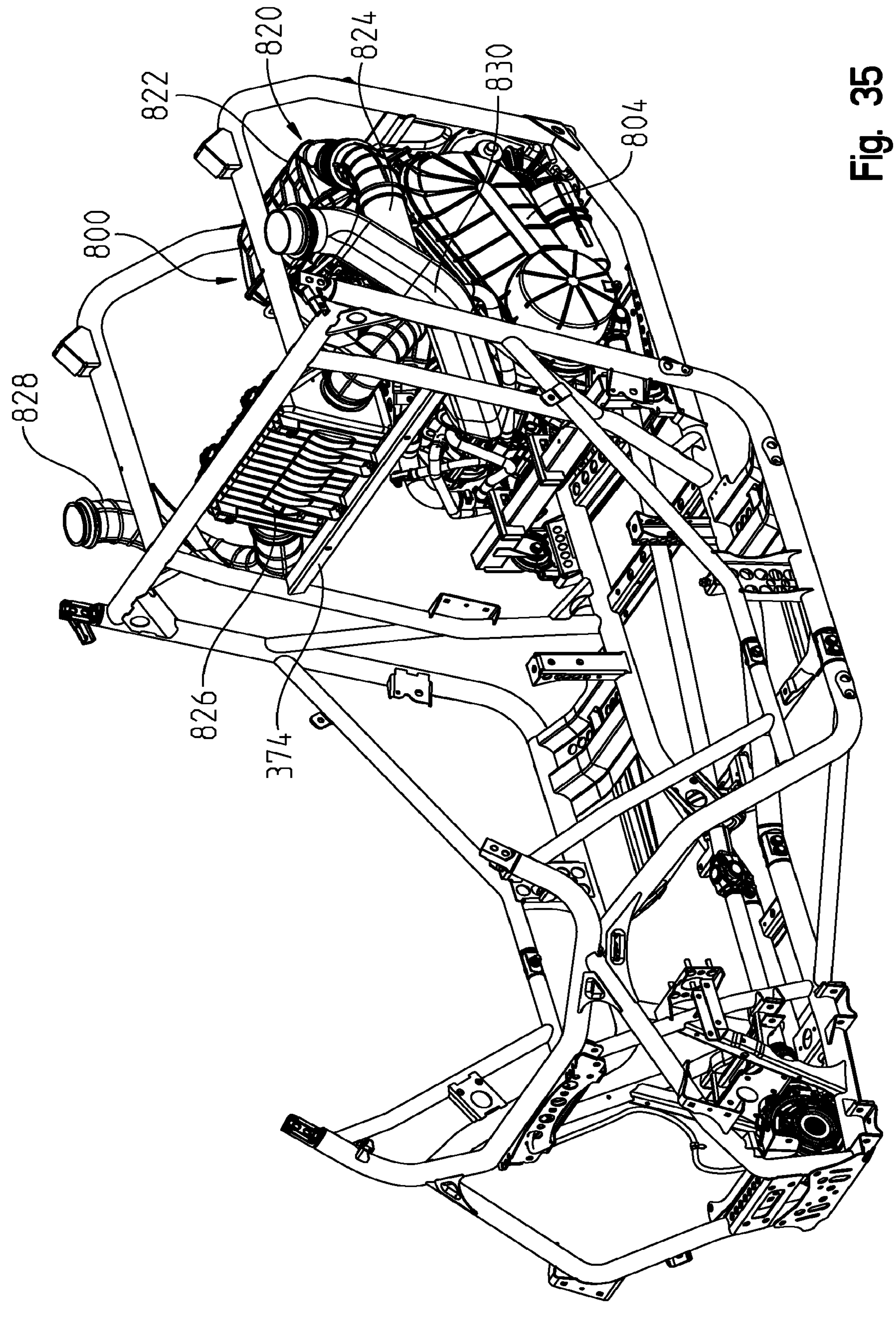
FIG. 35 shows a view similar to that of FIG. 34 including the air intake system.

With reference now to FIG. 35, engine air intake system 820 is comprised of an air filter 822, ducting 824, air filter 826, and air intake duct 828. A CVT cooling duct is also provided at 830 drawing ambient air to CVT transmission 804 for cooling purposes. Air intake system 820 and CVT cooling 830 is similar in nature to that described in Applicants Ser. No. 12/849,480, the subject matter of which is incorporated herein by reference.

Figure 36:
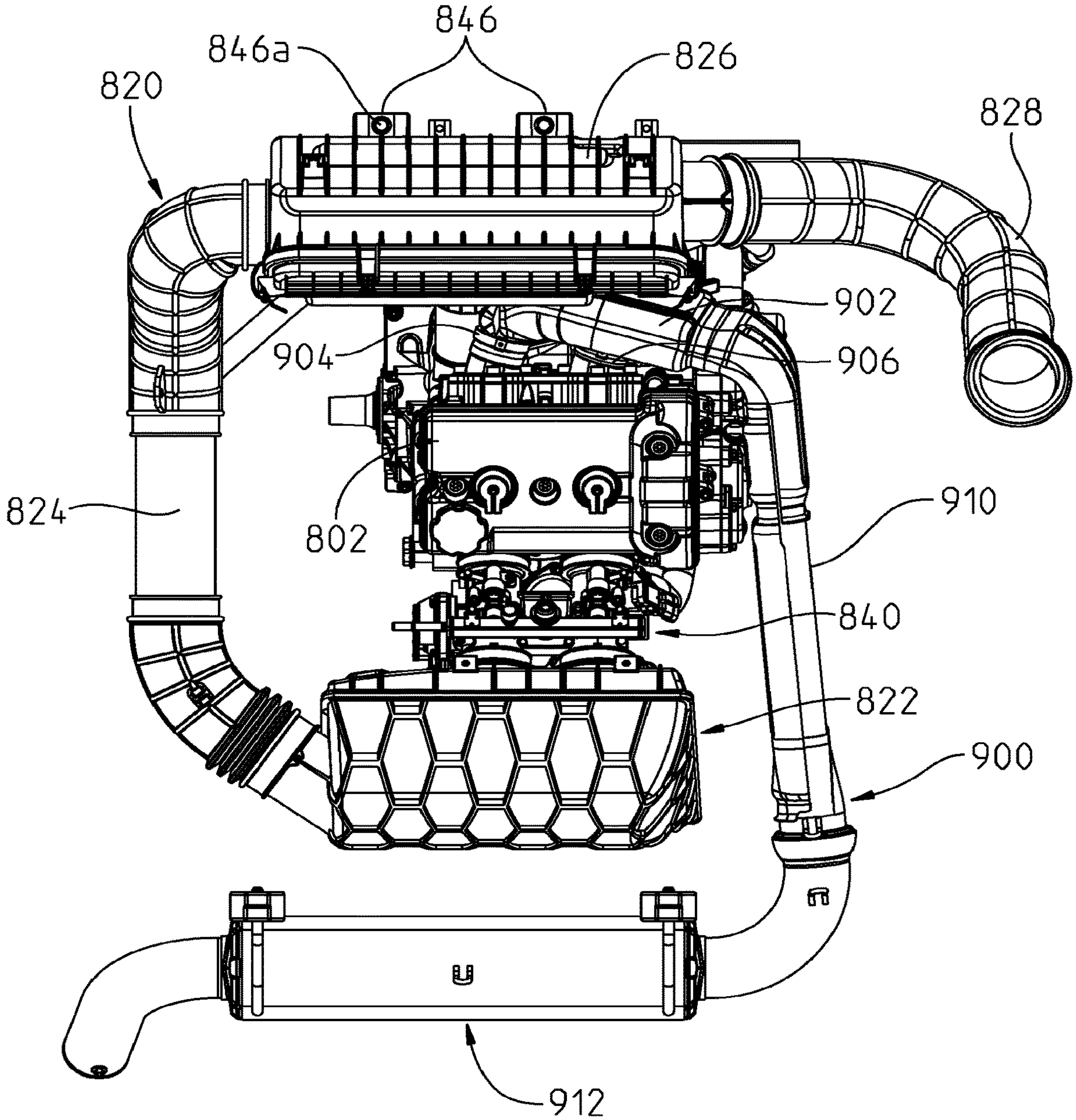
FIG. 36 is a top view of the engine intake and exhaust systems.

With reference now to FIG. 36, air intake system 820 is shown in plan view connected to engine 802. As shown, air manifold 822 is connected to throttle bodies 840, which in turn are directly connected to engine 802. Air filter 826 includes mounting tabs 846 having apertures at 846*a* for coupling with apertures 374*a* (FIG. 18) of cross tube 374 for mounting purposes.

Figure 37:
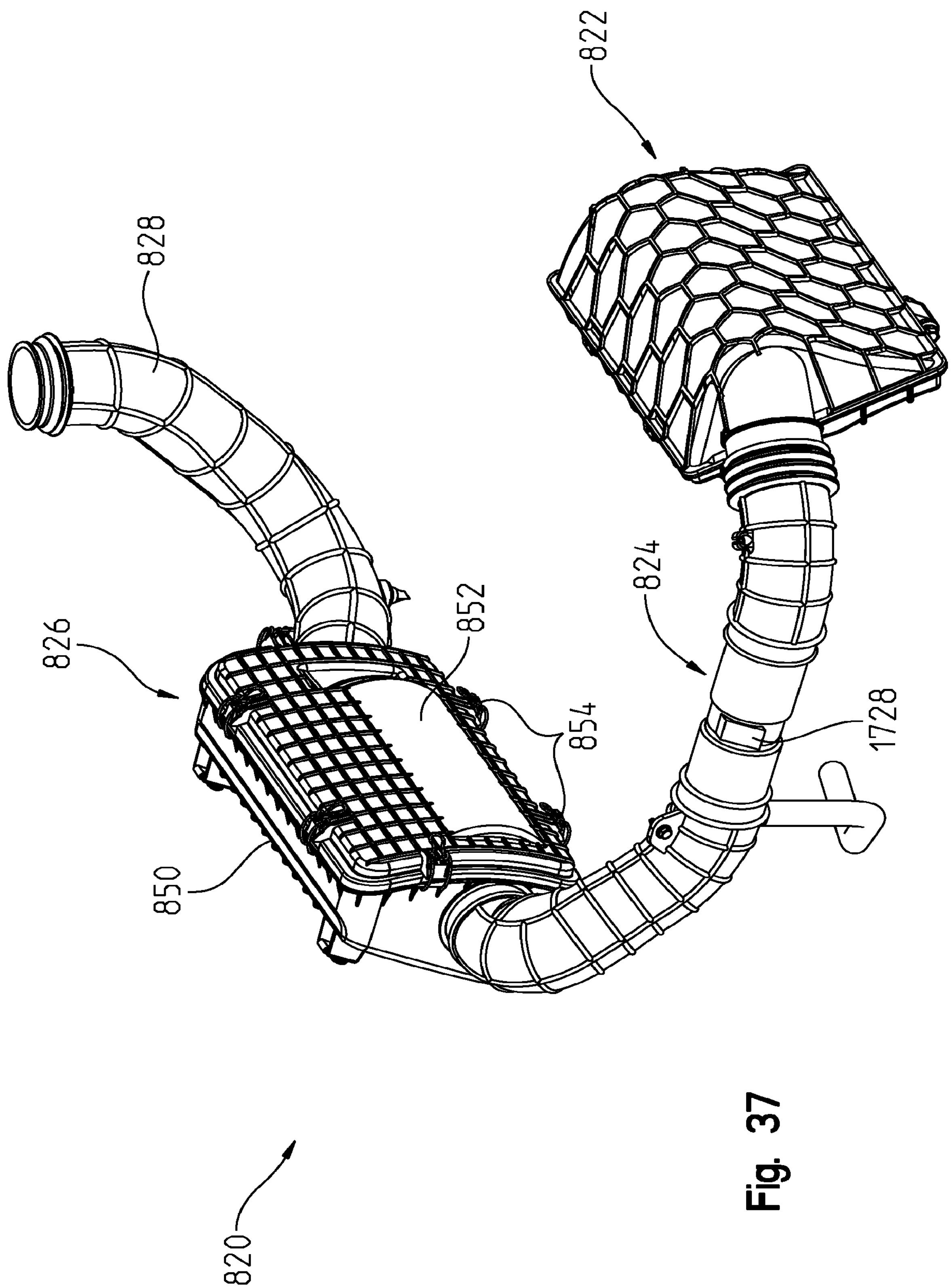
FIG. 37 is a perspective of the air intake system.
Figure 38:
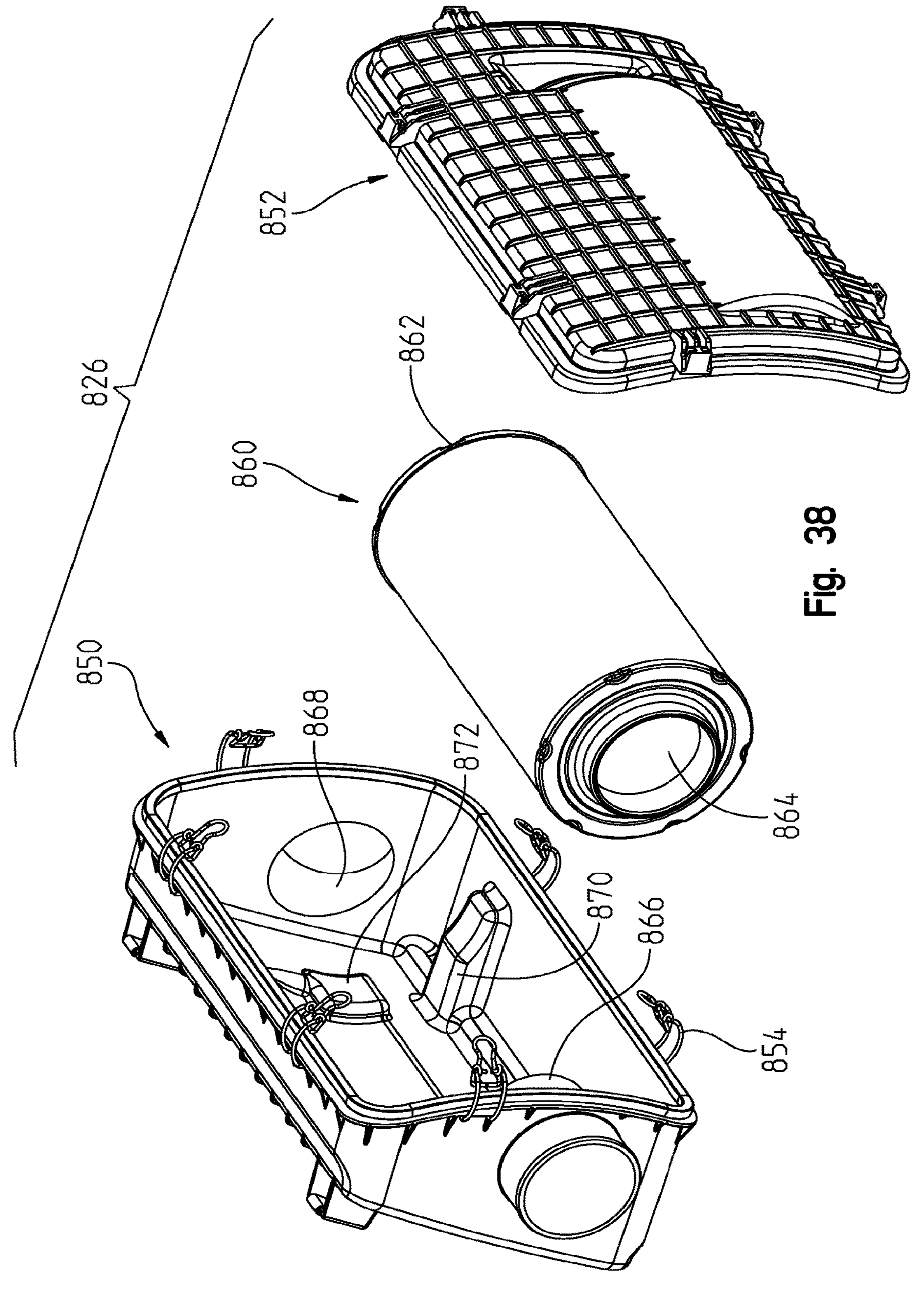
FIG. 38 is an exploded view of the air filter of the air intake system of FIG. 37.
Figure 39:
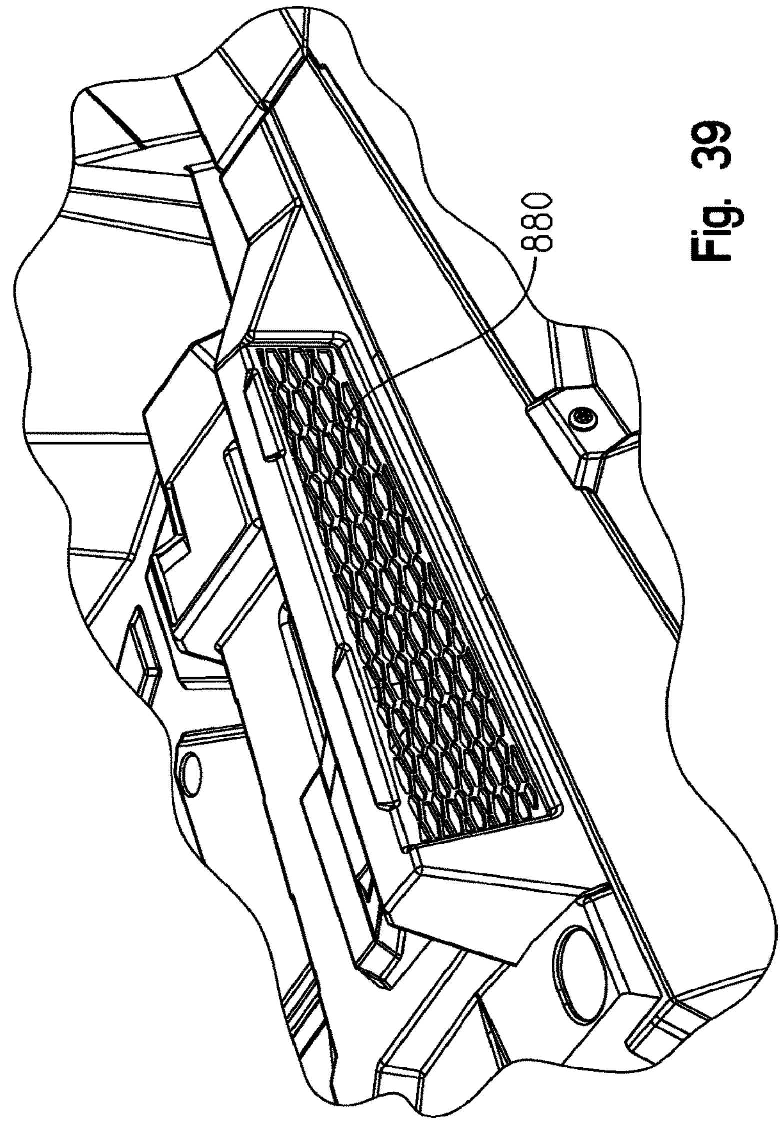
FIG. 39 shows the air inlet for the CVT air intake system of FIG. 35.
Figure 39A:
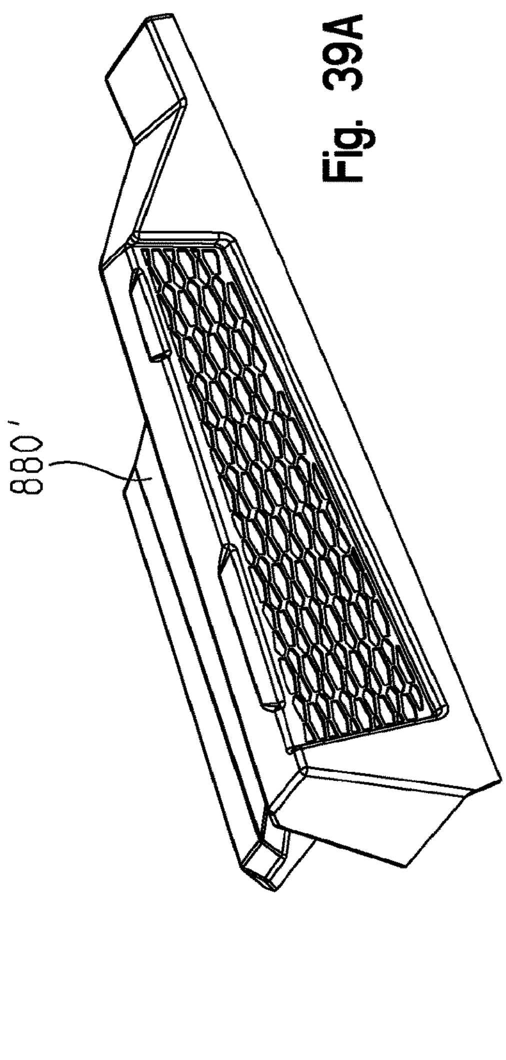
FIG. 39A shows an alternate air inlet for the CVT air intake system of FIG. 35.

As shown in FIGS. 37 and 38, air filter 826 includes a fixed housing 850 and a removable lid 852, the lid being fixed in place by binding clips 854. As shown in FIG. 38, air filter 826 includes an air filter canister 860 having an inlet end 862 and an outlet end 864. Outlet end 864 couples with duct coupling 866 and intake end couples with intake aperture 868. Filter canister is positioned in housing 850 and is aligned by way of stand-offs 870, 872. The air inlet for the CVT cooling air is shown at 880 in FIG. 39, where inlet 880 draws air from an outside of utility box. Alternatively, the air inlet may include a rear air inlet 880' which draws air from inside the utility box. The air inlet for the engine air intake is shown at 882 in FIG. 4.

Figure 40:
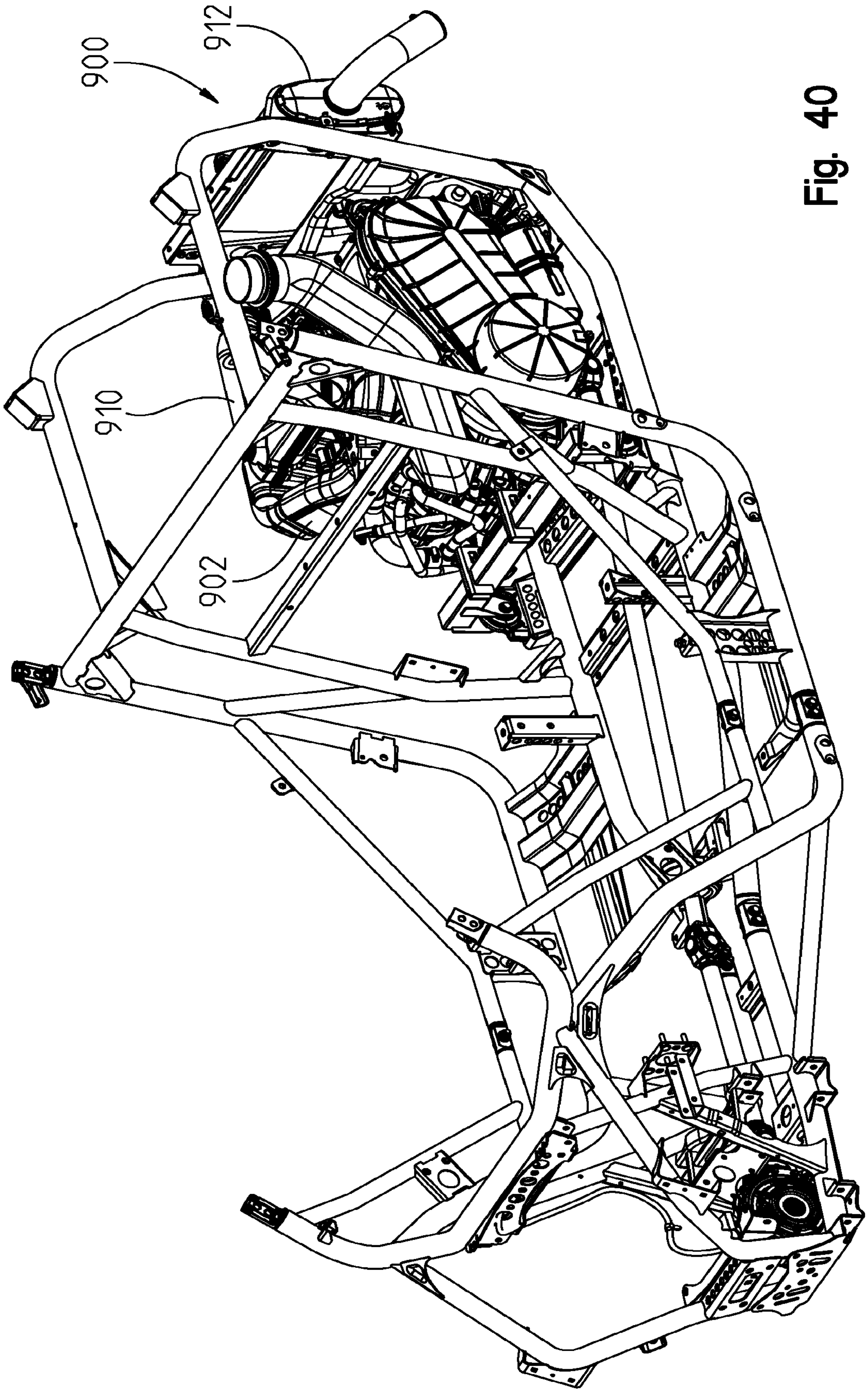
FIG. 40 shows a perspective view similar to that of FIG. 34 and including the exhaust system.
Figure 43:
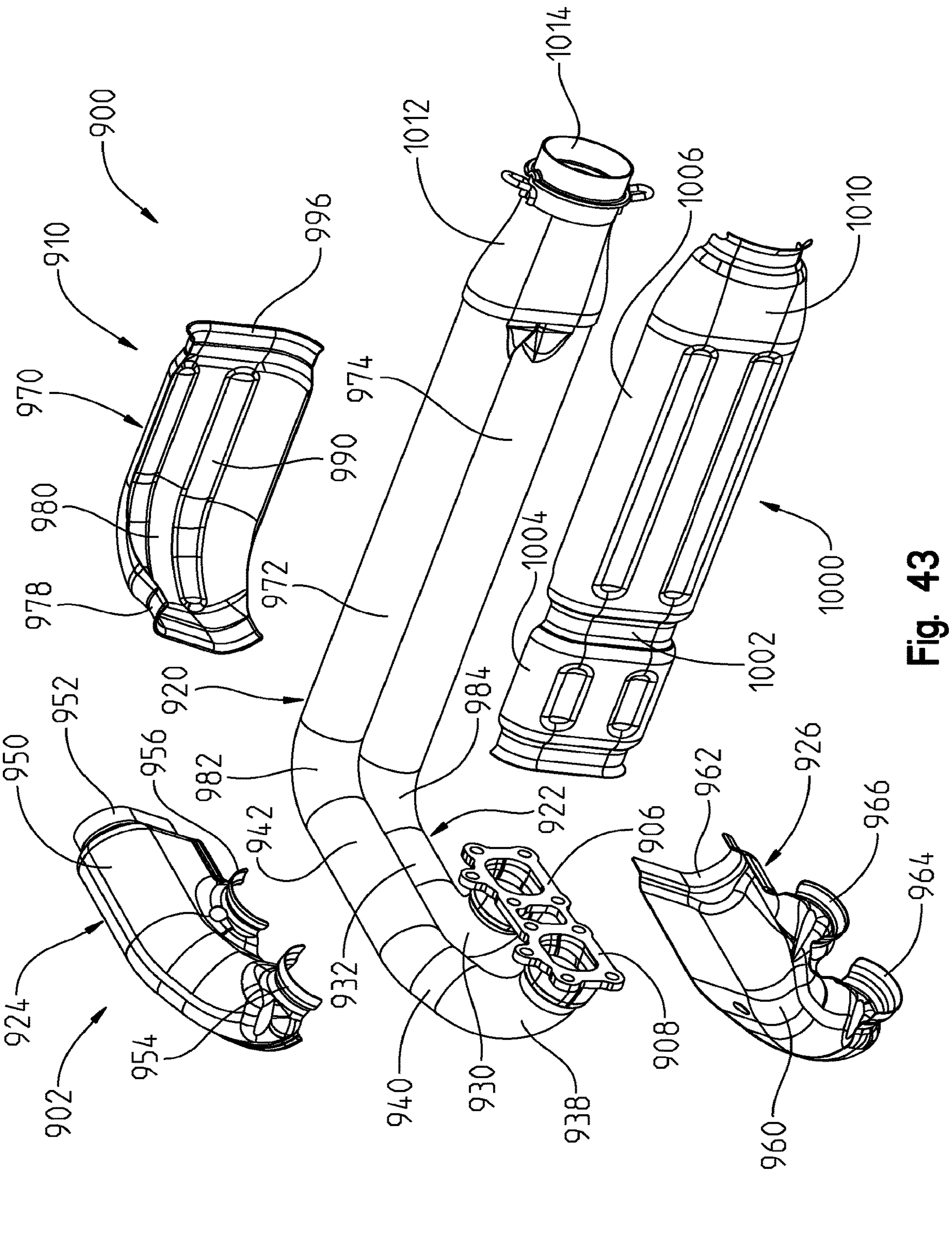
FIG. 43 shows an exploded and perspective view of the engine exhaust system.

The engine exhaust is shown generally at 900 in FIGS. 36 and 40. The engine exhaust 900 includes an exhaust manifold 902 having a casting 904 with flanges 906, 908 coupled to the exhaust ports of the engine 802. Exhaust system 900 further includes a rearwardly extending section 910 and muffler 912. As shown best in FIG. 43, manifold portion 902 includes exhaust tube portions 920 and 922, as well as, upper heat shield 924 and lower heat shield 926. As shown, exhaust tube portion 920 is coupled to exhaust port 908 and exhaust tube portion 922 is coupled to exhaust port 906. Exhaust tube portion 922 includes a first radiused portion 930 angled outwardly from exhaust port 906, which transitions into a straight section 932 extending laterally of port 906. Exhaust tube portion 920 includes a radiused section 938, which extends laterally and upwardly to an inclined section 940, which then transitions into a straight section 942 extending over the top of straight section 932. This allows for a simplified heat shield comprised of upper and lower heat shields 924 and 926 to be positioned there over for shielding the heat from the exhaust tube portions 920, 922.

More particularly, heat shield 924 includes an inverted U-shaped body 950 having a neck down section at 952 and a semi-cylindrical covers at 954 and 956; the semi-cylindrical covers 954, 956 conforming to overlie radiused portions 938, 930, respectively. Lower heat shield portion 926 includes a U-shaped body portion 960 having a necked down section 962 and semi-cylindrical covers at 964, 966. It should be appreciated that upper and lower heat shielding members 924, 926 cooperate together such that semi-cylindrical portions 954, 960 cover radius portion 938 and semi-cylindrical portion 956, 966 cover radius portions 930.

Figure 41:
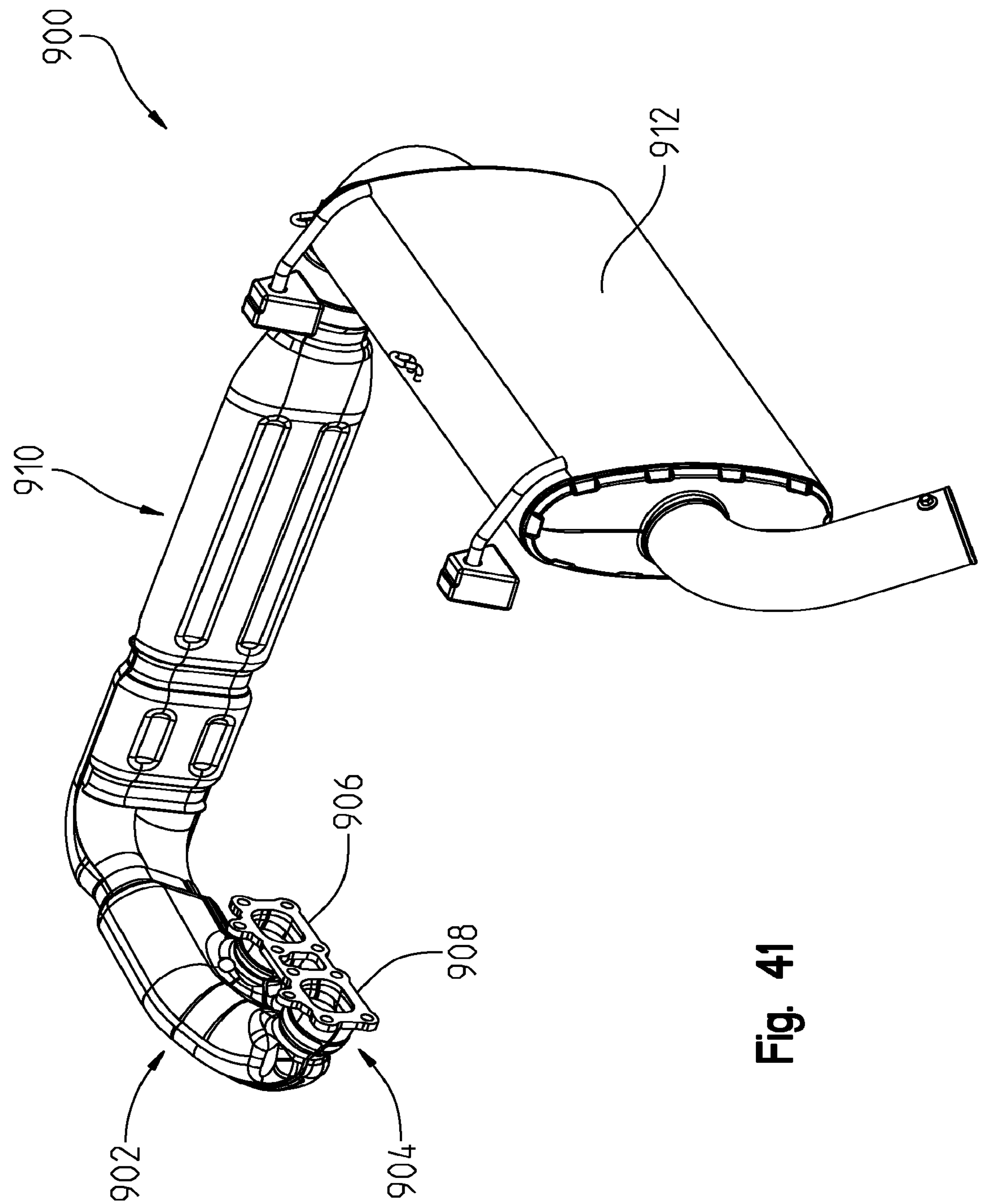
FIG. 41 shows a perspective view of the exhaust system.
Figure 42:
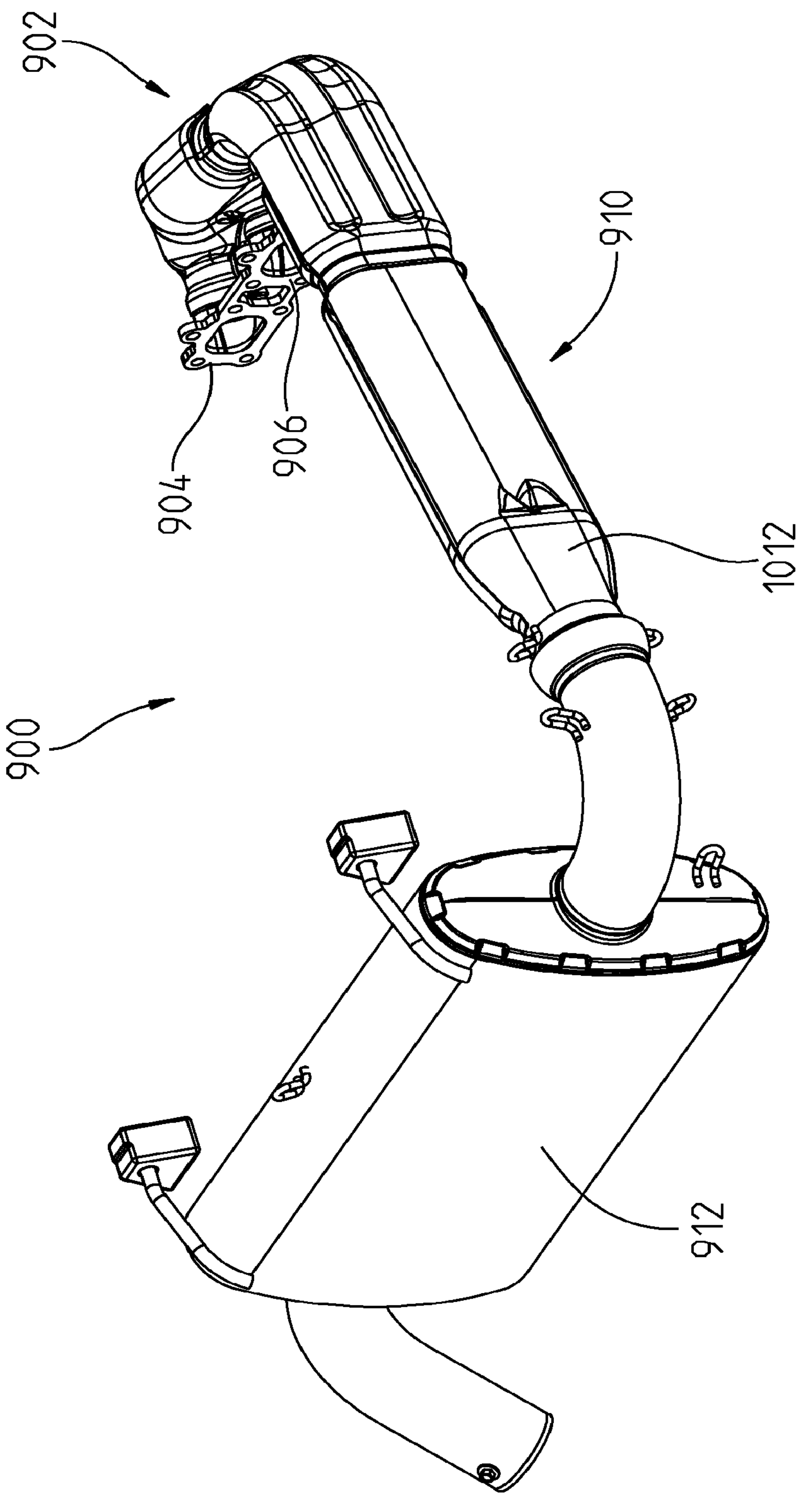
FIG. 42 shows a rear perspective view of the exhaust system.

The two U-shaped body portions 950, 960 cover the exhaust tube portion 920, 922 as shown in FIGS. 41 and 42.

The longitudinally extending section 910 of exhaust system 900 includes outer heat shield 970 and upper and lower exhaust tube portions 972, 974. Outer heat shield 970 includes a necked down portion at 978, which cooperates with necked down section 952 and 962 of heat shield members 924, 926. Heat shield portion 970 also includes a radiused portion at 980, which conforms to radius portions 982 and 984, and a longitudinally extending section 990 of heat shield 970 that overlies longitudinally extending sections 972 and 974. A necked down section 996 closely conforms to the outer profile of tubes 972 and 974. Inner heat shield 1000 includes a necked down section 1002, which cooperates with necked down section 996 and section 1004, which cooperates with section 990. An elongate section at 1006 covers the remaining length of the exhaust tubes 972 and 974. Necked down section 1010 covers the necked down portion 1012, which transitions together exhaust from exhaust tubes 972 and 974 into a single outlet at 1014.

The manifold portion 902 has advantages over previous manifolds. First, the casting provides a tight turn allowing the distance between the casting 904 and manifold generally to be as far as possible from the operator area. Also, the tube sections 932 and 942 are positioned in a generally overlying position, which moves tube portion 942 further away from the passenger area. As mentioned above, this also allows for a simplified heat shield comprised of upper and lower heat shields 924 and 926 to be positioned there over for shielding the heat from the exhaust tube portions 920, 922.

Figure 44:
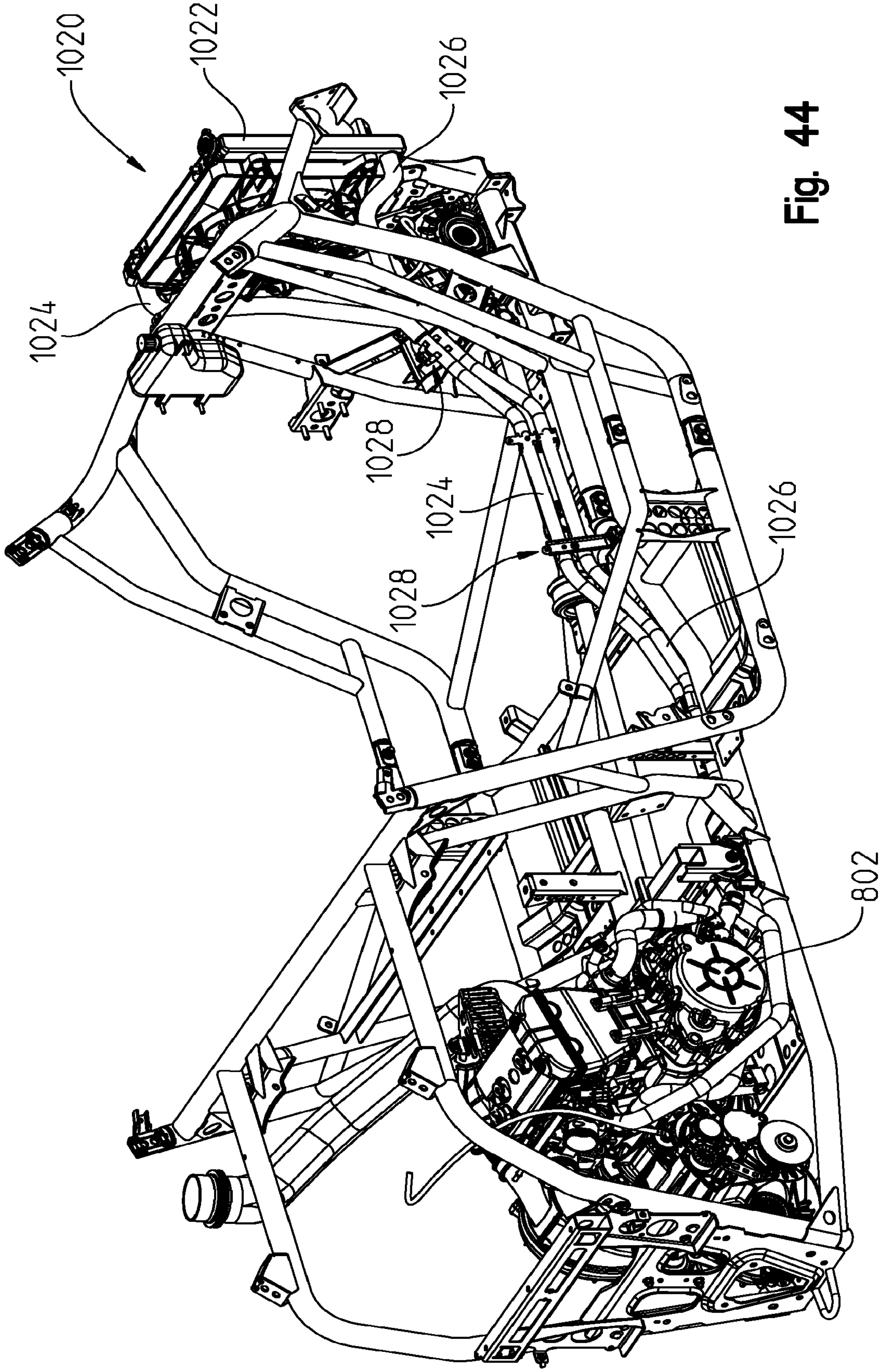
FIG. 44 shows a rear perspective view of the frame and power train and including the engine cooling system.
Figure 44A:
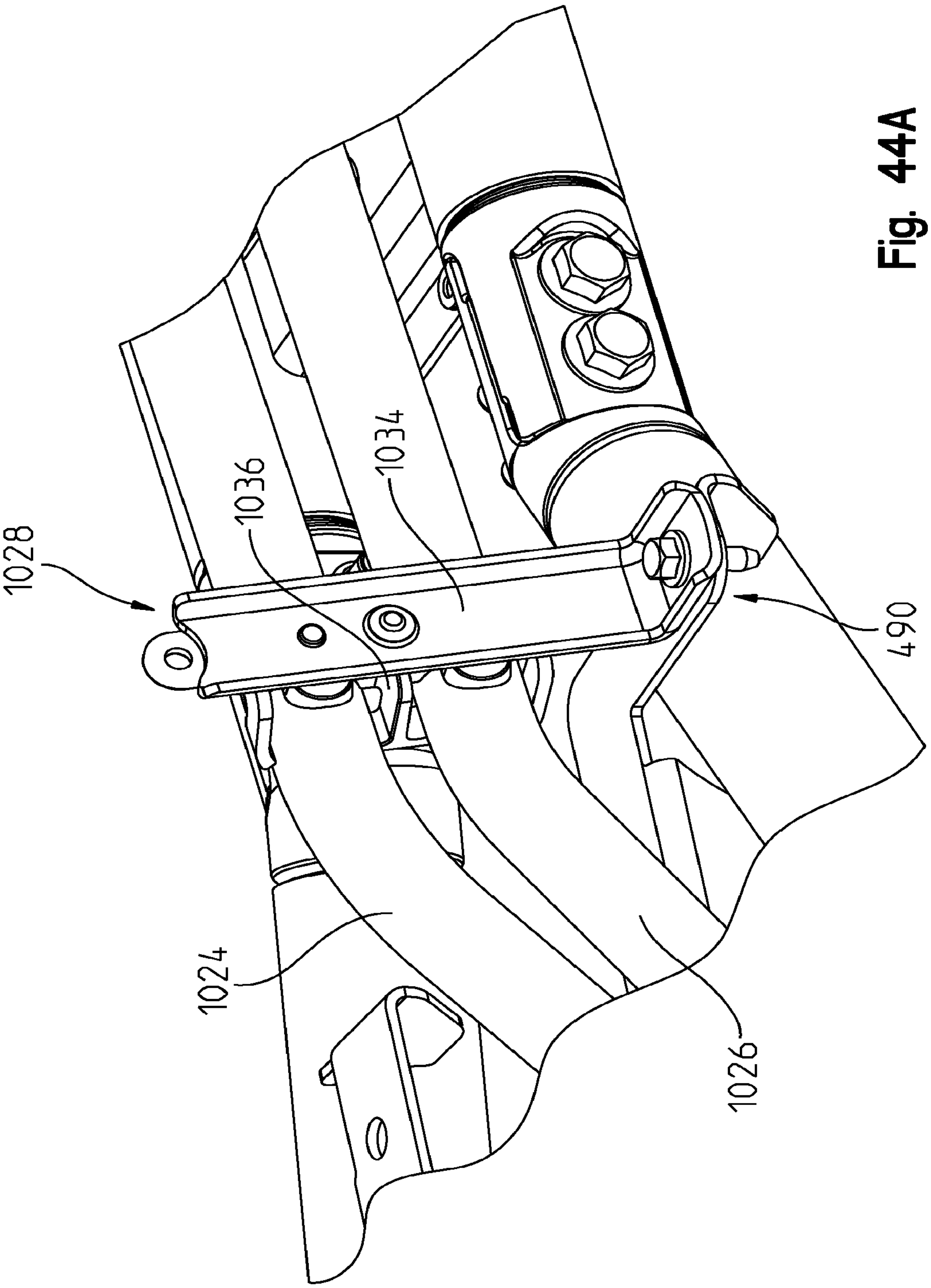
FIG. 44A is an enlarged view of a retaining clip for the water cooling hoses.
Figure 44B:
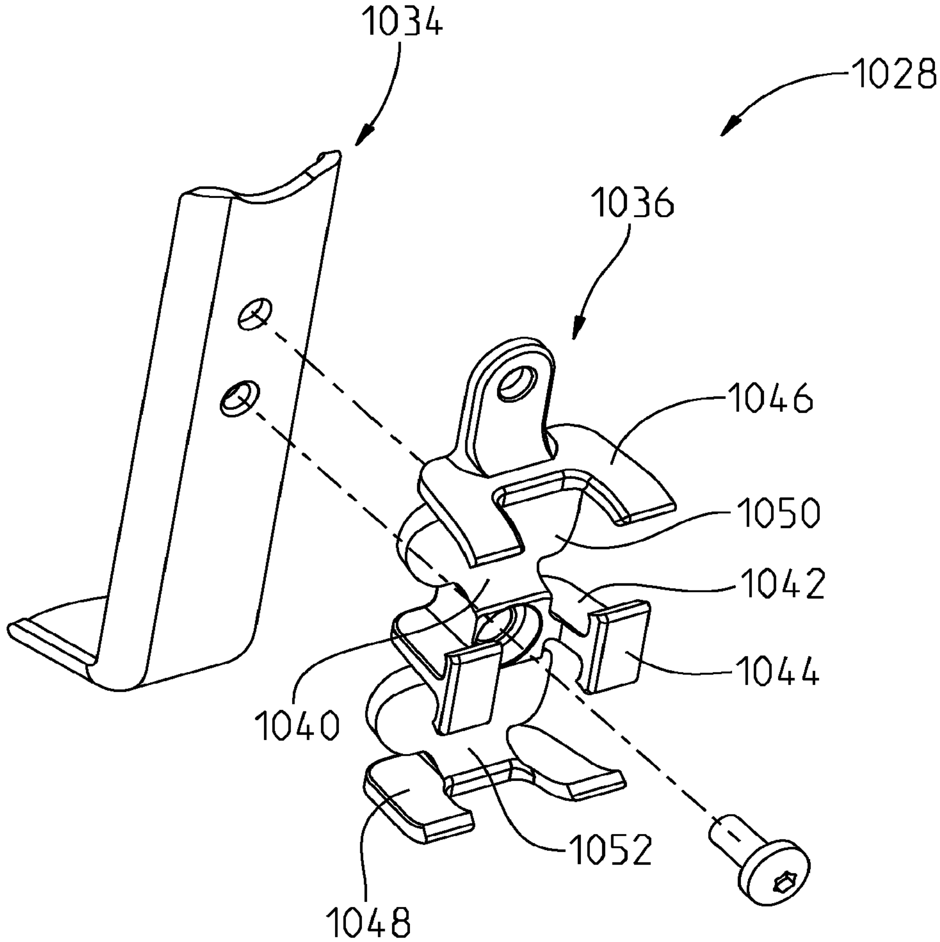
FIG. 44B shows a perspective view of the retaining clip of FIG. 44A in an exploded manner.

With reference now to FIGS. 44-48, the engine cooling system will be described in greater detail. With reference first to FIG. 44, the engine cooling system is shown generally at 1020, which includes radiator 1022 having a return line 1024 and a supply line 1026. Thus a close loop circuit is provided for the engine cooling water from the back of the vehicle at engine 802 to the front of the vehicle at radiator 1022 and returned. Various brackets such as 1028 may be utilized to retain the lines 1024, 1026 in a managed relationship relative to the frame. Bracket 1028 is shown in greater detail in FIG. 44A and has been coupled to bracket 490 and including bracket 1034 and retainer 1036. Clip 1036 is shown in greater detail in FIG. 44B as including a center wall section 1040 having central arms 1042 defining a T-shaped clip 1044. Top arms 1046 and bottom arms 1048 define receiving areas 1050 and 1052 for receiving supply lines 1024, 1026.

Figure 45:
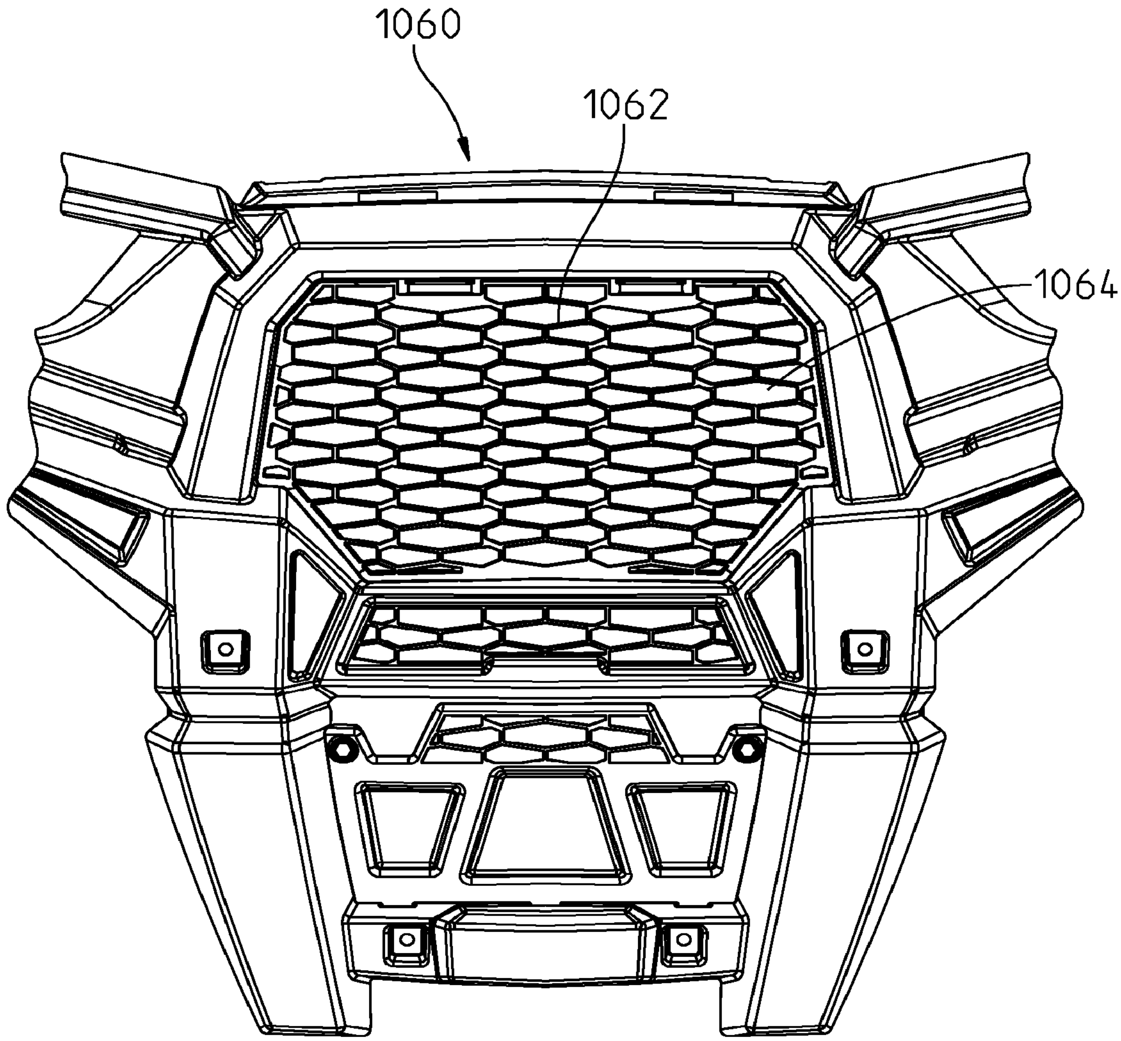
FIG. 45 shows a front view of the vehicle grill.
Figure 46:
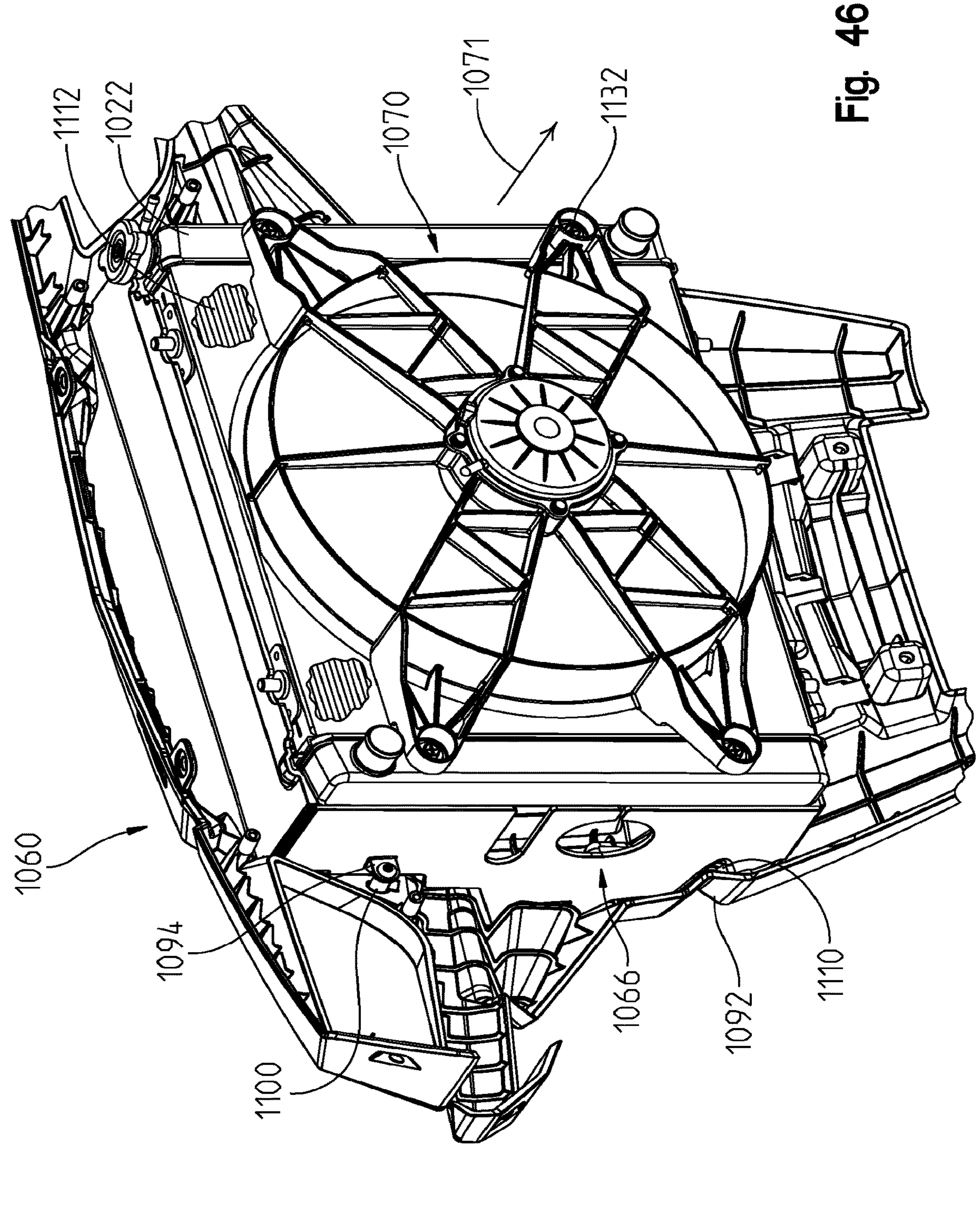
FIG. 46 shows a rear perspective view of the grill of FIG. 45 and including the radiator and shroud.

With reference now to FIGS. 45 and 46, a front grill 1060 is shown having a web pattern defined by a plurality ribs 1062 defining openings 1064 there through for the passage of air. As shown in FIG. 46, a shroud 1066 is shown and is coupled to grill 1060 and mounts radiator 1022 and fan 1070 thereto. It should be appreciated that either air traveling through shroud 1060 by virtue of the vehicle movement and/or by the operation fan causes air to flow across radiator 1022 in the direction of arrow 1071.

Figure 47:
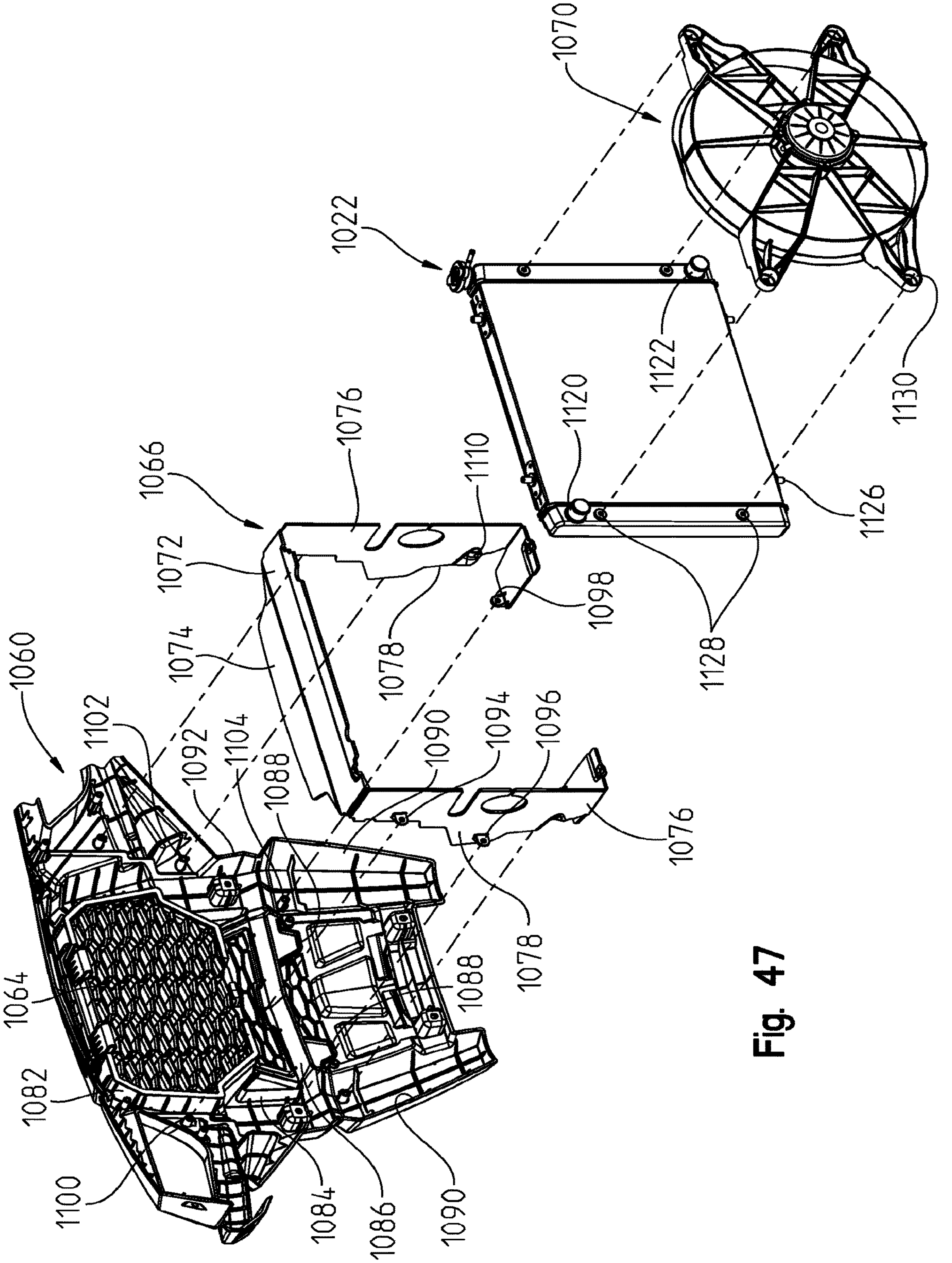
FIG. 47 shows an exploded view of the assembly shown in FIG. 46.
Figure 48:
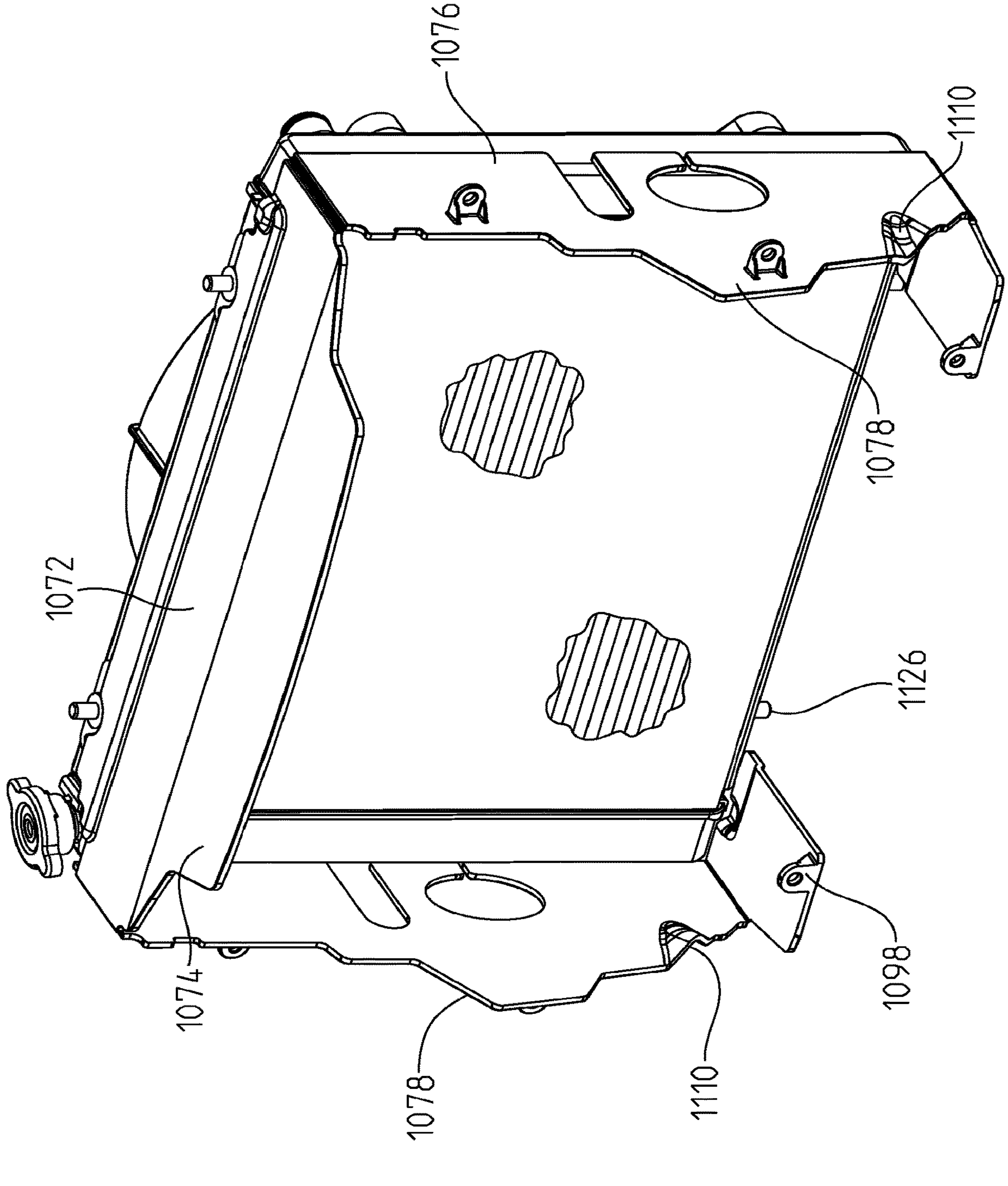
FIG. 48 shows a front view of the radiator and shroud.

As shown best in FIG. 47, shroud 1066 includes a top wall 1072 having a contoured extension 1074 and sidewalls 1076 having contoured extensions 1078. Meanwhile grill 1060 includes a wall 1082 surrounding openings 1064. Additional wall portions are provided at 1084, 1086, and 1088. Additionally, grill 1060 is defined with wall portions 1090 having constrictions at 1092. Shroud 1066 includes mounting tabs 1094, 1096, and 1098, which mount to respective stand-offs 1100, 1102, and 1104. As shown in FIGS. 46 and 48, shroud 1066 conforms closely with the profile of grill 1060 including a crimped portion 1110 conforming to constriction 1092. Thus, in the longitudinal direction, a combination of walls 1082, 1084, 1086, and 1088 overlap with walls 1072 and 1076. This allows all of air traveling through to grill 1060 to enter through and into the shroud 1066. As also shown in FIG. 46, radiator 1022 closely conforms to shroud 1066 preventing leaking of air around the periphery of the shroud/radiator interface. As also shown in FIG. 46, radiator 1022 has fins 1112, and when mounted thereto, fan 1070 does not completely all of the fins 1112.

Radiator 1022 further includes a return coupling at 1120 and a supply coupling at 1122 which cooperate with cooling lines 1024, 1026, respectively. Radiator 1022 further includes mounting lugs 1126, which cooperate with mounting apertures 230*d* of bracket 230 (FIG. 16A). Finally, radiator 1022 includes mounting apertures at 1128, which cooperate with mounting apertures 1130 on fan 1070. As shown in FIG. 46, fasteners 1132 retain fan 1070 directly to radiator 1022.

Figure 49:
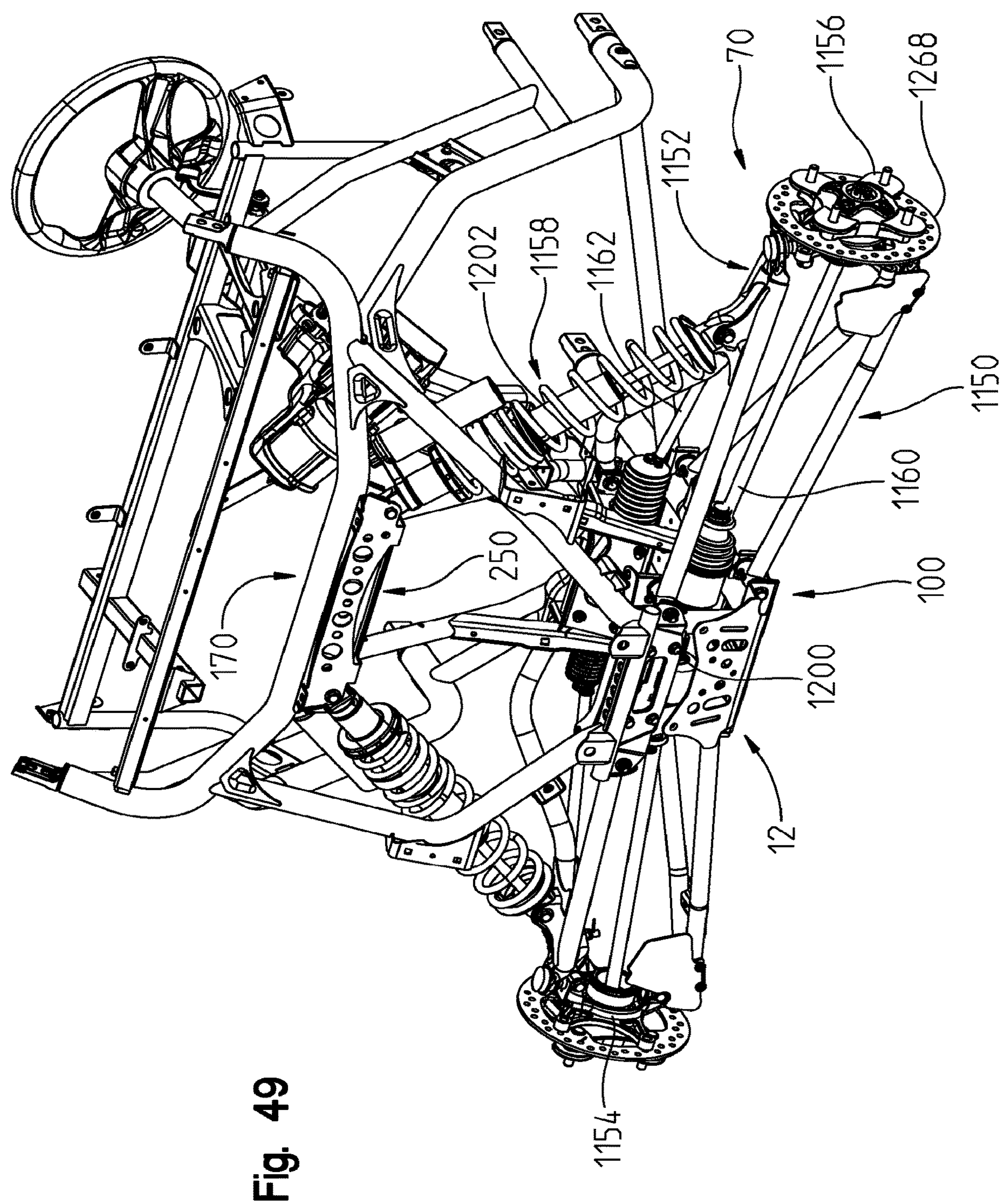
FIG. 49 is a front perspective view of the front suspension.
Figure 49A:
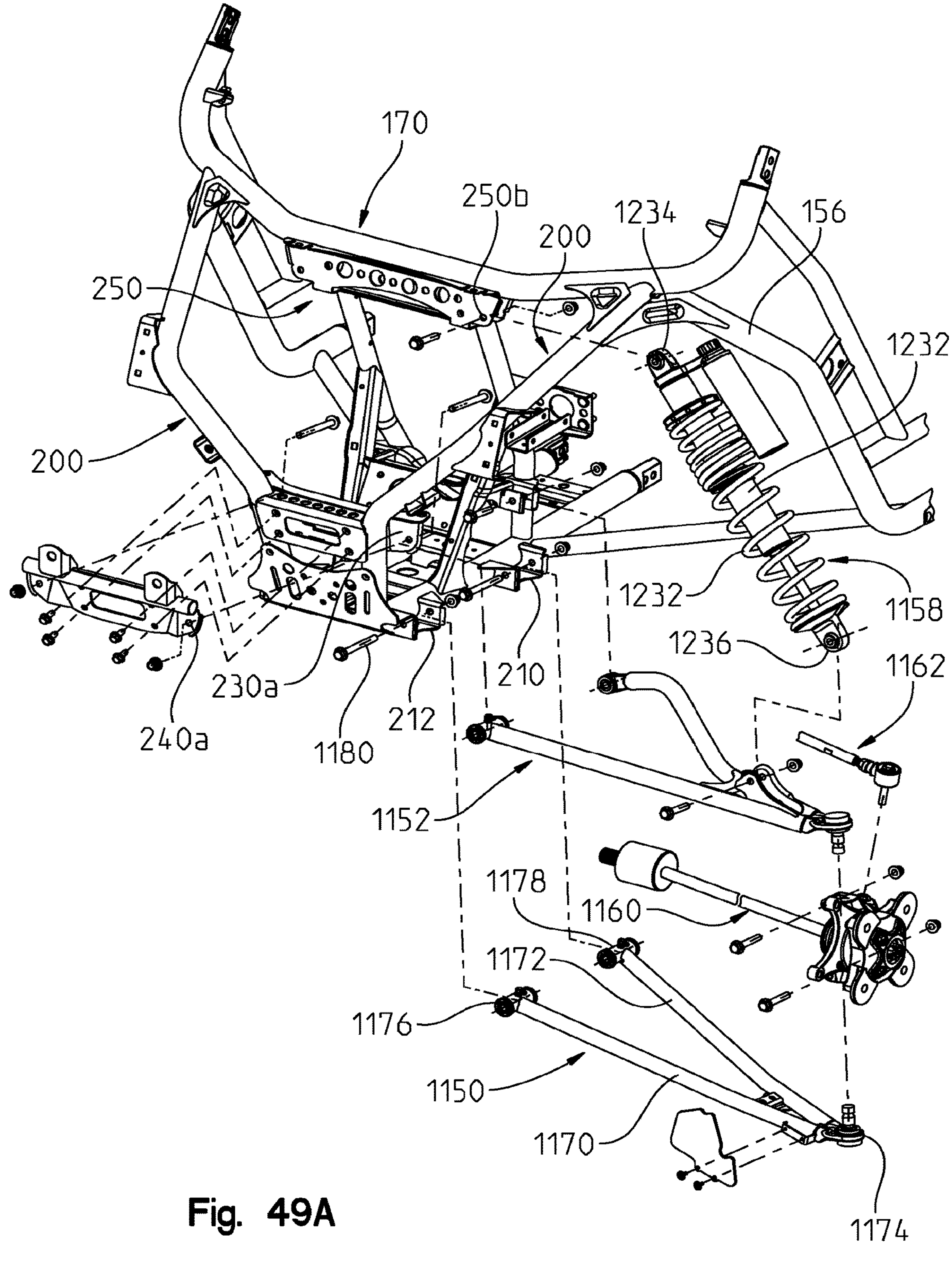
FIG. 49A is a view similar to that of FIG. 49 showing the components of the front suspension exploded.

With reference now to FIGS. 49-54, front suspension 70 will be described in greater detail. With reference first to FIG. 49, front suspension generally comprises lower alignment arm 1150, upper alignment arm 1152, spindle 1154, wheel hub 1156, and shock absorber 1158. Front stub shafts 1160 provide driving power to wheel hubs 1156, through a constant velocity joint (or similar device), and a steering shaft 1162 is provided and coupled to spindle 1154 for steering purposes. With reference now to FIG. 49A, lower alignment arms 1150 will be described in greater detail.

Figure 50:
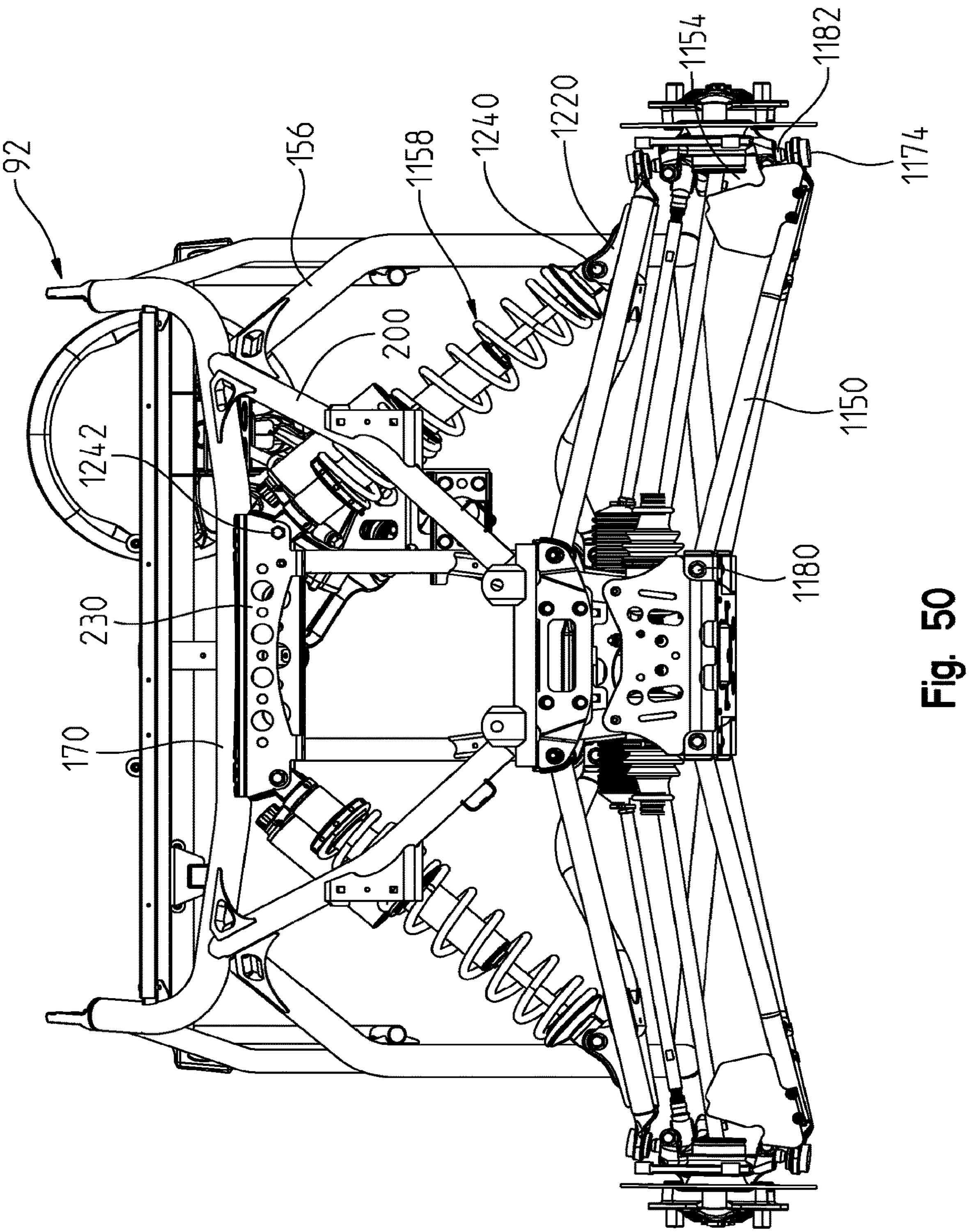
FIG. 50 is a front view of the vehicle frame and front suspension.
Figure 52:
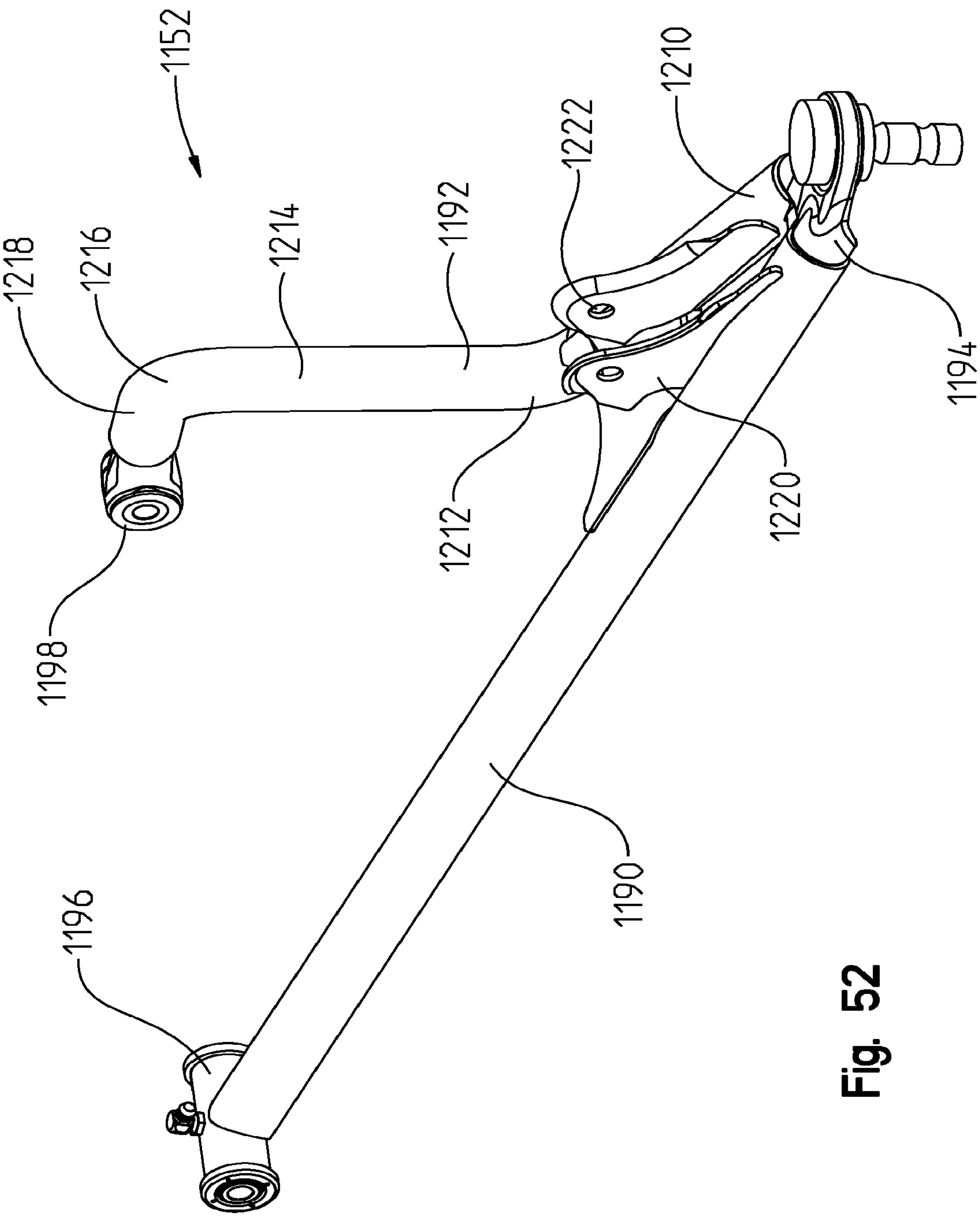
FIG. 52 shows a front perspective view of the upper alignment arm of the front suspension.
Figure 53:
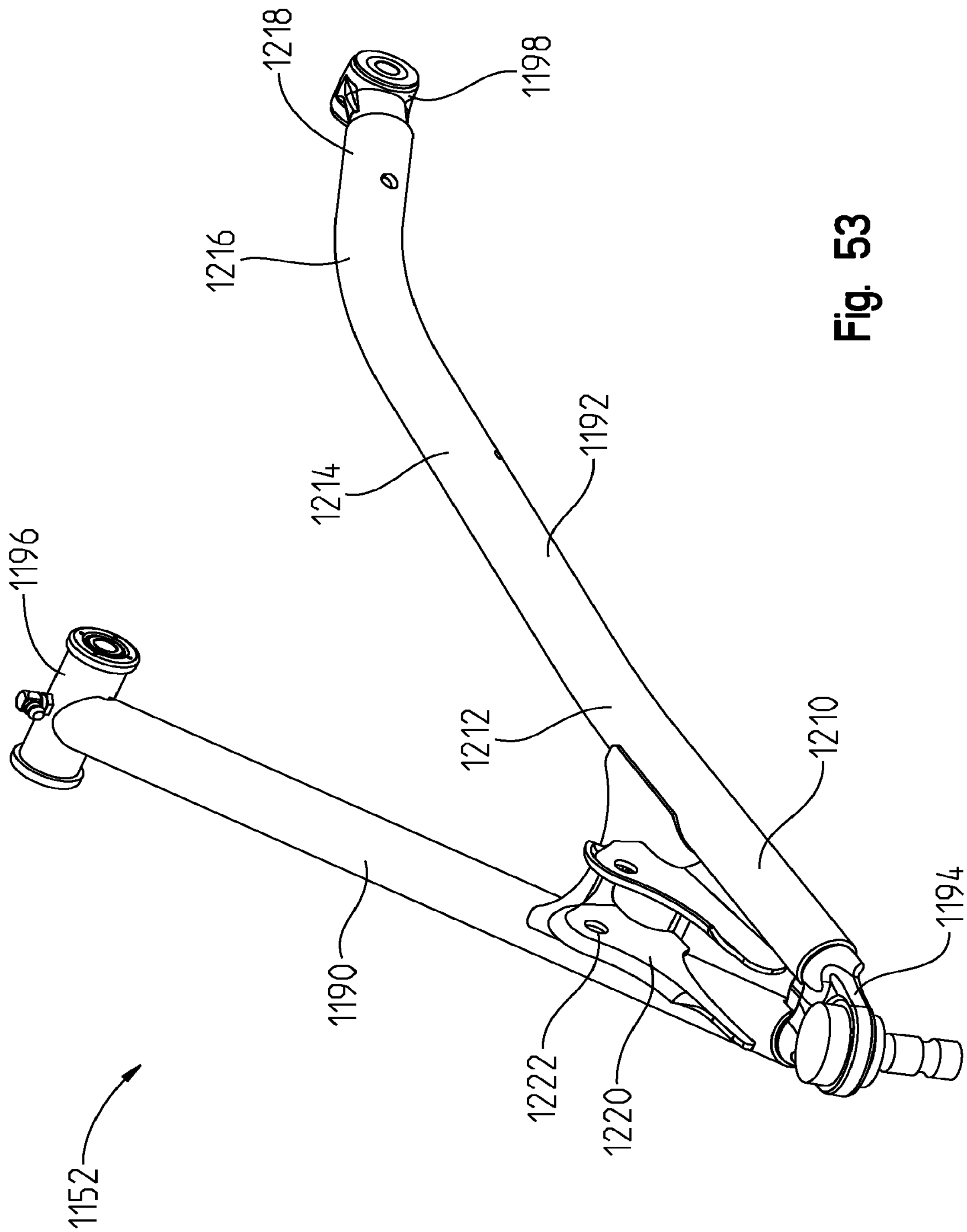
FIG. 53 shows a rear perspective view of the upper alignment arm of the front suspension.

Lower alignment arm 1150 includes arm portions 1170 and 1172 joining at an outer end to ball joint 1174. At opposite ends of each of the arms 1170, 1172 are couplings 1176 and 1178 respectively. It should be appreciated that couplings 1176 and 1178 couple with channels 212, 210, respectively, by way of fasteners 1180 (FIGS. 49A, 50). It should also be appreciated that ball joint 1174 of lower suspension arm 1150 couples to a lower coupling 1182 (FIG. 50) of spindle 1154. With reference now to FIGS. 52 and 53, upper alignment arm 1152 will be described in greater detail.

As shown, upper alignment arm 1152 includes two arms 1190, 1192. Outer ends of arms 1190, 1192 converge to couple with ball joint 1194. Opposite ends of arms 1190, 1192 include couplings 1196, 1198 and couples to frame 12 by way of fasteners 1200, 1202 (FIG. 49).

As shown best in FIGS. 52 and 53, upper alignment arm 1152 provides a different configuration for each of the arms 1190 and 1192. As shown, arm 1190 is substantially parallel along an axial length of the arm 1190, while arm 1192 is discontinuous along the length of its arm. More particularly, arm 1192 includes a first arm portion 1210, which projects away from ball joint member 1194 in a substantially parallel plane as arm 1190. Arm 1192 has a first radiused bend at 1212, which projects an arm portion 1214 upwardly at an angle relative to arm portion 1210. Arm 1192 further includes a second radiused portion at 1216 projecting an arm portion 1218 in a relatively horizontal position. Bracket 1220 is provided and coupled to an outer end of arms 1190, 1192 and includes mounting apertures at 1222.

The geometry of upper alignment arm 1152 and, in particular, the geometry of arm 1192 is provided for at least two reasons. Firstly, by providing the radiused portion 1212, 1216, predefined buckling points are provided in the suspension, such that if vehicle encounters a large jolt, the alignment arm buckles rather than damaging the frame 12. Secondly, and with reference to FIG. 51, alignment arm 1152 is provided over the top of steering arm 1162, which provides clearance for arm 1162. Absent the radiused portion 1216, the alignment arm 1152 and steering arm 1162 could not co-exist in the same space.

With reference again to FIG. 49A, shock absorber 1158 includes a gas shock absorber portion 1230 and an over spring at 1232. Shock absorber 1158 further includes a mounting coupler 1234 and a lower mounting coupler 1236. With reference to FIG. 50, shock absorber 1158 is shown mounted at its lower end to bracket 1220 by way of fasteners 1240 and at its upper end to bracket 230 by way of fasteners 1242. Thus, the shock mounting to bracket 230 is substantially higher than previously mounted providing the ability to utilize a much longer shock absorber 1158. In the disclosed embodiment, the shock absorbers are provided by Walker Evans part number 7044018 and 7043979, right and left shocks respectively. In addition, the shock mounting at bracket 230 is rigidified through the entire frame 12 by way of connection to the transverse tube 170 and by way of the triangulation of tubes 156, 170, and 200. The stresses of the shock absorber 1158 are also taken up through cab frame 84 (FIG. 9) by way of the connection tube couplings 92.

Figure 49B:
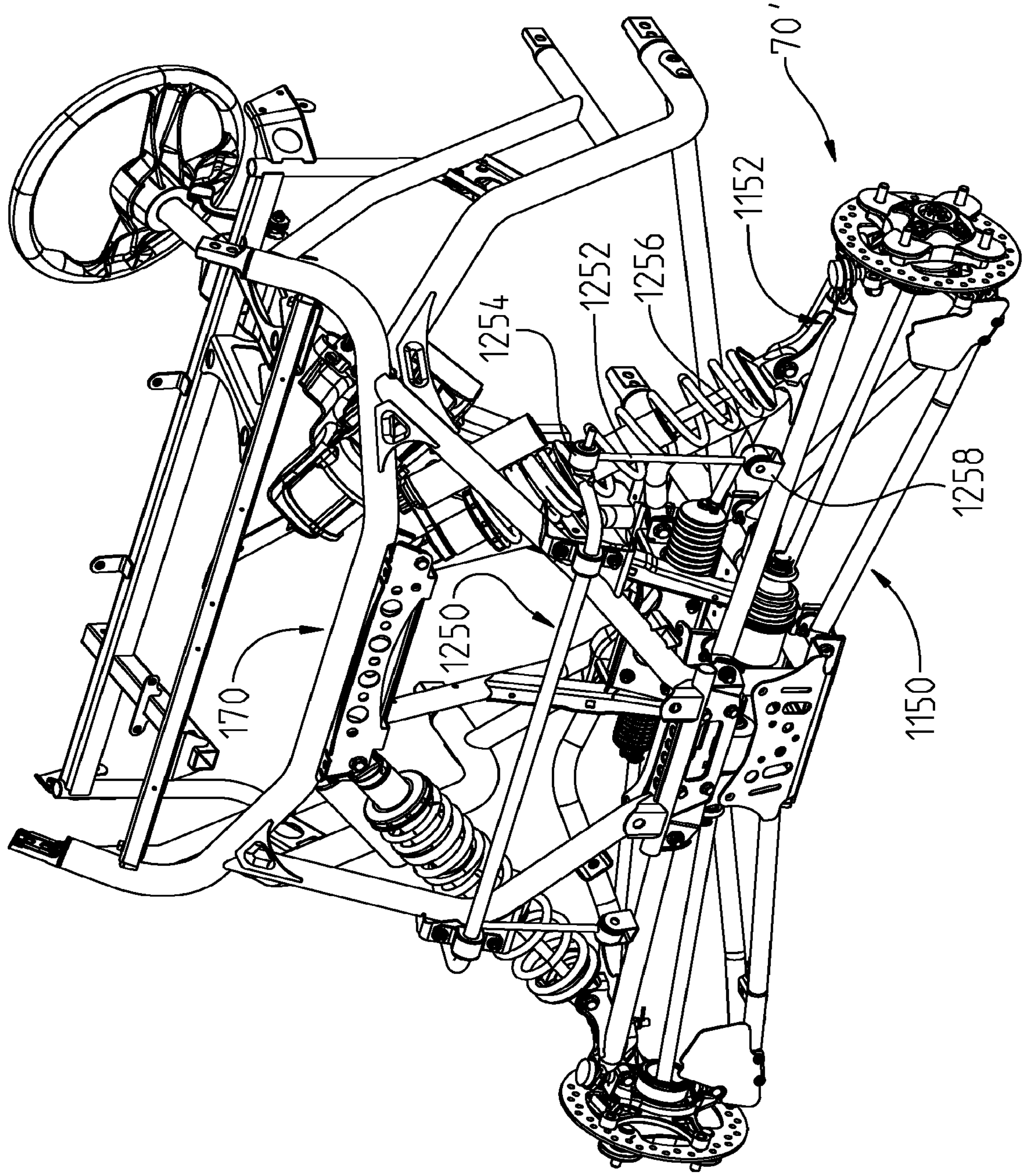
FIG. 49B is a front left perspective view of a front suspension similar to that described in FIG. 49, having a torsion bar.

With reference now to FIG. 49B, a version of the suspension is shown at 70', which includes a torsion (or sway) bar 1250. Torsion bar 1250 is coupled to the upper alignment arm 1152 by way of link arm 1252; link arm 1252 having an upper coupling 1254 coupled to torsion bar 1250, and a lower coupling 1256 attached to bracket 1258 on upper alignment arm 1152.

Figure 51:
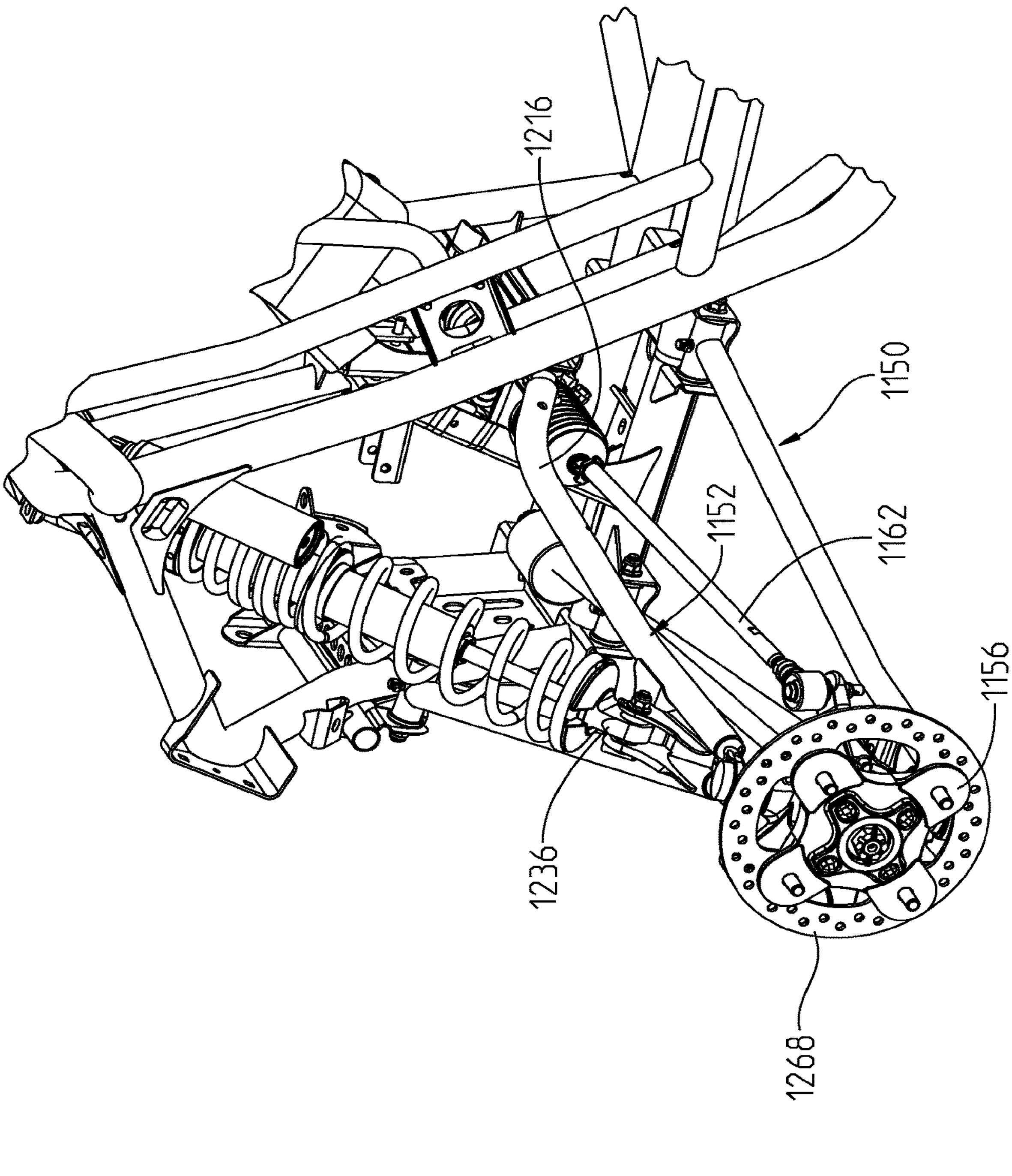
FIG. 51 is a rear left perspective view of the front left suspension.
Figure 54:
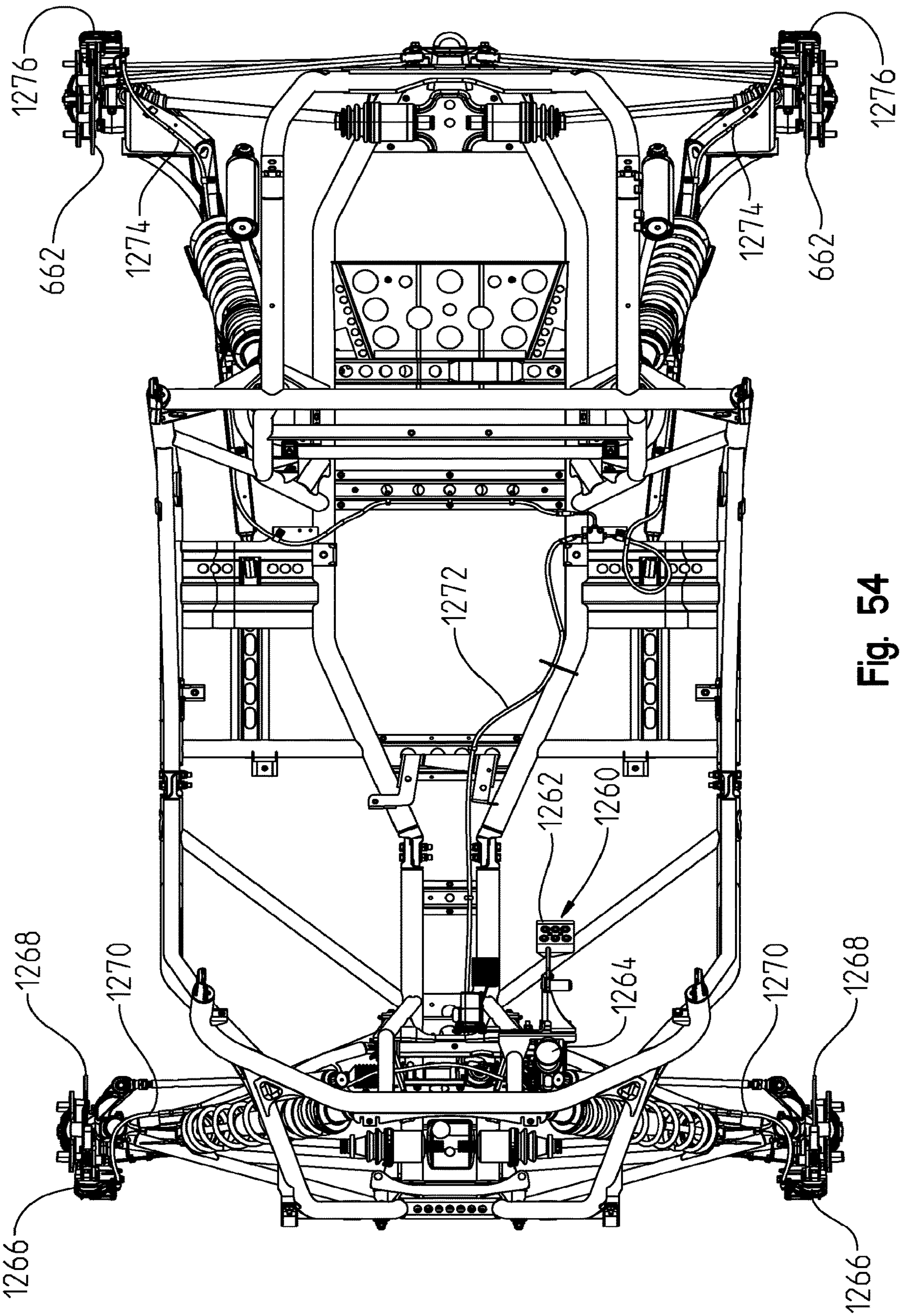
FIG. 54 shows a top view of the braking system.

With reference now to FIGS. 51 and 54, braking system is shown at 1260. Braking system 1260 includes a brake pedal 1262 in the operator's area which actuates a master cylinder 1264, which in turn operates brake calipers 1266. Brake calipers provide frictional force against brake disk 1268 through hydraulic lines 1270. Rear brake line 1272 feeds rear brake lines 1274, which in turn operate rear brake calipers 1276 to control rear disks 662.

Figure 55:
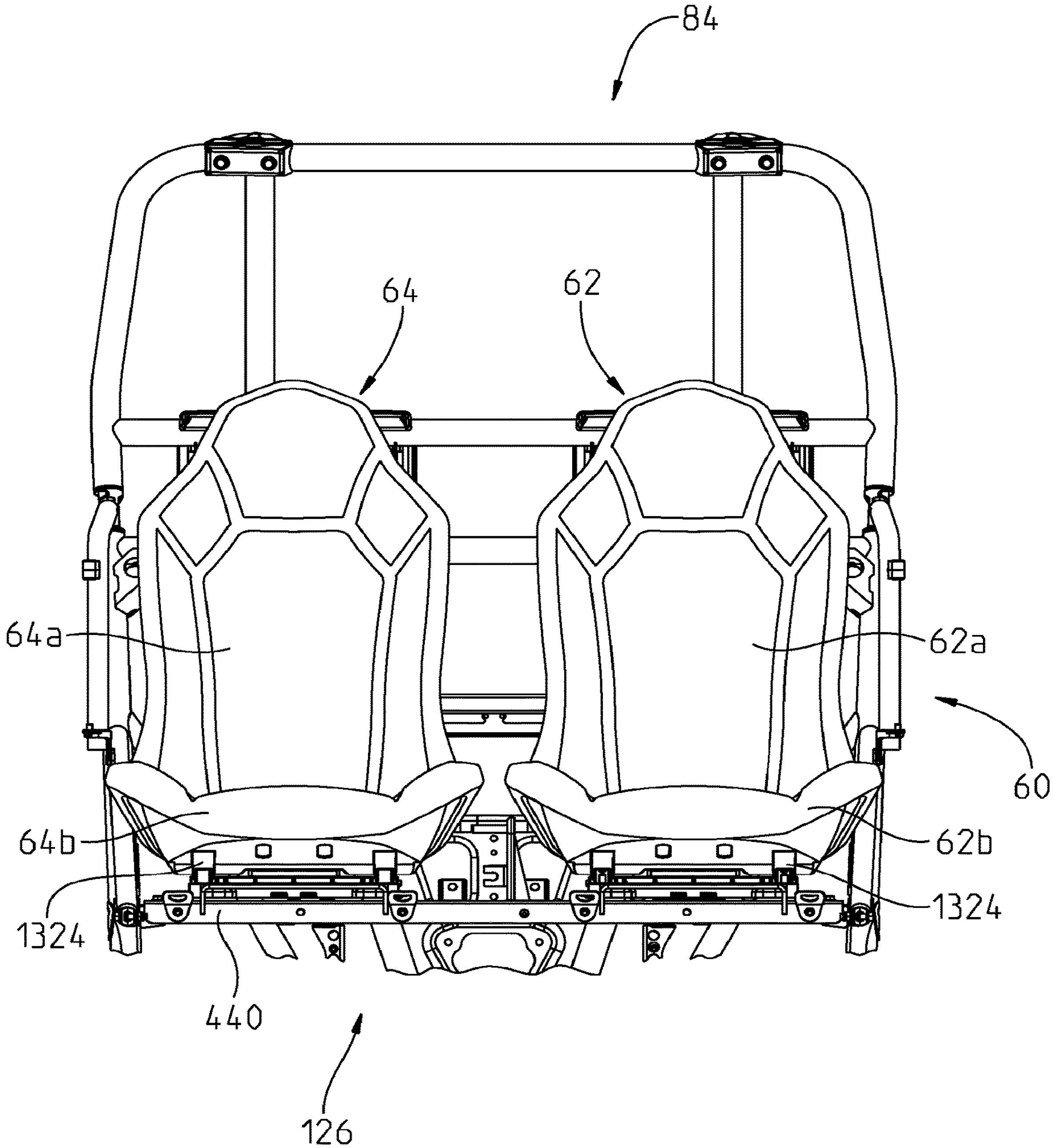
FIG. 55 is front elevational view of a seating area having a driver seat and a passenger seat of the vehicle of the present invention.
Figure 56:
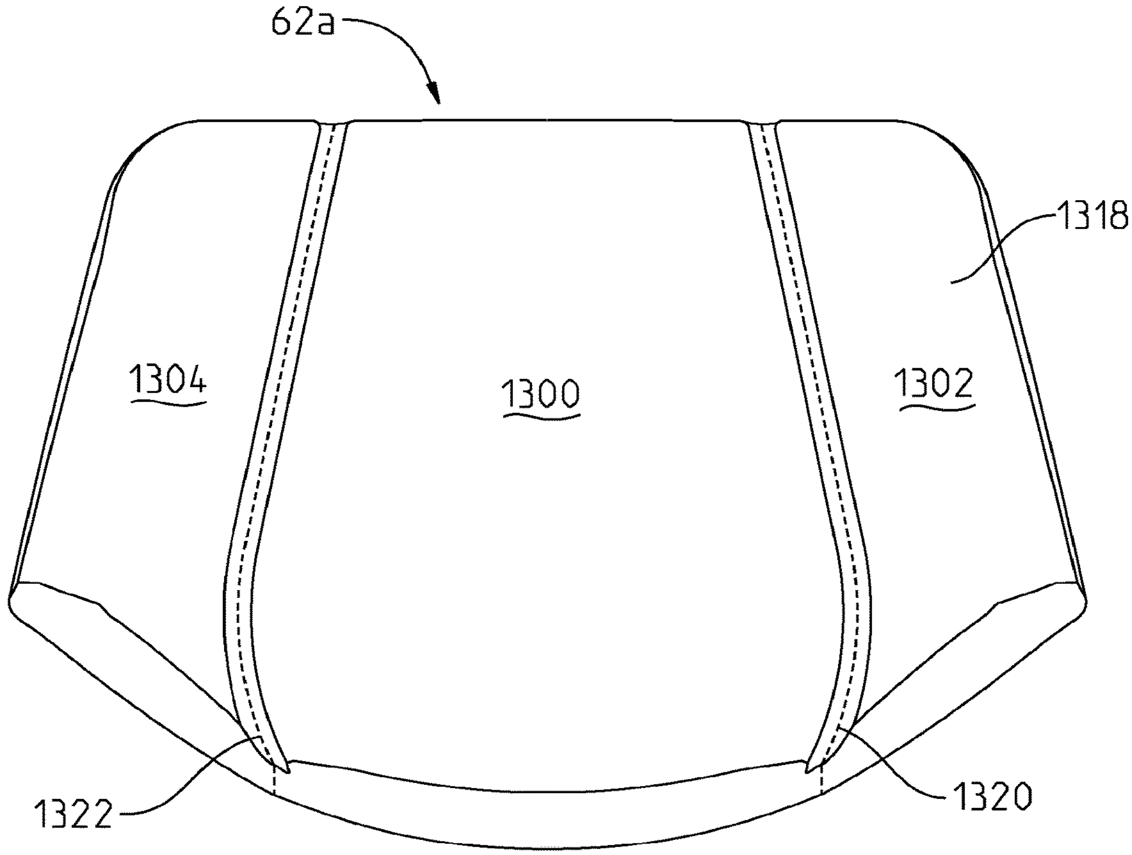
FIG. 56 is a top elevational view of a seat bottom of the driver seat of FIG. 55.
Figure 57:
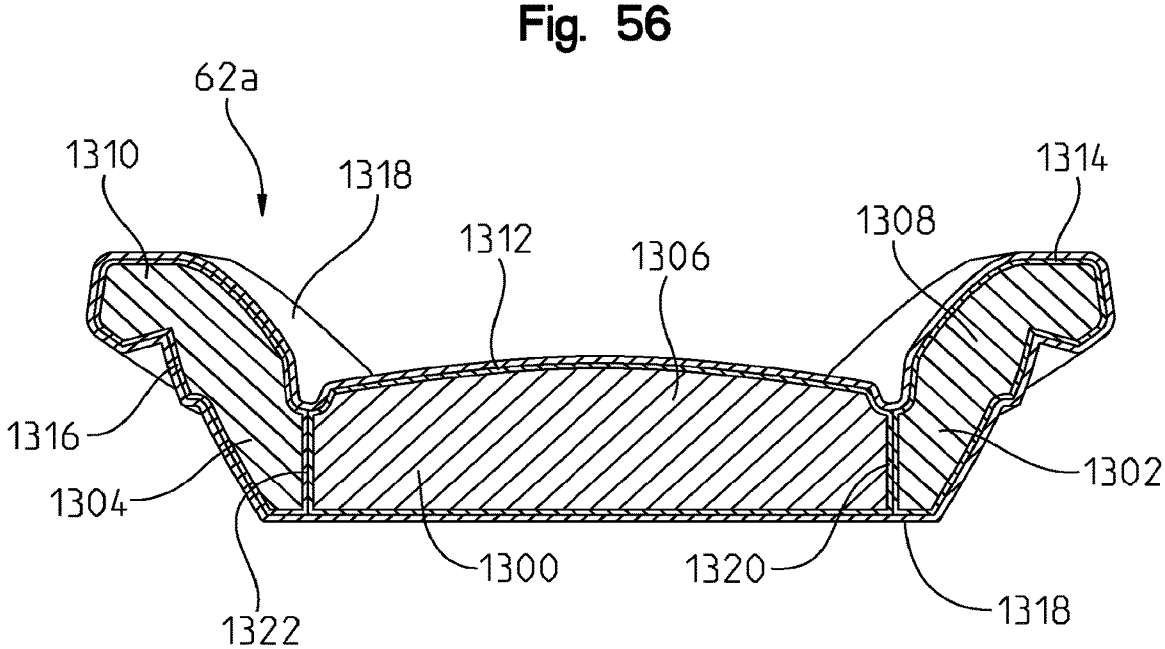
FIG. 57 is a cross-sectional view of the seat bottom of FIG. 56.
Figure 58:
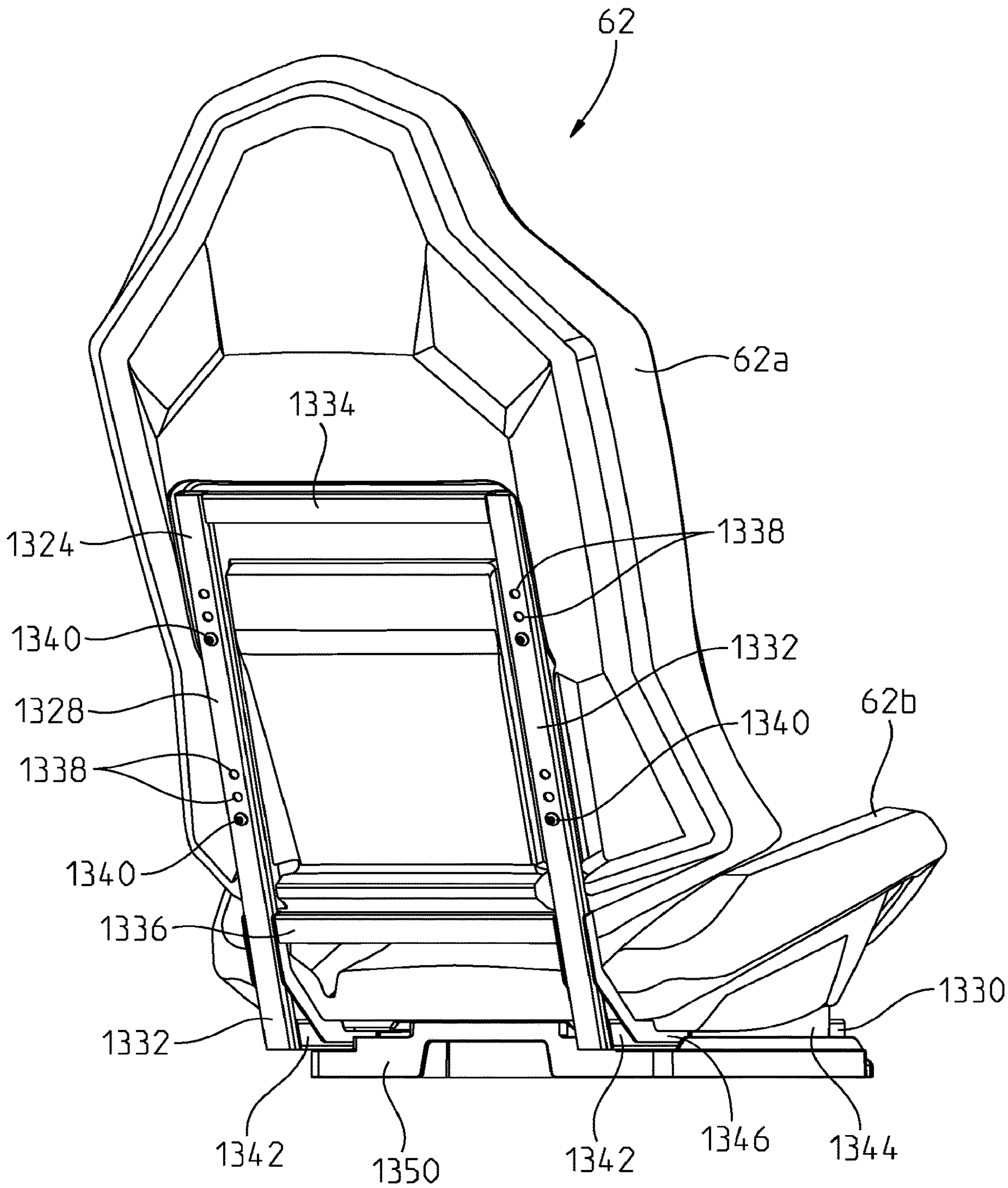
FIG. 58 is a rear perspective view of the driver seat of FIG. 55, including a seat frame and a seat base member.
Figure 59:
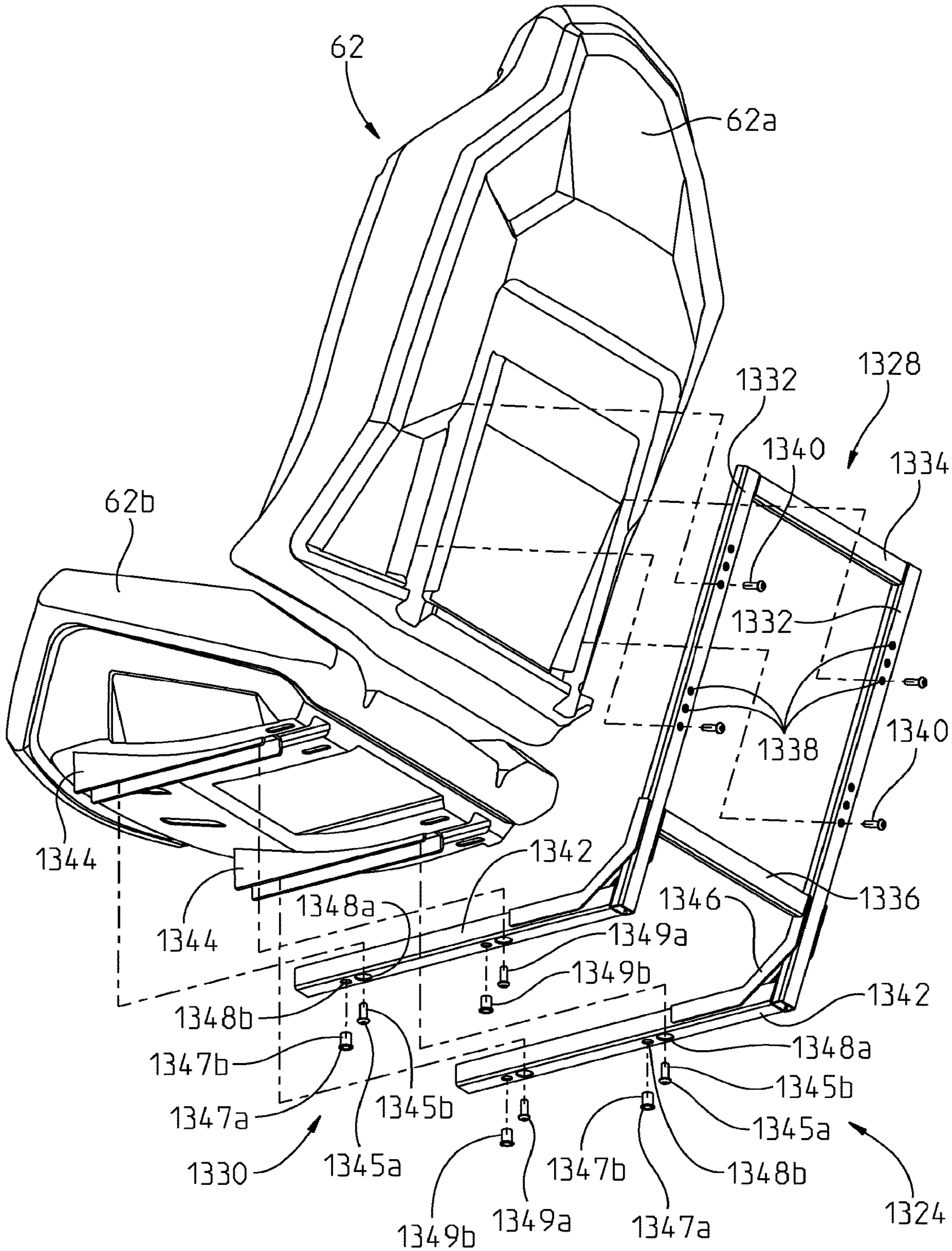
FIG. 59 is a rear exploded view of the driver seat and seat frame of FIG. 58.

With reference to FIGS. 55-63, seating area 60 is positioned within cab frame section 84 and includes driver seat 62 having seat back 62*a* and seat bottom 62*b*, and passenger seat 64 having seat back 64*a* and seat bottom 64*b*. As shown in FIG. 55, seats 62, 64 are in a side-by-side arrangement and are supported on seat mounting bracket 126, as is further detailed herein. Illustratively, as shown in FIGS. 58 and 59, seat backs 62*a* and 64*a* are spaced apart from seat bottoms 62*b* and 64*b* respectively. Alternatively, seat backs 62*a* and 64*a* may be integrally formed with, or otherwise connected to, respective seat bottoms 62*b* and 64*b* in order to distribute loads throughout seats 62, 64.

FIGS. 56 and 57 illustrates the configuration of seat bottom 62*b*, however, seat bottom 64*b* of passenger seat 64 also may be constructed in the manner detailed herein. Additionally, seat backs 62*a*, 64*a* may be constructed in the manner detailed herein. Seat bottom 62*b* includes a first portion 1300, a second portion 1302, and a third portion 1304. First portion 1300 is intermediate second and third portions 1302, 1304 and has a generally flat orientation for supporting a driver. Second and third portions 1302, 1304 are angled outwardly and upwardly relative to first portion 1300 in order to retain the operator and passenger on seat bottoms 62*b*, 64*b* during operation of vehicle 10. Similarly, seat backs 62*a*, 64*a* may be contoured or have angled portions to further retain the operator and passenger on seats 62, 64 during operation of vehicle 10. A cover 1318 generally surrounds first, second, and third portions 1300, 1302, and 1304. Illustratively, first, second, and third portions 1300, 1302, and 1304 are three separate and independent portions positioned adjacent to each other. In one embodiment, portions 1300, 1302, and 1304 may be coupled together in a conventional manner, for example by sewing, bonding, molding, radio frequency welding, stapling and/or using an adhesive. Alternatively, other embodiments of seat bottom 62*b* may be configured as a single component, in which portions 1300, 1302, and 1304 are integrally formed together to define seat bottom 62*b*.

Referring to FIG. 57, first portion 1300 includes an inner layer 1306 generally surrounded by an outer layer 1312, second portion 1302 includes an inner layer 1308 generally surrounded by an outer layer 1314, and third portion 1304 includes an inner layer 1310 generally surrounded by an outer layer 1316. Inner layers 1306, 1308, and 1310 may be comprised of a foam or other polymeric material and may be available from BASF Corporation. Inner layers 1306, 1308, and/or 1310 may be thicker at the h-point, or the point where the hips of the operator or passenger are positioned on seat bottoms 62*b*, 64*b*. Alternatively, additional padding or foam may be coupled to inner layers 1306, 1308, and/or 1310 at the h-point to provide additional comfort to the operator and passenger.

At an interface 1320 between first portion 1300 and second portion 1302, outer layer 1312 is adjacent outer layer 1314. Similarly, at an interface 1322 between first portion 1300 and third portion 1304, outer layer 1312 is adjacent outer layer 1316. Outer layers 1312, 1314, and 1316 are comprised of a water resistant polymeric material, for example vinyl. As such, each inner layer 1306, 1308, 1310 is surrounded by a water resistant material. By covering each inner layer 1316, 1308, 1310 with the water resistant material of outer layers 1312, 1314, 1316, respectively, each inner layer 1306, 1308, 1310 remains dry if seats 62, 64 are splashed with water, mud, or other fluids. In particular, even if fluid penetrates cover 1318, fluid does not penetrate outer layers 1312, 1314, 1316 and, therefore, is prevented from contacting inner layers 1306, 1308, 1310, respectively.

Cover 1318 extends around outer layers 1312, 1314, and 1316, such that outer layers 1312, 1314, and 1316 are intermediate cover 1318 and inner layers 1306, 1308, and 1310, respectively. Cover 1318 may be comprised of a polymeric film material, a polymeric sprayable material, a vinyl material, or other similar material, which also may be water resistant.

Referring to FIGS. 58 and 59, driver seat 62 is supported on a seat frame 1324. While FIGS. 58 and 59 illustrate the configuration of seat frame 1324 for driver seat 62, passenger seat 64 also is supported on frame 1324 in an identical manner. Seat frame 1324 includes an upper section 1328 for supporting seat back 62*a* and a lower section 1330 for supporting seat bottom 62*b*. Upper section 1328 includes generally upstanding tubes 1332 and cross bars 1334, 1336 extending between upstanding tubes 1332. Upstanding tubes 1332 include a plurality of apertures 1338, and more particularly, two groupings of apertures 1338. Apertures 1338 are configured to receive conventional fasteners 1340 in order to couple upper section 1328 of seat frame 1324 to a rear surface of seat back 62*a*. Because fasteners 1340 may be positioned in any of apertures 1338, the vertical position of seat back 62*a* may be adjusted along upper section 1328 of seat frame 1324 to accommodate different preferences for comfort, lumbar support, bolstering, and head rest position for various drivers. As shown in FIG. 59, the rear surface of seat back 62*a* may be contoured to define grooves or channels for receiving upstanding tubes 1332 and cross bars 1334, 1336. A panel or cover (not shown) may be comprised of a polymeric material and coupled to the rear surface of seat back 62*a* in order to conceal upper section 1328 of seat frame 1324.

FIG. 59 illustrates that upper section 1328 of frame 1324 is separate from lower section 1330 and is coupled thereto with gussets 1346. Gussets 1346 may be welded to upper and lower sections 1328, 1330. Alternatively, seat frame 1324 may be comprised of single, continuous tubes that are bent to define upper section 1328 and lower section 1330, such that upper section 1328 is integral with lower section 1330. Seat frame 1324 also may be stamped or otherwise formed to define upper and lower sections 1328, 1330.

Lower section 1330 includes lower frame members 1342 extending in a generally horizontal direction. Upstanding tubes 1332 form an approximate 90-degree angle with lower frame members 1342. Alternatively, upstanding tubes 1332 may be angled rearwardly such that upstanding tubes 1332 form an angle greater than 90 degrees with lower frame members 1342. Seat bottom 62*b* may include channel members 1344 on a bottom surface thereof for receiving lower frame members 1342.

As shown in FIG. 59, lower frame members 1342 include a plurality of apertures 1348, in particular apertures 1348*a* and 1348*b*, for receiving conventional fasteners 1349*a* and threaded couplers 1349*b*, therethrough. Illustratively, lower frame members 1342 include two groupings of apertures 1348*a*, 1348*b*. Fasteners 1349*a* extend through apertures 1348*a* in order to couple lower frame members 1342 of lower section 1330 to channel members 1344 of seat bottom 62*b*. As shown in FIG. 59, aperture 1348*a* is larger than aperture 1348*b*. The larger size of aperture 1348*a* allows a head portion 1345*a* and a body portion 1345*b* of fastener 1349*a* to extend therethrough. As such, and as shown in FIG. 61C, head portion 1345*a* of fastener 1349*a* abuts the top surface of lower frame members 1342 and body portion 1345*b* (FIG. 59) extends into channel members 1344 and seat bottom 62*b*.

Conversely, as shown in FIG. 59, the smaller size of aperture 1348*b* prevents a head portion 1347*a* of threaded coupler 1349*b* from extending therethrough. Instead, head portion 1347*a* is retained outside of lower frame member 1342 and aperture 1348*b*, as is further detailed herein. A body portion 1347*b* of threaded coupler 1349*b* extends within lower frame member 1342 but is spaced apart from the top surface of lower frame member 1342 (FIG. 61C). While illustrative threaded coupler 1349*b* does not couple lower section 1330 of seat frame 1324 to seat bottom 62*b*, alternative embodiments of seat bottoms 62*b*, 64*b* may be coupled to seat frames 1324 with both fasteners 1349*a* and threaded couplers 1349*b*.

Referring to FIGS. 60-62A, seat frame 1324 of seats 62 and 64 may be removably coupled to seat mounting bracket 126 and may be configured to move relative to seat mounting bracket 126, as is further detailed herein. In particular, lower sections 1330 of seat frames 1324 are coupled to a base member 1350 such that when seats 62, 64 are removed from seat mounting bracket 126, seat bottoms 62*b*, 64*b*, seat backs 62*a*, 64*a*, seat frames 1324, and seat bases 1350 also are removed. Base member 1350 may be comprised of a polymeric material or a metal material, and may be formed through extrusion methods, molding methods, stamping methods, or other similar processes. Base member 1350 may be available from Attwood Corporation.

Figure 60:
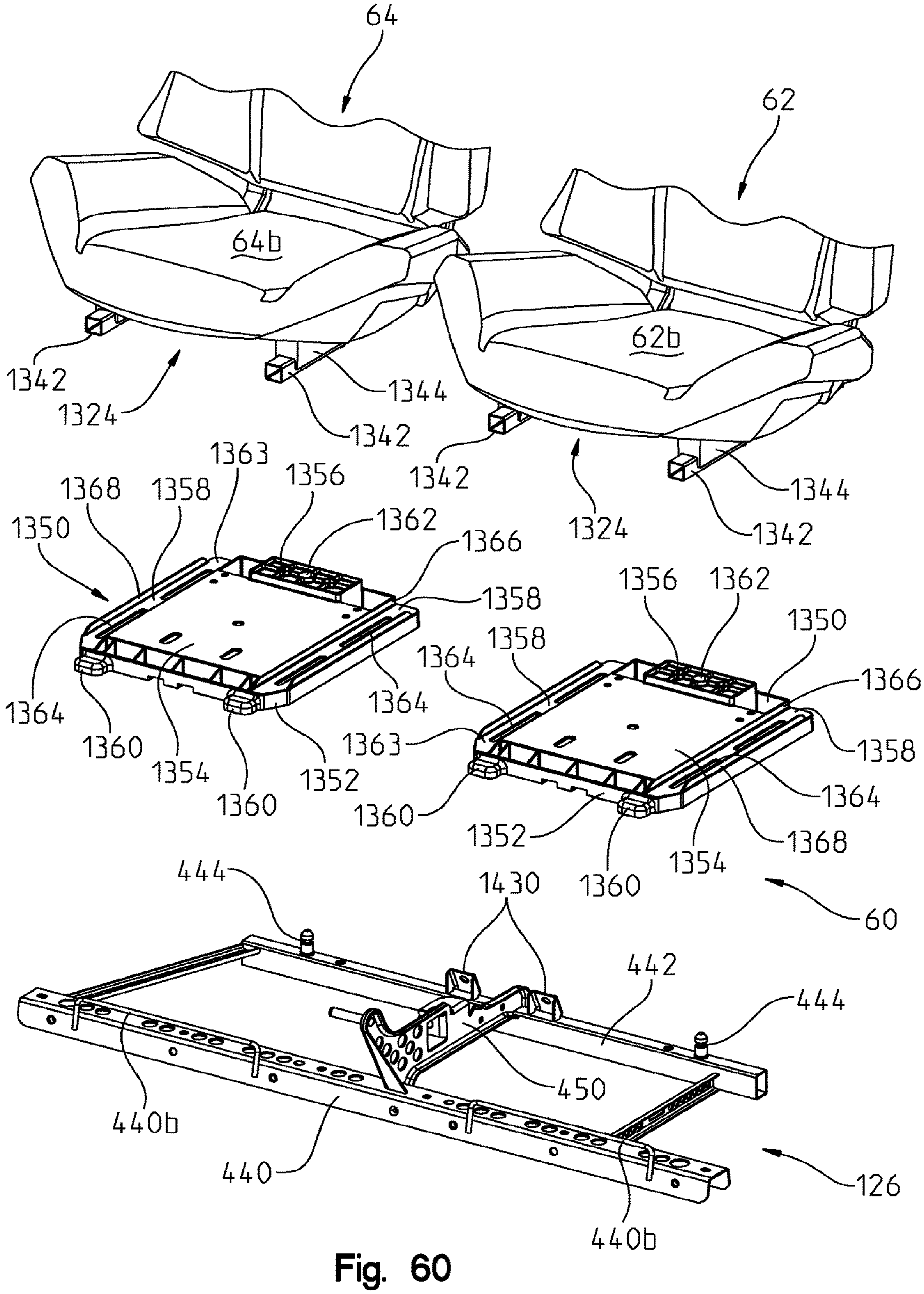
FIG. 60 is a front exploded view of the driver and passenger seats and base members of FIG. 58, and a seat mounting bracket of the frame.

As shown in FIG. 60, base member 1350 includes a frame 1352 which supports a plate 1354. Plate 1354 includes a mounting bracket 1356 having at least one aperture 1362 for receiving mounting pin 444 therethrough. Frame 1352 includes side channels 1358 and tabs or projections 1360.

A bottom surface 1363 of side channels 1358 of frame 1352 includes longitudinally extending slots 1364. Side channels 1358 also include vertical side walls, illustratively an inner side wall 1366 and an outer side wall 1368, extending upwardly from bottom surface 1363. Lower frame members 1342 of seat frame 1324 are positioned on bottom surface 1363 and are retained within side channels 1358 by inner and outer side walls 1366 and 1368. Additionally, and as shown in FIG. 61C, a threaded fastener 1370, such as a shoulder bolt, screw, or other similar device, is coupled to threaded coupler 1349*b* in order to further retain seat frame 1324 to base member 1350. In particular, body portion 1347*b* of threaded coupler 1349*b* includes internal threads (not shown) which engage with external threads (not shown) on threaded fastener 1370. A portion of fastener 1370 extends through slot 1364 (FIG. 61) and a flanged portion (not shown) of fastener 1370 is positioned below slot 1364 in order to couple base member 1350 to seat frame 1324. When seats 62, 64 are coupled to base members 1350 of FIG. 60, seats 62, 64 are removable from seat mounting bracket 126 but do not slide or move relative to frame 1352 of base member 1350. By configuring base members 1350 to be removable from vehicle 10 with seats 62, 64, base members 1350 do not compromise the space available for other components of vehicle 10, such as the fuel tank, which may be positioned below or near seats 62, 64. Additionally, base member 1350 maintains the low profile of seats 62, 64 within cab frame section 84.

Base member 1350 is removably coupled to seat mounting bracket 126, and in particular, the engagement between mounting pin 444 and mounting bracket 1356 allows seats 62, 64 to be released from seat mounting bracket 126 without tools. To couple base 1350 with seat mounting bracket 126, frame 1352 rests atop front channel 440 and rear tube 442. Mounting pin 444 is received within aperture 1362 and tabs 1360 are positioned underneath mounting hooks 440*b* in order to secure base members 1350 and seats 62, 64 to seat mounting bracket 126. When mounting pin 444 is received within aperture 1362 of bracket 1356, latch device 1386 (FIG. 61A) maintains the engagement therebetween to retain seats 62, 64 on seat mounting bracket 126. However, when seat 62 and/or seat 64 is removed from vehicle 10, latch device 1386 disengages pin 444 from aperture 1362 and tabs 1360 may be removed from mounting hooks 440*b* such that seats 62, 64 can be pulled upwardly away from seat mounting bracket 126 and removed from vehicle 10. Base members 1350 are self-contained portions of seats 62, 64 and are removed from vehicle 10 when seats 62, 64 are removed from vehicle 10. Additional details of the engagement between mounting pin 444 and base member 1350 are disclosed in pending U.S. patent application Ser. No. 12/246,948, filed Oct. 7, 2008, the complete disclosure of which is expressly incorporated by reference herein.

Figure 61:
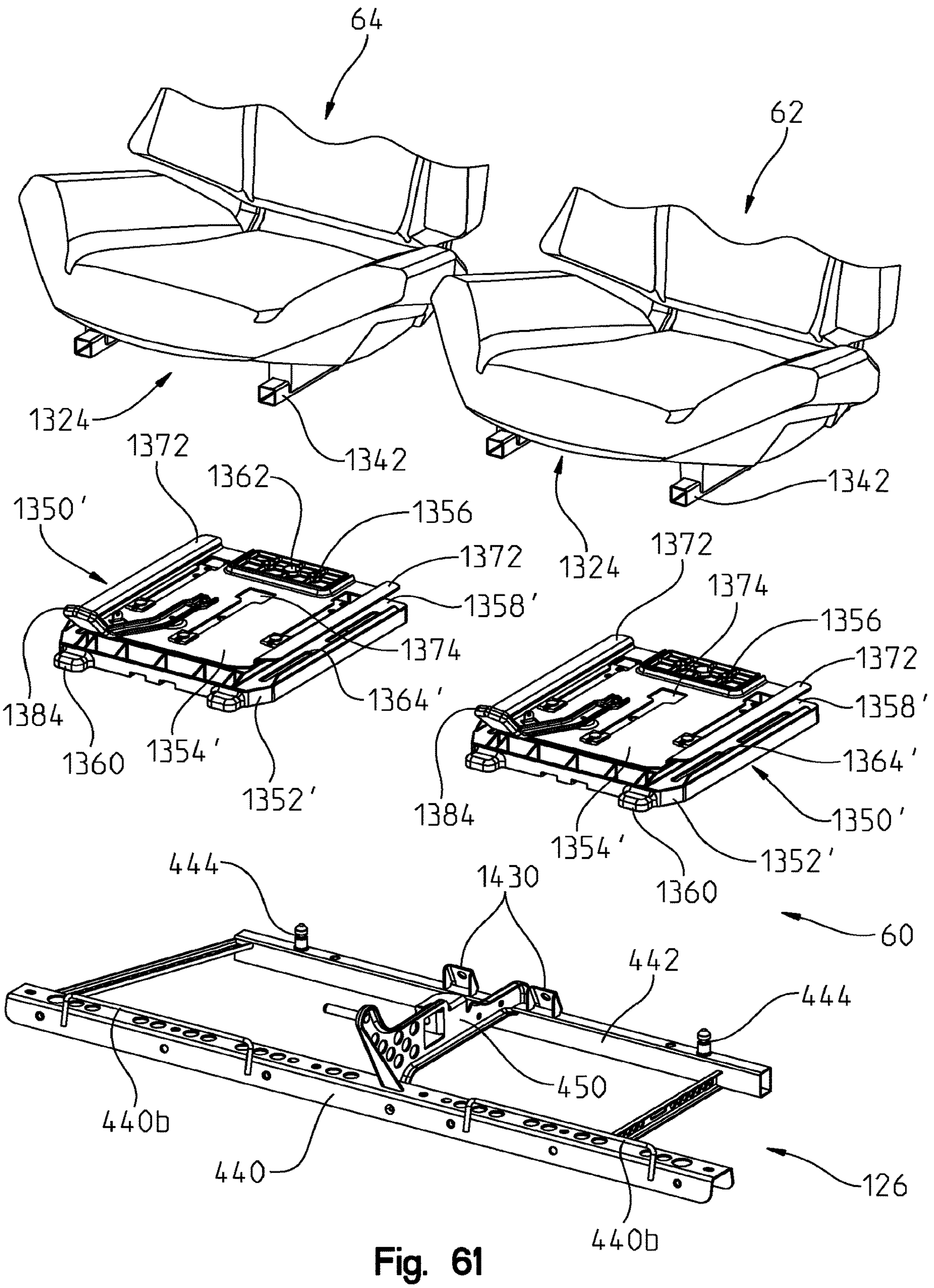
FIG. 61 is a front exploded view of the driver seat, passenger seat, and seat mounting bracket of FIG. 60, including an alternative embodiment of the base members.
Figure 61A:
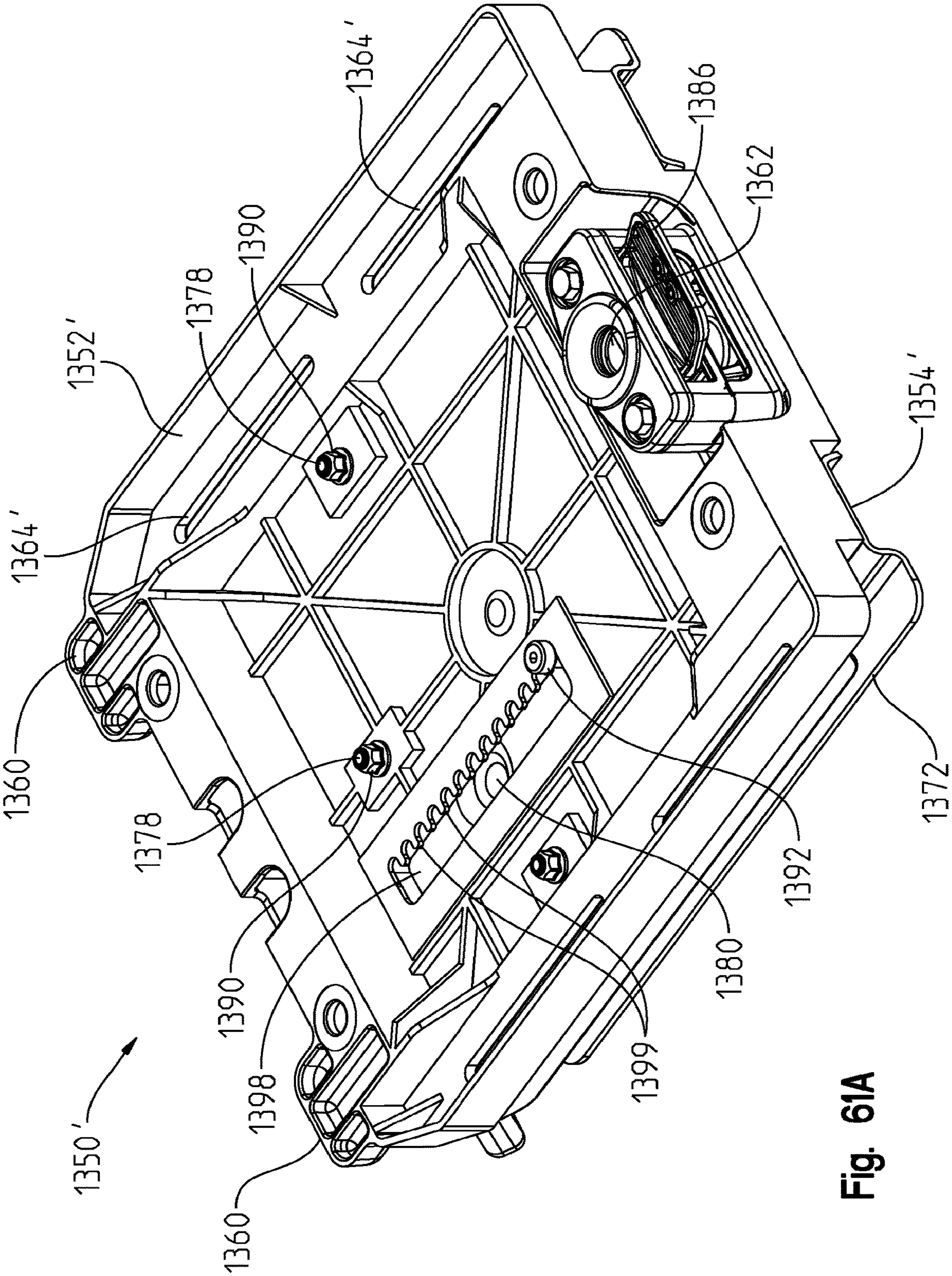
FIG. 61A is a rear perspective view of a bottom side of the base member of FIG. 61.
Figure 61B:
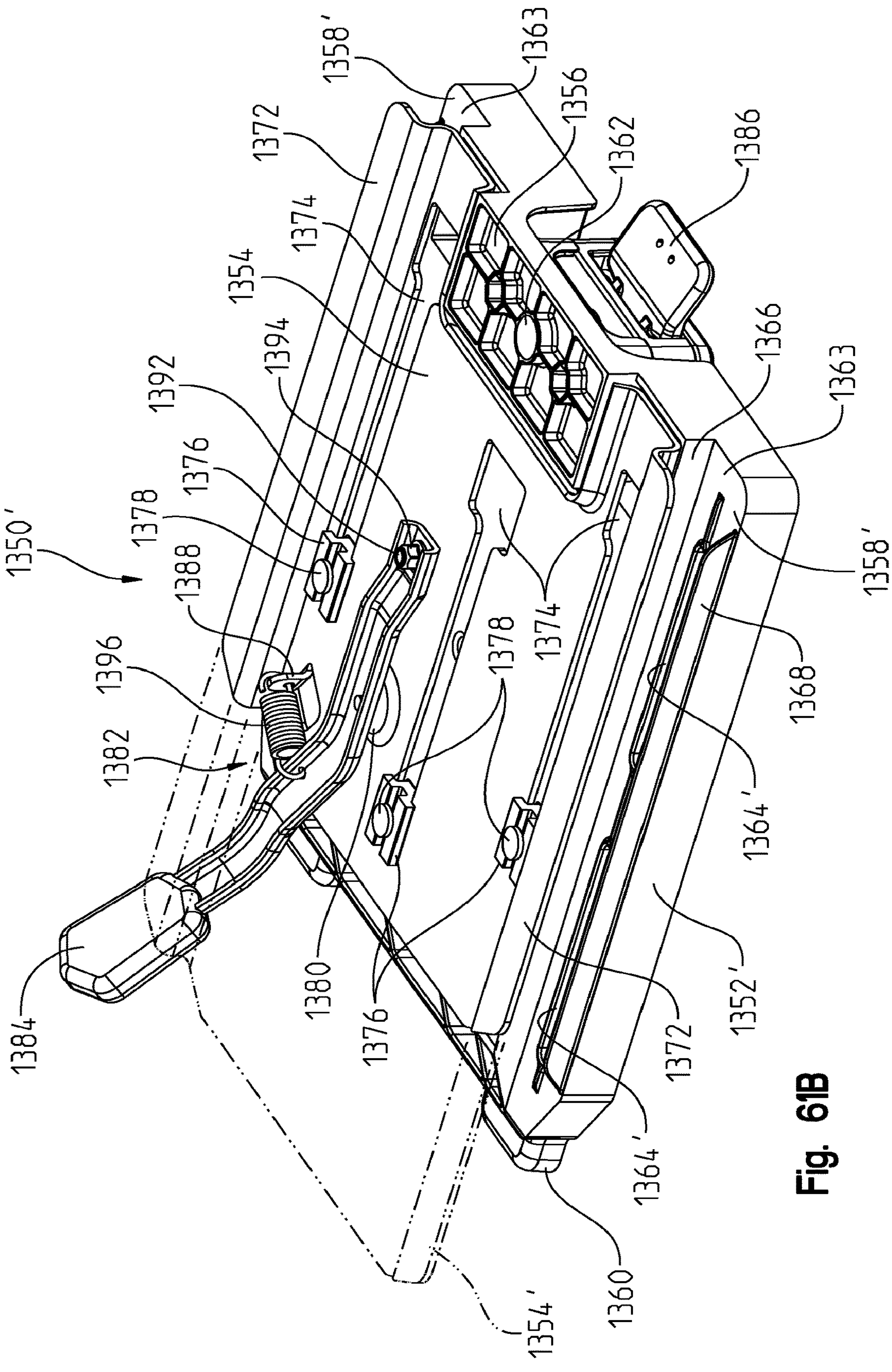
FIG. 61B is a rear perspective view of the top side of the base member of FIG. 61, showing the travel of a plate of the base member relative to the frame of the base member.
Figure 61C:
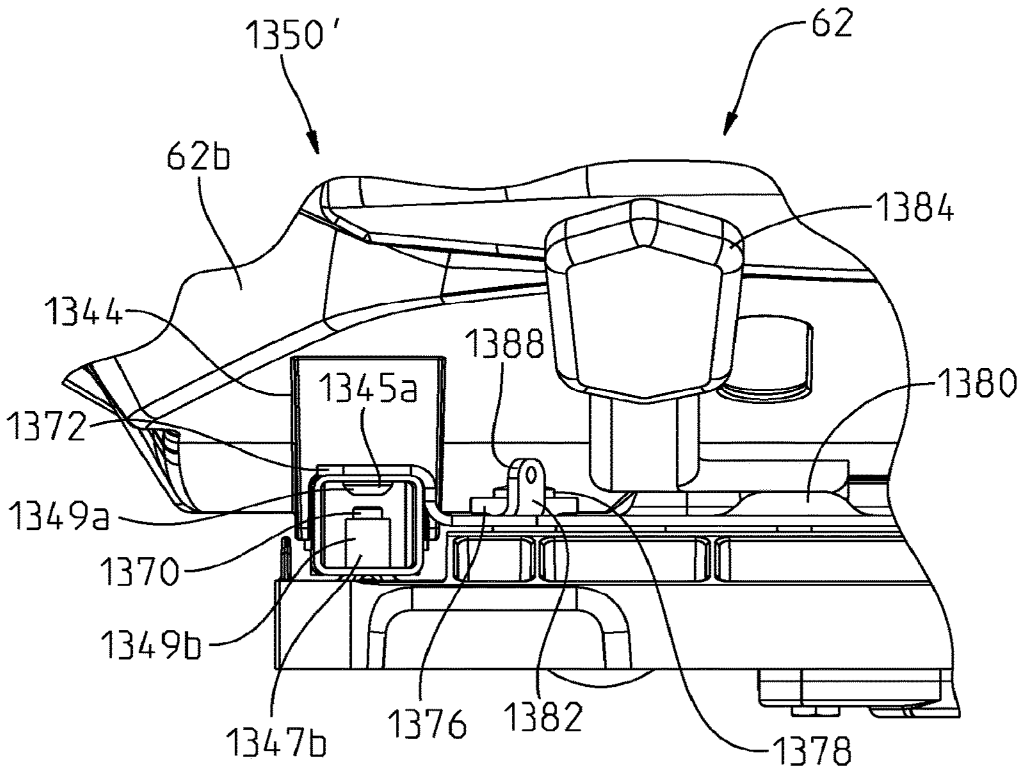
FIG. 61C is a cross-sectional view of the seat frame and the base member of FIG. 61.

Alternatively, according to the embodiment of FIGS. 61-61C, base members 1350' allow seats 62, 64 to slide relative to seat mounting bracket 126. Base member 1350' of FIG. 61 includes features similar to those of base member 1350 of FIG. 60, with like reference numerals indicating like elements, except as described below. As with base member 1350, base member 1350' is removable from vehicle 10 with seats 62, 64, and therefore, is a self-contained adjustment member of seats 62, 64. Additionally, base member 1350' allows seats 62, 64 to maintain a low profile within cab frame section 84 but does not decrease the space available for other components of vehicle 10, such as the fuel tank. Base member 1350' may be available from Attwood Corporation.

Base member 1350' includes frame 1352', plate 1354', a lever 1384, a latching mechanism 1382, fasteners 1378, and support members 1376. Side channels 1358' of frame 1352' include inner side walls 1366, outer side walls 1368, and slots 1364' extending longitudinally along bottom surface 1363. The outer perimeter of slots 1364' are raised or elevated relative to bottom surface 1363, as best shown in FIG. 61B and further detailed herein. Fastener 1370 extends through slots 1364' in order to couple with threaded coupler 1349*b*. Frame 1352' also includes tabs 1360 which extend forwardly therefrom. Frame 1352' may be comprised of a polymeric material and may be extruded, molded, or otherwise formed in a similar manner.

Plate 1354' includes mounting bracket 1356 for receiving mounting pin 444, as detailed herein. As such, when pin 444 is received within aperture 1362 of mounting bracket 1356 and tabs 1360 are positioned underneath mounting hooks 440*b*, seats 62, 64 are coupled to seat mounting bracket 126. Alternatively, pin may be released from mounting bracket 1356 by engaging latch device 1386 (FIG. 61B), such that seat 62 and/or seat 64, including base members 1350', are released from seat mounting bracket 126 and removed from vehicle 10.

Plate 1354' also includes side portions 1372, which are elevated relative to frame 1352'. Side portions 1372 extend over inner side wall 1366 of side channels 1358 and are positioned above a portion of bottom surface 1363. Lower frame members 1342 of seat frame 1324 are positioned intermediate bottom surface 1363 of side channels 1358 and side portions 1372 of plate 1354'. Illustratively, as best shown in FIG. 61C, side portions 1372 are intermediate the top surface of lower frame members 1342 and channels 1344 of seat frame 1324.

Additionally, plate 1354' includes longitudinal openings 1374 and, more particularly, includes three longitudinal openings 1374. Alternatively, plate 1354' may include more than three longitudinal openings 1374 or less than three longitudinal openings 1374. At least a portion of fasteners 1378 and support members 1376 are positioned above longitudinal openings 1364. Support members 1376 rest atop plate 1354' and fasteners 1378 extend through an aperture (not shown) of support members 1376 and below longitudinal openings 1374. Fasteners 1378 may be carriage bolts or other similar components configured to prevent rotation against support members 1376. As shown in FIG. 61A, couplers, such as nuts 1390, are threadedly coupled to fasteners 1378 in order to secure fasteners 1378 to base member 1350'. Nuts 1390 may be nylon insert lock nuts, polymer insert lock nuts, elastic stop nuts, or other similar components.

As shown in FIGS. 61-61B, lever 1384 is generally positioned below seat bottoms 62*b*, 64*b* but extends in a forward direction such that lever 1384 is accessible to the operator and passenger. Lever 1384 is positioned above plate 1354' and is coupled thereto with conventional fasteners, for example a shoulder bolt 1392 and a nut 1394. Shoulder bolt 1392 may be supported within a polymeric sleeve or insert (not shown) in order to reduce noise when the position of seats 62, 64 is adjusted.

Lever 1384 is operably coupled to latch mechanism 1382, which includes a spring 1396, a tab 1388, a support portion 1380, a pin (not shown) received within support portion 1380, and a gear tooth portion 1398 having a plurality of individual teeth 1399. Illustratively, gear tooth portion 1398 is coupled to the bottom surface of frame 1352'. Gear tooth portion 1398 may be sealed or covered to protect gear tooth portion 1398 from dirt and debris. The pin is movable along gear tooth portion 1398 in order to move plate 1354' relative to frame 1352', as is detailed herein. As best shown in FIG. 61B, spring 1396 may be a constant tension spring and is coupled to tab 1388 and lever 1384 in order to hold the pin, and therefore lever 1384, in a particular position along gear tooth portion 1398. More particularly, the pin extends through support portion 1380 and is held within one of teeth 1399. By maintaining the position of the pin in gear tooth portion 1398, seat 62 and/or seat 64 are prevented from sliding.

In operation, when lever 1384 is laterally pushed, spring 1396 extends and the pin is released from teeth 1399. As such, plate 1354' is free to slide along frame 1352' in order to move seat 62 and/or seat 64 because the pin is not held by teeth 1399. More particularly, longitudinal openings 1374 slide along frame 1352' relative to support members 1376 and fasteners 1378. Additionally, fastener 1370 slides within slots 1364' to allow lower frame members 1342 of seat frame 1324 to slide with plate 1354'. The elevated outer perimeters of slots 1364' reduce surface area and facilitate the sliding motion of lower frame members 1342 along side channels 1358'. As shown best in FIG. 61B, illustrative plates 1354' may be configured to slide approximately five inches in a forward direction along frame 1352' of base member 1350'. When seat 62 and/or seat 64 have been moved to a desired position within cab frame section 84, lever 1384 is released and the pin engages with a different one of teeth 1399 in order to maintain the new position of plate 1354' relative to frame 1352'.

Alternatively, seats 62, 64 may include a base member 1350", shown in FIGS. 62 and 62A, which includes features similar to those of base members 1350, 1350' of FIGS. 60-61A, with like reference numerals indicating like elements, except as described below. Base member 1350" may be available from Attwood Corporation and includes a frame 1352", a plate 1354", and a bracket 1356" having aperture 1362". Lower frame members 1342 of seat frame 1324 are coupled to plate 1354" with conventional fasteners (not shown). As shown best in FIG. 62A, frame 1352" includes a lower member 1414 which supports an adjustment mechanism 1410.

Illustratively, adjustment mechanism 1410 allows plate 1354", and therefore, seats 62, 64, to slide relative to frame 1352". Adjustment mechanism 1410 includes an upper adjustment member 1402 which is configured to move relative to a lower adjustment member 1404. Lower adjustment member 1404 is coupled to lower member 1414 of frame 1352" with conventional fasteners 1406, illustratively a bolt and nut. Upper adjustment member 1402 is coupled to plate 1354" with conventional fasteners 1408, illustratively a bolt and a nut. Adjustment mechanism 1410 also includes an arm 1412, which is movable relative to lower member 1414 of frame 1352" and is coupled to lever 1384", as is detailed further herein. Adjustment mechanism 1410 may be sealed or covered to protect upper adjustment member 1402, lower adjustment member 1404, and arm 1412 from dirt and debris.

Base member 1350" is removably coupled to seat mounting bracket 126 by engaging mounting pin 444 with aperture 1362" of bracket 1356". A latch device (not shown) may be included in order to engage and disengage mounting pin 444 with bracket 1356". Additionally, base member 1350" may include forward tabs (not shown) to engage mounting hooks 440*b* of seat mounting bracket 126. Alternatively, mounting hooks 440*b* may be removed from seat mounting bracket 126 such that mounting pin 444 is the primary device for coupling base member 1350" to seat mounting bracket 126.

It may be appreciated that when seat 62 and/or 64 are removed from vehicle 10, base members 1350" also are removed from vehicle 10.

In operation, base members 1350" may be used to adjust the position of seats 62, 64 within cab frame section 84. Seats 62, 64 may be configured to move in forward and rearward directions to accommodate specific preferences of the operator and/or passenger. More particularly, because seat frames 1324 are coupled to plate 1354", when the position of plate 1354" is adjusted relative to frame 1352", the position of seats 62, 64 also is adjusted. The operator and/or passenger may push or pull on lever 1384, which releases latch mechanism 1410. When lever 1384" is engaged, arm 1412 moves in a forward direction, which allows upper adjustment member 1402 to slide along lower adjustment member 1404 while lower adjustment member 1404 remains stationary on lower member 1414 of frame 1352". When lever 1384" is released (i.e., no longer engaged), then arm 1412 moves rearwardly to engage latch mechanism 1410 to retain the position of upper adjustment member 1402 relative to lower adjustment member 1404.

Figure 63:
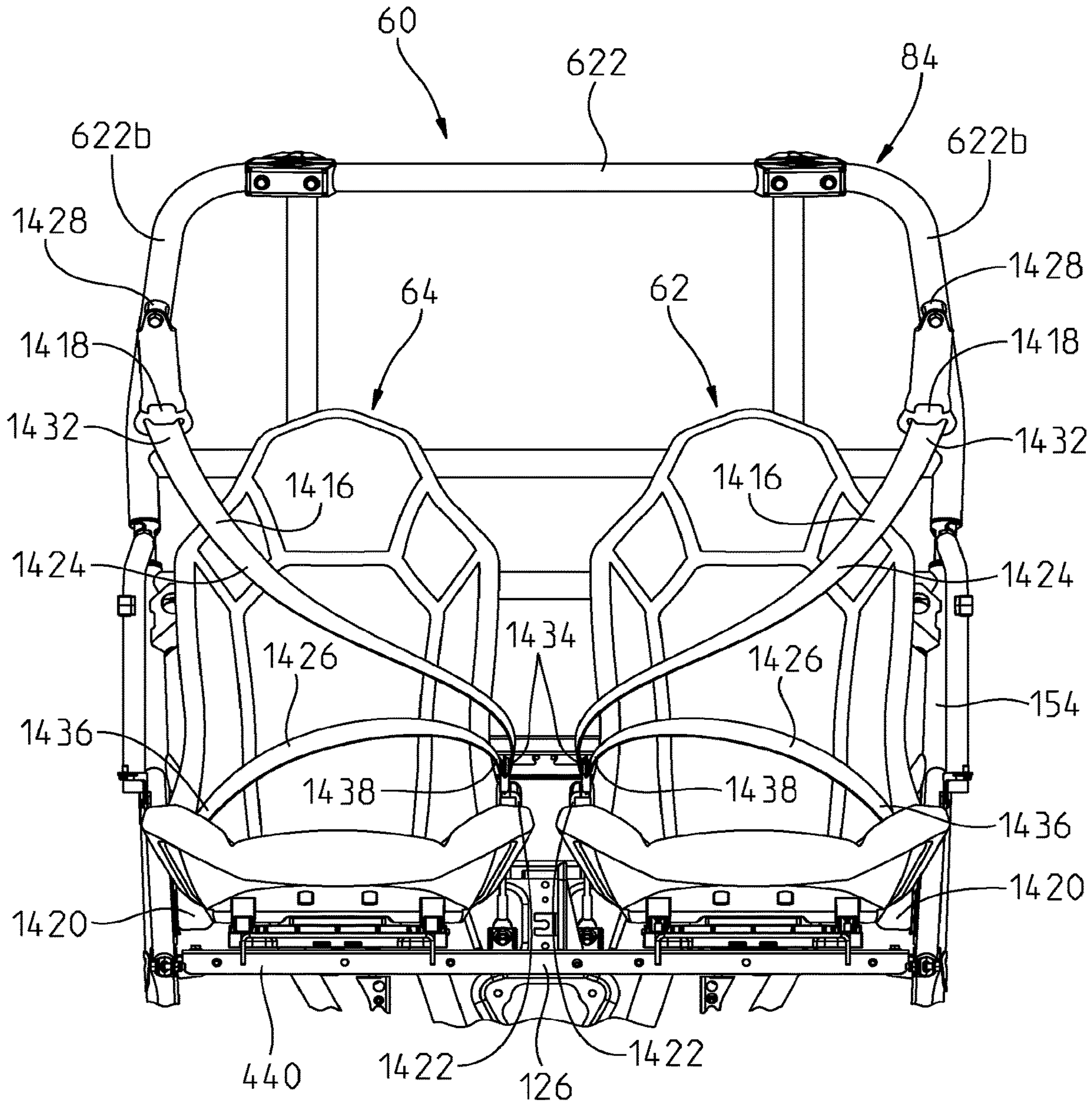
FIG. 63 is a front elevational view of the seating area, showing the driver seat and the passenger seat having seat belts.

Referring to FIGS. 63-66, seats 62, 64 may be configured with restraint harness-type seat belts. In the embodiment of FIG. 63, seat belts 1416 are three-point harnesses having a first point, illustratively a shoulder retractor 1418 positioned above seat backs 62*a*, 64*a*, a second point, illustratively a hip retractor 1420 positioned near seat bottoms 62*b*, 64*b*, and a third point, illustratively a latching mechanism 1422 generally opposite hip retractors 1420.

Shoulder retractor 1418 is coupled to a bracket 1428 on tube portions 622*b* of U-shaped tube 622 (FIGS. 26-28). As shown best in FIG. 1, tube portions 622, and therefore brackets 1428, are positioned rearward of seats 62, 64 such that shoulder retractors 1418 also are positioned rearward of seats 62, 64. Additionally, due to the configuration of cab frame section 84, brackets 1428 may be positioned above a forward portion of rear cargo area 56. Illustratively, brackets 1428 are positioned generally above seats 62, 64, however, brackets 1428 also may be positioned lower than the head rest portion of seats 62, 64. Alternatively, brackets 1428 may be coupled to the rear surface of seat backs 62*a*, 64*a* and also may be lower than the head rest portion of seats 62, 64.

A first strap 1424 extends between shoulder retractor 1418 and latching mechanism 1422 in order lay against the chest of the operator and passenger. First strap 1424 includes an anchor end 1432 which is coupled to shoulder retractor 1418 and a terminal end 1434 which is coupled to latching mechanism 1422. The operator or passenger needs only to pull terminal end 1434 across his or her chest in order secure first strap 1424 to latching mechanism 1422. As such, the operator or passenger is not required to pull first strap 1424 down over his or her head when engaging first strap 1424 with latching mechanism 1422.

Shoulder retractor 1418 automatically adjusts first strap 1424 to a length necessary to fit across the operator or passenger, which eliminates the need for the operator or passenger to manually adjust the length of first strap 1424. Additionally, shoulder retractor 1418 allows the operator or passenger to have mobility while wearing seat belt 1416 because the length of first strap 1424 automatically adjusts to accommodate movement of the operator or passenger while wearing seat belt 1416. However, shoulder retractor 1418 also includes an inertial lock (not shown) which prevents first strap 1424 from extending or lengthening in response to sudden movement. As such, the operator or passenger is restrained by first strap 1424 if vehicle 10 suddenly stops, changes directions, or moves in a manner that causes the operator or passenger to move suddenly.

Hip retractor 1420 is coupled to outer frame rails 154 (FIG. 12) and latching mechanism 1422 is coupled to seat mounting bracket 126. A second strap 1426 lays across the lap of the operator and passenger and extends between hip retractor 1420 and latching mechanism 1422. Second strap 1426 includes an anchor end 1436 coupled to hip retractor 1420 and a terminal end 1438 coupled to latching mechanism 1422. The operator or passenger only needs to pull terminal end 1438 across his or her lap in order secure second strap 1426 to latching mechanism 1422.

Hip retractor 1420 automatically adjusts second strap 1426 to a length necessary to fit across the operator's or passenger's lap, which eliminates the need for the operator or passenger to manually adjust the length of second strap 1426. Additionally, hip retractor 1420 allows the operator or passenger to have mobility while wearing seat belt 1416 because the length of second strap 1426 automatically adjusts to accommodate movement of the operator or passenger while wearing seat belt 1416. However, hip retractor 1420 also includes an inertial lock (not shown) which prevents second strap 1426 from extending or lengthening in response to sudden movement. As such, the operator or passenger is restrained by second strap 1426 if vehicle 10 suddenly stops, changes directions, or moves in a manner that causes the operator or passenger to move suddenly.

Figure 62:
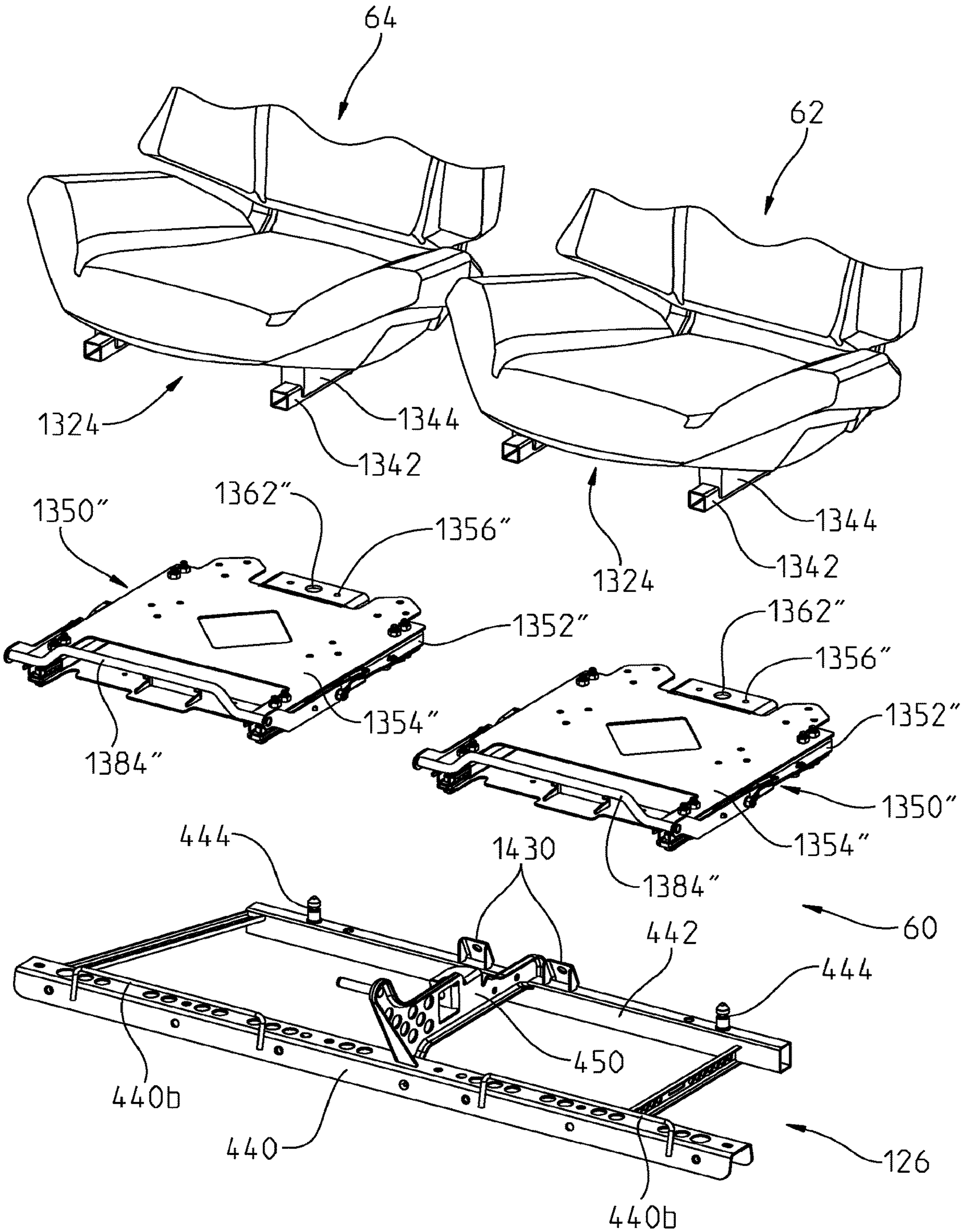
FIG. 62 is a front exploded view of the driver and passenger seats and seat mounting bracket of FIG. 61, including an alternative embodiment of the base member.
Figure 62A:
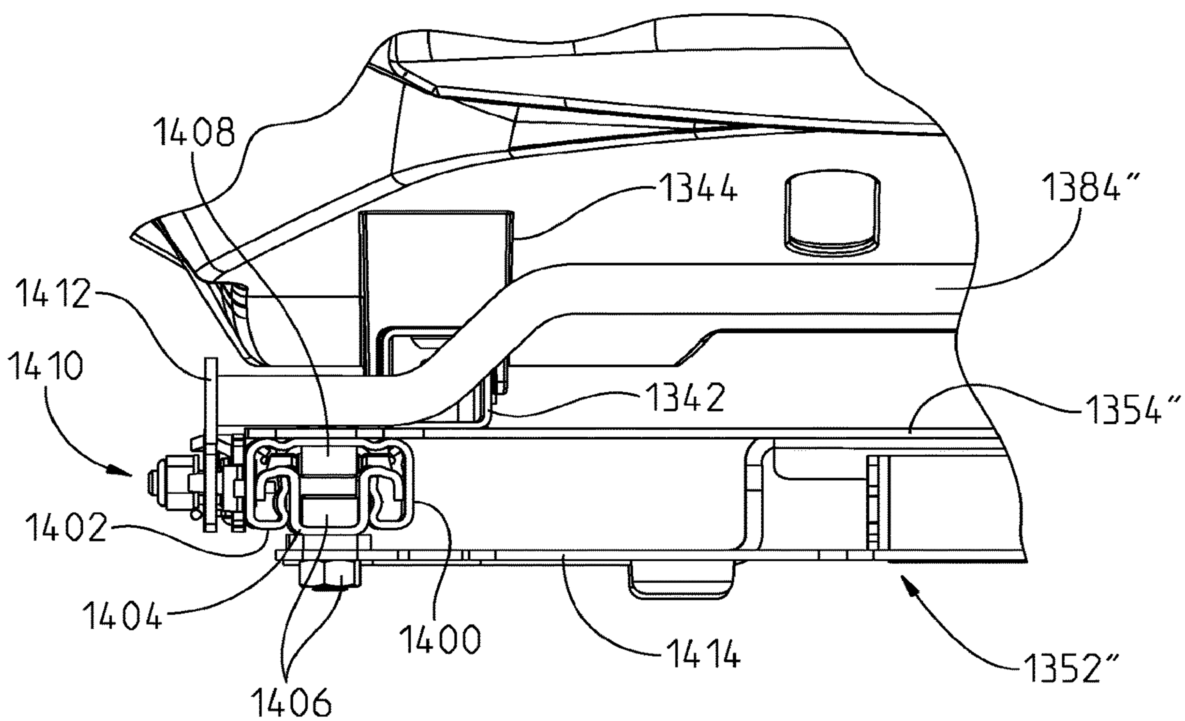
FIG. 62A is a cross-sectional view of the seat frame and the base member of FIG. 62.

As shown in FIGS. 60, 61, and 62, seat mounting bracket 126 includes brackets 1430 for supporting latching mechanism 1422. As such, brackets 1430 may be positioned generally rearward of the operator or passenger. Latching mechanism 1422 is configured to receive terminal ends 1434, 1438 of straps 1424, 1426. Terminal ends 1434, 1438 may be coupled together, for example through a clip (not shown), stitching, or other similar means, in order to reduce the number of latching points for latching mechanism 1422. For example, terminal ends 1434 and 1438 of respective first and second straps 1424 and 1426 may be releasably secured to a single latching point of latching mechanism 1422. As such, latching mechanism 1422 may include only one latching point for both first and second straps 1424, 1426.

Latching mechanism 1422 may include a release tab (not shown) for engaging and releasing terminal ends 1434, 1438 from latching mechanism 1422. Latching mechanism 1422 may include only one release tab because when terminal ends 1434, 1438 are coupled together, only one release tab is needed to engage and release both first and second straps 1424 and 1426 from latching mechanism 1422. For example, the operator or passenger may depress the release tab in order to release both terminal ends 1434, 1438 from latching mechanism 1422. First and second straps 1424 and 1426 automatically retract toward shoulder and hip retractors 1418 and 1420, respectively, when terminal ends 1434, 1438 are released from latching mechanism 1422. As such, seat belts 1416 do not rest on seats 62, 64 when not in use, which facilitates movement into and out of seating area 60.

Figure 64:
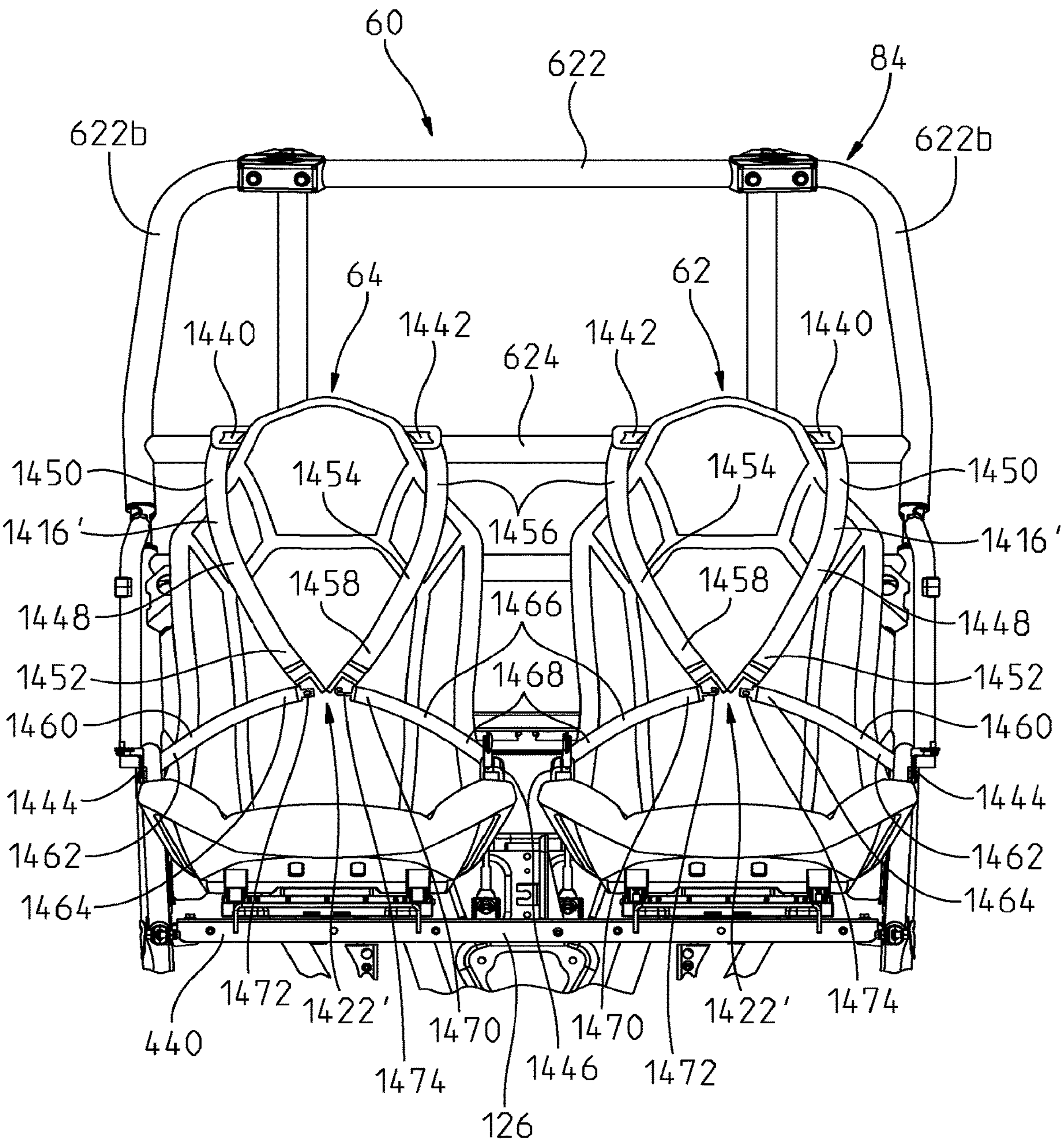
FIG. 64 is a front elevational view of the seating area of FIG. 63, showing the driver seat and the passenger seat with an alternative embodiment of the seat belts.

Alternatively, as shown in FIG. 64, seat belts 1416' include features similar to seat belts 1416 of FIG. 63, with like reference numerals indicating like elements, except as described below. Seat belts 1416' may be four-point harnesses having a first point, illustratively a first or outer shoulder retractor 1440 positioned near the head rest portion of seat backs 62*a* and 64*a*, a second point, illustratively a second or inner shoulder retractor 1442 positioned opposite outer shoulder retractor 1440 and near the head rest portion of seat backs 62*a* and 64*a*, a third point, illustratively a first or outer hip retractor 1444 positioned near seat bottoms 62*b* and 64*b*, and a fourth point, illustratively a second or inner hip retractor 1446 positioned generally opposite outer hip retractor 1444. Seat belts 1416' also include a latching mechanism 1422' configured to be positioned against the operator's or passenger's chest and is generally centrally positioned between the first, second, third, and fourth points of seat belts 1416'.

Outer and inner shoulder retractors 1440 and 1442 are coupled to cross tube 624 of cab frame section 84 (FIGS. 26-28). As shown best in FIG. 1, cross tube 624 is rearward of seats 62 and 64, and, therefore, outer and inner shoulder retractors 1440 and 1442 are rearward of seats 62, 64. Additionally, due to the configuration of cab frame portion 84, shoulder retractors 1440, 1442 may be positioned above a forward portion of rear cargo area 56. Illustratively, outer and inner shoulder retractors 1440 and 1442 are positioned generally above seat backs 62*a*, 64*a*, however, shoulder retractors 1440, 1442 also may be positioned below the head rest portion of seats 62, 64. Alternatively, shoulder retractors 1440, 1442 may be coupled to the rear surface of seat backs 62*a*, 64*a*.

Outer hip retractor 1444 is coupled to outer frame rails 154 (FIG. 12) and, as shown in FIG. 64, is positioned rearward of the operator and passenger when seated in seats 62, 64, respectively. Additionally, as shown in FIGS. 60, 61, and 62, seat mounting bracket 126 includes brackets 1430 for supporting inner hip retractors 1446. Brackets 1430, and, therefore, inner hip retractors 1446, may be positioned generally rearward of the operator or passenger when seated in seats 62, 64, respectively.

A first strap 1448 having an anchor end 1450 and a terminal end 1452 extends between outer shoulder retractor 1440 and latching mechanism 1422' in order lay against the chest of the operator and passenger. Anchor end 1450 is coupled to outer shoulder retractor 1440 and terminal end 1452 is coupled to latching mechanism 1422'. A third strap 1460 is positioned below first strap 1448 and includes an anchor end 1462 and a terminal end 1464. Anchor end 1462 is coupled to outer hip retractor 1444 and terminal end 1464 is coupled to latching mechanism 1422'. Illustratively, terminal ends 1452, 1464 of respective first and third straps 1448 and 1460 may be coupled together such that first and second straps 1448 and 1460 are coupled to latching mechanism 1422' at one single latching point.

A second strap 1454 may be positioned generally opposite first strap 1448 and extends between an anchor end 1456 at inner shoulder retractor 1442 and a terminal end 1458 at latching mechanism 1422'. A fourth strap 1466 is positioned below second strap 1454 and includes an anchor end 1468 and a terminal end 1470. Anchor end is coupled to inner hip retractor 1446 and terminal end is coupled to latch mechanism 1422'. Illustratively, terminal ends 1458, 1470 of respective second and fourth straps 1454 and 1466 may be coupled together such that second and fourth straps 1454 and 1466 are coupled to latching mechanism 1422' at one latching point.

Latching mechanism 1422' includes a tongue portion 1472 and a receptacle portion 1474. Tongue portion 1472 is releasably coupled to receptacle portion 1474 through a release tab (not shown). As shown in FIG. 64, first and third straps 1448, 1460 are coupled to tongue portion 1472, and second and fourth straps 1454, 1466 are coupled to receptacle portion 1474. As such, seat belt 1416' includes only one latching point defined by the engagement between tongue portion 1472 and receptacle portion 1474.

To secure seat belt 1416', the operator or passenger only needs to pull tongue portion 1472, which is coupled to first and third straps 1448, 1460, toward receptacle portion 1474, which is coupled to second and fourth straps 1454, 1466. As such, seat belts 1416' allow easy mounting and dismounting because the operator or passenger is not required to pull seat belt 1416' over his or her head.

Shoulder retractors 1440, 1442 and hip retractors 1444, 1446 automatically adjust the length of straps 1448, 1454, 1460, 1466, respectively, which eliminates the need for the operator or passenger to manually adjust the length of straps 1448, 1454, 1460, 1466. Therefore, shoulder retractors 1440, 1442 and hip retractors 1444, 1446 allow the operator or passenger to have mobility while wearing seat belt 1416' because the length of straps 1448, 1454, 1460, 1466 automatically adjusts to accommodate movement of the operator or passenger while wearing seat belt 1416'. However, shoulder retractors 1440, 1442 and hip retractors 1444, 1446 also include an inertial lock (not shown) which prevents straps 1448, 1454, 1460, 1466 from extending or lengthening in response to sudden movement. As such, the operator or passenger is restrained by seat belt 1416' if vehicle 10 suddenly stops, changes directions, or moves in a manner that causes the operator or passenger to move suddenly. Additionally, when tongue portion 1472 is disengaged from receptacle portion 1474, shoulder retractors 1440, 1442 and hip retractors 1444, 1446 automatically retract straps 1448, 1454, 1460, 1466, respectively, in order to move straps 1448, 1454, 1460, 1466 away from seats 62, 64 when not in use.

Figure 65:
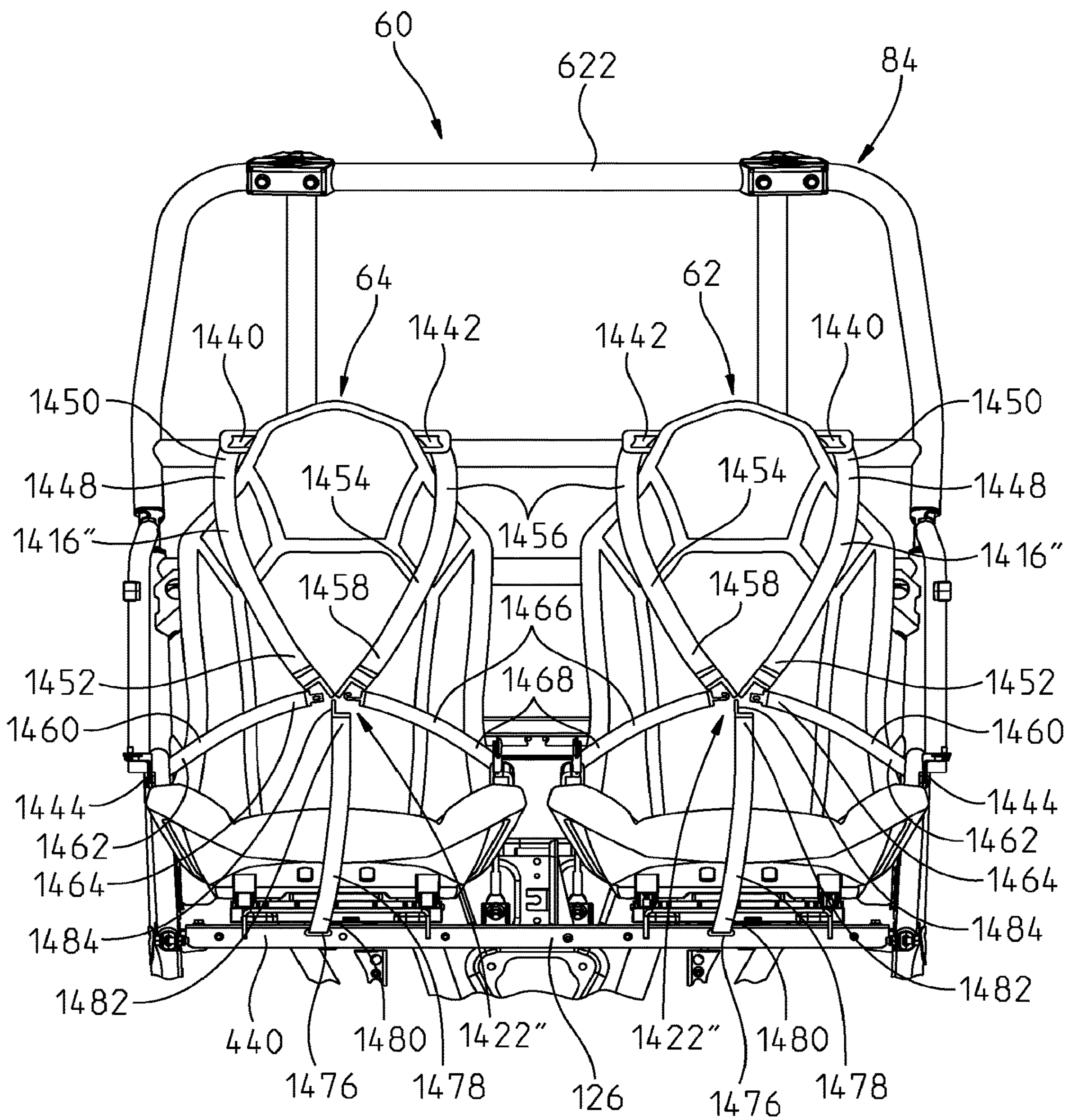
FIG. 65 is a front elevational view of the seating area of FIG. 64, showing the driver seat and the passenger seat with a further alternative embodiment of the seat belts.

Alternatively, as shown in FIG. 65, seat belts 1416" include features similar to seat belts 1416' of FIG. 64, with like reference numerals indicating like elements, except as described below. Seat belts 1416" may be five-point harnesses having a first point, illustratively outer shoulder retractor 1440 positioned near the head rest portion of seat backs 62*a* and 64*a*, a second point, illustratively inner shoulder retractor 1442 positioned opposite outer shoulder retractor 1440 and near the head rest portion of seat backs 62*a* and 64*a*, a third point, illustratively outer hip retractor 1444 positioned near seat bottoms 62*b* and 64*b*, a fourth point, illustratively inner hip retractor 1446 positioned generally opposite outer hip retractor 1444, and a fifth point, illustratively a leg retractor 1476. Seat belts 1416" also include a latching mechanism 1422" configured to be positioned against the operator's or passenger's chest and is generally centrally positioned between the first, second, third, fourth, and fifth points of seat belts 1416".

As detailed above with respect to seat belts 1416', outer shoulder retractor 1440 is coupled to first strap 1448, inner shoulder retractor 1442 is coupled to second strap 1454, outer hip retractor 1444 is coupled to third strap 1460, and inner hip retractor 1446 is coupled fourth strap 1466. Shoulder retractors 1440, 1442 and hip retractors 1444, 1446 automatically retract or lengthens straps 1448, 1454, 1460, 1466 in order to automatically adjust the length of straps 1448, 1454, 1460, 1466 when the operator or passenger moves or when seat belts 1416" are not in use.

Seat belts 1416" include a fifth strap 1478 operably coupled to leg retractor 1476. Fifth strap 1478 is configured to be positioned between the operator's or the passenger's legs. Fifth strap 1478 includes an anchor end 1480 coupled to leg retractor 1476 and a terminal end 1482 coupled to latch mechanism 1422". Leg retractor 1476 is configured to automatically adjust the length of fifth strap 1478, such that when fifth strap 1478 is not in use, terminal end 1482 is retracted and is adjacent leg retractor 1476. Conversely, when fifth strap 1478 is in use, terminal end 1482 is adjacent latching mechanism 1422". Additionally, the automatic adjustment of fifth strap 1478 allows the operator or passenger to easily move when wearing seat belt 1416". However, leg retractor 1476 includes an inertial lock which maintains the position of fifth strap 1478 during sudden movements.

Terminal end 1482 of fifth strap 1478 illustratively includes a tongue portion 1484. Tongue portion 1484 may be engaged with receptacle portion 1474 to secure fifth strap 1478 thereto. As such, latching mechanism 1422" may include two latching points—one latching point defined by the engagement between tongue portion 1472 and receptacle portion 1474 for securing first and third straps 1448 and 1460 to second and fourth straps 1454 and 1466, and a second latching point defined by the engagement between tongue portion 1484 and receptacle portion 1474 for securing fifth strap 1478 to first, second, third, and fourth straps 1448, 1454, 1460, and 1466. Alternatively, terminal end 1482 of fifth strap 1478 may be coupled to terminal ends 1452 and 1464 of respective first and third straps 1448 and 1460, such that latching mechanism 1422" includes only one single latching point defined by the engagement between tongue portion 1472 and receptacle portion 1474.

Leg retractor 1476 is coupled to front channel 440 of seat mounting bracket 126, and more particularly, is mounted to a middle portion of front channel 440. As shown best in FIG. 65, leg retractor 1476 is positioned below seat bottoms 62*b*, 64*b* of seats 62, 64. Additionally, leg retractor 1476 is generally positioned forward of seat bottoms 62*b*, 64*b*. Seat belt 1416" allows for easy mounting and dismounting therefrom because the operator and passenger are not required to pull seat belt 1416" over his or her head.

Figure 66:
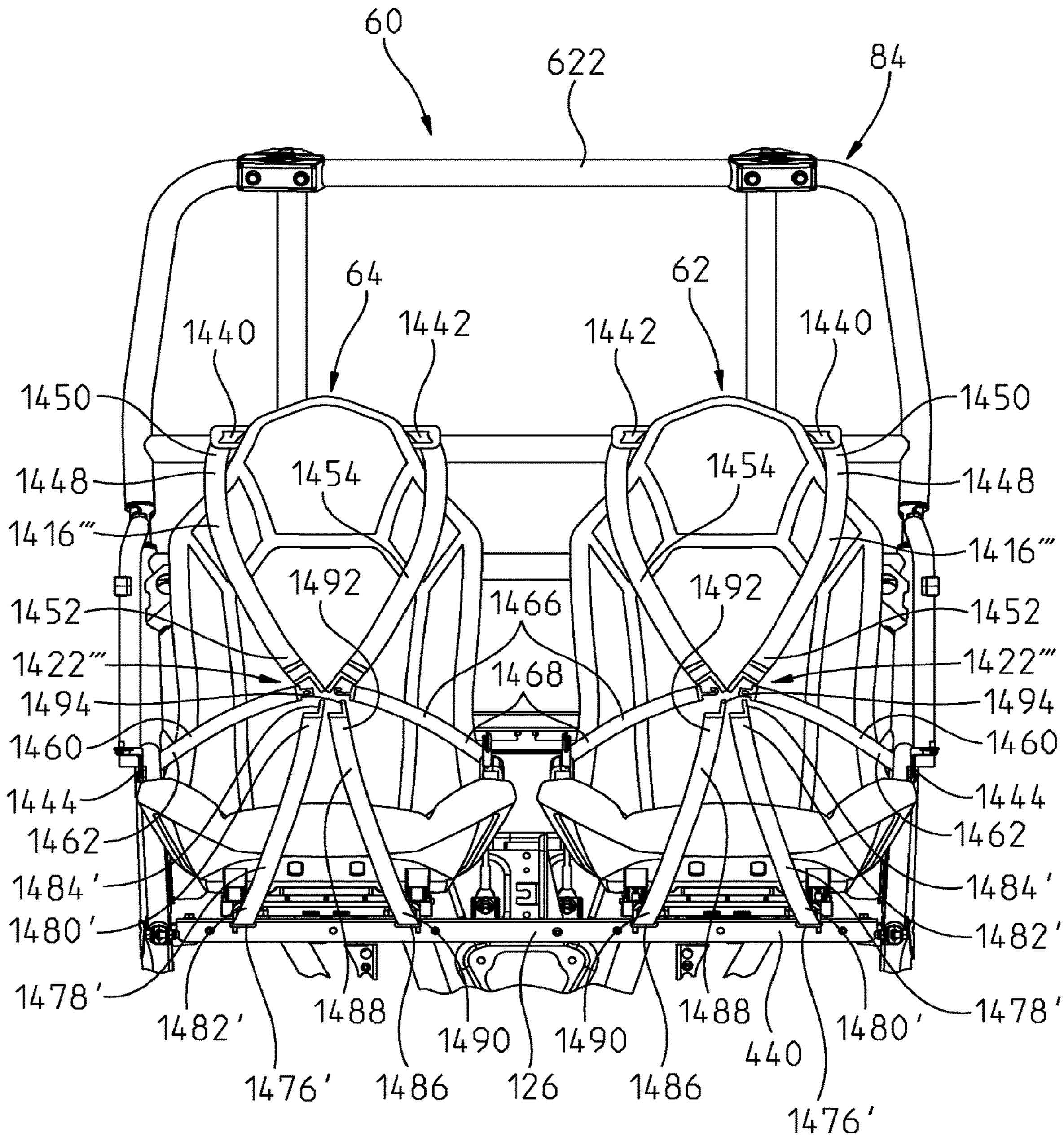
FIG. 66 is a front elevational view of the seating area of FIG. 65, showing the driver seat and the passenger seat with another alternative embodiment of the seat belts.

Alternatively, as shown in FIG. 66, seat belts 1416" include features similar to seat belts 1416" of FIG. 65, with like reference numerals indicating like elements, except as described below. Seat belts 1416''' may be six-point harnesses having a first point, illustratively outer shoulder retractor 1440 positioned near the head rest portion of seat backs 62*a* and 64*a*, a second point, illustratively inner shoulder retractor 1442 positioned opposite outer shoulder retractor 1440 and near the head rest portion of seat backs 62*a* and 64*a*, a third point, illustratively outer hip retractor 1444 positioned near seat bottoms 62*b* and 64*b*, a fourth point, illustratively inner hip retractor 1446 positioned generally opposite outer hip retractor 1444, a fifth point, illustratively an outer leg retractor 1476', and a sixth point, illustratively an inner leg retractor 1486. Seat belts 1416" also include a latching mechanism 1422" configured to be positioned against the operator's or passenger's chest and is generally centrally positioned between the first, second, third, fourth, fifth, and sixth points of seat belts 1416'''.

As detailed above with respect to seat belts 1416", outer shoulder retractor 1440 is coupled to first strap 1448, inner shoulder retractor 1442 is coupled to second strap 1454, outer hip retractor 1444 is coupled to third strap 1460, and inner hip retractor 1446 is coupled fourth strap 1466. Shoulder retractors 1440, 1442 and hip retractors 1444, 1446 automatically retract straps 1448, 1454, 1460, 1466 in order to automatically adjust the length of straps 1448, 1454, 1460, 1466 when the operator or passenger moves or when seat belts 1416" are not in use.

Seat belts 1416" include a fifth strap 1478' operably coupled to outer leg retractor 1476'. Fifth strap 1478' is configured to be positioned between the operator's or the passenger's legs. Fifth strap 1478' includes an anchor end 1480' coupled to outer leg retractor 1476' and a terminal end 1482' coupled to latch mechanism 1422'''. More particularly, terminal end 1482' may be coupled to a tongue portion 1484' which engages with receptacle portion 1474 of latch mechanism 1422'''. Alternatively, terminal end 1482' may be coupled to terminal ends 1452 and 1464 of first and third straps 1448 and 1460 such that tongue portion 1472 couples first, third, and fifth straps 1448, 1460, and 1478' with latch mechanism 1422'''.

Seat belts 1416''' further include a sixth strap 1488 operably coupled to inner leg retractor 1486. Sixth strap 1488 is configured to be positioned between the operator's or the passenger's legs. Sixth strap 1488 includes an anchor end 1490 coupled to inner leg retractor 1486 and a terminal end 1492 coupled to latch mechanism 1422'''. More particularly, terminal end 1492 may be coupled to a tongue portion 1494 which engages with receptacle portion 1474 of latch mechanism 1422'''. Alternatively, terminal end 1494 may be coupled to terminal ends 1458 and 1470 of second and fourth straps 1454 and 1466 such that receptacle portion 1474 couples second, fourth, and sixth straps 1454, 1466, and 1488 with first, third, and fifth straps 1448, 1460, and 1478'. As such, latching mechanism 1422''' includes one, two, or three latching points, depending on whether each of fifth and sixth straps 1478' and 1488 include respective tongue portions 1484' and 1494.

Outer and inner leg retractors 1476' and 1486 are configured to automatically adjust the length of fifth and sixth straps 1478' and 1488, such that when fifth and sixth straps 1478' and 1488 are not in use, terminal ends 1482' and 1490 are retracted and adjacent outer and inner leg retractors 1476' and 1486, respectively. Conversely, when fifth and sixth straps 1478' and 1488 are in use, terminal ends 1482' and 1490 are adjacent latching mechanism 1422'''. Additionally, the automatic adjustment of fifth and sixth straps 1478' and 1488 allows the operator or passenger to easily move when wearing seat belt 1416'''. However, outer and inner leg retractors 1476' and 1486 each include an inertial lock which maintains the positions of fifth and sixth straps 1478' and 1488 during sudden movements.

Outer and inner leg retractors 1476' and 1486 are coupled to front channel 440 of seat mounting bracket 126, and more particularly, outer leg retractor 1476' is mounted to an outer end portion of front channel 440, and inner leg retractor 1486 is mounted to an inner end portion of front channel 440. As shown best in FIG. 66, outer and inner leg retractors 1476' and 1486 are positioned below seat bottoms 62*b*, 64*b* of seats 62, 64. Additionally, outer and inner leg retractors 1476' and 1486 are generally positioned forward of seat bottoms 62*b*, 64*b*. Seat belt 1416" allows for easy mounting and dismounting therefrom because the operator and passenger are not required to pull seat belt 1416" over his or her head.

Figure 67:
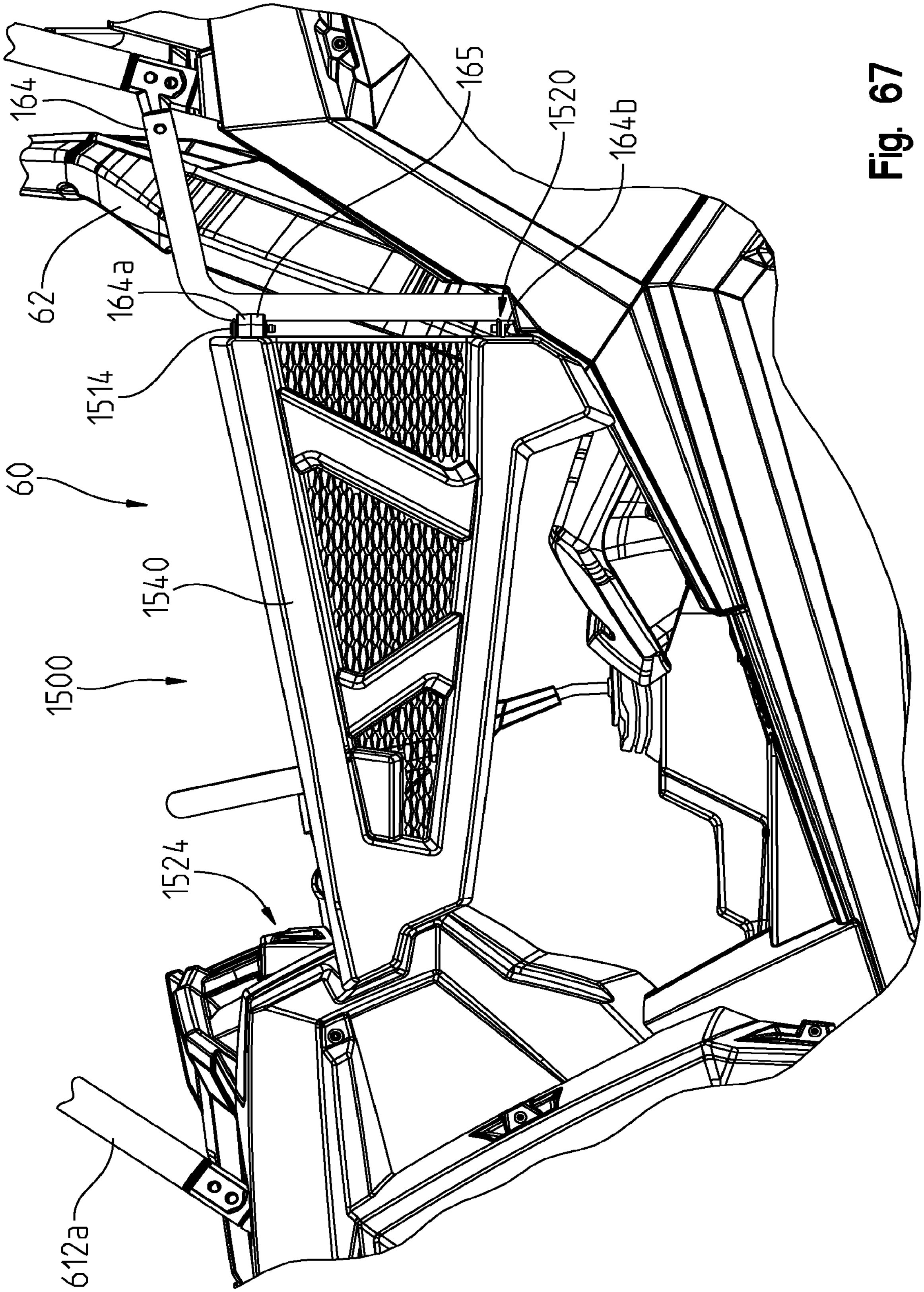
FIG. 67 is a side perspective view of a door assembly of the vehicle of the present invention.
Figure 68:
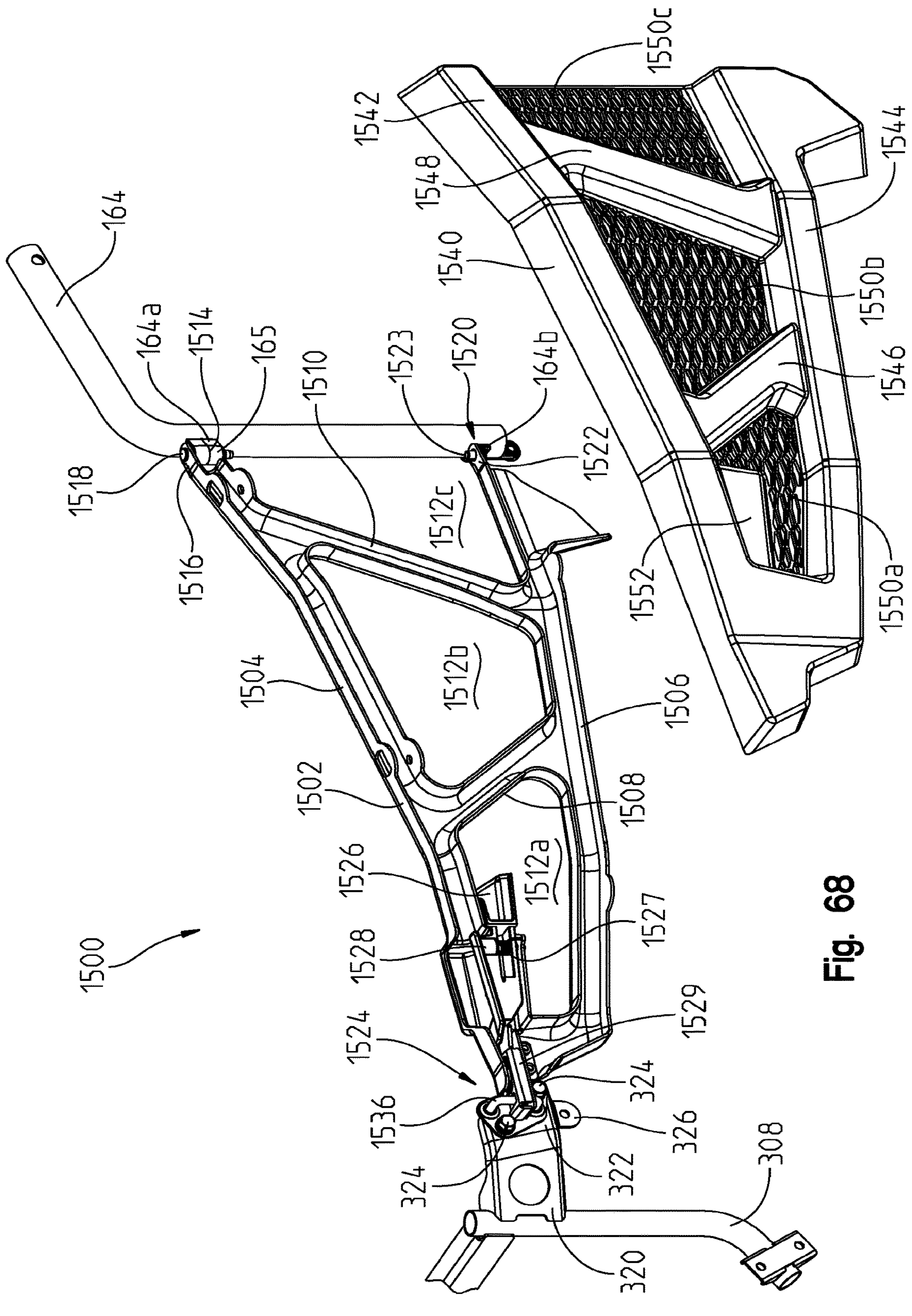
FIG. 68 is an exploded view of the door assembly of FIG. 67.
Figure 69:
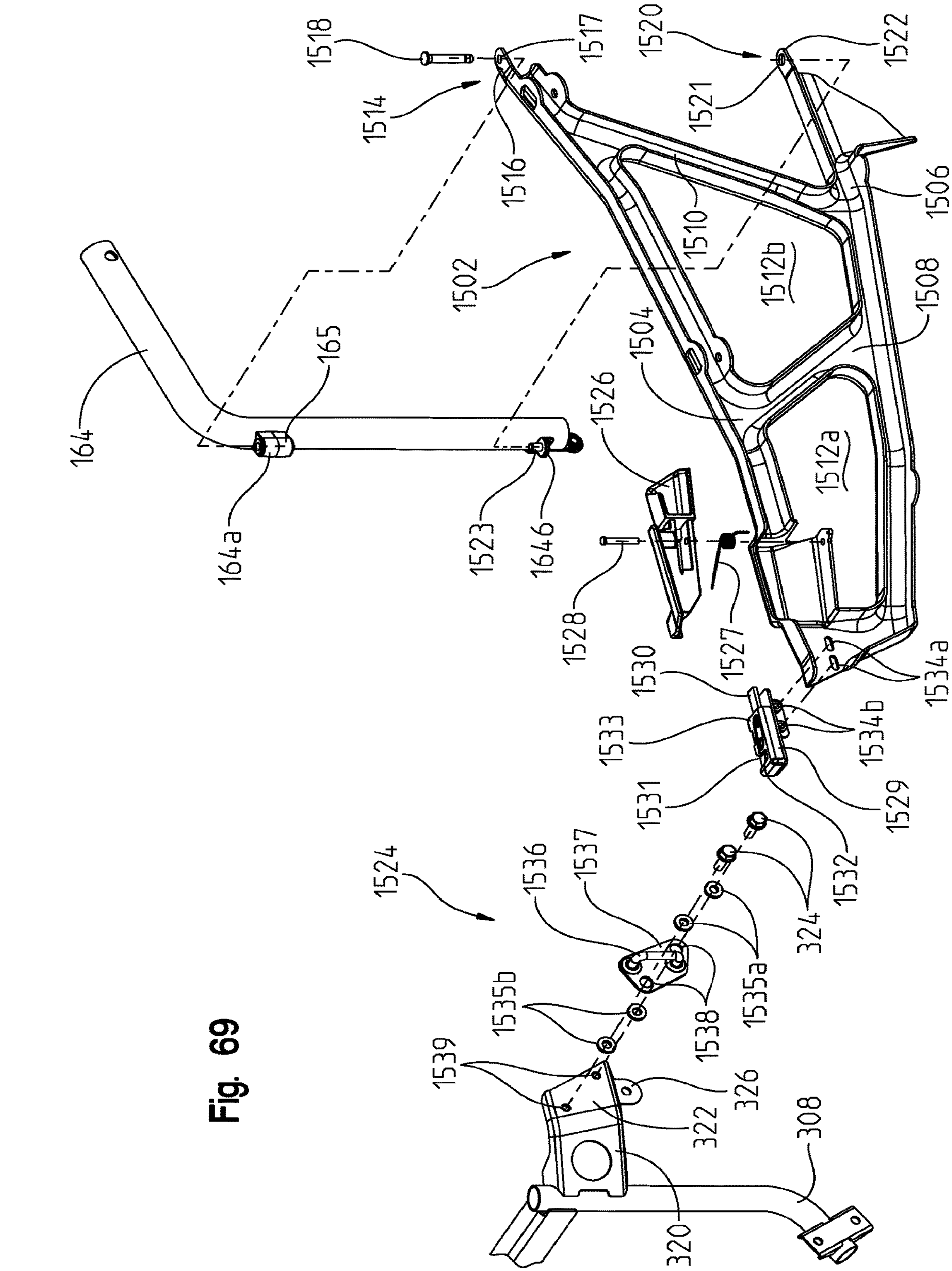
FIG. 69 is an exploded view of a frame, a hinge assembly, and a latch assembly of the door assembly of FIG. 68.

In addition to seat belts 1416, 1416', 1416", or 1416''', door assemblies 1500 also help retain the operator and passenger within vehicle 10. Door assemblies 1500 are positioned adjacent both driver seat 62 and passenger seat 64. As shown in FIGS. 67-69, door assembly 1500 includes a frame 1502, hinges 1514 and 1520, a latch assembly 1524, and an outer cover 1540. In the embodiment of FIG. 67, frame 1502 is comprised of a metal or polymeric material and, illustratively, is stamped to define a plurality of frame members, including an upper frame member 1504, a lower frame member 1506, a first brace 1508, and a second brace 1510. Upper and lower frame members 1504 and 1506 extend between side tube 164 and mounting tube 308. Braces 1508, 1510 extend between upper and lower frame members 1504 and 1506 to define openings 1512*a*, 1512*b*, and 1512*c*.

The rear ends of upper and lower frame members 1504 and 1506 are hingedly coupled to side tubes 164 through hinges 1514 and 1520. More particularly, a projection 1516 extending from upper frame member 1504 is positioned above hinge component 164*a* and is pivotally coupled thereto with a fastener 1518. Similarly, a projection 1522 extends from lower frame member 1506 and is pivotally coupled to hinge component 164*b* with fastener 1523. As such, door frame 1502 is pivotally coupled to side tube 164.

Figure 70:
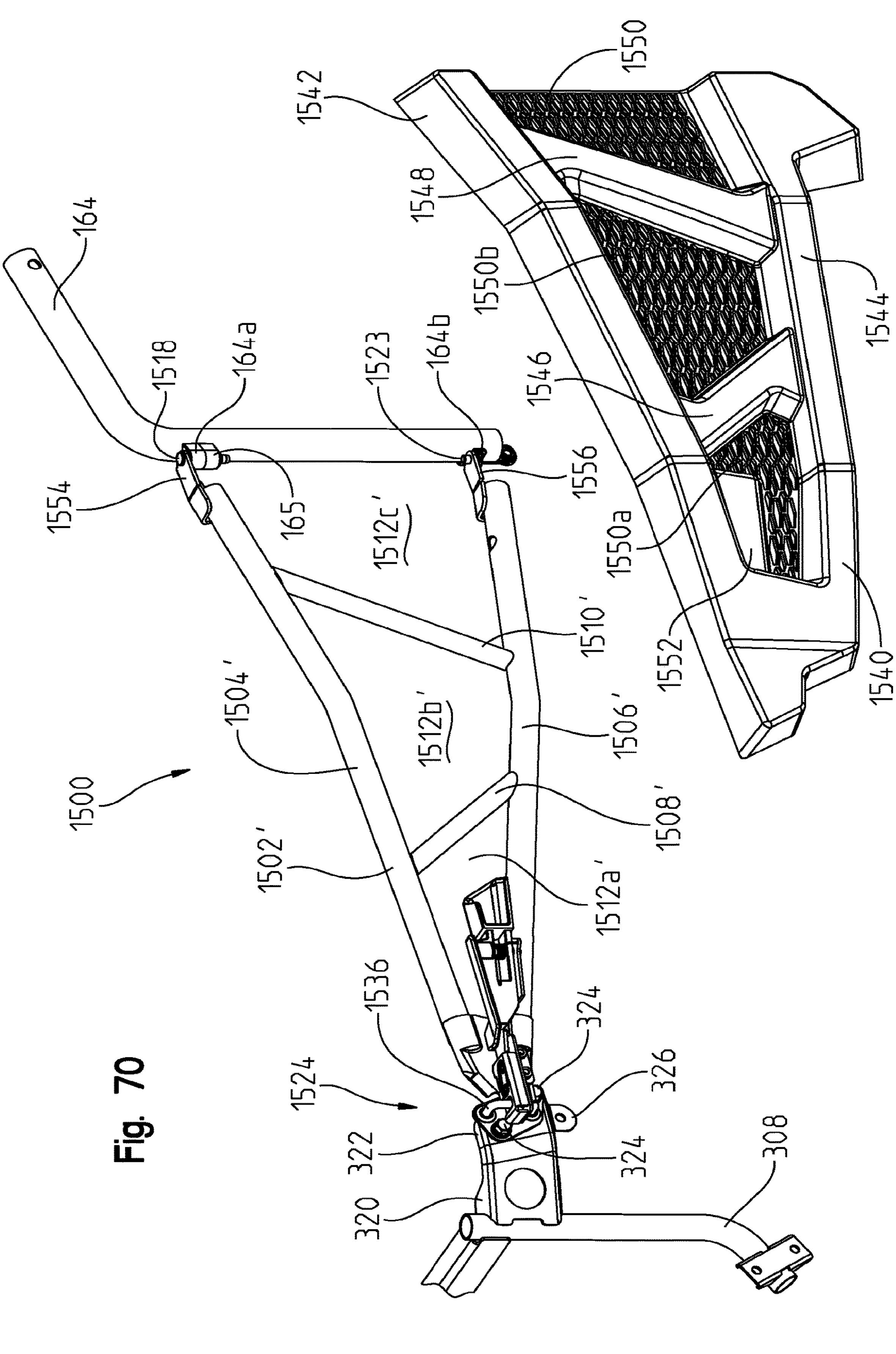
FIG. 70 is an exploded view of an alternative embodiment of the door assembly of FIG. 67.

Alternatively, as shown in FIG. 70, door assembly 1500 may include a frame 1502' comprised of a plurality of frame members welded together. Frame 1502' of FIG. 70 includes features similar to those of frame 1502 of FIG. 68, with like reference numerals indicating like features, except as disclosed below. Frame 1502' includes an upper frame member 1504', a lower frame member 1506', a first brace 1508', and a second brace 1510'. First and second braces 1508', 1510' extend between upper and lower frame members 1504', 1506' to define openings 1512*a'*, 1512*b'*, 1512*c'*.

Referring to FIG. 70, upper frame member 1504' of frame 1502' is pivotally coupled to side tube 164 through hinge component 164*a* and a tab 1554 coupled thereto with fastener 1518. Tab 1554 is welded or otherwise coupled to upper frame member 1504' and illustratively rests atop hinge component 164*a*. Similarly, lower frame member 1506' includes a tab 1556 welded or otherwise coupled thereto in order to pivotally couple lower frame member 1506' to side tube 164. Tab 1556 rests atop hinge component 164*b* and is coupled to hinge component 164*b* with fastener 1523. Latch assembly 1524 is welded or otherwise coupled to frame 1502' and, illustratively, is coupled to lower frame member 1506'.

Regardless of whether door assembly 1500 includes frame 1502 or 1502', upper frame member 1504 is operably coupled mounting tube 308 and bracket 320 through latch assembly 1524 (FIGS. 68 and 69). Latch assembly 1524 includes a handle 1526 operably coupled to frame 1502 through a spring 1527 and a pin 1528. The tension in spring 1527 allows handle 1526 to rotate relative to frame 1502, as is further detailed herein.

Latch assembly 1524 further includes a housing 1529 coupled to frame 1502 with conventional fasteners (not shown) extending through apertures 1534*a* of frame 1502 and apertures 1534*b* of housing 1529. An arm 1530 is positioned within housing 1529 and overlaps a portion of handle 1526. An opening or cut-out 1531 of arm 1530 is configured to engage a latching hook 1536 when securing door assembly 1500 to frame 12 of vehicle 10, as is further detailed herein. A groove or opening 1532 of housing 1529 exposes opening 1531 of arm 1530. A mechanism 1533 for rotating arm 1530 between an open position and a closed position also is supported by housing 1529.

Latching hook 1536 is supported on flange 322 of bracket 320. A plate member 1537 is proximate flange 322 and secures latching hook 1536 thereto with fasteners 324. Fasteners 324 are received through apertures 1538 of plate member 1537 and apertures 1539 of flange 322. Washers 1535*b* may be intermediate plate member 1537 and flange 322. Additionally, washers 1535*a* may be intermediate fasteners 324 and plate member 1537.

Alternative embodiments of latch assembly 1524 may be configured with a double-acting latch that allows door assembly 1500 to be partially released from frame 12 when in a first position and fully released when in a second position. A catch mechanism (not shown) may be used to partially release door assembly from frame 12 while preventing door assembly 1500 from rotating to the open position.

Cover 1540 may be outward of frame 1502 and coupled thereto. Cover includes an upper longitudinal member 1542 generally corresponding to upper frame member 1504 and a lower longitudinal member 1544 generally corresponding to lower frame member 1506. Cover further includes a first cross member 1546 and a second cross member 1548 generally corresponding to first and second braces 1508 and 1510, respectively. Longitudinal members 1542, 1544, and cross members 1546, 1548 may be comprised of a polymeric material. Covered portions 1550*a*, 1550*b*, and 1550*c* extend between longitudinal members 1542, 1544 and cross members 1546, 1548 to generally correspond to openings 1512*a*, 1512*b*, and 1512*c*, respectively. Covered portions 1550 may be comprised of a fabric or polymeric material, such as mesh, netting, webbing, or other similar materials. Covered portions 1550 may allow air to flow through door assembly 1500 and also provide additional protection for the operator and passenger. Covered portion 1550*a* may include an opening 1552 for exposing handle 1526 of latch assembly 1524.

Door assembly 1500 may further include side nets or, alternatively, may be comprised of side nets, additional details of which are disclosed in U.S. patent application Ser. No. 12/484,888, filed on Jun. 15, 2009; and U.S. patent application Ser. No. 12/796,495, filed on Jun. 8, 2010, the complete disclosures of which are expressly incorporated by reference herein. The side nets may be coupled to side tubes 164, or alternatively, side tubes 164 may be removed from frame 12 such that the side nets are coupled to portion 154*b* of outer frame rail 154.

Figure 71:
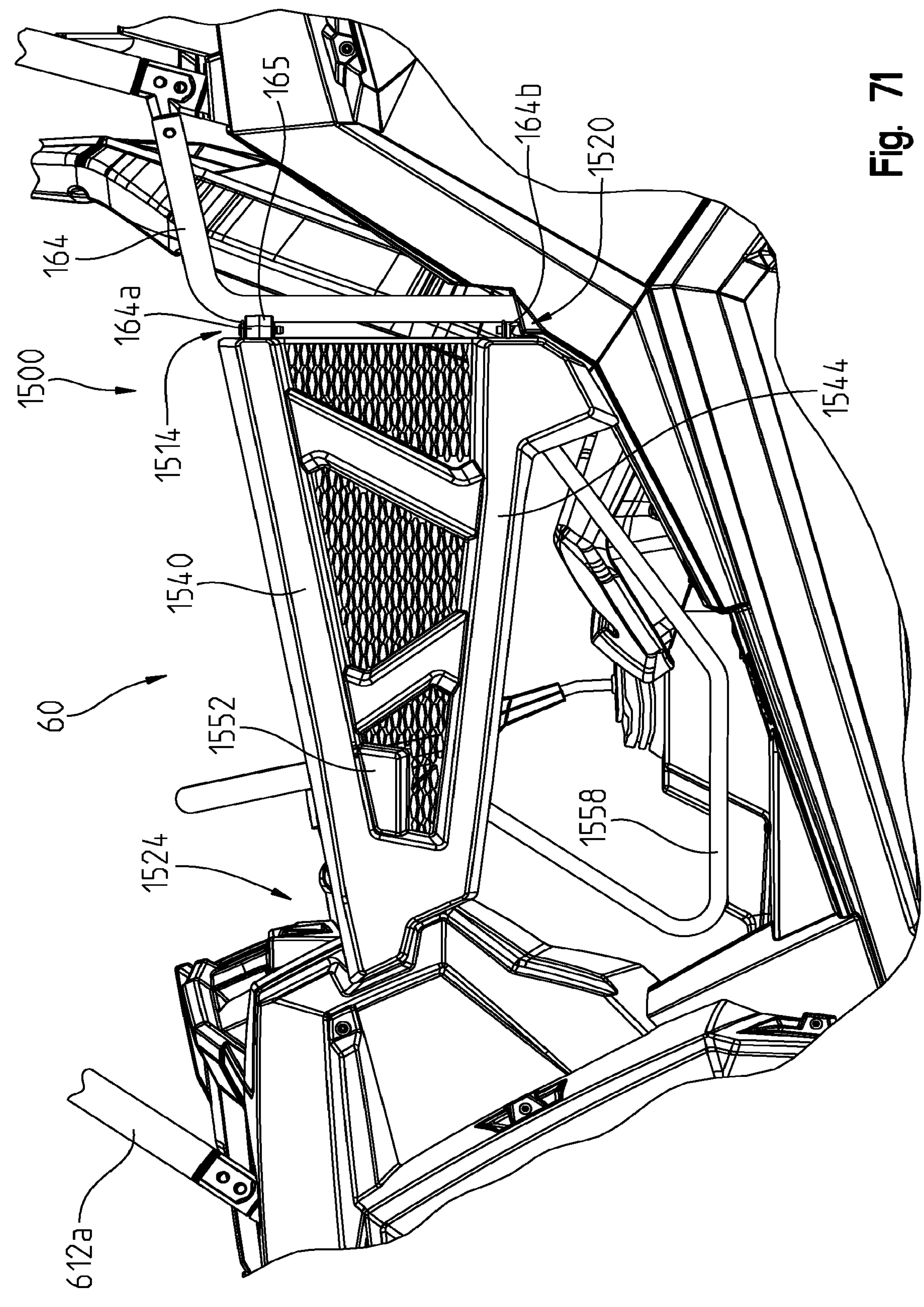
FIG. 71 is a side perspective view of an alternative embodiment of the door assembly of FIGS. 67 and 70.

Referring to FIG. 71, regardless of whether door assembly 1500 includes stamped frame 1502 or welded frame 1502', door assembly 1500 may also include a security bar 1558 extending therefrom. As shown in FIG. 71, security bar 1558 extends below frame 1502 and cover 1540 and may be generally U-shaped. Bar 1558 is coupled to lower frame member 1504 of frame 1502, or alternatively, may be coupled to lower longitudinal member 1544 of cover 1540. Security bar 1558 is positioned adjacent the operator's or passenger's legs to further stabilize and secure the operator and passenger within vehicle 10.

Figure 72:
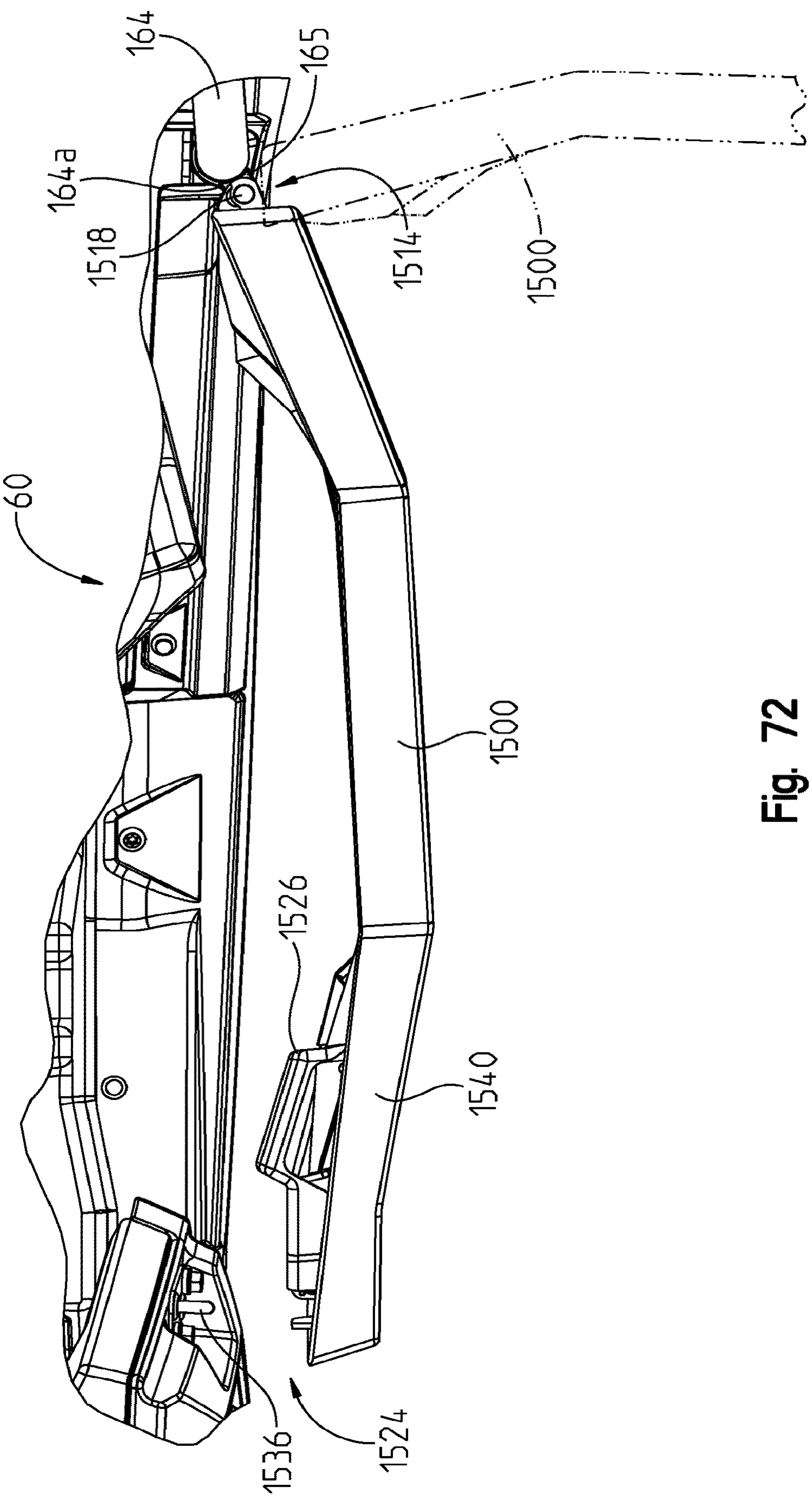
FIG. 72 is a top elevational view of the door assembly.

As shown in FIG. 72, door assembly 1500 is configured to pivot about hinge 1514 and hinge 1520 in a counter clockwise direction. In operation, door assembly 1500 is secured to frame 12 of vehicle 10 when arm 1530 is engaged with latching hook 1537. When handle 1526 is pulled inwardly, handle 1526 contacts arm 1530 such that mechanism 1533 causes arm 1530 to rotate away from latching hook 1536. As such, when handle 1526 is pulled, opening 1531 of arm 1530 no longer engage latching hook 1536 and door assembly 1500 may be swung open and moved away from frame 12. When door assembly 1500 is closed and secured to frame 12, mechanism 1533 causes opening 1531 of arm 1530 to engage latching hook 1536. A sound, for example a "click," may be heard when latch assembly 1524 is positively engaged and door assembly 1500 is fully secured to frame 12. An exemplary embodiment of latch assembly 1524 may be available from Eberhard Manufacturing Company.

Illustratively, when door assembly 1500 is in the open position, door assembly is angled approximately 90 degrees from side tube 164. Hinge component 164*a* includes a stop surface 165 (FIGS. 67-72) which contacts cover 1540 of door assembly 1500 to prevent door assembly 1500 from rotating past approximately 90 degrees when in the open position. By limiting the rotation of door assembly 1500 to approximately 90 degrees, the operator and passenger are able to easily close door assembly 1500 when entering vehicle 10. Furthermore, door assembly 1500 may be tapered inwardly such that door assembly 1500 may naturally rotate towards frame 12 to assist the operator and passenger when closing door assembly 1500.

Figure 73:
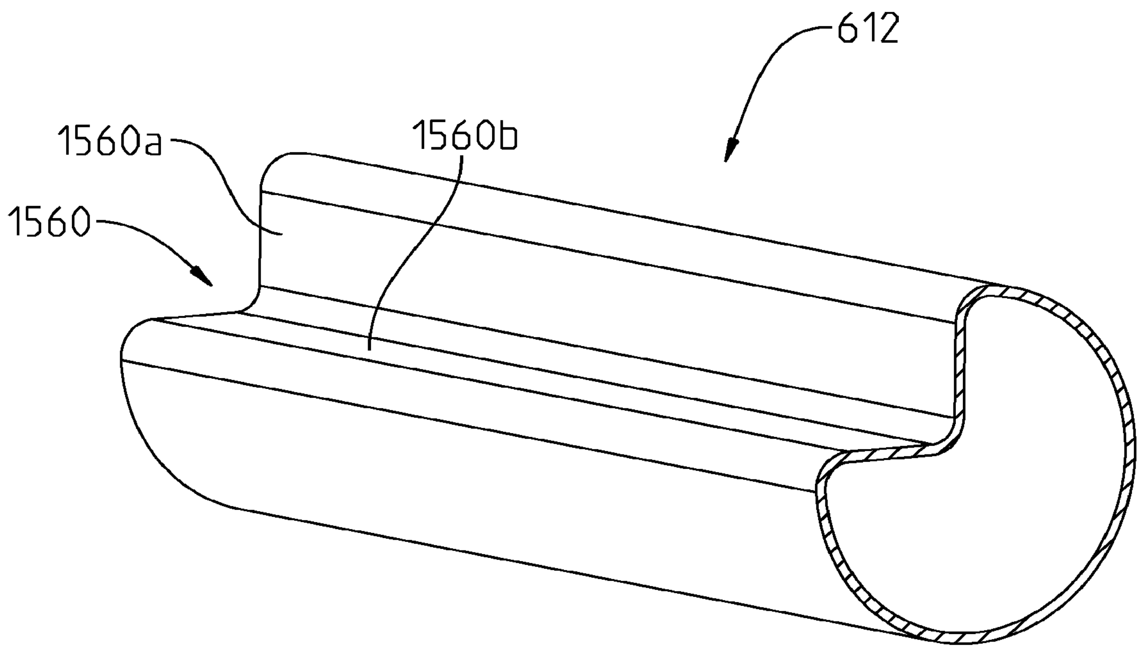
FIG. 73 is a cross-sectional view of a frame tube of a cab frame section of the vehicle of the present invention.

As shown in FIG. 67, door assembly 1500 may be generally flush with body portion 40 of vehicle 10 such that door assembly 1500 does not extend outwardly from vehicle 10 when in the closed position. Alternative embodiments of door assembly 1500 may be full doors that extend between outer frame rails 154 (FIG. 9) and frame portion 612 of cab frame section 84 (FIG. 28). The full doors also would be flush with frame 12 when closed because frame members, such as frame portion 612, may be profiled. As shown in FIG. 73, frame portion 612 may have a channel 1560 with opposing surfaces 1560*a* and 1560*b*. An inner surface of the full door may rest against surface 1560*b* and an upper surface of the full door may rest against surface 1560*a* in order to remain flush with body portion 40 when in the closed position. Additionally, frame 12 may include members with two profiled surfaces, additional details of which are disclosed in U.S. patent application Ser. No. 13/492,589, filed on Jun. 8, 2012, the complete disclose of which is expressly incorporated by reference herein.

Figure 74:
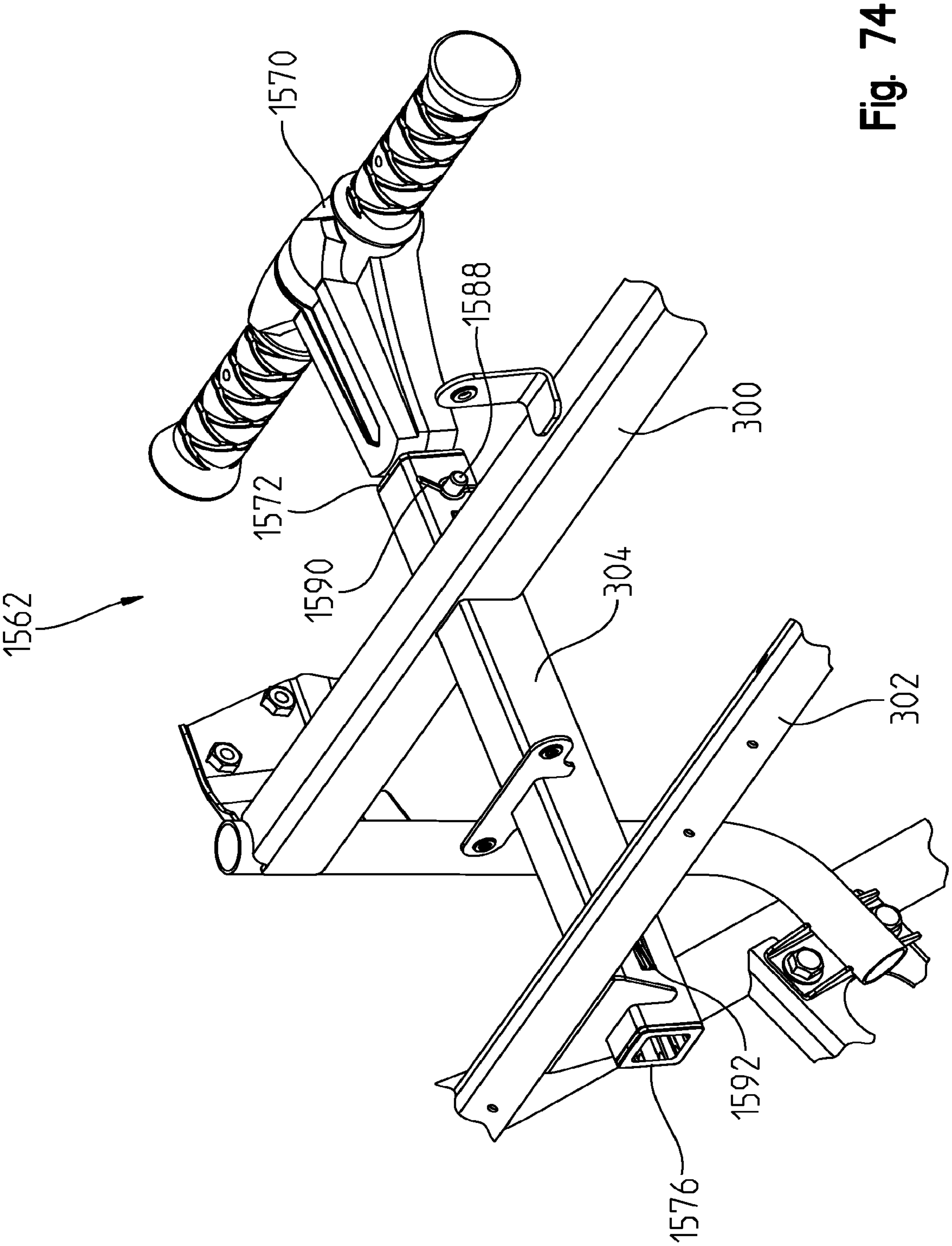
FIG. 74 is a rear perspective view of a passenger grab bar.
Figure 75:
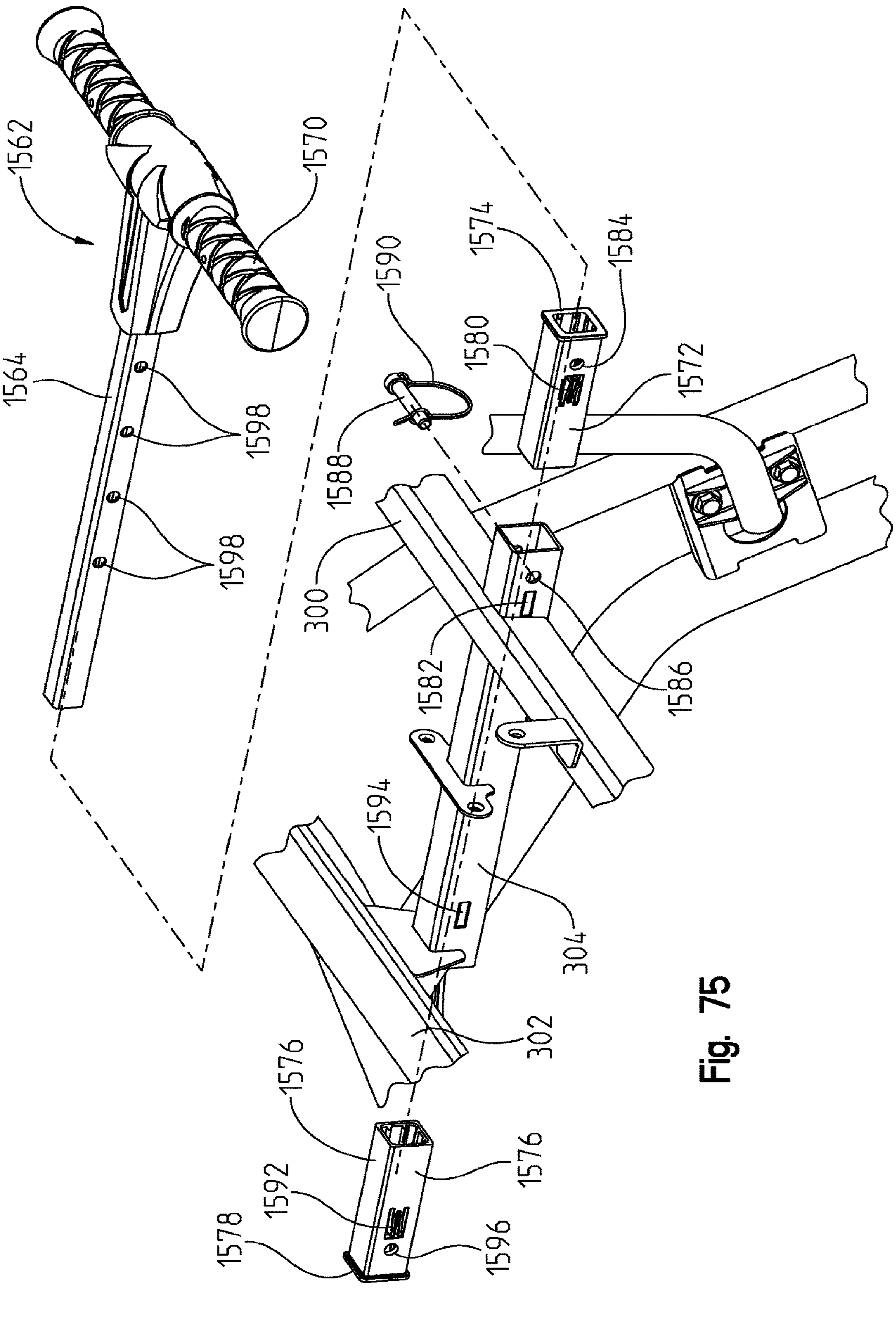
FIG. 75 is an exploded view of the passenger grab bar of FIG. 74.
Figure 76:
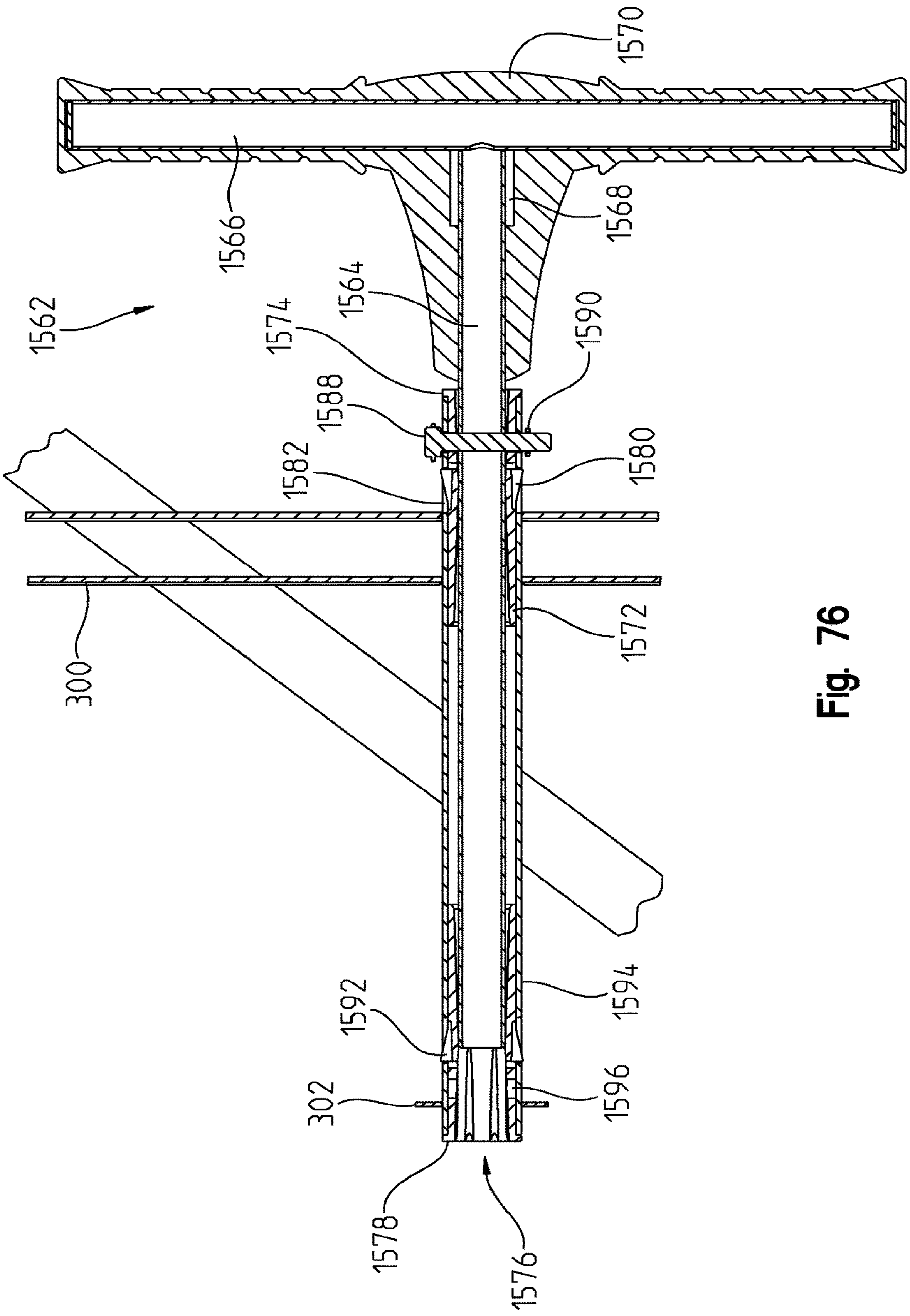
FIG. 76 is a cross-section view of the passenger grab bar of FIG. 74.

Referring to FIGS. 74-76, the operator area contained between door assembly 1500 includes a grab bar 1562 positioned forward of passenger seat 64 and extending towards the passenger. As shown best in FIGS. 75 and 76, grab bar 1562 includes a shaft 1564 and a handle member 1566. Illustratively, handle member 1566 and shaft 1564 define a square in cross-section; however, handle member 1566 and shaft 1564 may define other shapes in cross-section, for example a circle or triangle. Shaft 1564 includes a plurality of apertures 1598 which allows grab bar 1562 to telescope closer to, or further from, the passenger. Handle member 1566 is generally perpendicular to shaft 1564 and defines opposing gripping portions for the passenger to hold onto during operation of vehicle 10. Handle member 1566 may be coupled to shaft 1564 with a coupler 1568 positioned at the coupling location of handle member 1566 and shaft 1564. Handle member 1566 and shaft 1564 may be comprised of a polymeric or metal material, and, in addition to coupler 1568, may be coupled together with conventional fasteners, such as bolts, clips, screws, pins, welds, rivets, adhesive, or other similar components.

A grip or cover 1570 generally surrounds handle member 1566 and a portion of shaft 1564. Grip 1570 has a generally rounded shape that allows the passenger to comfortably grip grab bar 1562. Grab bar 1562 may be comprised of a polymeric material, for example a vibration isolating material.

Grab bar 1562 is supported on upper frame portion 190, and more particularly, on transverse tube 300 and transverse channel 302. Shaft 1564 is positioned within cross tube 304 and is configured to telescope relative thereto, as is further detailed herein. A first or rear insert member 1572 is adjacent grip 1570 and is positioned intermediate shaft 1564 and cross tube 304. Rear insert member 1572 includes a lip 1574 to prevent rear insert member 1572 from sliding forward in cross tube 304. Rear insert member 1572 may include a protrusion 1580 which is received within an aperture 1582 of cross tube 304 to further retain rear insert member 1572 within cross tube 304. Protrusion 1580 may be detent fingers or other resilient members configured to slide against the inner surface of cross tube 304 and extend outwardly at aperture 1582. Rear insert member 1572 further includes at least one opening 1584 which generally corresponds to an opening 1586 of cross tube 304 when rear insert member 1572 is positioned therein. A pin 1588 and a clip 1590 may be received through openings 1584 and 1586 of respective rear insert member 1572 and cross tube 304. Furthermore, when shaft 1564 is positioned within cross tube 334, pin 1588 may be inserted through openings 1584, 1586, and one of apertures 1598 in order to lock the position of grab bar 1562 relative to cross tube 304. The square cross-section of shaft 1564 does not allow rotation within cross tube 304, and therefore, may prevent grab bar 1562 from rattling or moving when vehicle 10 is in use. Additionally, illustrative rear insert member 1572 is a bushing that may be comprised of a polymeric material to further prevent rattling or movement or between shaft 1564 and cross tube 304.

A second or forward insert member 1576 is intermediate shaft 1564 and cross tube 304 and is generally opposite rear insert member 1572. Forward insert member 1576 includes a lip 1578 and is positioned generally below transverse channel 302. Forward insert member 1576 may be comprised of a polymeric material and illustratively is a bushing between shaft 1564 and cross tube 304. Forward insert member 1576 also may include a protrusion 1592 that extends from an aperture 1594 of cross tube 304 to couple forward insert member 1576 to cross tube 304. Protrusion 1592 may be detent fingers or other resilient members configured to slide against the inner surface of cross tube 304 and extend outwardly from aperture 1594. Forward insert member 1576 further includes at least one opening 1596 which may correspond to an opening (not shown) of cross tube 304 when forward insert member 1576 is positioned therein. Conventional fasteners, such as pins, clips, bolts, and screws may be received through opening 1596 of forward insert member 1576 and the corresponding opening in cross tube 304.

In operation, when the passenger desires to change the position of grab bar 1562, pin 1588 and clip 1590 are removed from cross tube 304, rear insert member 1572, and shaft 1564. Grab bar 1562 is pulled in a generally rearward direction relative to cross tube 304 in order to position grab bar 1562 closer to the passenger. Conversely, grab bar 1562 is pushed in a generally forward direction relative to cross tube 304 in order to position grab bar 1562 further from the passenger. When grab bar 1562 is in the desired position, one of apertures 1598 aligns with openings 1584 of rear insert member 1576 and openings 1586 of cross tube 304 in order to receive pin 1588 therethrough. Clip 1590 also is coupled to pin 1588. As such, the configuration of grab bar 1562 accommodates different passengers with different physical characteristics, such as different heights or different arm lengths. Additional details of grab bar 1562 are available in U.S. patent application Ser. No. 13/492,589, filed on Jun. 8, 2012, the complete disclose of which is expressly incorporated by reference herein.

Figure 77:
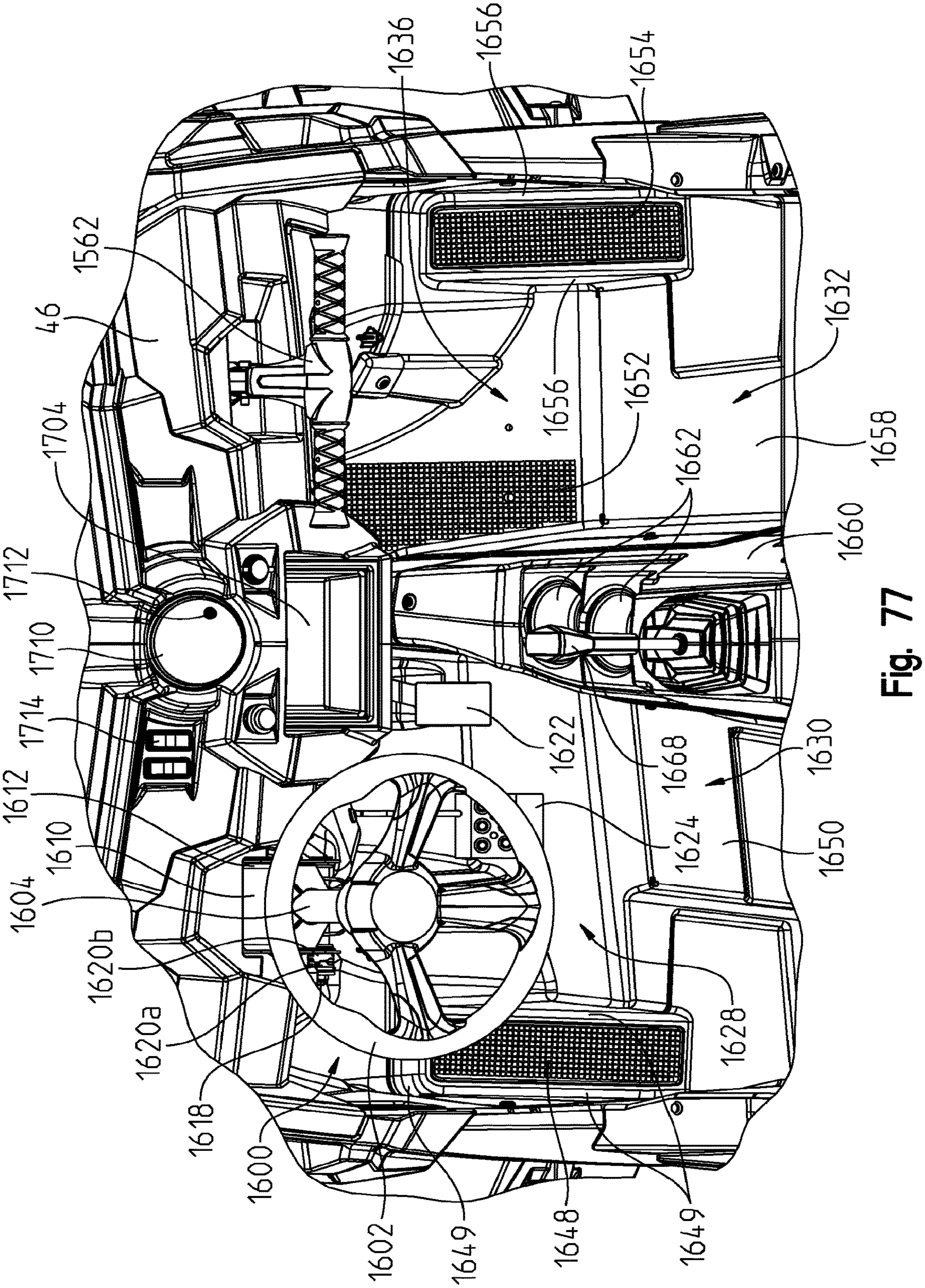
FIG. 77 is a rear perspective view of the operator area of the vehicle of the present invention, including a steering wheel assembly, the passenger grab bar of FIG. 74, and operator controls.
Figure 78:
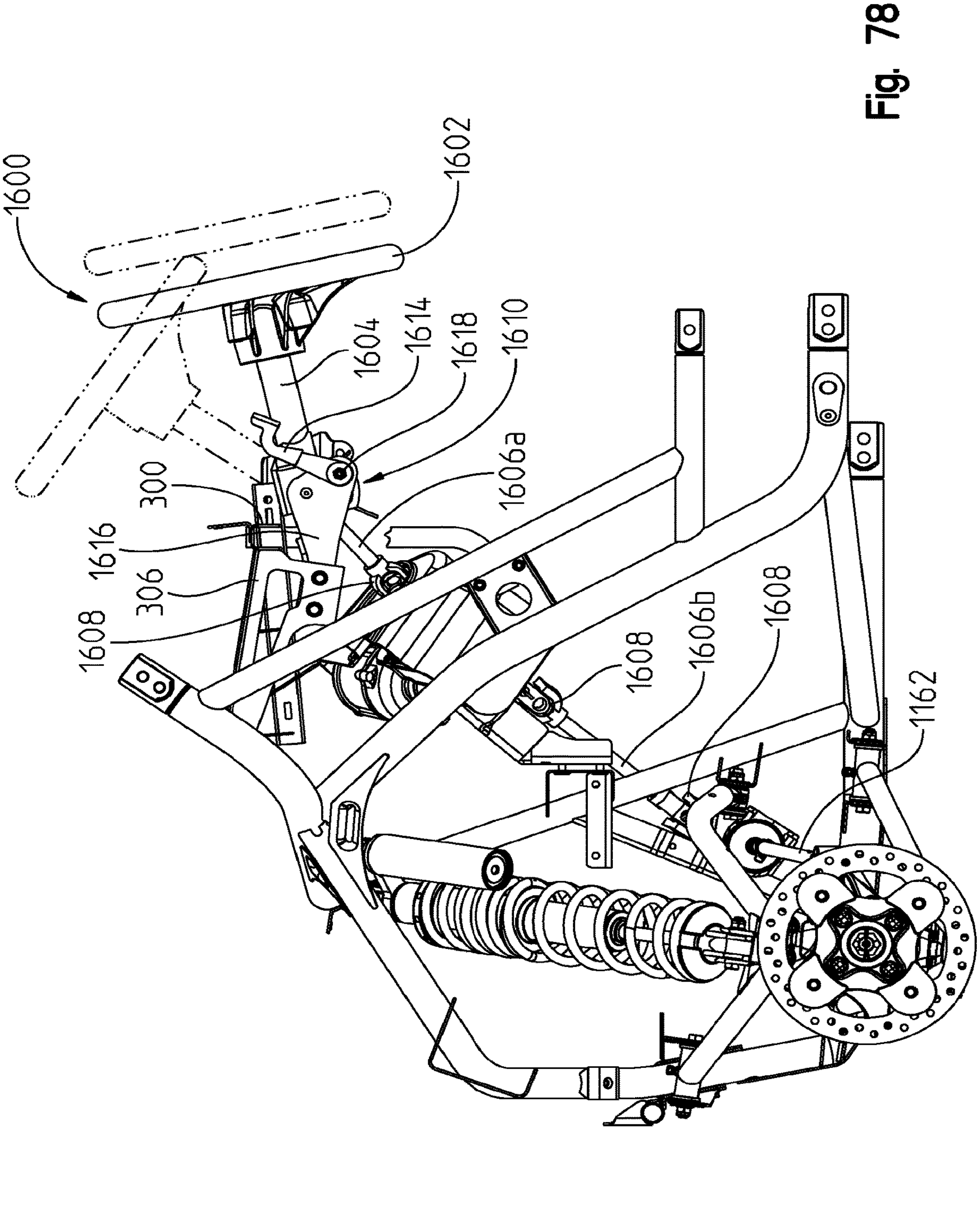
FIG. 78 is a side view of the steering wheel assembly of FIG. 77.

As shown in FIGS. 77 and 78, the operator controls in the operator area also include a steering assembly 1600 having a steering wheel 1602, a steering column 1604, a steering rod 1606 having portions 1606*a* and 1606*b*, steering shafts 1162 operably coupled to ground engaging members 14, and a steering adjustment mechanism 1610. Steering wheel 1602 is operably coupled to steering rod portion 1606*a* through steering column 1604 and a U-joint 1608. Steering rod portions 1606*a* and 1606*b* are operably coupled to each other through a U-joint 1608 and are operably coupled to steering shafts 1162 through a U-joint 1608.

Referring to FIG. 78, steering wheel 1602 and steering column 1602 are forward of driver seat 62 and are supported on transverse tube 300 through steering mount 306. Steering adjustment mechanism 1610 allows steering column 1604 and steering wheel 1602 to tilt upwardly or downwardly to accommodate the preferences of various operators. Additionally, steering adjustment mechanism 1610 may allow steering wheel 1602 to telescope relative to transverse tube 300 to adjust the fore and aft position of steering wheel 1602 (i.e., to adjust the position of steering wheel 1602 closer or further from the operator).

Steering adjustment mechanism 1610 includes a housing 1612, a lever 1614, a lever bracket 1616, a coupler 1618, and friction pads or plates 1620. Housing 1612 may be comprised of a metal material and generally surrounds a portion of steering column 1604. Lever 1614 is supported on housing 1612 by lever bracket 1616 such that lever 1614 is outside of housing 1612. Lever 1614 is coupled to bracket 1616 and housing 1612 by coupler 1618.

Friction pads 1620 are intermediate housing 1612 and lever bracket 1616, and illustratively include a first pad 1620*a* and a second pad 1620*b*. Coupler 1618 may extend through apertures (not shown) in friction pads 1620*a*, 1620*b* to secure friction pads 1620*a*, 1620*b* between housing 1612 and lever bracket 1616. Friction pads 1620*a* and 1620*b* are comprised of a polymeric or friction material and have complimentary and adjacent profiled surfaces at the interface therebetween. For example, friction pad 1620*a* may have a convex profiled surface facing a concave profiled surface on friction pad 1620*b*. The profiled surfaces frictionally engage each other in order to maintain a particular position and tilt angle of steering wheel 1602.

In order to tilt steering wheel 1602, the operator actuates lever 1614, which disengages friction pad 1620*a* from friction pad 1620*b*. As such, friction pad 1620*a* is not frictionally engaged with friction pad 1620*b*, which allows steering wheel 1602 to move or tilt relative to housing 1612. More particularly, the operator is able to push up or pull down on steering wheel 1602 when the profiled surface of friction pad 1620*a* is not frictionally held against the profiled surface of friction pad 1620*b*. As shown best in FIG. 78, the tilt angle of steering wheel 1602 may be approximately 45 degrees.

When steering wheel 1602 is in the desired position, lever 1614 is again actuated in order to frictionally engage friction pad 1620*a* with friction pad 1620*b*. More particularly, the profiled (e.g., convex) surface of friction pad 1620*a* aligns or mates with the profiled (e.g., concave) surface of friction pad 1620*b* to retain steering wheel 1602 in a particular position. The engagement between friction pads 1620*a*, 1620*b* also may prevent rattling or other movement in steering assembly 1600. Exemplary components of steering assembly 1600 may be available from Admiral Tool & Manufacturing Co. of Michigan.

Alternative embodiments of steering adjustment mechanism 1610 may include grooves or apertures that receive a pin or other similar device in order to move steering wheel 1602 incrementally when the pin is released from the aperture or groove. A further alternative embodiment of steering adjustment mechanism 1610 includes a gas shock absorber positioned below steering wheel 1602 for adjusting the tilt position of steering wheel 1602, additional details of which may be available in U.S. patent application Ser. No. 13/492,589, filed on Jun. 8, 2012, the complete disclose of which is expressly incorporated by reference herein.

Figure 79:
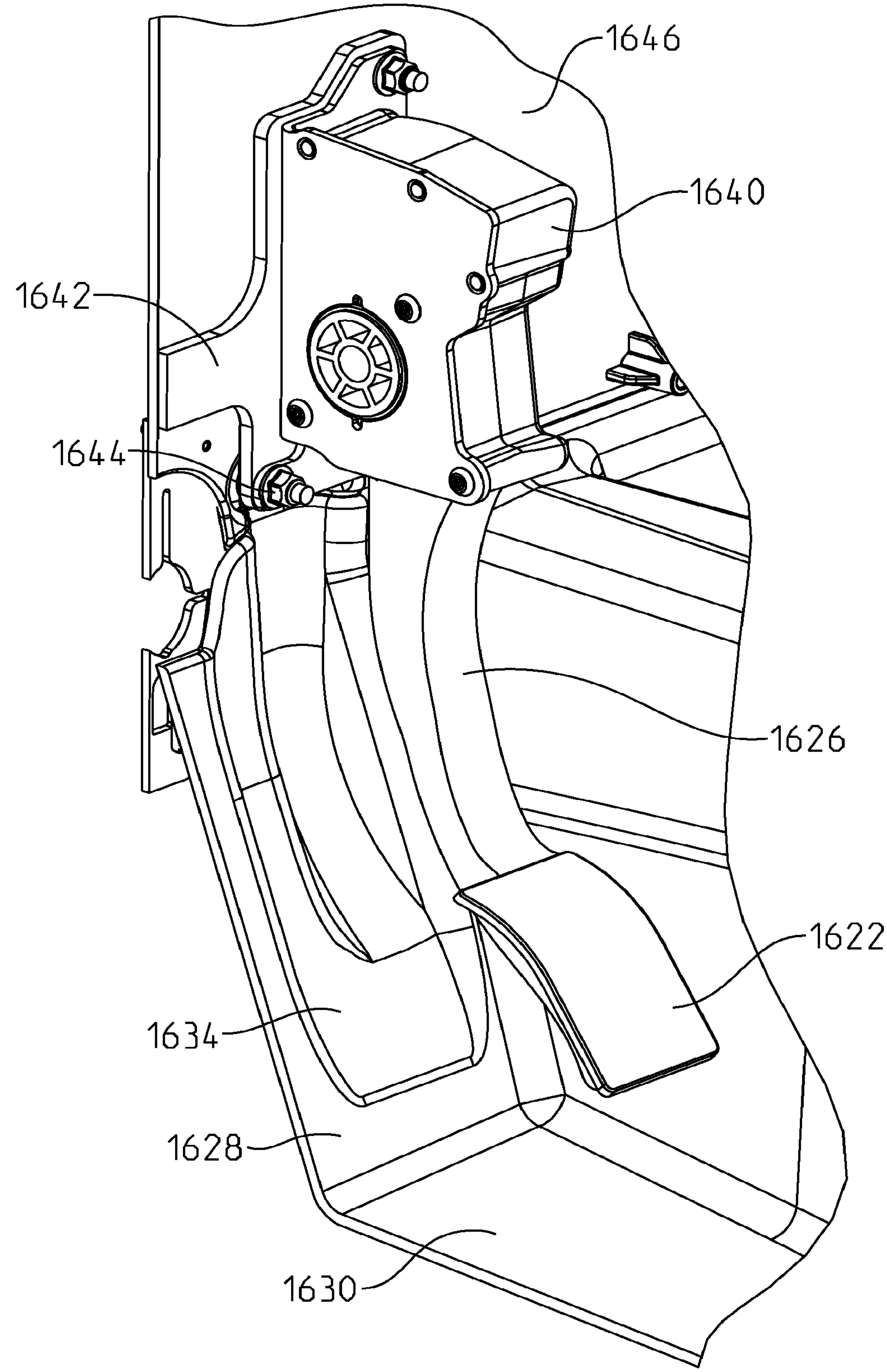
FIG. 79 is a rear perspective view of an accelerator pedal assembly of the vehicle of the present invention.
Figure 80:
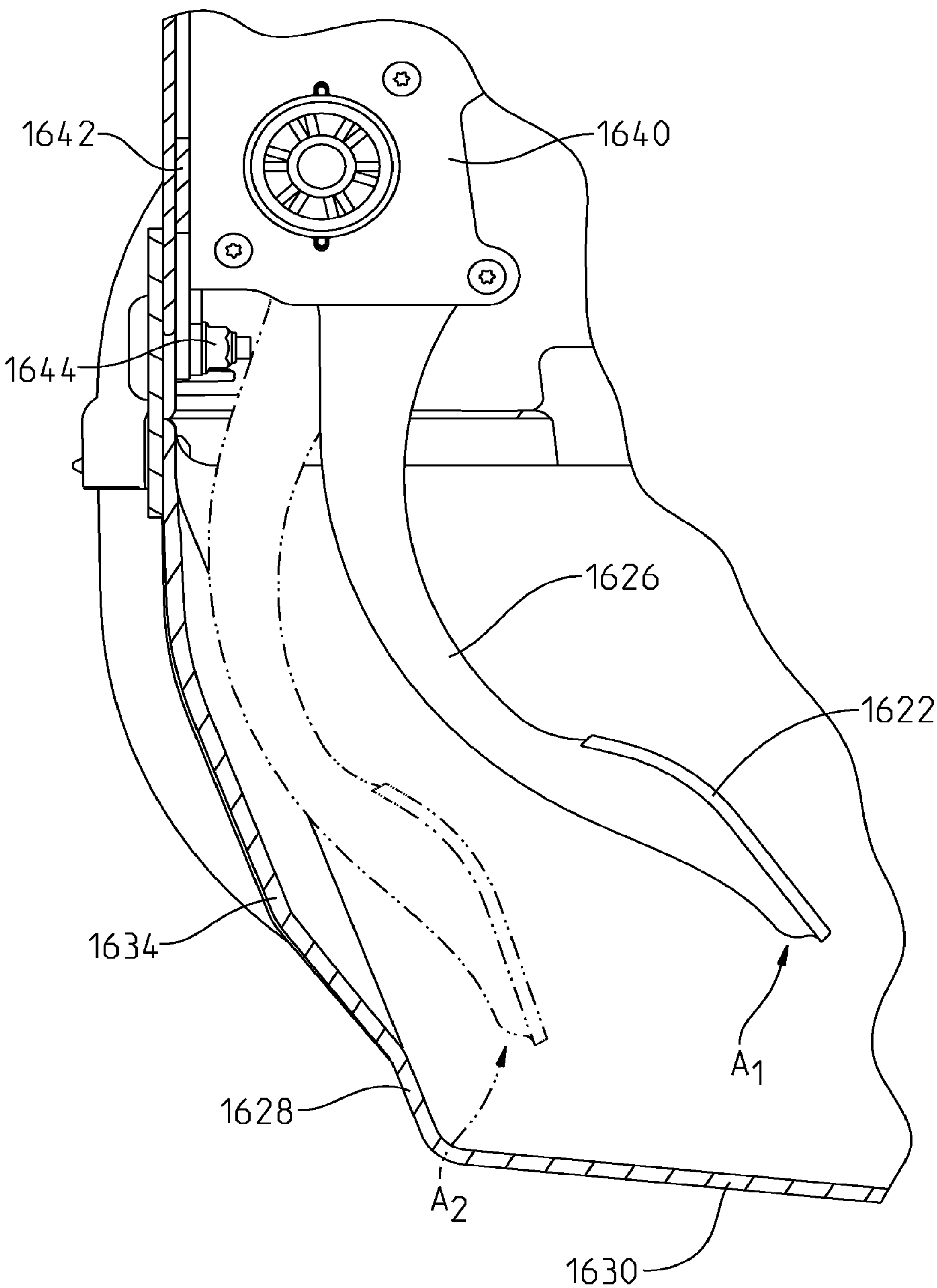
FIG. 80 is a side view of the accelerator pedal assembly of FIG. 79.

Referring to FIGS. 77, 79, and 80, the operator controls further include an accelerator pedal 1622, which also operates to move ground engaging members 14, 16. Accelerator pedal 1622 is coupled to an arm 1626 comprised of a resilient material, thereby allowing arm 1626 to flex without breaking when the operator depresses accelerator pedal 1622. Arm 1626 is pivotally coupled to an electrical system 1700 (FIG. 85) of vehicle 10 through an electronic throttle control ("ETC") 1640. ETC 1640 is electrically coupled to throttle bodies 840 (FIG. 36) at engine 802 (FIG. 34). Illustratively, the housing for ETC 1640 is supported by a plate 1642 and is coupled to an upper front panel 1646 with fasteners 1644. It may be appreciated that the illustrative housing of ETC 1640 does not support a throttle cable because ETC 1640 is in electrical communication with engine 802.

Accelerator pedal 1622 is positioned in a foot well of the operator area. As shown in FIG. 77, accelerator pedal 1622 is positioned below steering wheel 1602 and is adjacent a brake pedal 1624. Additionally, accelerator pedal 1622 is above a floor board panel 1630 and is rearward of a lower front panel 1628. Lower front panel 1628 includes a profiled recess 1634 that is configured to receive arm 1626 when accelerator pedal 1622 is depressed and arm 1626 moves in a forward direction. Illustratively, profiled recess 1634 is molded into lower front panel and functions as a "stop" for arm 1626 and accelerator pedal 1622.

In operation, as shown best in FIG. 80, when vehicle 10 is not moving, accelerator pedal 1622 and arm 1626 are in an idle position $A_1$. When in position $A_1$, accelerator pedal 1622 and arm 1626 are spaced apart from profiled recess 1634 and vehicle 10 is not moving. However, when the operator depresses accelerator pedal 1622, arm 1626 and accelerator pedal 1622 are moved in a forward direction and pivot relative to ETC 1640. The pivoting motion of arm 1626 signals ETC 1640 to open throttle bodies 840, thereby causing vehicle 10 to move. Accelerator pedal 1622 may be depressed to a "wide open" or maximum throttle position $A_2$, which also correlates to the maximum movement of accelerator pedal 1622 and arm 1626. When in position $A_2$, arm 1626 may contact recess 1634 which stops the forward movement of arm 1626. When in position $A_2$, arm 1626 resiliently flexes to allow accelerator pedal 1622 to contact floor board panel 1630 before arm 1626 is flexed to a breaking point.

Referring again to FIG. 77, floor board panel 1630 and lower front panel 1628 are forward of driver seat 62 and may include a stationary "dead pedal" 1648. Walls 1649 elevate dead pedal 1648 relative to floor board panel 1630 and lower front panel 1628. Dead pedal 1648 supports the operator's left foot when the operator is seated in driver seat 62. The position of dead pedal 1648 provides a natural and comfortable position for the operator's foot. The upper surface of dead pedal 1648 may be textured to prevent the operator's foot from sliding. Additionally, floor board panel 1630 may include a recessed pocket 1650 forward of driver seat 62. Pocket 1650 is sized and positioned to accommodate at least the heel of the operator's right foot, which may increase the operator's comfort when depressing accelerator pedal 1622.

FIG. 77 also discloses that the passenger side of vehicle 10 includes a floor board panel 1632 and a lower front panel 1636 forward of passenger seat 64. Floor board panel 1632 also may include a recessed pocket 1658 for supporting the passenger's feet, for example, the passenger's left heel or foot. Additionally, floor board panel 1632 and lower front panel 1636 support an inner dead pedal 1652 and an outer dead pedal 1654. Illustratively, inner dead pedal 1652 is angled relative to floor board panel 1632. Additionally, inner dead pedal 1652 may be flush with lower front panel 1635 and, therefore, would be angled at the same degree as lower front panel 1636. Alternatively, inner dead pedal 1652 may include walls (not shown) for elevating and angling inner dead pedal 1652 relative to lower front panel 1636 and floor board panel 1632. Inner dead pedal 1652 is positioned at a natural and comfortable location for the passenger's left foot and may include a textured surface to prevent the passenger's foot from slipping.

Outer dead pedal 1654 is supported by both floor board panel 1632 and lower front panel 1636. Outer dead pedal 1654 includes walls 1656 that elevate outer dead pedal 1654 relative to floor board panel 1632 and lower front panel 1636. Illustratively, outer dead pedal 1654 is offset from inner dead pedal 1652, and more particularly, is rearward of inner dead pedal 1652. Outer dead pedal 1654 also may be angled relative to floor board panel 1632, and more particularly, may be angled at the same degree as inner dead pedal 1652. As such, illustrative inner and outer dead pedals 1652, 1654 are offset from each other but positioned in parallel planes. Outer dead pedal 1654 provides a natural and comfortable location for the passenger's feet (e.g., the right foot) and may include a textured surface to prevent the passenger's foot from slipping.

Figure 81:
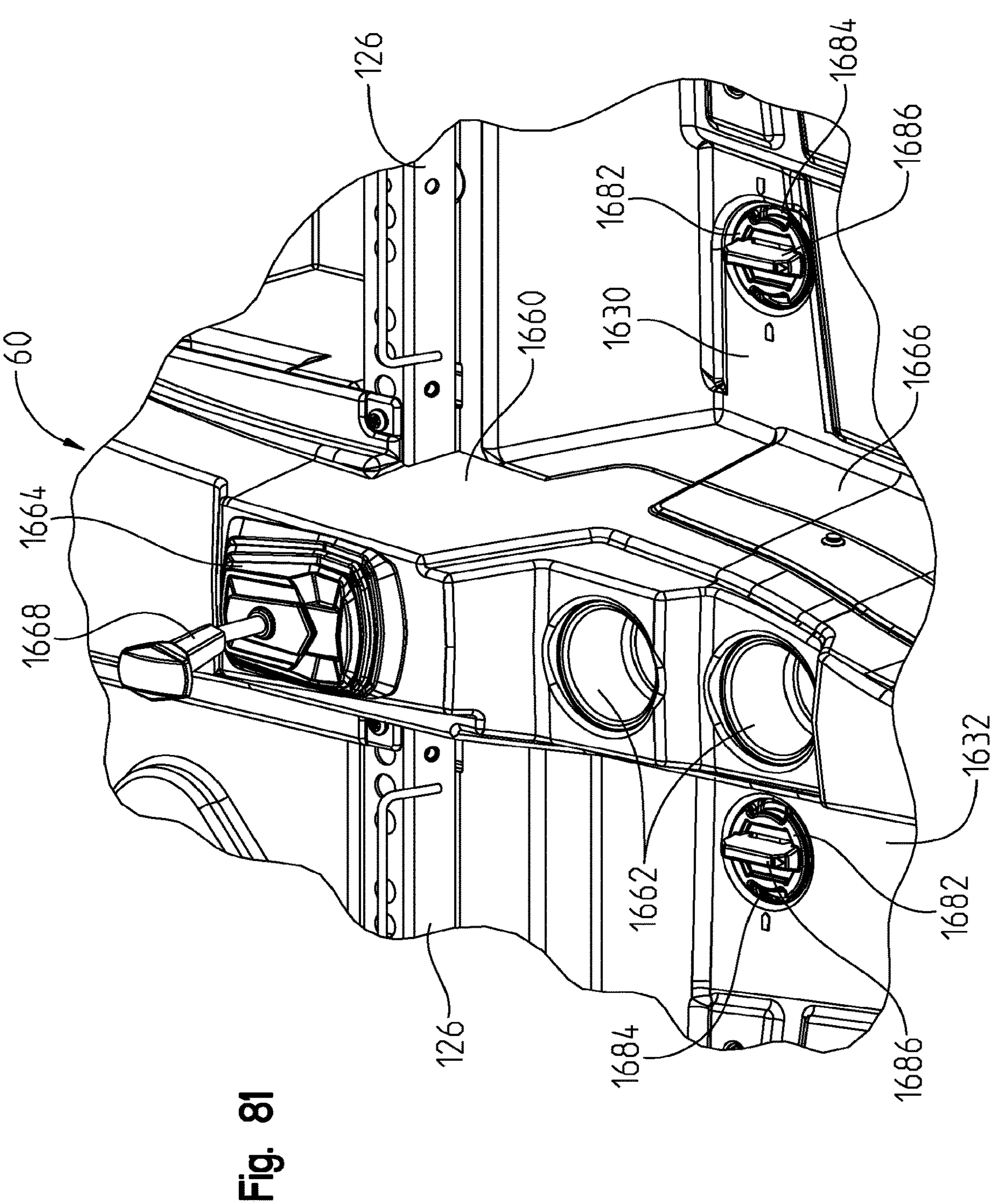
FIG. 81 is a rear perspective view of the operator area of FIG. 77.
Figure 82:
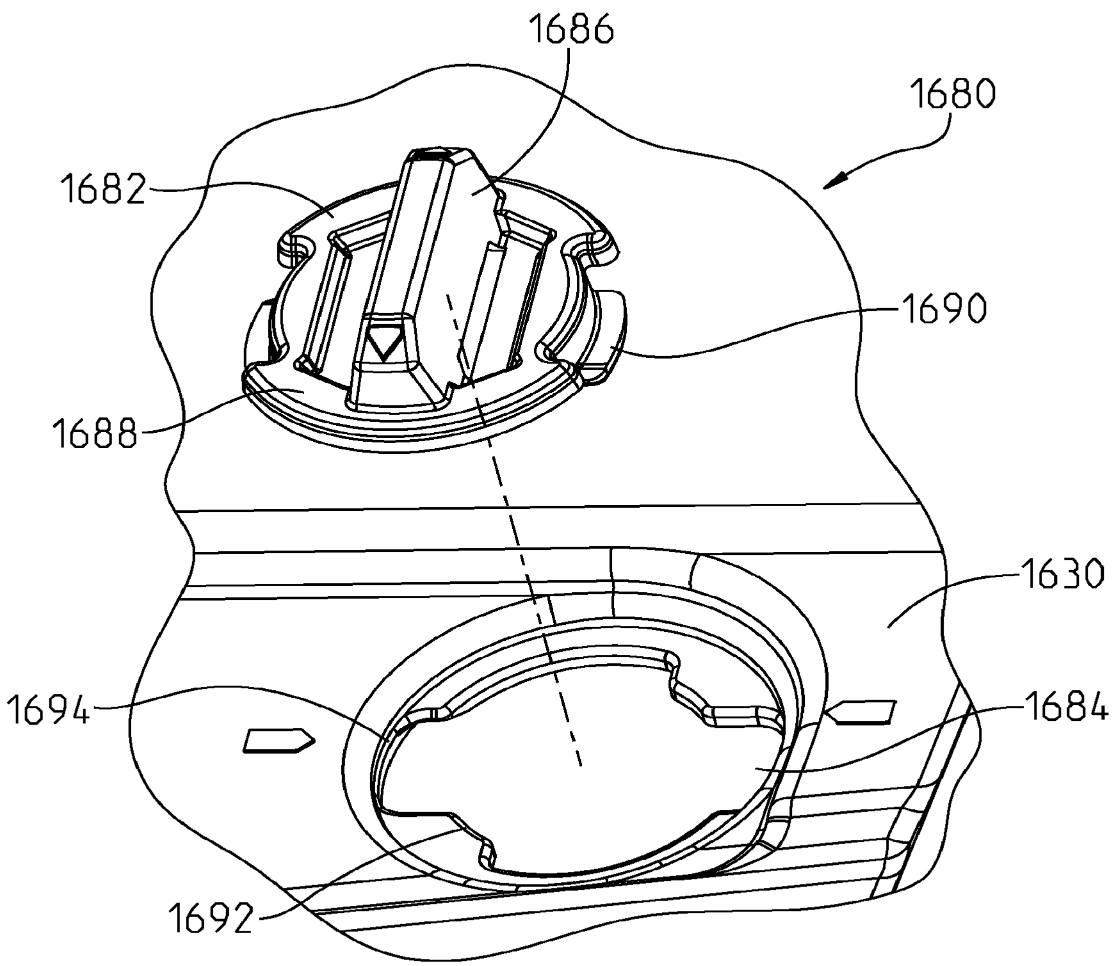
FIG. 82 is an exploded view of a floor drain within the operator area of FIG. 77.

As shown in FIGS. 81 and 82, floor board panels 1630, 1632 each may include at least one drain 1680 to allow fluids, dirt, and debris to exit the operator area when drain 1680 is open. Drain 1680 includes a cap 1682 that is removably coupled to a drain opening 1684 in floor board panels 1630, 1632. Drain cap 1682 includes a handle 1686, a body portion 1688, and a locking tab 1690. Handle 1686 extends upwardly from body portion 1688 to allow the operator or passenger to rotate drain cap 1682. Locking tabs 1690 are illustratively positioned below body portion 1688. Drain cap 1682 is positioned above drain opening 1684 and is rotatably coupled thereto, as is further detailed herein.

Drain opening 1684 includes a receiving surface 1692 that generally corresponds to the shape of body portion 1688 of cap 1682. Drain opening 1684 also includes channels 1694 for receiving locking tabs 1690 of cap 1682. When closed, body portion 1688 of cap 1682 contacts receiving surface 1692 and locking tabs 1690 extend within channels 1694. When handle 1686 is rotated to the closed position, locking tabs 1690 rotate below receiving surface 1692 such that locking tabs 1690 are no longer aligned with channels 1694. As such, drain cap 1682 may not be released from drain opening 1684. Conversely, when drain caps 1682 are rotated to the open position, locking tabs 1690 are aligned with channels 1694 such that locking tabs 1690 may be pulled through channels 1694. As such, drain caps 1682 may be released from drain opening 1684 which allows dirt, debris, and fluids to flow from the operator area and below vehicle 10. Illustrative drain caps 1682 may be snapped into, or released from, drain openings 1684 with only quarter turns (i.e., rotation through one-fourth of drain cap 1682).

Alternatively, floor board panels 1630, 1632 may include other removable portions. In one embodiment, floor board panels 1630, 1632 include removable portions larger than drains 1680. In another embodiment, floor board panels 1630, 1632 are removable from vehicle 10. However, floor board panels 1630, 1632 and/or frame 12 would include seals for sealing floor board panels 1630, 1632 against the frame members to prevent fluids, dirt, debris, and noise from entering the operator area.

Figure 83:
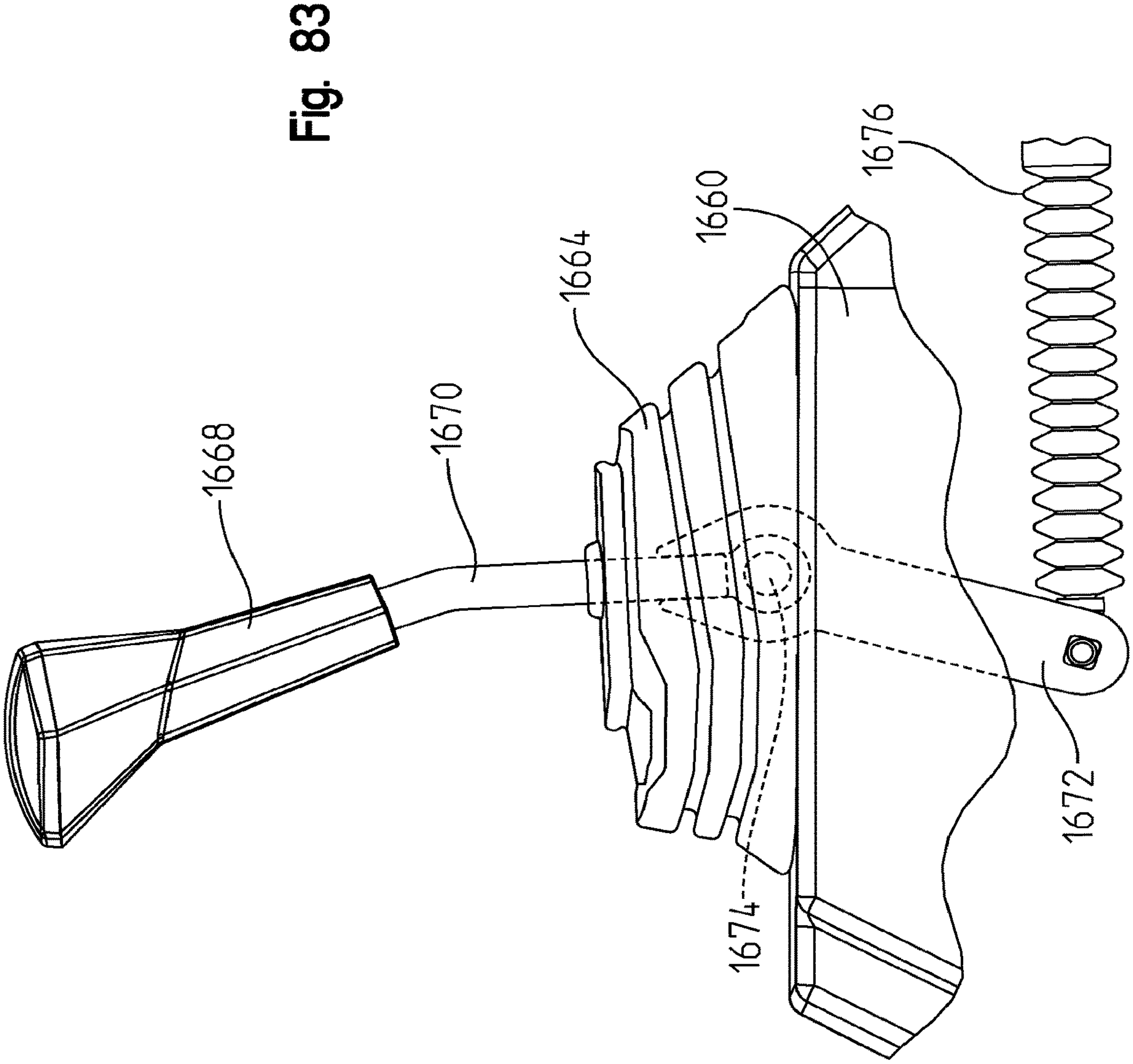
FIG. 83 is a side view of a shifter boot of the operator controls of FIG. 77.

Referring to FIGS. 77, 81, and 83, the operator area further includes a center console 1660 having cup holders 1662, a shifter boot 1664, and an access panel 1666. Access panel 1666 may be opened to provide access to drivetrain 30 and other components of vehicle 10 for cleaning, maintenance, and other actions. Console 1660 may be comprised of a polymeric material and is illustratively positioned between seat mounting brackets 126 on the driver side and the passenger side of vehicle 10. Console 1660 extends above floor board panels 1630, 1632 and extends in a generally longitudinal direction of vehicle 10.

As shown in FIG. 83, shifter boot 1664 supports a shift lever 1668 for signaling the drive mode of vehicle 10. Shifter boot 1664 is coupled to a top surface of console 1660. More particularly, shifter boot 1664 is sealed against the top surface of console 1660 in order to seal the operator area from dirt, debris, fluids, and noise from below vehicle 10.

Shift lever 1668 extends through shifter boot 1664 and includes an arm 1670. Arm 1670 is pivotally coupled to a pivot member 1672 at pivot point 1674. Pivot member 1672 connects shift lever 1668 to a cable 1676 for signaling the drive mode to drivetrain 30. As shown in FIG. 83, less than half of arm 1670 is positioned within shifter boot 1668 which allows shifter boot 1664 to remain close to pivot point 1674. Therefore, shifter boot 1664 does not move excessively during movement of shift lever 1668.

Figure 84:
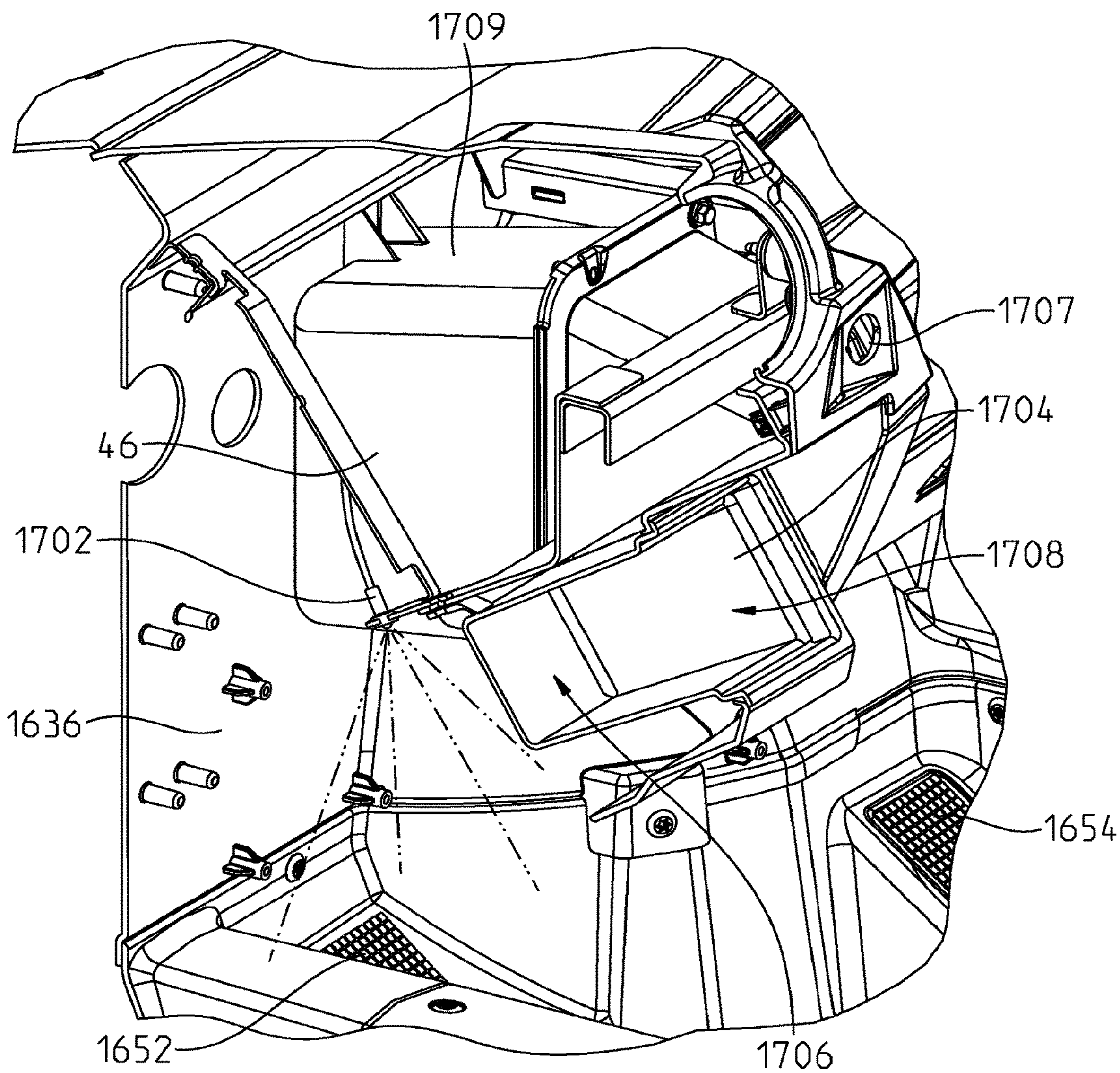
FIG. 84 is a rear perspective view of a light and a storage compartment within the operator area of FIG. 77.

Dash 46 is positioned within the operator area and supports as steering wheel 1602 and gauges (FIG. 77), as is further detailed herein. Referring to FIG. 84, dash 46 also supports at least one storage container 1704 having a front end 1706 and a rear end 1708. Storage container 1704 is supported on a bottom surface of dash 46 and is positioned over the foot well area of the operator area. Storage container 1704 is open to the operator area such that the passenger can reach into storage container without opening a door or removing a cover. Alternatively, storage container 1704 may include a removable or rotatable cover that extends over rear end 1708 of storage container 1704. Contents positioned within storage container 1704 remain therein during operation of vehicle 10 because front end 1706 of storage container 1704 is angled downwardly.

Dash 46 also includes a glove box 1709 for additional storage in the operator area. Glove box 1709 may include a cover for securing the contents therein, which is configured to rotate or slide to expose the contents within glove box 1709. Additionally, dash 46 has at least one boss 1707 for mounting accessories within the operator area.

Additional operator controls 68 are accessible to the operator and passenger when seated in the operator area. For example, and referring to FIG. 84, electrical system 1700 may include a light 1702 projecting below dash 46. Illustrative light 1702 may be a light emitting diode ("LED") or other similar device configured to illuminate the foot well of the operator area. Light 1702 is illustratively shown on the passenger side of vehicle 10, however, the driver side also may include light 1702. As shown, light 1702 illuminates floor board panel 1632 and lower front panel 1636, as well as inner dead pedal 1652 and outer dead pedal 1654 in front of passenger seat 64. Light 1702 also may illuminate storage container 1704 and console 1660, including cup holders 1662 and shift lever 1668. Additional lights (not shown) also may be used to illuminate other components of the operator area and vehicle 10.

Light 1702 may be electrically coupled to electrical system 1700, and may be controlled through a switch (not shown). The switch may be manually activated by the operator or passenger, or may be automatically activated by electrical system 1700. Electrical system 1700 may turn on light 1702 only when the headlights and/or other lights within the operator area are illuminated, or may turn on light 1702 when vehicle 10 starts such that light 1702 remains on when vehicle 10 is operating.

Figure 85:
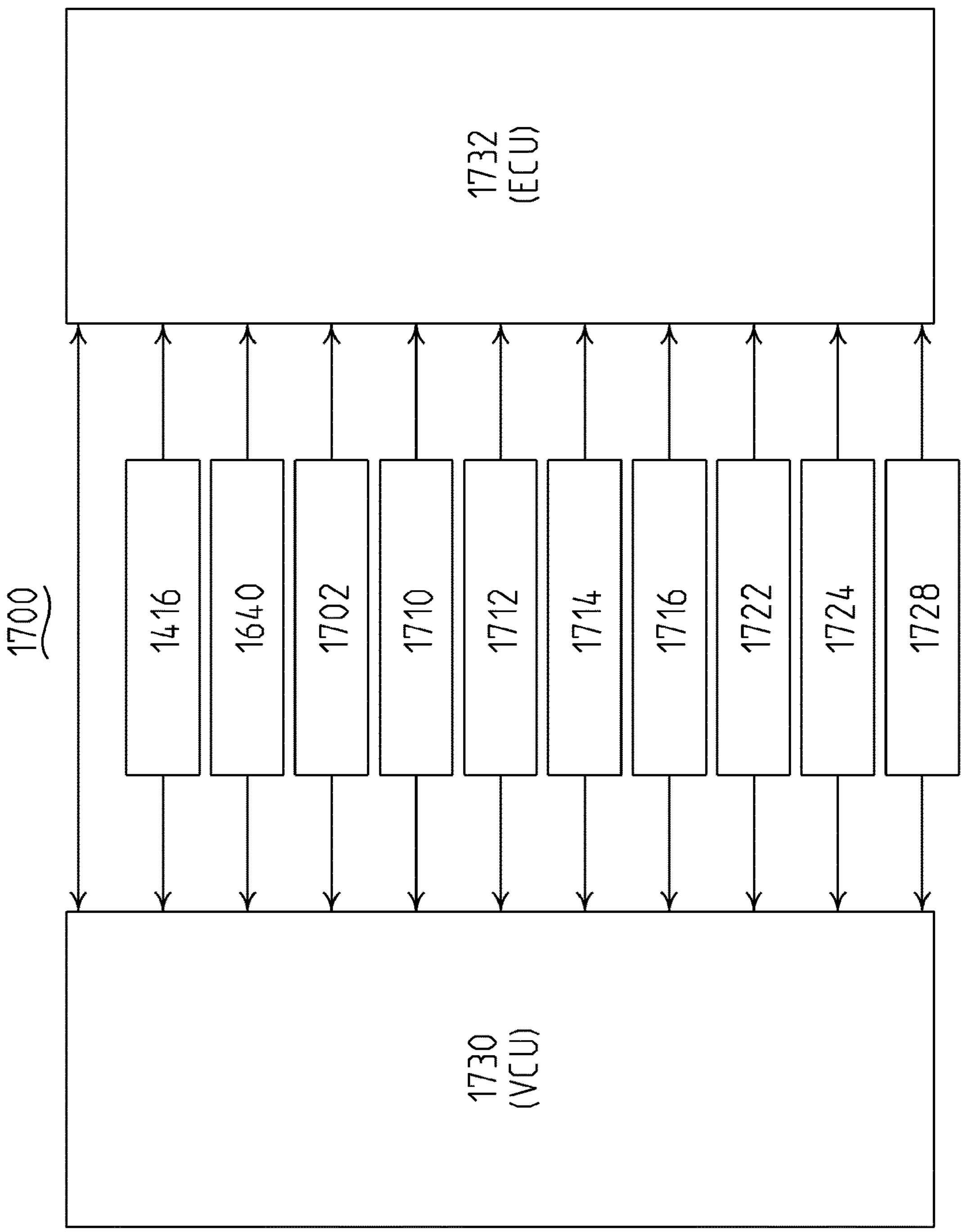
FIG. 85 is a schematic view of an electrical system of the vehicle of the present disclosure.

As shown in FIGS. 77 and 85, dash 46 also supports other components of electrical system 1700, such as a power sports interface ("PSI") 1724. PSI 1724 is an interface for a graphical multi-functional display, such as a display unit 1710, which is positioned on dash 46 and is accessible to the operator. Through display unit 1710, PSI 1724 displays various functional groups of vehicle 10 as pages of a multi-page menu structure. For example, the functional groups of PSI 1724 may include vehicle performance, vehicle dynamics, component setup, infotainment, navigation, weather, and phone and other external communications, as is detailed further herein. Display unit 1710 may be a double din unit in order to accommodate the various outputs.

Display unit 1710 may be a color touch screen graphical device, or alternatively, may include buttons and switches on display unit 1710, dash 46, steering wheel 1602, or other locations within the operator area for selecting the options presented on display unit 1710. Display unit 1710 also may include a light indicator 1712 and/or an audio signal for indicating a particular status of a component of vehicle 10.

Additionally, dash 46 may support various buttons, levers, or switches, such as ignition push button 1714 (FIG. 84), of electrical system 1700. Bosses 1707 on dash 46 also may support other components of vehicle 10, for example a CD, MP3, or musical player, a Bluetooth or wireless system for cell phones, and other systems or components in order to integrate those accessories into vehicle 10.

Alternatively, accessories such as cell phones, computers, musical players, or chargers for these various devices may be integrated into vehicle 10 near seats 62, 64. For example, a panel or box (not shown) may be positioned intermediate seats 62, 64, or positioned intermediate seats 62 or 64 and door assembly 1500 or side tubes 164, to support cell phones, computers, musical players, chargers, or GPS devices. Additionally, a panel or box may be supported under hood 42 for additional storage and support locations for accessories and cargo. Whether adjacent seats 62, 64, or under hood 42, the panels or boxes may be sealed to prevent fluids, dirt, and debris from entering and damaging the accessories therein, and therefore, are considered dry storage containers.

Frame tubes 602, 606, 610, 612, 614, 622, 624 of cab frame section 84 (FIG. 28) may include openings for passing the wires of the various integrated accessories (e.g., cell phones, chargers, computers, GPS devices, or musical players) to other locations of vehicle 10. As such, cab frame section 84 further integrates these accessories into vehicle 10 and also prevents the electrical wires from interfering with the operator area. Additionally, by supporting the wires for the various on-board and external devices within the frame tubes of cab frame section 84, zip ties or other coupling components are not required for securing the wires in vehicle 10.

Electrical system 1700 may operate various components of vehicle 10 as follows. Vehicle 10 may be started using a remote mechanism, such as a wireless or radio frequency ("RF") key fob 1716. When key fob 1716 is brought into proximity with vehicle 10, key fob 1716 communicates a wireless, RF, or other identification signal to a vehicle control unit 1730 ("VCU") and/or an engine control unit 1732 ("ECU") of electrical system 1700. The polymeric components of vehicle 10, such as body panels 40 and dash 46, are comprised of materials that allow transmission of RF, wireless, or other signals to and from key fob 1716. When VCU 1730 identifies key fob 1716 as being associated with vehicle 10, the operator may turn on vehicle 10 by depressing ignition push button 1714. As shown in FIG. 85, VCU 1730 and ECU 1732 may be coupled to a battery 1722 in order to power VCU 1730 and ECU 1732 when vehicle 10 is not turned on. Alternatively, vehicle 10 may be started using a conventional key that is turned in the ignition When vehicle 10 is operating, VCU 1730 and ECU 1732 may communicate with each other and also may send signals to display unit 10 to allow the operator and passenger to view the functions, operations, and status of the components of vehicle 10. For example, through PSI 1724, display unit 1710 may output the speed of vehicle 10, fluid and temperature levels, the time, the geographic coordinates of vehicle 10, the weather, the charging status of on-board and external devices, warnings, alarms, and other indicators to alert the operator of a status of the components of vehicle 10. PSI 1724 also may cooperate with internet or satellite signals to display a web browser, GPS, infotainment system, audio or sound displays, and/or other network or system outputs on display 1710. More particularly, PSI 1724 includes at least one network interfaces for allowing display unit 1710 to communicate with, display information from, and/or control certain aspects of the various components of electrical system 1700.

For example, one of the control functions of PSI 1724 displayed on display unit 1710 relates to a vehicle control system, which includes an engine management system, a drivetrain management system, a transmission control, a steering control, a suspension control, a traction control, stability control, and drive modes. Additional details about the drive modes are disclosed in U.S. Ser. No. 13/152,981, filed on Jun. 3, 2011, and Ser. No. 13/325,561 filed Dec. 14, 2011 the complete disclosures of which are expressly incorporated by reference herein. PSI 1724 allows the operator to select pre-designed active vehicle dynamic control algorithms, which are presented on display unit 1710, for viewing and tuning vehicle dynamics and performance. The active vehicle dynamic control algorithms may reside in PSI 1724 or another vehicle module. Additionally, the vehicle control system of PSI 1724 may display service or diagnostic alerts from various vehicle systems. The information from the vehicle control system of PSI 1724 may be uploaded to external devices, such as cell phones, smart phones, computers, cellular networks, wireless or satellite networks, the internet, a computer network, or other vehicle networks via one or more of the network interfaces of PSI 1724. Exemplary network interfaces of PSI 1724 may include CAN, Bluetooth, Wi-Fi, GSM, USB, and others.

Additionally, PSI 1724 connects to and manages the infotainment systems of vehicle 10 through interconnection to on-board and external devices, such as smart phones, radio receivers, USB memory devices, audio devices, amplifiers, speakers, and wired or wireless headsets. Additionally, PSI 1724 may include audio amplifiers and drivers for the external devices.

PSI 1724 also cooperates with display unit 1710 to overlay the location of vehicle 10 onto maps, terrain images, obstacle maps, and/or satellite and weather imagery. PSI 1724 also may record, save, and display vehicle log data and ride information. The log data and ride information may be communicated to on-board and external devices through at least one of the network interfaces.

Furthermore, electrical system 1700 may include cameras at the front and/or rear ends of vehicle 10, and through display unit 1710, PSI 1724 may display the video data. Additionally, PSI 1724 may be configured to playback the data on display unit 1710 or to send the data to another device via one of the network interfaces.

PSI 1724 also may control a security system for vehicle 10. Additional details of an exemplary security system are disclosed in U.S. U.S. Ser. No. 12/475,531, filed on May 31, 2009, the complete disclosure of which is expressly incorporated by reference herein. Additionally, through display unit 1710, PSI 1724 may display anti-collision warnings that are generated by external devices on vehicle 10. Alternatively, the anti-collision warnings may be generated by external inputs and algorithms that are included in PSI 1724.

Electrical system 1700 also may include a feedback system for communicating with various sensors, such as a sensor on light 1702 or other illumination devices (e.g., headlights), a sensor on seat belts 1416, and a MAP sensor 1728 on engine air intake system 820 (FIG. 37). For example, VCU 1730 and/or ECU 1732 communicate with the sensor on light 1702 to determine if light 1702 has been turned on. Depending on the conditions, such as time of day, operating conditions, or pre-configured parameters, electrical system 1700 may automatically turn on light 1702.

Additionally, VCU 1730 and/or ECU 1732 communicate with the sensor on seat belt 1416 to determine if the operator and/or passenger have securely latched seat belt 1416 before operation of vehicle 10. If the sensor indicates that seat belt 1416 is not engaged, a visual or audible alert may be communicated to the operator through light indicator 1712 on display unit 1710. Furthermore, ECU 1732 may prevent vehicle 10 from moving if the sensor indicates that seat belt 1416 is not latched.

VCU 1730 and/or ECU 1732 also communicate with MAP sensor 1728 (FIGS. 37 and 85) on intake system 820 to monitor intake air pressure. Display unit 1710 may output the intake pressure which alerts the driver to the reduction made by the filter and/or whether the filter is dirty and should be changed.

When vehicle 10 is no longer operating, ECU 1732 may include a controlled chassis relay which allows ECU 1732 to remain operational (via battery 1722) for a predetermined amount of time after vehicle 10 is shut off. For example, ECU 1732 may remain operational for approximately 30 seconds after the operator turns off vehicle 10 in order to maintain the operation of various components of electrical system 1700. For example, after vehicle 10 is turned off, ECU 1732 may maintain operation of head lights, tail lights, light 1702 in the operator area, communication devices, and/or the security system for the predetermined time limit (e.g., 30 seconds).

Figure 86:
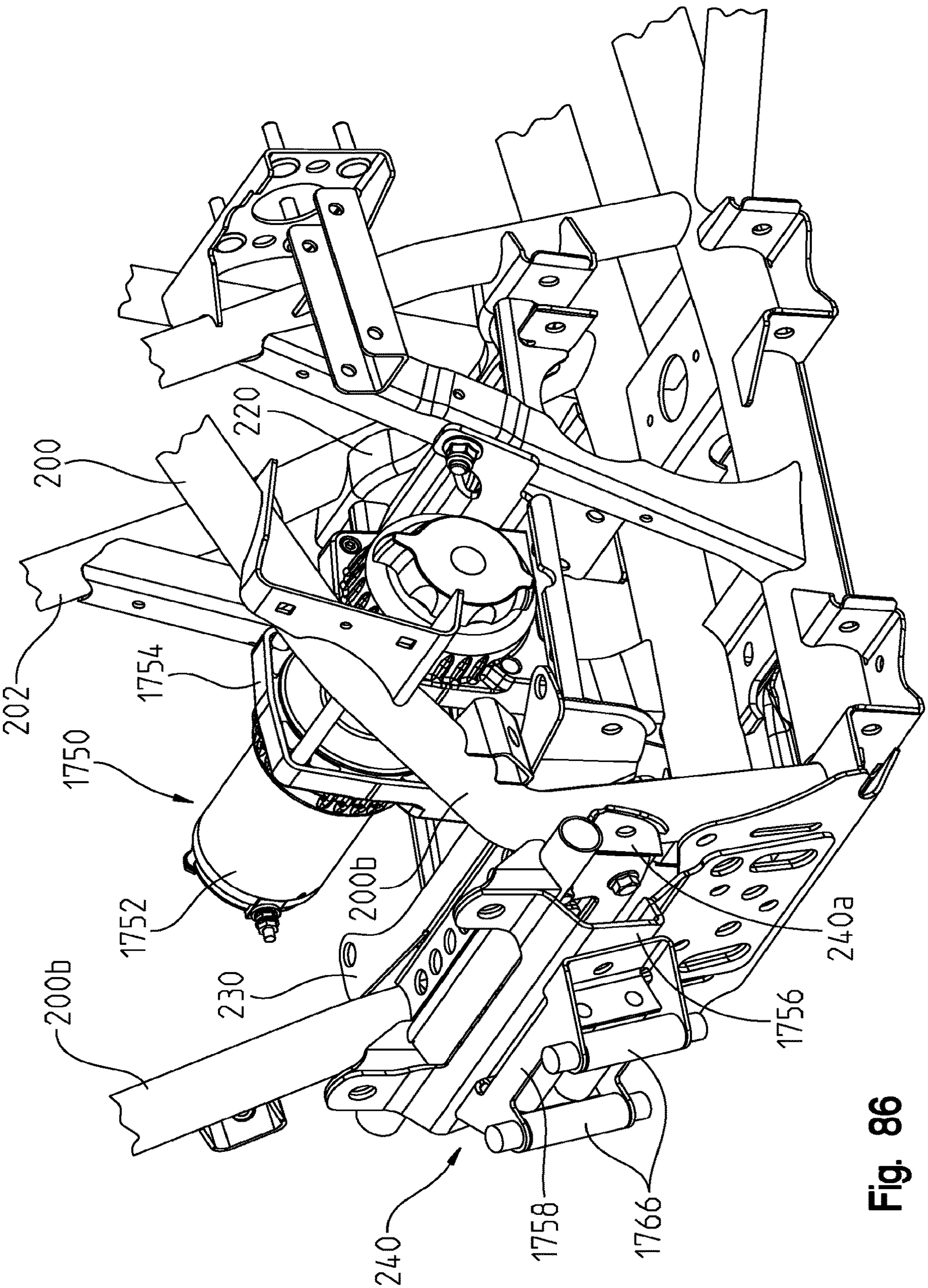
FIG. 86 is a front perspective view of a winch assembly positioned at the front end of the vehicle of the present invention.
Figure 87:
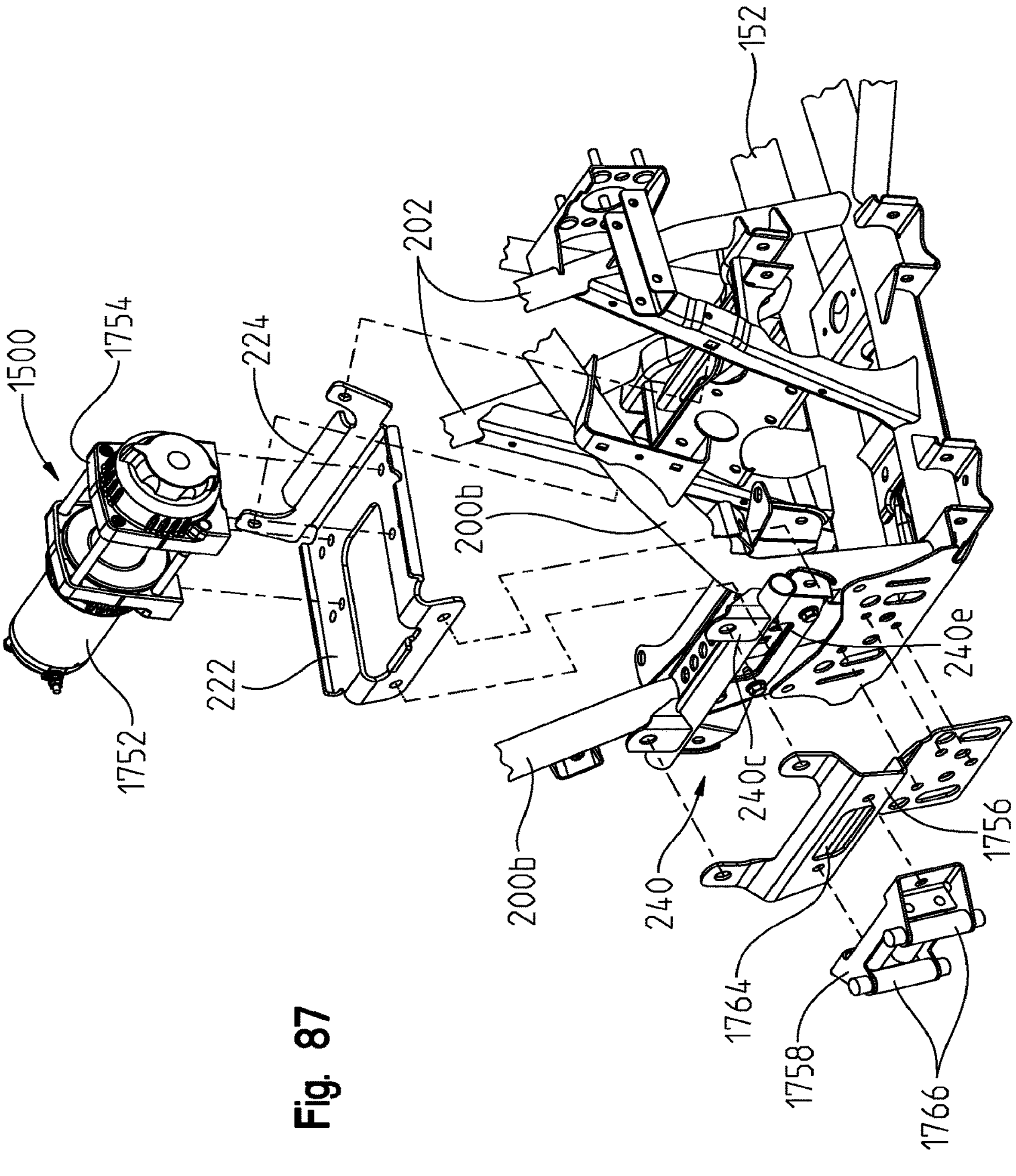
FIG. 87 is an exploded view of the winch assembly of FIG. 86
Figure 88:
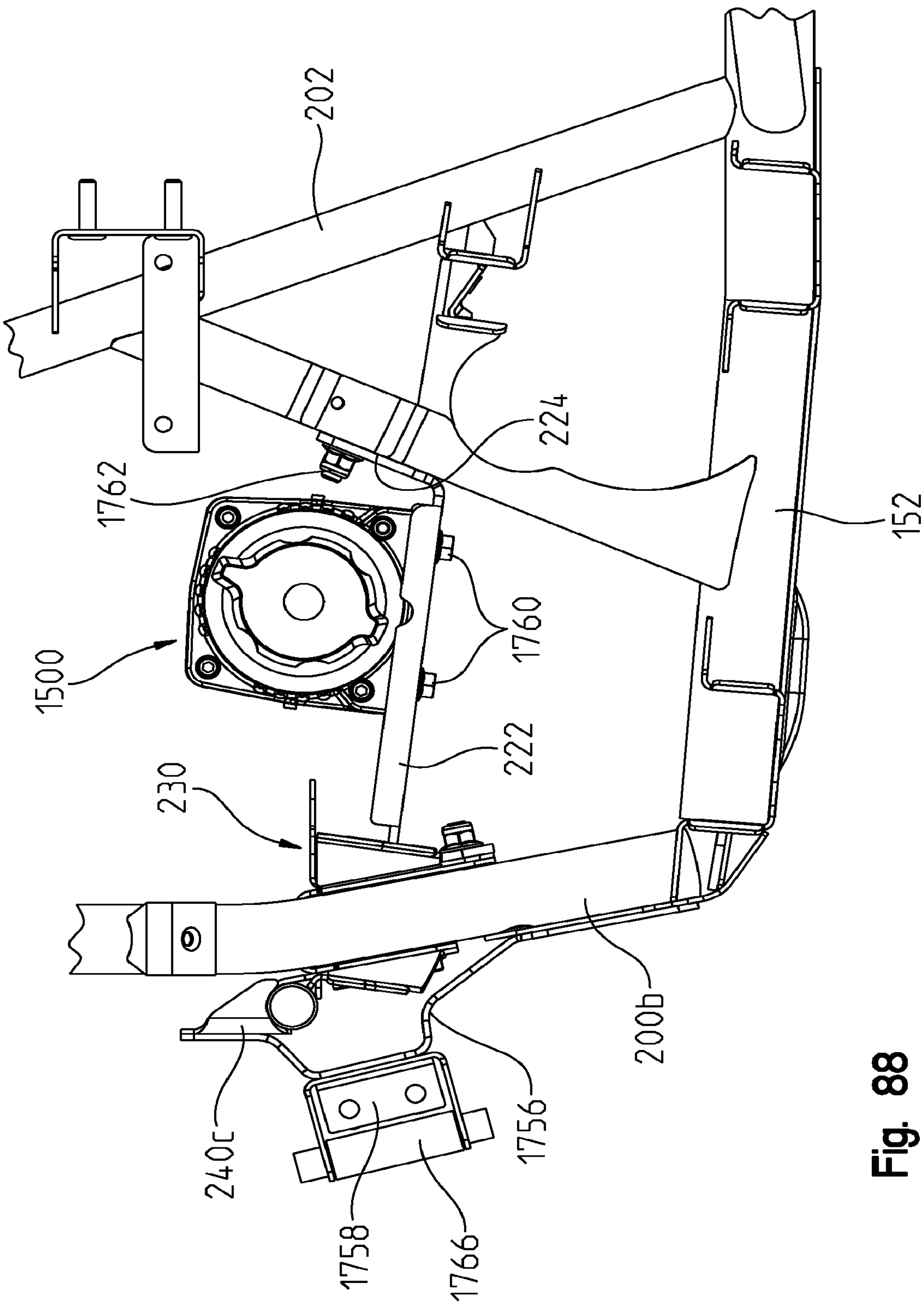
FIG. 88 is a side view of the winch assembly of FIG. 86.
Figure 89:
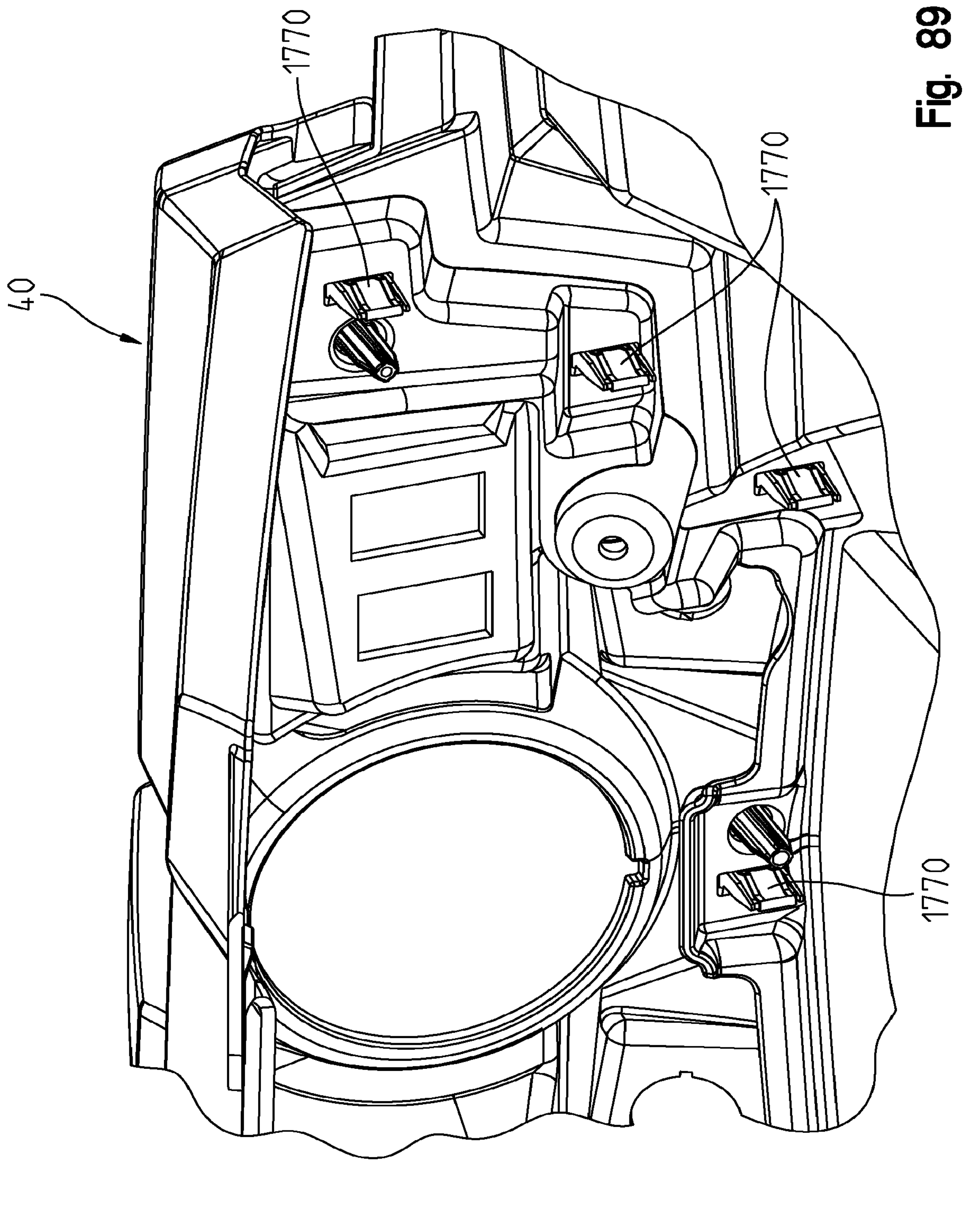
FIG. 89 is rear perspective view of body panels coupled to the frame of the vehicle of the present invention with connectors.
Figure 90:
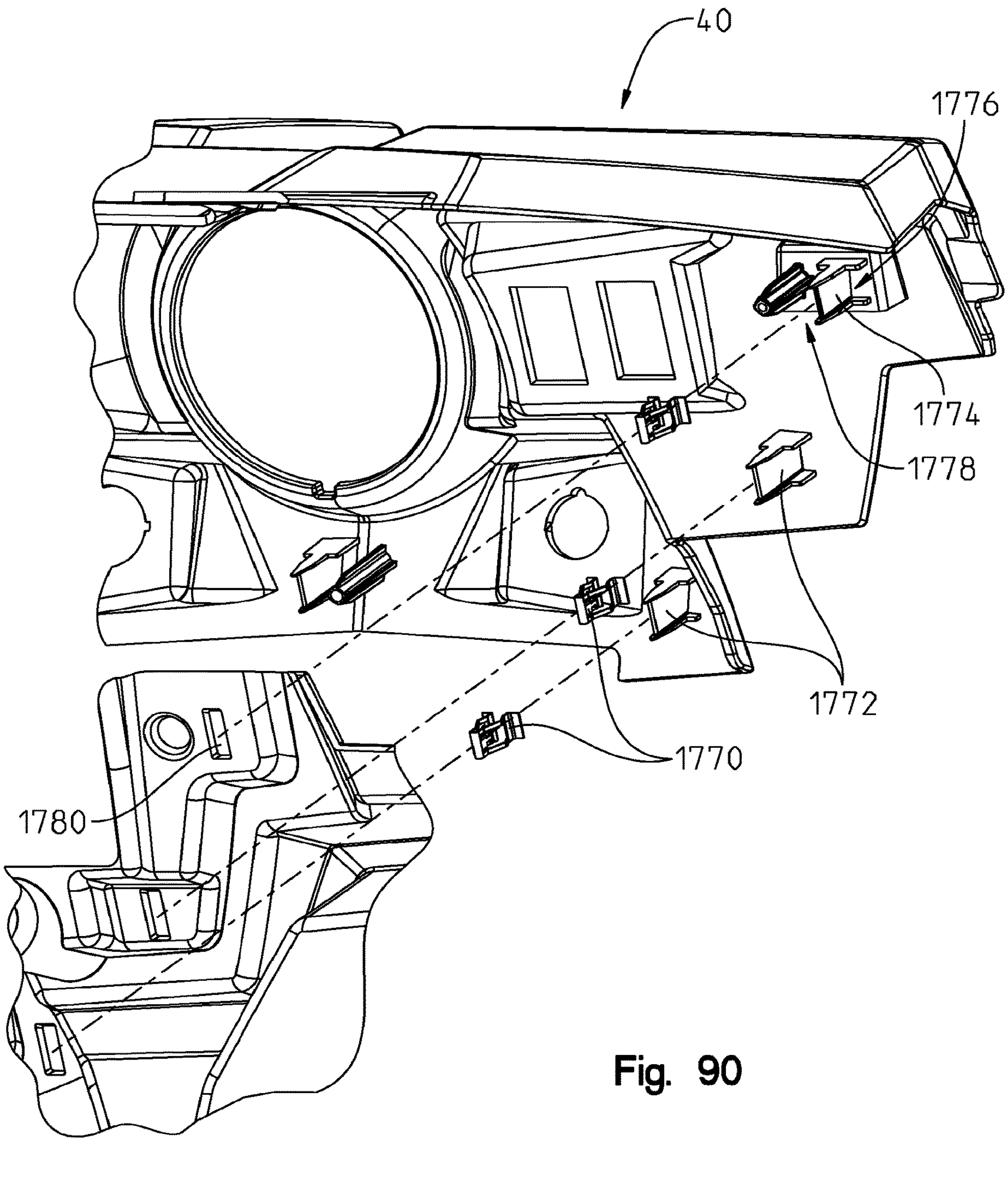
FIG. 90 is an exploded view of the connectors and body panels of FIG. 89.
Figure 91A:
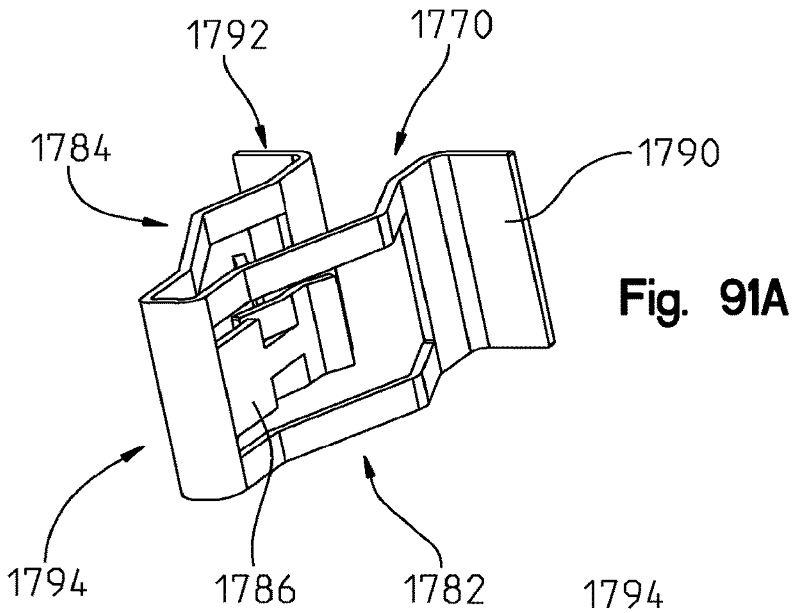
FIG. 91A is a perspective view of a connector of FIG. 90.
Figure 91B:
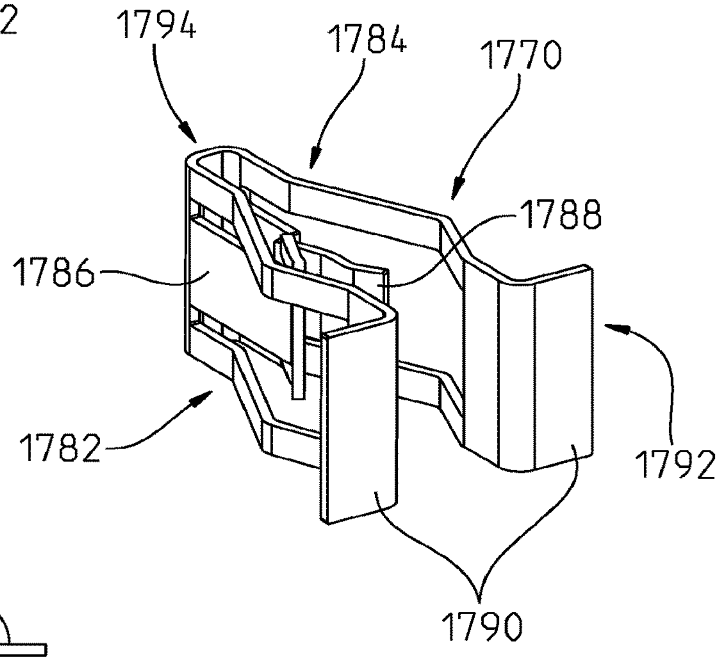
FIG. 91B is a further perspective view of the connector of FIG. 91A.
Figure 91C:
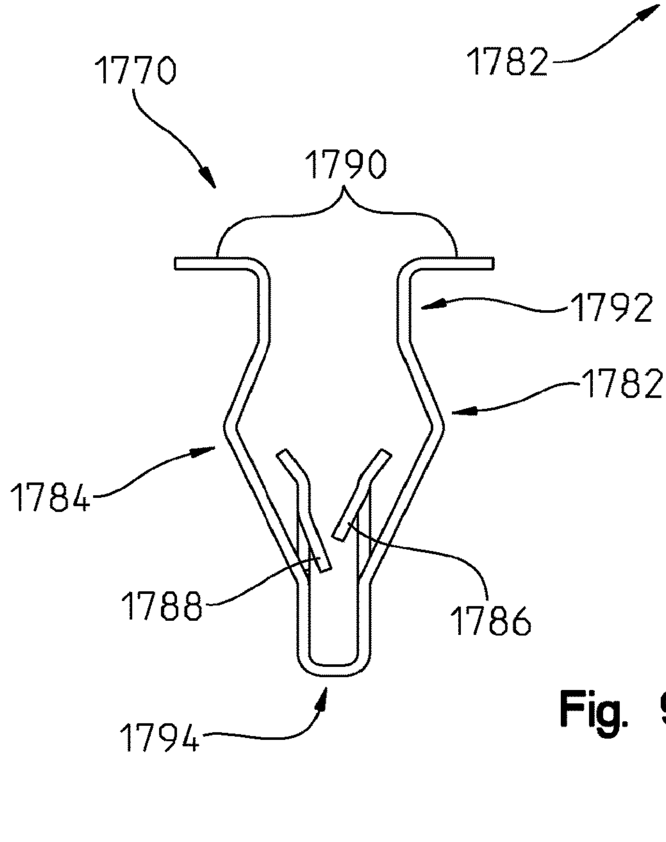
FIG. 91C is a top view of the connector of FIG. 91A.

In addition to the accessories of electrical system 1700, vehicle 10 also supports other accessories thereon. For example, as shown in FIGS. 86-88, a winch assembly 1750 may be supported on vehicle 10 on the outside of body portion 40 of vehicle 10. Alternatively, winch assembly 1750 may be positioned within body portion 40 of vehicle 10 to allow the operator access to winch assembly 1750 from the operator area. A further embodiment may include more than one location (e.g., a front end location and a rear end location) for winch assembly 1750 such that frame 12 may support more multiple winch assemblies 1750.

Winch assembly 1750 includes a winch device 1752, a device brace 1754, an alignment plate 1756, and a guide device 1758. Winch device 1752 is supported by device brace 1754, which is coupled to channels 222 and plate 224 at the front end of frame 12. As shown best in FIG. 88, winch device 1752 is intermediate tube portions 200*b* and frame tubes 202. More particularly, winch device 1752 is forward of frame tubes 202 and is rearward of tube portions 200*b*. Additionally, because winch device 1752 is coupled to channels 222 and plate 224, winch device 1752 is spaced apart from frame tubes 152. Illustratively, winch device 1752 is positioned above frame tubes 152 and device brace 1754 is coupled to channels 222 and plate 224 with fasteners 1760 and 1762, respectively.

Winch device 1752 is rearward of bracket 230 but the cable, rope, or line (not shown) that extends therefrom may be received through an opening (not shown) in bracket 230. When in use, the cable continuously extends from bracket 230 to bracket 240 which is forward of bracket 230. The cable extends through an aperture 240*e* of bracket 240 and also passes through an aperture 1764 of alignment plate 1756 before extending through an aperture (not shown) of guide device 1758. Alignment plate 1756 is coupled to bracket 240 and is intermediate bracket 240 and guide device 1758 when in use. Guide device 1758 is forward of alignment plate 1756 and includes rollers 1766 or other rounded devices. Rollers 1766 prevent damage to the cable of winch device 1752 if the cable slides to the outer edges of the aperture of guide device 1758. The cable may be coupled to an external object in order to carry or support the object. Winch device 1752 includes a retraction mechanism to retract the cable into winch device 1752 when not in use. Additional detailed of winch assembly 1750 are disclosed in U.S. patent application Ser. No. 13/492,589, filed on Jun. 8, 2012, the complete disclose of which is expressly incorporated by reference herein.

As shown in FIGS. 89-91C, body portion 40, including hood 42, front fender 44, dash 46, sideboard 48, front floorboard 50, rear sideboard 52, and rear cargo area 56, may be coupled to each other with connectors 1770. Illustratively, connectors 1770 are "H" connectors which are configured to couple with projections 1772 extending from body portions 40. Projections 1772 have opposing angled surfaces 1774 generally defining a V-shape. A distal end 1776 is coupled to a rear surface of body portions 40 and is wider than a proximate end 1778 which extends from the rear surface of body portions 40. Proximate end 1778 is received through apertures 1780 in adjacent body portions 40 to couple adjacent body portions to each other.

Connectors 1770 are coupled to proximate end 1778 in order to further secure adjacent body portions 40 together. Connectors 1770 also include opposing angled surfaces 1782, 1784, which generally correspond to opposing surfaces 1774 of projections 1772. Connectors 1770 also include an arm 1786 extending along a portion of surface 1782 and an arm 1788 extending along a portion of surface 1784. Tabs 1790 are positioned at a distal end 1792 of connectors 1770. A proximate end 1794 is narrower than distal end 1792.

In operation, when projections 1772 of body portions 40 are received through apertures 1780 of adjacent body portions 40, connectors 1770 slide over projections 1772 to further secure adjacent body portions 40 together. In particular, distal end 1792 of connector 1770 is coupled to distal end 1776 of projection 1772 such that tabs 1790 are in contact with the rear surface of body portions 40. Proximate end 1794 is coupled to proximate end 1778 of projections 1772. When connectors 1770 are received over projections 1772, arms 1786, 1788 engage opposing surfaces 1774 of projections 1772 to prevent connectors 1770 from sliding off of projections 1772. As such, connectors 1770 remain coupled to projections 1772, thereby securing body portions 40 to each other.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:

a frame;

ground engaging members supporting the frame;

an operator's compartment;

a powertrain for driving the ground engaging members;

a rear suspension comprising a trailing arm having a longitudinal length, the trailing arm being generally horizontally disposed, wherein the trailing arm includes a trailing arm lower surface that is horizontally disposed along the longitudinal length of the trailing arm when the trailing arm is in an unsprung, steady state; and a torsion bar coupled to the trailing arm and angled downward toward a front of the vehicle when trailing arm is in a neutral position.

2. The utility vehicle of claim 1, wherein the trailing arm lower surface is flat.

3. The utility vehicle of claim 2, wherein the trailing arm is substantially rectangular in cross-section.

4. The utility vehicle of claim 2, wherein the trailing arm lower surface is configured to be parallel to a ground surface.

5. The utility vehicle of claim 1, wherein the rear suspension comprises at least one shock absorber coupled between the trailing arm and the frame and a rear utility bed positioned rearward of the operator's compartment, and the at least one shock absorber mounts to the frame at a position behind the operator's compartment and under the rear utility bed.

6. The utility vehicle of claim 1, wherein the trailing arm includes a first portion having a first width and a second portion having a second width, the first width and the second width being substantially equal.

7. The utility vehicle of claim 1, wherein the frame includes a main frame section having outer frame rails defining a longitudinal section and the ground engaging members include at least one wheel hub, an upper surface of the longitudinal section of the outer frame rails and an upper surface of the trailing arm are positioned below an upper surface of the at least one wheel hub, and a lower surface of the outer frame rail and a lower surface of the trailing arm are positioned above a lower surface of the at least one wheel hub.

8. The utility vehicle of claim 1, further including a rear utility bed positioned rearward of the operator's compartment, the at least one shock absorber extending between the rear utility bed and the trailing arm.

9. A utility vehicle, comprising:

a frame comprising a main frame section having outer frame rails defining a longitudinal section and including a frame lower surface positioned vertically at a first height;

ground engaging members supporting the frame, the ground engaging members having at least one wheel hub;

an operator's compartment;

a powertrain for driving the ground engaging members;

a rear suspension comprising a trailing arm, a lower surface of the longitudinal section of the outer frame rails and a lower surface of the trailing arm being positioned above a lower surface of the at least one wheel hub, and wherein a trailing arm lower surface is positioned vertically at a second height in an unsprung, steady state, wherein the first height of the frame lower surface is substantially equal to the second height of the trailing arm lower surface; and a torsion bar coupled to the trailing arm and angled downward toward a front of the vehicle when trailing arm is in a neutral position.

10. The utility vehicle of claim 9, wherein an upper surface of the longitudinal section of the outer frame rails and an upper surface of the trailing arm are positioned below an upper surface of the at least one wheel hub.

11. The utility vehicle of claim 10, wherein the rear suspension further includes at least one shock absorber and the trailing arm including a mounting bracket, the at least one shock absorber is coupled to the mounting bracket and the mounting bracket is positioned along the upper surface of the trailing arm.

12. The utility vehicle of claim 11, further comprising a rear utility bed positioned behind the operator's compartment, and the mounting bracket is positioned vertically below the rear utility bed.

13. The utility vehicle of claim 12, wherein the mounting bracket is positioned horizontally forward of the at least one wheel hub.

14. A utility vehicle, comprising:

a frame;

ground engaging members supporting the frame;

an operator's compartment;

a powertrain for driving the ground engaging members;

a rear suspension comprising a trailing arm, a torsion bar operably coupled to the trailing arm at a pivot connection on the trailing arm, and at least one shock absorber, and the at least one shock absorber is operably coupled to an upper surface of the trailing arm, wherein the torsion bar is operable to pivot relative to the trailing arm at the pivot connection of the trailing arm; and the torsion bar coupled to the trailing arm and angled downward toward a front of the vehicle when trailing arm is in a neutral position.

15. The utility vehicle of claim 14, wherein the torsion bar is operably coupled to the trailing arm at a first position and the at least one shock absorber is operably coupled to the trailing arm at a second position, and the first position is forward of the second position.

16. The utility vehicle of claim 14, wherein the at least one shock absorber is coupled to the frame at a first position, the first position is forward of the coupling of the torsion bar to the trailing arm.

* * * * *